United States Patent
Jung et al.

(10) Patent No.: US 8,540,381 B2
(45) Date of Patent: Sep. 24, 2013

(54) SYSTEMS AND METHODS FOR RECEIVING INFORMATION ASSOCIATED WITH PROJECTING

(75) Inventors: Edward K. Y. Jung, Bellevue, WA (US); Eric C. Leuthardt, St. Louis, MO (US); Royce A. Levien, Lexington, MA (US); Robert W. Lord, Seattle, WA (US); Mark A. Malamud, Seattle, WA (US); John D. Rinaldo, Jr., Bellevue, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 247 days.

(21) Appl. No.: 12/217,123

(22) Filed: Jun. 30, 2008

(65) Prior Publication Data

US 2009/0310089 A1    Dec. 17, 2009

Related U.S. Application Data

(63) Continuation-in-part of application No. 12/214,422, filed on Jun. 17, 2008, and a continuation-in-part of application No. 12/217,118, filed on Jun. 30, 2008, and a continuation-in-part of application No. 12/217,116, filed on Jun. 30, 2008, and a continuation-in-part of application No. 12/217,115, filed on Jun. 30, 2008, and a continuation-in-part of application No. 12/217,135, filed on Jun. 30, 2008, and a continuation-in-part of application No. 12/217,117, filed on Jun. 30, 2008.

(51) Int. Cl.
*G03B 21/00*    (2006.01)

(52) U.S. Cl.
USPC .......................................... 353/122; 353/121

(58) Field of Classification Search
USPC ............................... 353/69, 70, 79, 121, 122
See application file for complete search history.

(56) References Cited

U.S. PATENT DOCUMENTS

| | | | |
|---|---|---|---|
| 3,622,223 A | 11/1971 | Brakell | |
| 3,623,804 A | 11/1971 | Spreitzer | |
| 3,644,027 A | 2/1972 | Bennett | |
| 3,874,787 A | 4/1975 | Taylor | |
| 3,905,695 A | 9/1975 | Taylor | |
| 4,012,133 A | 3/1977 | Burton | |
| 4,320,664 A | 3/1982 | Rehn et al. | |
| 4,684,136 A * | 8/1987 | Turner | 273/271 |
| 4,739,567 A | 4/1988 | Cardin | |
| 4,779,240 A | 10/1988 | Dorr | |
| 5,026,152 A | 6/1991 | Sharkey | |
| 5,469,258 A | 11/1995 | Grasso | |
| 5,515,079 A | 5/1996 | Hauck | |

(Continued)

FOREIGN PATENT DOCUMENTS

| | | | |
|---|---|---|---|
| JP | 2005-165129 A | 6/2005 | |
| WO | WO 2006/027855 A1 | 3/2006 | |
| WO | WO 2006/040725 A1 | 4/2006 | |
| WO | WO 2007/111382 A1 | 10/2007 | |

OTHER PUBLICATIONS

U.S. Appl. No. 12/291,025, Jung et al.
U.S. Appl. No. 12/291,024, Jung et al.

(Continued)

*Primary Examiner* — Thanh Luu

(57) ABSTRACT

The present disclosure relates to systems and methods that are related to transmitting and receiving information associated with projection.

51 Claims, 47 Drawing Sheets

(56) References Cited

U.S. PATENT DOCUMENTS

| | | |
|---|---|---|
| 5,581,637 A | 12/1996 | Cass et al. |
| 5,581,783 A | 12/1996 | Ohashi |
| 5,635,725 A | 6/1997 | Cooper |
| 5,747,690 A | 5/1998 | Park et al. |
| 5,757,490 A | 5/1998 | Martin |
| 5,793,470 A | 8/1998 | Haseltine et al. |
| 5,838,889 A | 11/1998 | Booker |
| 5,902,030 A | 5/1999 | Blanchard |
| 5,914,756 A | 6/1999 | Maeda et al. |
| 5,951,015 A * | 9/1999 | Smith et al. .......... 273/358 |
| 6,002,505 A | 12/1999 | Kraenert et al. |
| 6,115,022 A | 9/2000 | Mayer, III et al. |
| 6,266,048 B1 | 7/2001 | Carau, Sr. |
| 6,272,231 B1 | 8/2001 | Maurer et al. |
| 6,310,650 B1 | 10/2001 | Johnson et al. |
| 6,310,988 B1 | 10/2001 | Flores et al. |
| 6,334,063 B1 | 12/2001 | Charlier et al. |
| 6,340,976 B1 | 1/2002 | Oguchi et al. |
| 6,362,797 B1 | 3/2002 | Dehmlow |
| 6,414,672 B2 | 7/2002 | Rekimoto et al. |
| 6,424,998 B2 | 7/2002 | Hunter |
| 6,456,339 B1 | 9/2002 | Surati et al. |
| 6,489,934 B1 | 12/2002 | Klausner |
| 6,498,651 B1 | 12/2002 | Loil |
| 6,516,666 B1 | 2/2003 | Li |
| 6,527,395 B1 | 3/2003 | Raskar et al. |
| 6,549,487 B2 | 4/2003 | Gualtieri |
| 6,550,331 B2 | 4/2003 | Fujii et al. |
| 6,551,493 B2 | 4/2003 | Mori et al. |
| 6,554,431 B1 | 4/2003 | Binsted et al. |
| 6,563,504 B1 | 5/2003 | Rose et al. |
| 6,573,887 B1 | 6/2003 | O'Donnell, Jr. |
| 6,577,496 B1 | 6/2003 | Gioscia et al. |
| 6,583,864 B1 | 6/2003 | Stanners |
| 6,595,644 B2 | 7/2003 | Kostrzewski et al. |
| 6,601,037 B1 | 7/2003 | Kolls |
| 6,611,252 B1 | 8/2003 | DuFaux |
| 6,611,253 B1 | 8/2003 | Cohen |
| 6,614,422 B1 | 9/2003 | Rafii et al. |
| 6,626,543 B2 | 9/2003 | Derryberry |
| 6,636,203 B1 | 10/2003 | Wong et al. |
| 6,665,100 B1 | 12/2003 | Klug et al. |
| 6,675,630 B2 | 1/2004 | Challoner et al. |
| 6,695,451 B1 | 2/2004 | Yamasaki et al. |
| 6,708,087 B2 | 3/2004 | Matsumoto |
| 6,710,754 B2 | 3/2004 | Hanson et al. |
| 6,710,770 B2 | 3/2004 | Tomasi et al. |
| 6,727,864 B1 | 4/2004 | Johnson et al. |
| 6,733,138 B2 | 5/2004 | Raskar |
| 6,750,849 B2 | 6/2004 | Potkonen |
| 6,755,537 B1 | 6/2004 | Raskar et al. |
| 6,760,075 B2 | 7/2004 | Mayer, III et al. |
| 6,764,185 B2 | 7/2004 | Beardsley et al. |
| 6,793,350 B1 | 9/2004 | Raskar et al. |
| 6,798,401 B2 | 9/2004 | DuFaux |
| 6,802,614 B2 | 10/2004 | Haldiman |
| 6,811,264 B2 | 11/2004 | Raskar et al. |
| 6,840,627 B2 | 1/2005 | Olbrich |
| 6,844,893 B1 | 1/2005 | Miller et al. |
| 6,857,746 B2 | 2/2005 | Dyner |
| 6,909,670 B1 | 6/2005 | Li |
| 6,919,892 B1 | 7/2005 | Cheiky et al. |
| 6,955,297 B2 | 10/2005 | Grant |
| 6,984,039 B2 | 1/2006 | Agostinelli |
| 6,997,563 B1 | 2/2006 | Wang et al. |
| 7,013,029 B2 | 3/2006 | Keskar et al. |
| 7,016,711 B2 | 3/2006 | Kurakane |
| 7,036,936 B2 | 5/2006 | Hattori et al. |
| 7,043,987 B2 | 5/2006 | Jeong et al. |
| 7,071,924 B2 | 7/2006 | Wilbrink et al. |
| 7,088,352 B2 | 8/2006 | Wampler |
| 7,088,440 B2 | 8/2006 | Buermann et al. |
| 7,103,313 B2 | 9/2006 | Heinonen et al. |
| 7,118,220 B2 | 10/2006 | Castaldi et al. |
| 7,134,078 B2 | 11/2006 | Vaarala |
| 7,151,530 B2 | 12/2006 | Roeber et al. |
| 7,151,764 B1 | 12/2006 | Heinonen et al. |
| 7,155,978 B2 | 1/2007 | Lo et al. |
| 7,159,441 B2 | 1/2007 | Challoner et al. |
| 7,173,605 B2 | 2/2007 | Fong et al. |
| 7,185,987 B2 | 3/2007 | Tamura |
| 7,191,653 B2 | 3/2007 | Park et al. |
| 7,193,241 B2 | 3/2007 | Hayashi et al. |
| 7,195,170 B2 | 3/2007 | Matsumoto et al. |
| 7,209,569 B2 | 4/2007 | Boesen |
| 7,216,799 B2 | 5/2007 | Amemiya |
| 7,231,063 B2 | 6/2007 | Naimark et al. |
| 7,232,700 B1 | 6/2007 | Kubena |
| 7,234,119 B2 | 6/2007 | Wu et al. |
| 7,239,445 B2 | 7/2007 | Pouslen |
| 7,242,388 B2 | 7/2007 | Lieberman et al. |
| 7,245,381 B2 | 7/2007 | Marino et al. |
| 7,248,151 B2 | 7/2007 | Mc Call |
| 7,252,002 B2 | 8/2007 | Zerbini et al. |
| 7,256,923 B2 | 8/2007 | Liu et al. |
| 7,257,255 B2 | 8/2007 | Pittel |
| 7,259,658 B2 | 8/2007 | Noguchi et al. |
| 7,266,391 B2 | 9/2007 | Warren |
| 7,270,003 B2 | 9/2007 | Sassolini et al. |
| 7,282,712 B2 | 10/2007 | Shibayama |
| 7,284,866 B2 | 10/2007 | Buchmann |
| 7,287,428 B2 | 10/2007 | Green |
| 7,290,885 B2 | 11/2007 | Salvatori et al. |
| 7,301,648 B2 | 11/2007 | Foxlin |
| 7,305,368 B2 | 12/2007 | Lieberman et al. |
| 7,328,616 B2 | 2/2008 | Won et al. |
| 7,330,269 B2 | 2/2008 | Zurn et al. |
| 7,332,717 B2 | 2/2008 | Murata et al. |
| 7,336,271 B2 | 2/2008 | Ozeki et al. |
| 7,337,669 B2 | 3/2008 | Nozoe |
| 7,350,923 B2 | 4/2008 | Olson et al. |
| 7,355,583 B2 | 4/2008 | Beardsley et al. |
| 7,355,584 B2 | 4/2008 | Hendriks et al. |
| 7,355,796 B2 | 4/2008 | Robinson |
| 7,358,986 B1 | 4/2008 | Knighton et al. |
| 7,361,899 B2 | 4/2008 | Iida |
| 7,363,816 B2 | 4/2008 | Judy et al. |
| 7,373,833 B2 | 5/2008 | Hopper et al. |
| 7,379,630 B2 | 5/2008 | Lagakos et al. |
| 7,382,599 B2 | 6/2008 | Kikuiri et al. |
| 7,460,185 B2 | 12/2008 | Saletta |
| 7,484,855 B2 | 2/2009 | Kobayashi et al. |
| 7,549,754 B2 | 6/2009 | Furui |
| 7,595,809 B2 | 9/2009 | Widdowson |
| 7,630,522 B2 | 12/2009 | Popp et al. |
| 7,690,797 B2 | 4/2010 | Higashi |
| 7,742,949 B2 | 6/2010 | Evangelist et al. |
| 7,783,892 B2 | 8/2010 | Russell et al. |
| 7,810,114 B2 | 10/2010 | Flickinger et al. |
| 7,870,592 B2 | 1/2011 | Hudson et al. |
| 7,874,679 B2 | 1/2011 | Stonier |
| 7,891,826 B2 | 2/2011 | Fujinawa et al. |
| 7,936,943 B2 | 5/2011 | Way et al. |
| 7,967,445 B2 | 6/2011 | Hamano et al. |
| 7,980,707 B2 | 7/2011 | Murphy |
| 8,024,762 B2 | 9/2011 | Britt |
| 8,049,721 B2 | 11/2011 | Tagawa |
| 8,055,907 B2 | 11/2011 | Deem et al. |
| 2001/0000300 A1 | 4/2001 | Haile-mariam |
| 2001/0012001 A1 | 8/2001 | Rekimoto et al. |
| 2001/0024231 A1 | 9/2001 | Nakamura et al. |
| 2002/0039177 A1 | 4/2002 | Fukushima et al. |
| 2002/0105624 A1 | 8/2002 | Quori |
| 2002/0154091 A1 | 10/2002 | Uchida et al. |
| 2002/0184098 A1 | 12/2002 | Giraud et al. |
| 2002/0186676 A1 | 12/2002 | Milley et al. |
| 2003/0017846 A1 | 1/2003 | Estevez et al. |
| 2003/0038925 A1 | 2/2003 | Choi |
| 2003/0038927 A1 | 2/2003 | Alden |
| 2003/0038928 A1 | 2/2003 | Alden |
| 2003/0051256 A1 | 3/2003 | Uesaki et al. |
| 2003/0061607 A1 | 3/2003 | Hunter et al. |
| 2004/0003398 A1 | 1/2004 | Donian et al. |
| 2004/0012849 A1 | 1/2004 | Cruz-Uribe et al. |

| | | |
|---|---|---|
| 2004/0027539 A1 | 2/2004 | Plunkett |
| 2004/0075820 A1 | 4/2004 | Chu et al. |
| 2004/0158865 A1 | 8/2004 | Kubler et al. |
| 2004/0184010 A1 | 9/2004 | Raskar et al. |
| 2004/0184013 A1 | 9/2004 | Raskar et al. |
| 2004/0222983 A1 | 11/2004 | Kakemura |
| 2004/0239884 A1 | 12/2004 | Nagashima et al. |
| 2005/0030486 A1 | 2/2005 | Lee et al. |
| 2005/0036117 A1 | 2/2005 | Kobayashi |
| 2005/0046803 A1 | 3/2005 | Akutsu |
| 2005/0060210 A1 | 3/2005 | Levi et al. |
| 2005/0068501 A1* | 3/2005 | Nonaka et al. .................. 353/30 |
| 2005/0076372 A1 | 4/2005 | Moore et al. |
| 2005/0091671 A1 | 4/2005 | Deem et al. |
| 2005/0099432 A1* | 5/2005 | Chavis et al. ................ 345/619 |
| 2005/0117130 A1 | 6/2005 | Bohn et al. |
| 2005/0128437 A1 | 6/2005 | Pingali et al. |
| 2005/0153759 A1 | 7/2005 | Varley |
| 2005/0153760 A1 | 7/2005 | Varley |
| 2005/0179875 A1 | 8/2005 | Aoyanagi |
| 2005/0184958 A1 | 8/2005 | Gnanamgari et al. |
| 2005/0206856 A1 | 9/2005 | Ishii |
| 2005/0219467 A1 | 10/2005 | Nomizo et al. |
| 2005/0237492 A1 | 10/2005 | Shinozaki |
| 2005/0240417 A1 | 10/2005 | Savage |
| 2005/0253776 A1 | 11/2005 | Lee et al. |
| 2005/0259084 A1* | 11/2005 | Popovich et al. ............. 345/173 |
| 2005/0259231 A1 | 11/2005 | Salvatori et al. |
| 2005/0280628 A1 | 12/2005 | Adams et al. |
| 2006/0001543 A1 | 1/2006 | Raskar et al. |
| 2006/0015375 A1 | 1/2006 | Lee et al. |
| 2006/0017890 A1* | 1/2006 | Inazumi ......................... 353/69 |
| 2006/0020481 A1 | 1/2006 | Lee et al. |
| 2006/0020515 A1 | 1/2006 | Lee et al. |
| 2006/0028624 A1 | 2/2006 | Kaise et al. |
| 2006/0038814 A1 | 2/2006 | Rivera |
| 2006/0038965 A1 | 2/2006 | Hennes |
| 2006/0044513 A1 | 3/2006 | Sakurai |
| 2006/0059002 A1 | 3/2006 | Shibata et al. |
| 2006/0059739 A1 | 3/2006 | Sondergaard |
| 2006/0066564 A1 | 3/2006 | Yee et al. |
| 2006/0075019 A1 | 4/2006 | Donovan et al. |
| 2006/0095515 A1 | 5/2006 | Forstadius |
| 2006/0103811 A1 | 5/2006 | May et al. |
| 2006/0109237 A1 | 5/2006 | Morita et al. |
| 2006/0129551 A1 | 6/2006 | Teicher |
| 2006/0146291 A1 | 7/2006 | Olson et al. |
| 2006/0158425 A1 | 7/2006 | Andrews et al. |
| 2006/0158623 A1* | 7/2006 | Kobayashi et al. ........... 353/122 |
| 2006/0164526 A1 | 7/2006 | Suzuki et al. |
| 2006/0170875 A1 | 8/2006 | Falck et al. |
| 2006/0170885 A1 | 8/2006 | Kitahara |
| 2006/0171008 A1 | 8/2006 | Mintz et al. |
| 2006/0184977 A1 | 8/2006 | Mueller et al. |
| 2006/0187421 A1 | 8/2006 | Hattori et al. |
| 2006/0198550 A1 | 9/2006 | Jung et al. |
| 2006/0234784 A1 | 10/2006 | Reinhorn |
| 2006/0256076 A1 | 11/2006 | Liou et al. |
| 2006/0266135 A1 | 11/2006 | Nishikawa et al. |
| 2006/0271486 A1 | 11/2006 | Cross et al. |
| 2007/0005450 A1 | 1/2007 | Krishnamoorthy et al. |
| 2007/0005809 A1 | 1/2007 | Kobayashi et al. |
| 2007/0024580 A1 | 2/2007 | Sands et al. |
| 2007/0024763 A1 | 2/2007 | Chung |
| 2007/0040989 A1 | 2/2007 | Weng et al. |
| 2007/0064208 A1 | 3/2007 | Giegerich et al. |
| 2007/0075982 A1* | 4/2007 | Morrison et al. ............. 345/173 |
| 2007/0085977 A1* | 4/2007 | Fricke et al. .................... 353/79 |
| 2007/0091278 A1 | 4/2007 | Zakoji et al. |
| 2007/0103652 A1 | 5/2007 | Nijim et al. |
| 2007/0106950 A1* | 5/2007 | Hutchinson et al. .......... 715/761 |
| 2007/0109500 A1 | 5/2007 | Kobori et al. |
| 2007/0109505 A1 | 5/2007 | Kubara et al. |
| 2007/0109509 A1 | 5/2007 | Lee |
| 2007/0115440 A1 | 5/2007 | Wiklof et al. |
| 2007/0178973 A1 | 8/2007 | Camhi |
| 2007/0180409 A1 | 8/2007 | Sohn et al. |
| 2007/0188450 A1 | 8/2007 | Hernandez et al. |
| 2007/0199108 A1 | 8/2007 | Angle et al. |
| 2007/0218432 A1 | 9/2007 | Glass et al. |
| 2007/0220575 A1 | 9/2007 | Cooper et al. |
| 2007/0242033 A1 | 10/2007 | Cradick et al. |
| 2007/0242233 A1* | 10/2007 | Sokeila et al. .................. 353/69 |
| 2007/0247422 A1 | 10/2007 | Vertegaal et al. |
| 2007/0266412 A1 | 11/2007 | Trowbridge et al. |
| 2007/0273842 A1 | 11/2007 | Morrison et al. |
| 2007/0273848 A1 | 11/2007 | Fan et al. |
| 2007/0282564 A1 | 12/2007 | Sprague et al. |
| 2008/0002159 A1 | 1/2008 | Liu et al. |
| 2008/0036969 A1 | 2/2008 | Otsuka et al. |
| 2008/0056544 A1 | 3/2008 | Aikawa et al. |
| 2008/0060014 A1 | 3/2008 | Bentley et al. |
| 2008/0066111 A1 | 3/2008 | Ellis et al. |
| 2008/0079752 A1 | 4/2008 | Gates et al. |
| 2008/0121701 A1 | 5/2008 | Gabriel |
| 2008/0129647 A1 | 6/2008 | Canova |
| 2008/0136976 A1 | 6/2008 | Ajito et al. |
| 2008/0168523 A1 | 7/2008 | Ansari et al. |
| 2008/0183820 A1 | 7/2008 | Golovchinsky et al. |
| 2008/0186255 A1 | 8/2008 | Cohen et al. |
| 2008/0192017 A1 | 8/2008 | Hildebrandt et al. |
| 2008/0212039 A1 | 9/2008 | Taylor |
| 2008/0224251 A1 | 9/2008 | Troost et al. |
| 2008/0256453 A1 | 10/2008 | Fein et al. |
| 2008/0291213 A1 | 11/2008 | Bhogal et al. |
| 2008/0319857 A1 | 12/2008 | Dobbins et al. |
| 2009/0019078 A1 | 1/2009 | Chisholm et al. |
| 2009/0037382 A1 | 2/2009 | Ansari et al. |
| 2009/0051961 A1 | 2/2009 | Ohsawa |
| 2009/0070276 A1 | 3/2009 | Kodimer et al. |
| 2009/0070881 A1 | 3/2009 | Yellepeddy et al. |
| 2009/0079945 A1 | 3/2009 | Klosowiak et al. |
| 2009/0088204 A1 | 4/2009 | Culbert et al. |
| 2009/0091714 A1 | 4/2009 | Aufranc et al. |
| 2009/0096994 A1 | 4/2009 | Smits |
| 2009/0117846 A1 | 5/2009 | Mavrakakis |
| 2009/0136212 A1 | 5/2009 | Klein |
| 2009/0149246 A1 | 6/2009 | Opaluch |
| 2009/0150947 A1 | 6/2009 | Soderstrom |
| 2009/0181645 A1 | 7/2009 | Chan et al. |
| 2009/0186700 A1 | 7/2009 | Konkle |
| 2009/0217320 A1 | 8/2009 | Aldrey |
| 2009/0295712 A1 | 12/2009 | Ritzau |
| 2009/0310099 A1 | 12/2009 | Jung et al. |
| 2009/0310101 A1 | 12/2009 | Jung et al. |
| 2009/0310102 A1 | 12/2009 | Jung et al. |
| 2009/0311965 A1 | 12/2009 | Jung et al. |
| 2009/0316671 A1 | 12/2009 | Rolf et al. |
| 2010/0082743 A1 | 4/2010 | Zeng et al. |
| 2010/0132034 A1 | 5/2010 | Pearce et al. |
| 2011/0037953 A1 | 2/2011 | Nizani et al. |
| 2011/0255059 A1 | 10/2011 | Furui |

OTHER PUBLICATIONS

U.S. Appl. No. 12/291,023, Jung et al.
U.S. Appl. No. 12/291,019, Jung et al.
U.S. Appl. No. 12/290,241, Jung et al.
U.S. Appl. No. 12/290,240, Jung et al.
U.S. Appl. No. 12/286,750, Jung et al.
U.S. Appl. No. 12/286,731, Jung et al.
U.S. Appl. No. 12/229,536, Jung et al.
U.S. Appl. No. 12/229,534, Jung et al.
U.S. Appl. No. 12/229,519, Jung et al.
U.S. Appl. No. 12/229,518, Jung et al.
U.S. Appl. No. 12/229,508, Jung et al.
U.S. Appl. No. 12/229,505, Jung et al.
U.S. Appl. No. 12/220,906, Jung et al.
U.S. Appl. No. 12/218,269, Jung et al.
U.S. Appl. No. 12/218,268, Jung et al.
U.S. Appl. No. 12/218,267, Jung et al.
U.S. Appl. No. 12/218,266, Jung et al.
Harding, Margaret; "Futuristic Windshield Helps Drivers See the Road"; Siliconvalley.com; Bearing a date of Jul. 18, 2008; pp. 1-2; located at: http://www.siliconvalley.com/ci_9919977?1ADID=Search-www.siliconvalley.com-www.siliconvalley.com; printed on Aug. 18, 2008.

Menon, Anuradha; "Flexible Computers Conform to Any Shape"; The Future of Things; Bearing a date of Jul. 3, 2008; pp. 1-3; located at: http://thefutureofthings.com/news/1222/flexible-computers-able-to-conform-any-shape.html; printed on Jul. 9, 2008.

"Mint V10: World's Smallest Pocket Projector"; Gizmodo; Bearing a date of Aug. 18, 2008; pp. 1-3; located at: http://gizmodo.com/5031873/mint-v10-worlds-smallest-pocket-projector; printed on Aug. 18, 2008.

Murph, Darren; "3M Reveals MPro110 Pocket Projector: Ships This Month"; Engadget; Bearing a date of Sep. 13, 2008; pp. 1-5; Weblogs, Inc.; located at: http://www.engadget.com/2008/09/13/3m-reveals-mpro110-pocket-projector-ships-this-month/; printed on Sep. 22, 2008.

"Projectors: LG Projector Phone Is Like a Media-Throwing Web Shooter"; Gizmodo; Bearing a date of Jul. 9, 2008; pp. 1-3; located at: http://gizmodo.com/5022626/lg-projector-phone-is-like-a-media+throwing-web-shooter; printed on Jul. 9, 2008.

"Projectors: 18 Super Small Projectors"; Gizmodo; Bearing a date of Aug. 18, 2008; pp. 1-3; located at: http://gizmodo.com/5031238/18-super-small-projectors; printed on Aug. 18, 2008.

Ricker, Thomas; "Video: Camera-Based Concept Turns Any Surface into a DJ Deck"; Engadget; Bearing a date of Jul. 31, 2008; pp. 1-5; Weblogs, Inc.; located at: http://www.engadget.com/2008/07/31/video-camera-based-concept-turns-any-surface-into-a-dj-deck/; printed on Aug. 18, 2008.

Topolsky, Joshua; "SenseSurface Sticks Knobs Onto Screens, Turns Virtual Controls Physical"; Engadget; Bearing a date of Jul. 16, 2008; pp. 1-7; Weblogs, Inc.; located at: http://www.engadget.com/2008/07/16/sensesurface-sticks-knobs-onto-screens-turns-virtual-controls-p/; printed on Aug. 18, 2008.

Allen, Danny; "Before Nikon's S1000pj: The Cine-Twin Was the First Camera/Projector Hybrid"; printed on Nov. 25, 2009; pp. 1-2; gizmodo.com; located at http://gizmodo.com/5347564/before-nikons-s1000pj-the-cine+twin-was-the-first-cameraprojector-hybrid.

Allen, Danny; "Ericsson's Spider PC Concept Projects the Keyboard and Screen"; printed on Nov. 25, 2009; pp. 1-3;gizmodo.com; located at http://gizmodo.com/5392667/ericssons-spider-pc-concept-projects-the-keyboard-and-screen.

Herrman, John; "Nikon S1000pj Projector Camera Review: Screw You All, I Love This Thing"; printed on Nov. 25, 2009; pp. 1-5; gizmodo.com; located at http://gizmodo.com/5402528/nikon-s1000pj-projector-camera-review-screw-you-all-i-love-this-thing.

Miller, Paul; "Optoma's screen-in-a-bag actually makes a lot of sense"; bearing a date of Nov. 12, 2009; printed on Nov. 25, 2009; pp. 1-5; engadget.com; located at http://www.engadget.com/2009/11/12/optomas-screen-in-a-bag-actually-makes-a-lot-of-sense.

Diaz, Jesus; "Is There an iPad Cinema in Your Future?"; Bearing a date of Mar. 16, 2010, printed on Mar. 19, 2010; pp. 1-2; Gizmodo. com; located at http://gizmodo.com/5494787/is-there-an-ipad-cinema-in-your-future.

Hannaford, Kat; "Pico Projector From Light Blue Optics Throws Up a 10-inch Touchscreen Laser Projection"; Bearing a date of Jan. 5, 2010, printed on Jan. 19, 2010; pp. 1-2; Gizmodo.com; located at http://gizmodo.com/5440651/pico-projector-from-light-blue-optics-throws-up-a-10+inch-touchscreen-laser-projection.

Loftus, Jack; "Dell Froot Concept Design Does Away with Keyboard, Monitor"; Bearing a date of Jan. 17, 2010, printed on Jan. 19, 2010; pp. 1-2; Gizmodo.com; located at http://gizmodo.com/5450176/dell-froot-concept-design-does-away-with-keyboard-monitor.

Blass, Evan; "Hands-On With Texas Instruments' Cellphone Projector"; Engadget; Bearing a date of Sep. 20, 2007; pp. 1-7; Weblogs, Inc.; located at: http://www.engadget.com/2007/09/20/hands-on-with-texas-instruments-cellphone-projector; printed on Apr. 10, 2008.

Browne et al.; "Using Motion Control to Guide Augmented Reality Manufacturing Systems"; Motion Control Technology; Bearing a date of 2006; pp. 1-4; ABP International, Inc.; located at: http://www.nasatech.com/motion/features/feat_1007.html; printed on May 8, 2008.

"Cell Phone With Built-in Projector"; Physorg; Bearing a date of Mar. 24, 2005; p. 1; located at: http://www.physorg.com/news3505.html; printed on Apr. 10, 2008.

"Concepts: Cellphone Projector Concept Allows Impromptu Sales Meetings"; Gizmodo; pp. 1-3; located at: http://gizmodo.com/gadgets/concepts/cellphone-projector-concept-allows-impromptu-sales-meetings-311590.php; printed on Apr. 10, 2008.

"Hybrid Technology"; InterSense; p. 1; InterSense, Inc.; located at: http://www.isense.com/products.aspx?id=43; printed on May 8, 2008.

"6-DOF Tracking (IS-900, IS-1200 Product Families)"; InterSense; p. 1; InterSense, Inc.; located at: http://www.isense.com/products.aspx?id=45&; printed on May 8, 2008.

"Precision Motion Tracking Solutions"; InterSense; p. 1; InterSense, Inc.; located at: http://www.isense.com/; printed on May 8, 2008.

"Is That a Projector in Your Pocket or a . . . Cell Phone?"; Gadget Review; Bearing a date of Mar. 27, 2007; pp. 1-6; located at: http://www.gadgetreview.com/2007/03/is-that-a-projector-in-your-pocket-or-acell-phone.html; printed on Apr. 10, 2008.

Kanellos, Michael; "TI Demos Its Movie Projector in a Phone"; CNET News; Bearing a date of Mar. 26, 2007; pp. 1-2; CNET Networks, Inc.; located at: http://earthlink.com.com/TI+demos+its+movie+projector+in+a+phone/2100-1041_3-6170619.html; printed on Apr. 10, 2008.

Lagorio, Christine; "Weird Science! NYU Student Invents Virtual Girlfriend"; New York Magazine; Bearing a date of May 14, 2008; pp. 1-2; New York Media LLC; located at: http://nymag.com/daily/inte1/2008/05/weird_science_nyu_student_inve.html; printed on May 15, 2008.

"LCD Projector Cell Phone Next April"; Gadget Review; Bearing a date of Apr. 13, 2006; pp. 1-6; located at: http://www.gadgetreview.com/2006/04/lcd-project-cell-phone-next-april.html; printed on Apr. 10, 2008.

"Micro Piezo Gyro"; Heli-Max Performance Parts; Bearing a date of 1998; pp. 1-2; located at: http://manuals.hobbico.com/hmx/hmxml010-manual.pdf.

Mooney, Allison; "Mobile Phone Projectors"; PSFK; Bearing a date of Oct. 22, 2007; pp. 1-6; located at: http://www.psfk.com/2007/10/mobile-phone-proiectors.html; printed on Apr. 10, 2008.

"Nano Projector Now in Cellphones"; Ubergizmo; Bearing a date of Jul. 2, 2007; pp. 1-4; located at: http://www.ubergizmo.com/15/archives/2007/07/nano_projector_now_in_cellphones.html; printed on Apr. 10, 2008.

"PicoP: Mobile Phone Projector From Microvision"; Planet Cell Phone Blog; Bearing a date of Sep. 23, 2006; pp. 1-9; located at: http://blog.planet-cell-phone.com/2006/09/23/picop-mobile-phone-projector-from-microvision/; printed on Apr. 10, 2008.

"Pico: Optoma to Launch 'World's First' Pico Projector in 2008"; Gizmodo; Bearing a date of Jun. 18, 2008; pp. 1-3; located at: http://gizmodo.com/5017516/optoma-to-launch-worlds-first-pico-projector-in-2008; printed on Jun. 23, 2008.

Sakata et al.; "Digital Annotation System For Printed Paper Documents Using Camera-Projector Systems"; ACTA Press; Bearing a date of 2007; p. 1; located at: http://www.actapress.com/Abstract.aspx?paperId=27986; printed on May 2, 2008 (Abstract Only).

"Silicon Gyroscopes"; Boeing; pp. 1-3; located at; http://www.boeing.com/defense-space/space/bss/factsheets/gyro/gyro.html; printed on Apr. 25, 2008.

Svensson, Peter; "Projectors to Magnify Cell-Phone Cinema"; Physorg; Bearing a date of Apr. 3, 2008; pp. 1-2; The Associated Press; located at: http://www.physorg.com/news126457642.html; printed on Apr. 10, 2008.

"Technology: Micro Projectors:: Nice and Steady: Vibration-Compensated Mini Projectors"; Symbian-freak; Bearing a date of Jun. 14, 2007; pp. 1-3; Symbian Freak; located at: http://www.symbian-freak.com/news/007/06/tiny_projector_nice_and_steady.htm; printed Apr. 28, 2008.

U.S. Appl. No. 12/459,581, Jung et al.
U.S. Appl. No. 12/459,580, Jung et al.
U.S. Appl. No. 12/454,184, Jung et al.
U.S. Appl. No. 12/380,595, Jung et al.
U.S. Appl. No. 12/380,582, Jung et al.
U.S. Appl. No. 12/380,571, Jung et al.
U.S. Appl. No. 12/322,876, Jung et al.
U.S. Appl. No. 12/322,875, Jung et al.
U.S. Appl. No. 12/322,063, Jung et al.

U.S. Appl. No. 12/217,135, Jung et al.
U.S. Appl. No. 12/217,118, Jung et al.
U.S. Appl. No. 12/217,117, Jung et al.
U.S. Appl. No. 12/217,116, Jung et al.
U.S. Appl. No. 12/217,115, Jung et al.
U.S. Appl. No. 12/214,422, Jung et al.
"2010 Toyota Prius Touch Tracer Display"; KickingTires; printed on Mar. 4, 2009; pp. 1-5; located at http://blogs.cars.com/kickingtires/2009/03/2010-toyota-prius-touch-tracer-display.html.
Foo, Juniper; "MIT's 6th Sense device could trump Apple's multitouch"; Crave; bearing a date of Feb. 9, 2009; printed on Feb. 19, 2009; pp. 1-4; located at http://news.cnet.com/8301-17938_105-10159601-1.html.
Frucci, Adam; "MiLi Pro Turns Your iPhone Into a Projector"; GIZMODO; bearing a date of Jun. 26, 2009; printed on Jul. 8, 2009; pp. 1-3; located at http://gizmodo.com/5302942/mili-pro-turns-your-iphone-into-a-projector/gallery/.
Hereld, Mark et al.; "Introduction to Building Projection-based Tiled Display Systems"; pp. 1-9; Computer Science Department, University of Chicago.
June, Laura; "Toshiba announces TDP-F10U pico projector"; Engadget; bearing a date of Jan. 7, 2009; printed on Jan. 15, 2009; pp. 1-2; Weblogs, Inc.; located at: http://www.engadget.com/2009/01/07/toshiba-announces-tdp-f10u-pico-projector/.
Lam, Brian; "Bug Labs Open Source Gadgets Getting Pico Projector, 3G modules and More"; Gizmodo; bearing a date of Jan. 7, 2009; printed on Jan. 15, 2009; pp. 1-2; located at: http://i.gizmodo.com/5125563/bug-labs-open-source-gadgets-getting-pico-projector-3g-modules-and-more.
Melanson, Donald; "Apple patent filing suggests a safer in-car touchscreen"; Engadget; bearing a date of Mar. 30, 2009; printed on Apr. 10, 2009; pp. 1-8; located at http://www.engadget.com/2009/03/30/apple-patent-filing-suggests-a-safer-in-car-touchscreen/.
Melanson, Donald; "Light Blue Optics promises tough-interface pico projectors"; Engadget; bearing a date of Jun. 3, 2009; printed on Jun. 8, 2009; pp. 1-4; located at http://www.engadget.com/2009/06/03/light-blue-optics-promises-touch-interface-pico-projectors/.
Miller, Ross; "WowWee Cinemin Swivel, Stick, and Station pico PJs hands-on"; Engadget; bearing a date of Jan. 7, 2009; printed on Jan. 15, 2009; pp. 1-3; Weblogs, Inc.; located at: http://www.engadget.com/2009/01/07/wowwee-cinemin-swivel-stick-and-station-pico-pjs-hands-on/.
Murph, Darren; "TI's DLP Pico technology unveiled in new round of pico projectors"; Engadget; bearing a date of Jan. 7, 2009; printed on Jan. 15, 2009; pp. 1-2; Weblogs, Inc.; located at: http://www.enadget.com/2009/01/07/tis-dlp-pico-technology-unveiled-in-new-round-of-pico-projector/.
Nosowitz, Dan; "Official Specs and Prices for New Nikon Coolpix Line, Including Mutant Projector-Camera"; Gizmodo; bearing a date of Aug. 4, 2009; printed on Aug. 4, 2009; pp. 1-4; located at http://gizmodo.com/5329376/official-specs-and-prices-for-new-nikon-coolpix-line-including-mutant-projectors+camera.
Oliver, Sam; "Apple may add micro projectors to iPhones, iPod touches"; AppleInsider; bearing a date of Jul. 6, 2009; printed on Jul. 8, 2009; pp. 1-8; located at http://www.appleinsider.com/articles/09/07/06/apple_may_add_micro_projectors_toiphones_ipod-touches.html/.
"Rear Projection Products and Technology"; Christie Digital; printed on Feb. 13, 2009; pp. 1-2; located at htp://controlrooms.christiedigital.com/Products/RearScreenTilingProjectors/.
"What is Science on a Sphere® (SOS)?"; Science on a Sphere®; printed on Mar. 4, 2009; pp. 1-2; NOAA; located at http://sos.noaa.gov/about/.
Wilson, Mark; "Logic Bolt: The US's First Projecting Cellphone"; Gizmodo; bearing a date of Jan. 8, 2009; printed on Jan. 15, 2009; pp. 1-3; located at: http://i.gizmodo.com/5126754/logic-bolt-the-uss-first-projecting-cellphone.
Wilson, Mark; "New Pico Projectors Offer DVD-Quality Resolution"; Gizmodo; bearing a date of Feb. 17, 2009; printed on Feb. 19, 2009; pp. 1; located at http://i.gizmodo.com/5155132/new-pico-projectors-offer-dvd+quality-resolution.
Diaz, Jesus; "Rear-Projection Urinal Lets You Pee Over Football Games or Bill O'Reilly"; Gizmodo; bearing a date of Aug. 10, 2009; pp. 1; located at http://gizmodo.com/5333854/; printed on Aug. 10, 2009.
Wilson, Andrew D.; Benko, Hrvoje; "Combining Multiple Depth Cameras and Projectors for Interactions on, Above, and Between Surfaces"; UIST'10; 10 total pages; bearing a date of Oct. 3-6, 2010; ACM.
Lee et al.; "Automatic Projector Calibration with Embedded Light Sensors"; UIST '04; dates of Oct. 24-27, 2004; pp. 1-4; ACM.
Panasonic; "Electronic Print Board (Interactive Panaboard) Operating Instructions with Installation Manual"; bearing a date of 2001; pp. 1-86; Kyushu Matsushita Electric Co., Ltd.
U.S. Appl. No. 60/990,851, Klein, Scott V.

* cited by examiner

FIG. 1A
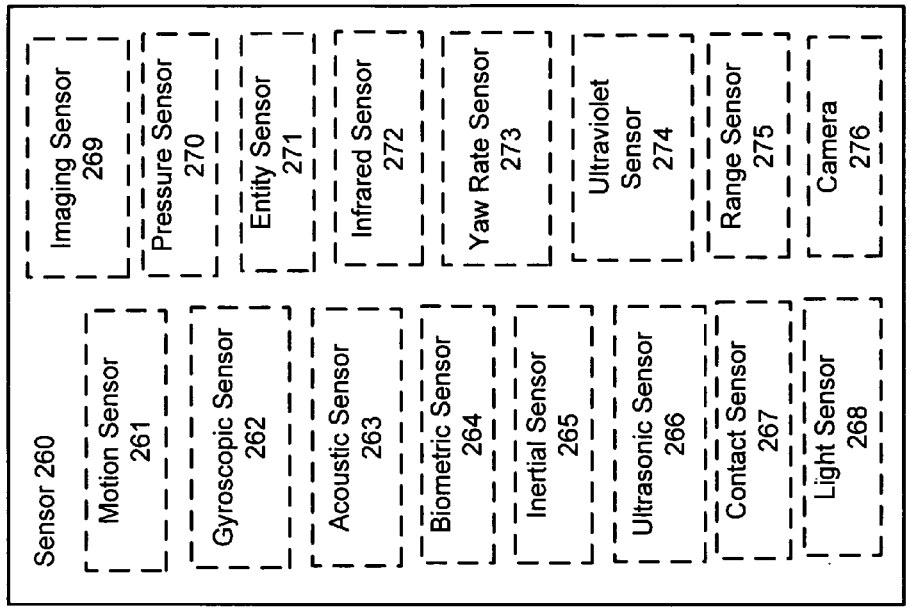
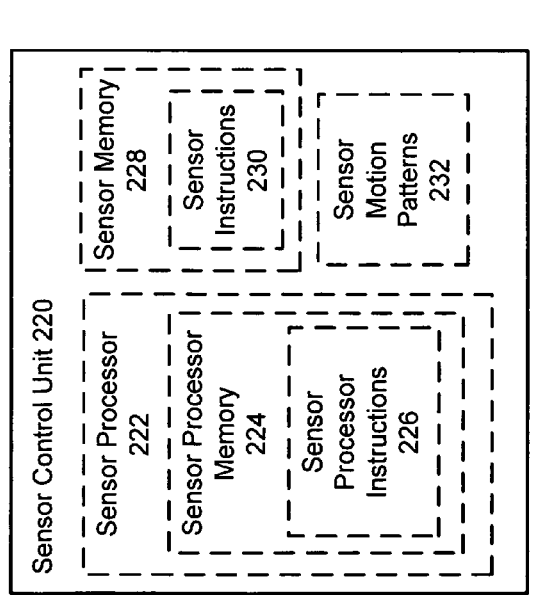
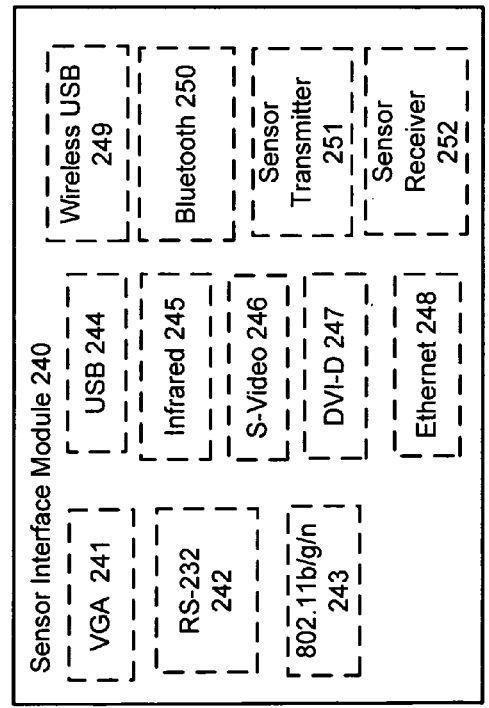

FIG. 43

4300 A system comprising:

4302 a signal-bearing medium bearing 4304
one or more instructions for receiving one or more signals that include information associated with one or more changes in one or more features of one or more projection surfaces;

one or more instructions for projecting in response to receiving one or more signals that include information associated with one or more changes in one or more features of one or more projection surfaces; and one or more instructions for receiving one or more signals that include information associated with coordinating one or more changes in one or more features of one or more projection surfaces with one or more commands

| 4306 a computer-readable medium | 4308 a recordable medium | 4310 a communications medium |

SYSTEMS AND METHODS FOR RECEIVING INFORMATION ASSOCIATED WITH PROJECTING

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 12/214,422, entitled SYSTEMS AND DEVICES, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 17 Jun. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/217,118, entitled MOTION RESPONSIVE DEVICES AND SYSTEMS, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/217,116, entitled SYSTEMS AND METHODS FOR PROJECTING, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/217,115, entitled SYSTEMS AND METHODS FOR TRANSMITTING INFORMATION ASSOCIATED WITH PROJECTING, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/217,135, entitled SYSTEMS AND METHODS FOR PROJECTING IN RESPONSE TO POSITION, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/217,117, entitled SYSTEMS AND METHODS FOR PROJECTING IN RESPONSE TO CONFORMATION, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present disclosure relates to systems and methods that are related to transmitting and receiving information associated with projection.

SUMMARY

In one aspect, a method includes but is not limited to obtaining information associated with one or more changes in one or more features of one or more projection surfaces and transmitting one or more signals that include the information associated with one or more changes in one or more features of one or more projection surfaces. The method may optionally include coordinating one or more changes in one or more features of one or more projection surfaces with one or more commands. The method may optionally include transmitting one or more signals that include information associated with the coordinating one or more changes in one or more features of one or more projection surfaces with one or more commands. In addition to the foregoing, other aspects are described in the claims, drawings, and text forming a part of the present disclosure.

In one aspect, a method includes but is not limited to receiving one or more signals that include information associated with one or more changes in one or more features of one or more projection surfaces and projecting in response to the receiving one or more signals that include information associated with one or more changes in one or more features of one or more projection surfaces. The method may optionally include receiving one or more signals that include information associated with coordinating one or more changes in one or more features of one or more projection surfaces with one or more commands. The method may optionally include projecting in response to the receiving one or more signals that include information associated with coordinating one or more changes in one or more features of one or more projection surfaces with one or more commands. In addition to the foregoing, other aspects are described in the claims, drawings, and text forming a part of the present disclosure.

In one aspect, a system includes but is not limited to circuitry for obtaining information associated with one or more changes in one or more features of one or more projection surfaces and circuitry for transmitting one or more signals that include the information associated with one or more changes in one or more features of one or more projection surfaces. The system may optionally include circuitry for coordinating one or more changes in one or more features of one or more projection surfaces with one or more commands. The system may optionally include circuitry for transmitting one or more signals in response to the circuitry for coordinating one or more changes in one or more features of one or more projection surfaces with one or more commands. In addition to the foregoing, other system aspects are described in the claims, drawings, and text forming a part of the present disclosure.

In one aspect, a system includes but is not limited to circuitry for receiving one or more signals that include information associated with one or more changes in one or more features of one or more projection surfaces and circuitry for projecting that is responsive to the circuitry for receiving one or more signals that include information associated with one or more changes in one or more features of one or more projection surfaces. The system may optionally include circuitry for receiving one or more signals that include information associated with coordinating one or more changes in one or more features of one or more projection surfaces with one or more commands. The system may optionally include circuitry for projecting that is responsive to the circuitry for receiving one or more signals that include information associated with coordinating one or more changes in one or more features of one or more projection surfaces with one or more commands. In addition to the foregoing, other system aspects are described in the claims, drawings, and text forming a part of the present disclosure.

In one aspect, a system includes but is not limited to means for obtaining information associated with one or more changes in one or more features of one or more projection surfaces and means for transmitting one or more signals that include the information associated with one or more changes in one or more features of one or more projection surfaces. The system may optionally include means for coordinating one or more changes in one or more features of one or more projection surfaces with one or more commands. The system may optionally include means for transmitting one or more signals that include information associated with the coordinating one or more changes in one or more features of one or more projection surfaces with one or more commands. In addition to the foregoing, other system aspects are described in the claims, drawings, and text forming a part of the present disclosure.

In one aspect, a system includes but is not limited to means for receiving one or more signals that include information associated with one or more changes in one or more features of one or more projection surfaces and means for projecting that are responsive to the means for receiving one or more signals that include information associated with one or more changes in one or more features of one or more projection surfaces. The system may optionally include means for receiving one or more signals that include information associated with coordinating one or more changes in one or more features of one or more projection surfaces with one or more commands. The system may optionally include means for projecting in response to the means for receiving one or more signals that include information associated with coordinating one or more changes in one or more features of one or more projection surfaces with one or more commands. In addition to the foregoing, other system aspects are described in the claims, drawings, and text forming a part of the present disclosure.

In one aspect, a system includes but is not limited to a signal-bearing medium bearing one or more instructions for obtaining information associated with one or more changes in one or more features of one or more projection surfaces and one or more instructions for transmitting one or more signals that include the information associated with one or more changes in one or more features of one or more projection surfaces. The system may optionally include one or more instructions for coordinating one or more changes in one or more features of one or more projection surfaces with one or more commands. The system may optionally include one or more instructions for transmitting one or more signals that include information associated with the coordinating one or more changes in one or more features of one or more projection surfaces with one or more commands. In addition to the foregoing, other system aspects are described in the claims, drawings, and text forming a part of the present disclosure.

In one aspect, a system includes but is not limited to a signal-bearing medium bearing one or more instructions for receiving one or more signals that include information associated with one or more changes in one or more features of one or more projection surfaces and one or more instructions for projecting in response to receiving one or more signals that include information associated with one or more changes in one or more features of one or more projection surfaces. The system may optionally include one or more instructions for receiving one or more signals that include information associated with coordinating one or more changes in one or more features of one or more projection surfaces with one or more commands. The system may optionally include one or more instructions for projecting in response to receiving one or more signals that include information associated with coordinating one or more changes in one or more features of one or more projection surfaces with one or more commands. In addition to the foregoing, other system aspects are described in the claims, drawings, and text forming a part of the present disclosure.

In one or more various aspects, means include but are not limited to circuitry and/or programming for effecting the herein referenced functional aspects; the circuitry and/or programming can be virtually any combination of hardware, software, and/or firmware configured to effect the herein referenced functional aspects depending upon the design choices of the system designer. In addition to the foregoing, other system aspects means are described in the claims, drawings, and/or text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein referenced method aspects depending upon the design choices of the system designer. In addition to the foregoing, other system aspects are described in the claims, drawings, and/or text forming a part of the present application.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 1A illustrates embodiments of components shown in FIG. 1.

FIG. 43 illustrates a partial view of a system 4300 that includes a computer program for executing a computer process on a computing device.

DETAILED DESCRIPTION

Figure 1:
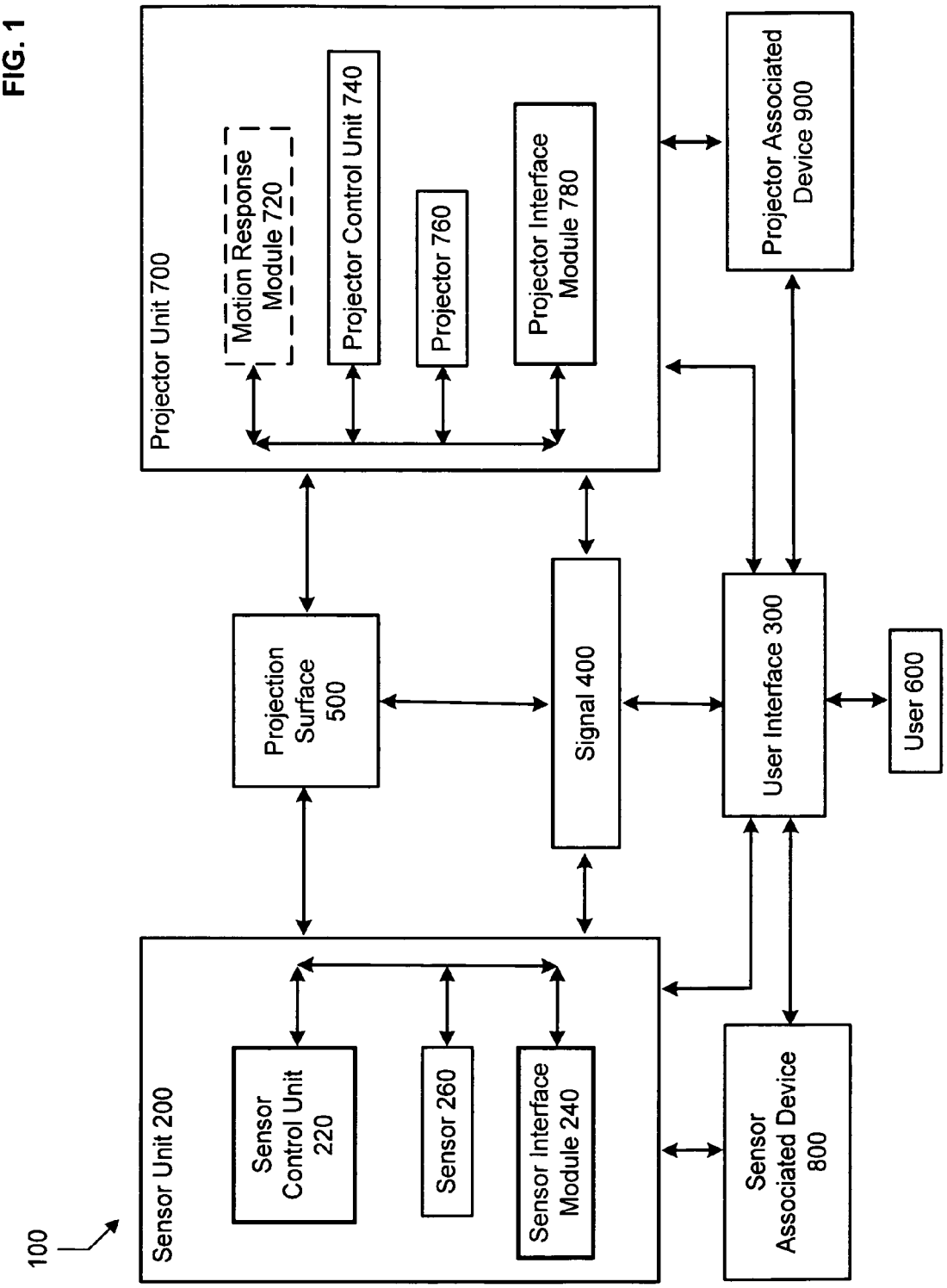
FIG. 1 illustrates an example system 100 in which embodiments may be implemented.
Figure 1B:
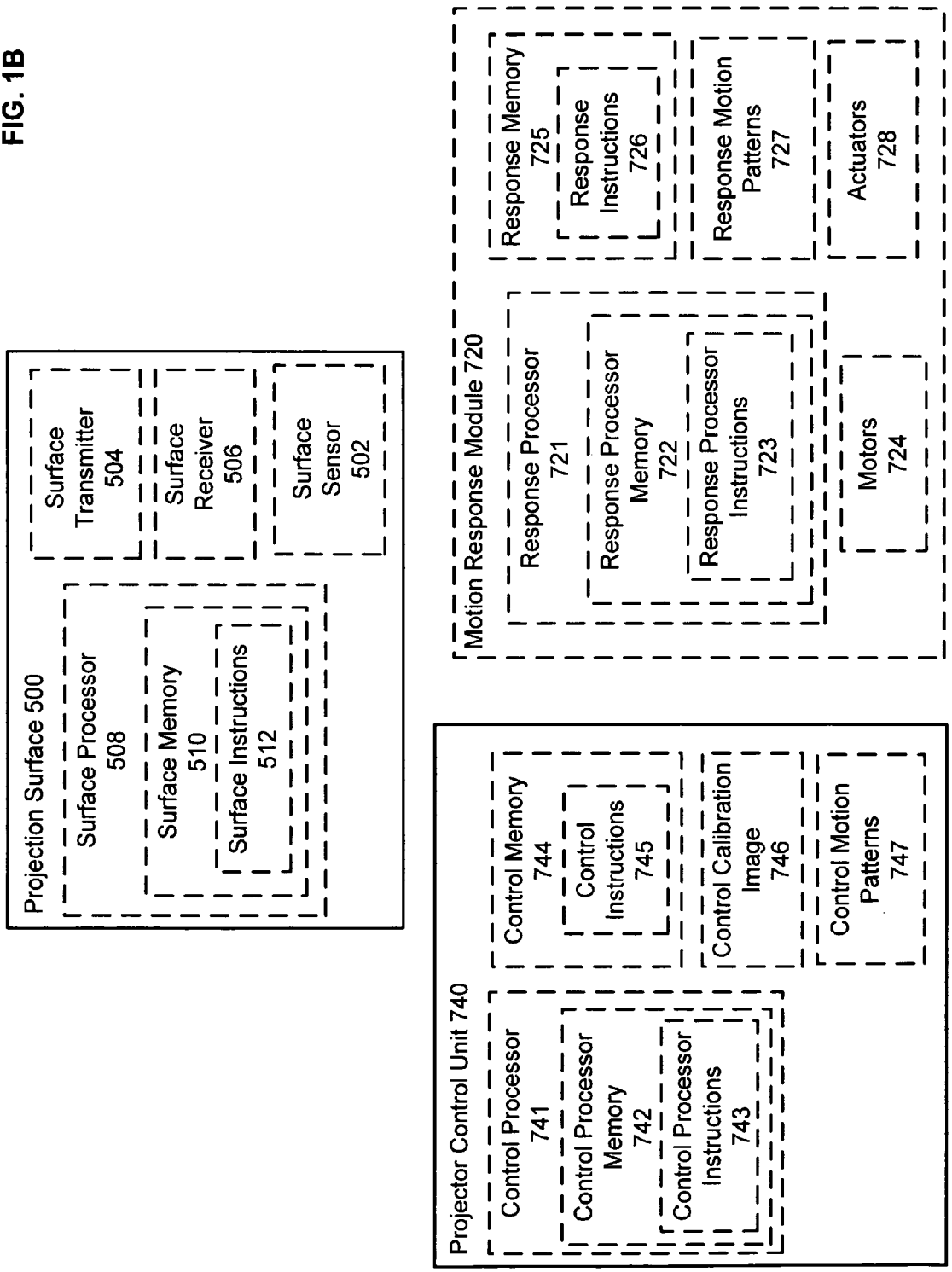
FIG. 1B illustrates embodiments of components shown in FIG. 1.
Figure 1C:
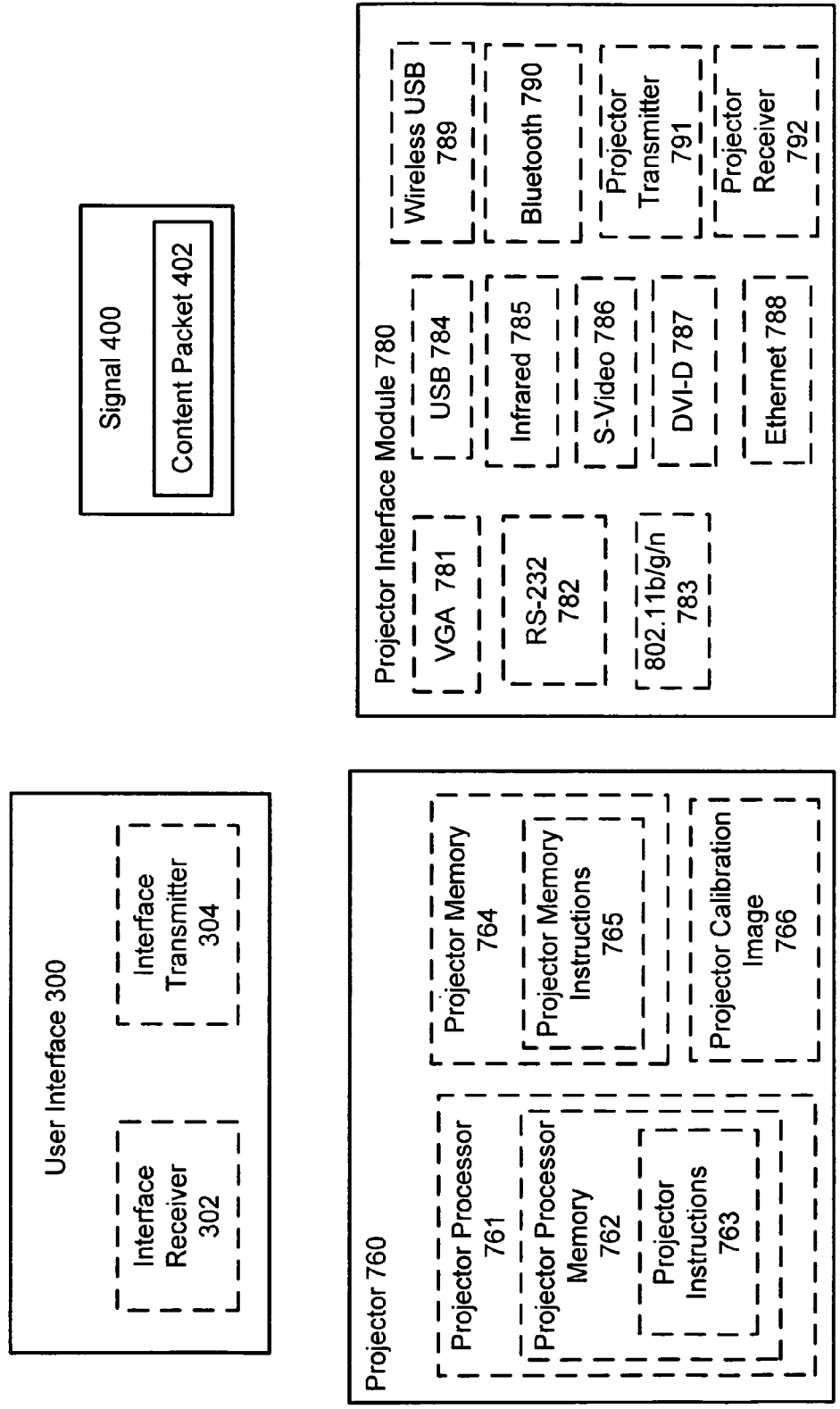
FIG. 1C illustrates embodiments of components shown in FIG. 1.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

FIG. 1 illustrates an example system 100 in which embodiments may be implemented. In some embodiments, system 100 may include one or more sensor units 200. In some embodiments, system 100 may include one or more projector units 700. In some embodiments, system 100 may include one or more sensors 260. In some embodiments, system 100 may include one or more sensor interface modules 240. In some embodiments, system 100 may include one or more user interfaces 300. In some embodiments, system 100 may include one or more signals 400. In some embodiments, system 100 may include one or more projection surfaces 500. In some embodiments, system 100 may include one or more projector units 700. In some embodiments, system 100 may include one or more motion response modules 720. In some embodiments, system 100 may include one or more projector control units 740. In some embodiments, system 100 may include one or more projectors 760. In some embodiments, system 100 may include one or more projector interface modules 780. In some embodiments, system 100 may include one or more sensor associated devices 800. In some embodiments, system 100 may include one or more projector associated devices 900. In some embodiments, system 100 may include two or more projectors 760 that project in a coordinated manner. For example, in some embodiments, two or more projectors 760 may project the same content such that the projections are registered together to create a continuous projection.

Sensor Unit

A system may include one or more sensor units 200. A sensor unit 200 may be configured to detect one or more changes in one or more features associated with one or more projection surfaces 500. In some embodiments, one or more sensor units 200 may be configured to detect one or more changes in position of one or more projection surfaces 500. In some embodiments, one or more sensor units 200 may be configured to detect one or more changes in position of one or more projection surfaces 500. In some embodiments, one or more sensor units 200 may be configured to detect one or more changes in motion associated with one or more projection surfaces 500. In some embodiments, one or more sensor units 200 may be configured to detect one or more changes in conformation associated with one or more projection surfaces 500. Accordingly, numerous features associated with one or more projection surfaces 500 may be detected by one or more sensor units 200. A sensor unit 200 may be configured to have numerous conformations. In some embodiments, a sensor unit 200 may be configured as a hand held device. In some embodiments, a sensor unit 200 may be configured as a mountable device. For example, in some embodiments, a sensor unit 200 may be configured as a sensor unit 200 that may be mounted to a ceiling. In some embodiments, a sensor unit 200 may be mounted and/or positioned onto a desk. In some embodiments, a sensor unit 200 may be mounted to, or otherwise contained within, another system such as a desktop or mobile computer, PDA, cellular phone, camera, video player, or other system. In some embodiments, a sensor unit 220 may include one or more housings. In some embodiments, a sensor unit 200 may be configured to receive one or more signals 400. In some embodiments, a sensor unit 200 may be configured to transmit one or more signals 400. Accordingly, a sensor unit 200 may be configured in numerous ways.

Sensor Control Unit

System 100 may include one or more sensor control units 220. In some embodiments, one or more sensor control units 220 may be operably associated with one or more sensor units 200. In some embodiments, one or more sensor control units 220 may be operably associated with one or more sensors 260. In some embodiments, one or more sensor control units 220 may be operably associated with one or more sensor interface modules 240. In some embodiments, one or more sensor control units 220 may be operably associated with one or more sensor processors 222. In some embodiments, one or more sensor control units 220 may be operably associated with sensor processor memory 224. In some embodiments, one or more sensor control units 220 may be operably associated with one or more sensor processor instructions 226. In some embodiments, one or more sensor control units 220 may be operably associated with sensor memory 228. In some embodiments, one or more sensor control units 220 may be operably associated with one or more sensor instructions 230. In some embodiments, one or more sensor control units 220 may be operably associated with one or more sensor motion patterns 232. In some embodiments, one or more sensor control units 220 may facilitate the transmission of one or more signals 400 that include information associated with one or more changes in sensor response. For example, in some embodiments, one or more signals 400 that include information associated with a change in one or more features associated with one or more projection surfaces 500 may be transmitted. The one or more signals 400 may be received by one or more projector units 700 and used to facilitate projection by one or more projectors 760 in response to the one or more signals 400. In some embodiments, one or more sensor control units 220 may use prior sensor response, user input, or other stimulus, to activate or deactivate one or more sensors 260 or other subordinate features contained within one or more sensor control units 220.

Sensor

System 100 may include one or more sensors 260. In some embodiments, one or more sensors 260 may be operably associated with one or more sensor units 200. In some embodiments, one or more sensors 260 may be operably associated with one or more sensor control units 220. In some embodiments, one or more sensors 260 may be operably associated with one or more sensor interface modules 240. A sensor unit 200 may include many types of sensors 260 alone or in combination. Examples of sensors 260 include, but are not limited to, cameras 276, light sensors 268, range sensors 275, contact sensors 267, entity sensors 271, infrared sensors 272, yaw rate sensors 273, ultraviolet sensors 274, inertial sensors 265, ultrasonic sensors 266, imaging sensors 269, pressure sensors 270, motion sensors 261, gyroscopic sensors 262, acoustic sensors 263, biometric sensors 264, and the like. In some embodiments, one or more sensors 260 may be configured to detect motion. In some embodiments, one or more sensors 260 may be configured to detect motion that is imparted to one or more projection surfaces 500.

Sensor Interface Module

System 100 may include one or more sensor interface modules 240. In some embodiments, one or more sensor interface modules 240 may be operably associated with one or more sensor units 200. In some embodiments, one or more sensor interface modules 240 may be operably associated with one or more sensor control units 220. In some embodiments, one or more sensor interface modules 240 may be operably associated with one or more sensors 260. In some embodiments, one or more sensor interface modules 240 may be operably associated with one or more sensor associated devices 800. In some embodiments, one or more sensor interface modules 240 may be operably associated with external memory. In some embodiments, one or more sensor interface modules 240 may be configured to communicate with one or more user interfaces 300. A sensor interface module 240 may communicate with other components of system 100 through use of numerous communication formats and combinations of communications formats. Examples of such formats include, but are not limited to, VGA 241, USB 244, wireless USB 249, RS-232 242, infrared 245, Bluetooth 250, 802.11b/g/n 243, S-video 246, Ethernet 248, DVI-D 247, and the like. In some embodiments, a sensor interface module 240 may include one or more sensor transmitters 251. In some embodiments, a sensor interface module 240 may include one or more sensor receivers 252.

Projector Unit

A system may include one or more projector units 700. In some embodiments, a projector unit 700 may include one or more motion response modules 720. In some embodiments, a projector unit 700 may include one or more projector control units 740. In some embodiments, a projector unit 700 may include one or more projectors 760. In some embodiments, a projector unit 700 may include one or more projector interface modules 780. Accordingly, in some embodiments, a projector unit 700 may include one or more projectors 760. In some embodiments, a projector unit 700 may include one or more projectors 760 and one or more projector control units 740. In some embodiments, a projector unit 700 may include one or more projectors 760, one or more projector control units 740, and one or more motion response modules 720. In some embodiments, a projector unit 700 may include one or more projectors 760, one or more projector control units 740, one or more motion response modules 720, and one or more projector interface modules 780. In some embodiments, a projector unit 700 may include one or more housings.

A projector unit 700 may be configured to have numerous conformations. In some embodiments, a projector unit 700 may be configured to receive one or more signals 400. In some embodiments, a projector unit 700 may be configured to transmit one or more signals 400. In some embodiments, a projector unit 700 may be configured as a mountable projector unit 700. For example, in some embodiments, a projector unit 700 may be configured for mounting to a ceiling. In some embodiments, a projector unit 700 may be configured as a ceiling mounted projector unit 700 that may be configured to project content onto one or more portions of one or more substantially vertical surfaces. In some embodiments, a projector unit 700 may be configured as a ceiling mounted projector unit 700 that may be configured to project content onto one or more portions of one or more substantially horizontal surfaces. In some embodiments, a projector unit 700 may be configured as a ceiling mounted projector unit 700 that may be configured to project content onto one or more portions of one or more substantially vertical surfaces and onto one or more portions of one or more substantially horizontal surfaces. In some embodiments, a projector unit 700 may be configured to project content onto one or more portions of one or more tabletops. For example, in some embodiments, a projector unit 700 may be mounted onto a wall and configured to project content onto one or more tabletops. In some embodiments, a projector unit 700 may be mounted and/or positioned onto a desk and configured to project content onto one or more desktops. In some embodiments, a projector unit 700 may be mounted to or otherwise contained within another system, such as a desktop or mobile computer, PDA, cellular phone, camera 276, video player, or other system, for the display of content associated with that system. Accordingly, a projector unit 700 may be configured in numerous ways to project content onto numerous types of projection surfaces 500.

In some embodiments, a projector unit 700 may be configured to project in response to motion imparted to the projector unit 700. In some embodiments, a projector unit 700 may be configured to project content in manner that is dependent upon one or more substantially specific motions that are imparted to the projector unit 700. For example, in some embodiments, a projector unit 700 may be configured to project content contained on pages of a book in a manner that is motion dependent. Accordingly, in some embodiments, a projector unit 700 may be configured to project content contained on the next page in a series upon rotation of the projector unit 700 in a clockwise direction. In some embodiments, a projector unit 700 may be configured to project content contained on the preceding page in a series upon rotation of the projector unit 700 in a counterclockwise direction. In some embodiments, a projector unit 700 may be configured to project content on the next page in a series upon being moved to the left from a starting position and then moved substantially back to the starting position. In some embodiments, the projector unit 700 may be configured to project content on the preceding page in a series upon being moved to the right from a starting position and then moved substantially back to the starting position. In some embodiments, a projector unit 700 may select content to be projected in response to motion imparted to the projector unit 700. For example, in some embodiments, a projector unit 700 may be configured to project content associated with a newspaper when the projector unit 700 is positioned in a first orientation and be configured to project content associated with a news magazine when positioned in a second orientation. In some embodiments, a projector unit 700 may be configured to correlate substantially specific motions with projection commands to select content in a motion dependent manner. In some embodiments, a projector unit 700 may be configured to correlate substantially specific motions with projection commands to project content in a motion dependent manner. In some embodiments, a projector unit 700 may be configured to correlate substantially specific motions with projection commands to select and project content in a motion dependent manner.

In some embodiments, a projector unit 700 may be configured to project content in a manner that is dependent upon a person who is associated with the projector unit 700. For example, in some embodiments, a projector unit 700 may be configured to project children's content if used by a child. In some embodiments, a projector unit 700 may be configured to project the statistics associated with various sports teams when associated with a first person and configured to project stock quotes when associated with a second person. Accordingly, a projector unit 700 may be configured to project content that is selected in accordance with specific persons or classes of persons.

Motion Response Module

In some embodiments, system 100 may include one or more motion response modules 720. In some embodiments, one or more motion response modules 720 may be operably associated with one or more projector units 700. In some embodiments, one or more motion response modules 720 may be operably associated with one or more projectors 760. In some embodiments, one or more motion response modules 720 may be operably associated with one or more projector control units 740. In some embodiments, one or more motion response modules 720 may be operably associated with one or more projector interface modules 780. In some embodiments, one or more motion response modules 720 may include one or more response processors 721. In some embodiments, one or more motion response modules 720 may include response processor memory 722. In some embodiments, one or more motion response modules 720 may include one or more response processor instructions 723. In some embodiments, one or more motion response modules 720 may include one or more motors 724. In some embodiments, one or more motion response modules 720 may include response memory 725. In some embodiments, one or more motion response modules 720 may include one or more response instructions 726. In some embodiments, one or more motion response modules 720 may include one or more response motion patterns 727. In some embodiments, one or more motion response modules 720 may include one or more actuators 728. In some embodiments, a motion response module 720 may be configured to modulate output from a projector 760 in response to motion that is imparted to a projector unit 700. For example, in some embodiments, a motion response module 720 may include one or more motors 724 that are operably coupled to one or more actuators 728 that control one or more lenses. Accordingly, in some embodiments, one or more motion response modules 720 may focus output from a projector 760 in response to motion imparted to a projection unit 700. Motion response modules 720 may be configured in numerous conformations to modulate output from an operably associated projector 760.

Projector Control Unit

System 100 may include one or more projector control units 740. In some embodiments, one or more projector control units 740 may be operably associated with one or more projectors 760. In some embodiments, one or more projector control units 740 may be operably associated with one or more motion response modules 720. In some embodiments, one or more projector control units 740 may be operably associated with one or more projector interface modules 780. In some embodiments, one or more projector control units 740 may be operably associated with one or more projectors 760 and one or more motion response modules 720. In some embodiments, one or more projector control units 740 may be operably associated with one or more projectors 760, one or more motion response modules 720, and one or more projector control units 740. In some embodiments, one or more projector control units 740 may be operably associated with one or more projectors 760, one or more motion response modules 720, one or more projector control units 740, and one or more projector interface modules 780. In some embodiments, a projector control unit 740 may be operably associated with one or more control processors 741. In some embodiments, a projector control unit 740 may be operably associated with control processor memory 742. In some embodiments, a projector control unit 740 may be operably associated with one or more control processor instructions 743. In some embodiments, a projector control unit 740 may be operably associated with control memory 744. In some embodiments, a projector control unit 740 may be operably associated with one or more control instructions 745. In some embodiments, a projector control unit 740 may be operably associated with one or more control calibration images 746. In some embodiments, a projector control unit 740 may be operably associated with one or more control motion patterns 747.

In some embodiments, a projector control unit 740 may be configured to modulate output projected by one or more projectors 760. In some embodiments, one or more projector control units 740 may be configured to select one or more wavelengths of light that will be projected by one or more projectors 760. For example, in some embodiments, one or more projector control units 740 may select one or more wavelengths of ultraviolet light that will be projected by one or more projectors 760. In some embodiments, one or more projector control units 740 may select one or more wavelengths of visible light that will be projected by one or more projectors 760. In some embodiments, one or more projector control units 740 may select one or more wavelengths of infrared light that will be projected by one or more projectors 760. Accordingly, in some embodiments, one or more projector control units 740 may select numerous wavelengths of light that will be projected by one or more projectors 760.

In some embodiments, one or more projector control units 740 may select content that is to be projected by one or more projectors 760. In some embodiments, one or more projector control units 740 may select content that is to be projected in response to one or more features associated with one or more projection surfaces 500. For example, in some embodiments, one or more projector control units 740 may select content that is to be projected in response to motion. In some embodiments, one or more projector control units 740 may select content that is to be projected in response to motion associated with one or more projection surfaces 500. In some embodiments, one or more projector control units 740 may select content that is not to be projected by one or more projectors 760. In some embodiments, one or more projector control units 740 may select content that is not to be projected in response to one or more features associated with one or more projection surfaces 500. For example, in some embodiments, one or more projector control units 740 may select content that is not to be projected in response to motion. In some embodiments, one or more projector control units 740 may select content that is not to be projected in response to motion associated with one or more projection surfaces 500.

In some embodiments, one or more projector control units 740 may modulate output that is projected by one or more projectors 760. In some embodiments, one or more projector control units 740 may modulate the intensity of light that is projected by one or more projectors 760. In some embodiments, one or more projector control units 740 may modulate the brightness of light that is projected by one or more projectors 760. In some embodiments, one or more projector control units 740 may modulate the contrast of light that is projected by one or more projectors 760. In some embodiments, one or more projector control units 740 may modulate the sharpness of light that is projected by one or more projectors 760.

In some embodiments, one or more projector control units 740 may modulate the direction of output that is projected by one or more projectors 760. In some embodiments, one or more projector control units 740 may direct output from one or more projectors 760 onto one or more moving projection surfaces 500. In some embodiments, one or more projector control units 740 may direct output from one or more projectors 760 onto one or more stationary projection surfaces 500. In some embodiments, one or more projector control units 740 may direct output from one or more projectors 760 onto one or more moving projection surfaces 500 and onto one or more stationary projection surfaces 500. In some embodiments, one or more projector control units 740 may direct output from one or more projectors 760 onto multiple projection surfaces 500. For example, in some embodiments, one or more projector control units 740 may direct output from one or more projectors 760 onto a first projection surface 500 and direct output from one or more projectors 760 onto a second projection surface 500.

In some embodiments, one or more projector control units 740 may dynamically modulate output from one or more projectors 760. For example, in some embodiments, one or more projectors 760 may be carried from room to room such that one or more projector control units 740 modulate output from the one or more projectors 760 in response to the available projection surface 500. In some embodiments, one or more projector control units 740 may dynamically modulate output from one or more projectors 760 in an outdoor environment. For example, in some embodiments, one or more projectors 760 may be configured to project one or more images in response to changing terrain.

In some embodiments, one or more projector control units 740 may be configured to respond to one or more substantially defined motions. In some embodiments, a user 600 may program one or more projector control units 740 to correlate one or more substantially defined motions with one or more projection commands. For example, in some embodiments, a user 600 may program one or more projector control units 740 to correlate clockwise motion of a device with a command to advance a projected slide presentation by one slide. Accordingly, in some embodiments, a device may be configured to project in response to substantially defined motions that are programmed according to the preferences of an individual user 600.

Projector

System 100 may include one or more projectors 760. In some embodiments, a projector 760 may be operably associated with one or more projector control units 740. In some embodiments, a projector 760 may be operably associated with one or more motion response modules 720. In some embodiments, a projector 760 may be operably associated with one or more projector interface modules 780. In some embodiments, a projector 760 may be operably associated with one or more projector processors 761. In some embodiments, a projector 760 may be operably associated with projector processor memory 762. In some embodiments, a projector 760 may be operably associated with one or more projector instructions 763. In some embodiments, a projector 760 may be operably associated with projector memory 764. In some embodiments, a projector 760 may be operably associated with one or more projector instructions. In some embodiments, a projector 760 may be operably associated with projector memory instructions 765. In some embodiments, a projector 760 may be operably associated with projector calibration images 766. In some embodiments, a projector 760 may be operably associated with one or more housings. In some embodiments, a projector 760 may be an image stabilized projector 760.

System 100 may include numerous types of projectors 760. In some embodiments, a projector 760 may include inertia and yaw rate sensors 273 that detect motion and provide for adjustment of projected content to compensate for the detected motion. In some embodiments, a projector 760 may include an optoelectronic inclination sensor and an optical position displacement sensor to provide for stabilized projection (e.g., U.S. Published Patent Application No. 2003/0038927). In some embodiments, a projector 760 may include an optoelectronic inclination sensor, an optical position sensitive detector, and a piezoelectric accelerometer that provide for stabilized projection (e.g., U.S. Published Patent Application No. 2003/0038928). Image stabilized projectors 760 have been described (e.g., U.S. Pat. No. 7,284,866; U.S. Published Patent Application Nos. 20050280628; 20060103811, and 2006/0187421). In some embodiments, one or more projectors 760 may be modified to become image stabilized projectors 760. Examples of such projectors 760 have been described (e.g., U.S. Pat. Nos. 6,002,505; 6,764,185; 6,811,264; 7,036,936; 6,626,543; 7,134,078; 7,355,584; U.S. Published Patent Application No. 2007/0109509).

Projectors 760 may be configured to project numerous wavelengths of light. In some embodiments, a projector 760 may be configured to project ultraviolet light. In some embodiments, a projector 760 may be configured to project visible light. In some embodiments, a projector 760 may be configured to project infrared light. In some embodiments, a projector 760 may be configured to project numerous combinations of light. For example, in some embodiments, a projector 760 may project one or more infrared calibration images and one or more visible images.

Projector Interface Module

System 100 may include one or more projector interface modules 780. In some embodiments, one or more projector interface modules 780 may be operably associated with one or more projector units 700. In some embodiments, one or more projector interface modules 780 may be operably associated with one or more projectors 760. In some embodiments, one or more projector interface modules 780 may be operably associated with one or more projector control units 740. In some embodiments, one or more projector interface modules 780 may be operably associated with one or more motion response modules 720. In some embodiments, one or more projector interface modules 780 may be operably associated with one or more projector associated devices 900. A projector interface module 780 may communicate with other components of system 100 through use of numerous communication formats and combinations of communications formats. Examples of such formats include, but are not limited to, VGA 781, USB 784, wireless USB 789, RS-232 782, infrared 785, Bluetooth 790, 802.11b/g/n 783, S-video 786, Ethernet 788, DVI-D 787, and the like. In some embodiments, a projector interface module 780 may include one or more projector transmitters 791. In some embodiments, a projector interface module 780 may include one or more projector receivers 792.

User Interface

System 100 may include one or more user interfaces 300. In some embodiments, system 100 may include one or more user interfaces 300 that are configured to facilitate user interaction with one or more projector units 700. In some embodiments, system 100 may include one or more user interfaces 300 that are configured as gestural user interfaces 300. For example, in some embodiments, a projector unit 700 may project content in response to substantially specific motion that is imparted to the projector unit 700. For example, in some embodiments, a user 600 may rotate a projector unit 700 in a clockwise direction to advance the projection of a slide presentation by one frame. In some embodiments, one or more projector units 700 may be configured to respond to voice commands or other auditory signals. In some embodiments, a projector unit 700 may include one or more user interfaces 300 that are configured as control features on the projector unit 700. Examples of such control features include, but are not limited to, buttons, switches, track balls, and the like. In some embodiments, system 100 may include one or more user interfaces 300 that are configured to facilitate user interaction with one or more sensor units 200. In some embodiments, one or more user interfaces 300 may be used to instruct one or more sensor units 200 to monitor one or more projection surfaces 500. In some embodiments, a user interface 300 may include one or more interface receivers 302. In some embodiments, a user interface 300 may include one or more interface transmitters 304. Accordingly, in some embodiments, a user interface 300 may be configured to transmit one or more signals 400. In some embodiments, a user interface 300 may be configured to receive one or more signals 400.

Signal

Numerous types of signals 400 may be used in association with system 100. Examples of such signals 400 include, but are not limited to, analog signals 400, digital signals 400, acoustic signals 400, optical signals 400, radio signals 400, wireless signals 400, hardwired signals 400, infrared signals 400, ultrasonic signals 400, and the like. In some embodiments, one or more signals 400 may not be encrypted. In some embodiments, one or more signals 400 may be encrypted. In some embodiments, one or more signals 400 may be sent through use of a secure mode of transmission. In some embodiments, one or more signals 400 may be coded for receipt by a specific recipient. In some embodiments, such code may include anonymous code that is specific for the recipient. Accordingly, information included within one or more signals 400 may be protected against being accessed by others who are not the intended recipient. In some embodiments, one or more signals may include information as one or more content packets 402.

In some embodiments, one or more signals 400 may include processed information. In some embodiments, one or more signals 400 may include information that has been processed by one or more sensor processors 222. For example, in some embodiments, a sensor processor 222 may receive input from one or more sensors 260 that is processed. In some embodiments, this processed information may then be included within a signal 400 that is transmitted. In some embodiments, one or more signals 400 may include processed information that contains information that has been retrieved from sensor processor memory 224. In some embodiments, one or more signals 400 may include processed information that contains information that has been processed through use of sensor processor instructions 226. Accordingly, in some embodiments, one or more signals may include numerous types of information that is processed. Examples of such processing may include, but are not limited to, sub-setting, generating projection commands, selecting content, selecting content for projection, selecting content that is not for projection, summarizing sensor data, transforming sensor data, supplementing sensor data, supplementing sensor data with data from external sources, and the like.

In some embodiments, one or more signals 400 may include information that has not been processed. In some embodiments, a sensor transmitter 251 may act as a conduit to transmit one or more signals 400 that include raw data. For example, in some embodiments, one or more sensor transmitters 251 may receive information from one or more sensors 260 and transmit one or more signals 400 that include the unprocessed information. Accordingly, in some embodiments, one or more signals may include unprocessed information.

Projection Surface

System 100 may include one or more projection surfaces 500. In some embodiments, nearly any surface may be utilized as a projection surface 500. In some embodiments, a projection surface 500 may be portable. In some embodiments, a projection surface 500 may be carried by an individual person. For example, in some embodiments, a projection surface 500 may be configured as a sheet of material, a tablet, two or more sheets of material that may be separated from each other, and the like. Accordingly, in some embodiments, a projection surface 500 may be configured as a sheet of material that a user 600 may unfold and place on a surface, such as a desk, wall, floor, ceiling, etc.

In some embodiments, a projection surface 500 may include one or more surface sensors 502 that are associated with the projection surface 500. In some embodiments, a projection surface 500 may include one or more magnetic surface sensors 502. For example, in some embodiments, a projection surface 500 may include magnetic surface sensors 502 that are configured to detect magnetic ink that is applied to the projection surface 500. In some embodiments, a projection surface 500 may include one or more pressure surface sensors 502. For example, in some embodiments, a projection surface 500 may include pressure surface sensors 502 that are configured to detect pressure that is applied to the projection surface 500 (e.g., contact of a stylus with the projection surface 500, contact of a pen with the projection surface 500, contact of a pencil with the projection surface 500, etc.). In some embodiments, a projection surface 500 may include one or more motion surface sensors 502. For example, in some embodiments, a projection surface 500 may include motion surface sensors 502 that are configured to detect movement associated with the projection surface 500. In some embodiments, a projection surface 500 may include one or more strain surface sensors 502. For example, in some embodiments, a projection surface 500 may include strain surface sensors 502 that are configured to detect changes in conformation associated with the projection surface 500. In some embodiments, a projection surface 500 may include one or more positional surface sensors 502 (e.g., global positioning surface sensors 502). For example, in some embodiments, a projection surface 500 may include positional surface sensors 502 that are configured to detect changes in position associated with the projection surface 500.

A projection surface 500 may be constructed from numerous types of materials and combinations of materials. Examples of such materials include, but are not limited to, cloth, plastic, metal, ceramics, paper, wood, leather, glass, and the like. In some embodiments, one or more projection surfaces 500 may exhibit electrochromic properties. In some embodiments, one or more projection surfaces 500 may be coated. For example, in some embodiments, a projection surface 500 may be coated with paint. In some embodiments, a projection surface 500 may include one or more materials that alter light. For example, in some embodiments, a projection surface 500 may convert light (e.g., up-convert light, down-convert light).

In some embodiments, a projection surface 500 may be associated with one or more fiducials. For example, in some embodiments, one or more fluorescent marks may be placed on a projection surface 500. In some embodiments, one or more phosphorescent marks may be placed on a projection surface 500. In some embodiments, one or more magnetic materials may be placed on a projection surface 500. In some embodiments, fiducials may be placed on a projection surface 500 in numerous configurations. For example, in some embodiments, fiducials may be positioned in association with a projection surface 500 such that they form a pattern. In some embodiments, a projection surface 500 may include one or more calibration images.

In some embodiments, a projection surface 500 may include one or more surface transmitters 504. Accordingly, in some embodiments, a projection surface 500 may be configured to transmit one or more signals 400. Such signals 400 may include numerous types of information. Examples of such information may include, but are not limited to, information associated with: one or more positions of one or more projection surfaces 500, one or more conformations of one or more projection surfaces 500, one or more changes in the position of one or more projection surfaces 500, one or more changes in the conformation of one or more projection surfaces 500, one or more motions associated with one or more projection surfaces 500, one or more changes in the motion of one or more projection surfaces 500, and the like.

In some embodiments, a projection surface 500 may include one or more surface receivers 506. Accordingly, in some embodiments, a projection surface 500 may be configured to receive one or more signals 400. For example, in some embodiments, one or more surface receivers 506 may receive one or more signals 400 that are transmitted by one or more projector transmitters 791. In some embodiments, one or more surface receivers 506 may receive one or more signals 400 that are transmitted by one or more sensor transmitters 251.

In some embodiments, a projection surface 500 may include one or more surface processors 508. Accordingly, in some embodiments, a surface processor 508 may be configured to process information received from one or more surface sensors 502.

In some embodiments, a projection surface 500 may include surface memory 510. In some embodiments, surface memory 510 may include one or more lookup tables that include correlation information associated with the position of one or more fiducials associated with a projection surface 500 and one or more conformations of the projection surface 500. In some embodiments, surface memory 510 may include surface instructions 512. In some embodiments, surface instructions 512 may include instructions for a projection surface 500 to transmit one or more signals 400 that indicate that a projection surface 500 has undergone a change in conformation. In some embodiments, surface instructions 512 may include instructions for a projection surface 500 to transmit one or more signals 400 that indicate that a projection surface 500 has undergone a change in position. In some embodiments, surface instructions 512 may include instructions for a projection surface 500 to transmit one or more signals 400 that indicate that a projection surface 500 has undergone a change in motion.

In some embodiments, a projection surface 500 may be configured to include one or more recording attributes. For example, in some embodiments, a projection surface 500 may be configured to communicate with other devices. In some embodiments, a projection surface 500 may be configured to communicate with one or more printers. Accordingly, in some embodiments, a projection surface 500 may be configured to facilitate printing of content that is projected onto the projection surface 500. In some embodiments, a projection surface 500 may be configured to communicate with external memory. Accordingly, in some embodiments, a projection surface 500 may be configured to facilitate capture and storage of content that is projected onto the projection surface 500 into memory. In some embodiments, a projection surface 500 may be configured to communicate with one or more cellular networks. Accordingly, in some embodiments, a projection surface 500 may be configured to facilitate transmission of content that is projected onto the projection surface 500 over one or more cellular networks. In some embodiments, a projection surface 500 may be configured to communicate with the internet. Accordingly, in some embodiments, a projection surface 500 may be configured to facilitate transmission of content that is projected onto the projection surface 500 over the internet.

Sensor Associated Device

System 100 may include one or more sensor associated devices 800. Examples of such sensor associated devices 800 include, but are not limited to, projectors 760, recording devices, image acquiring surfaces, printers, computer networks, the internet, wireless devices (e.g., personal digital assistant, cellular telephones, telephones, television transmissions, etc.), memory, and the like. Examples of such memory include, but are not limited to, USB flash drives, memory cards, external hard drives, networked storage, and the like. In some embodiments, sensor data, operational parameters, usage information, or other device or subsystem information can be stored on such memory.

Projector Associated Device

System 100 may include one or more projector associated devices 900. Examples of such projector associated devices 900 include, but are not limited to, projectors 760, recording devices, image acquiring surfaces, printers, computer networks, the internet, wireless devices (e.g., personal digital assistant, cellular telephones, telephones, television transmissions, etc.), memory, and the like. Examples of such memory include, but are not limited to, USB flash drives, memory cards, external hard drives, networked storage, and the like. In some embodiments, projection content may be retrieved from memory. In some embodiments, projector data, operational parameters, usage information, or other device or subsystem information can be stored on such memory.

User

System 100 may be operated by one or more users 600. In some embodiments, a user 600 may be human. In some embodiments, a user 600 may be a non-human user 600. For example, in some embodiments, a user 600 may be a computer, a robot, and the like. In some embodiments, a user 600 may be proximate to system 100. In some embodiments, a user 600 may be remote from system 100.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 2:
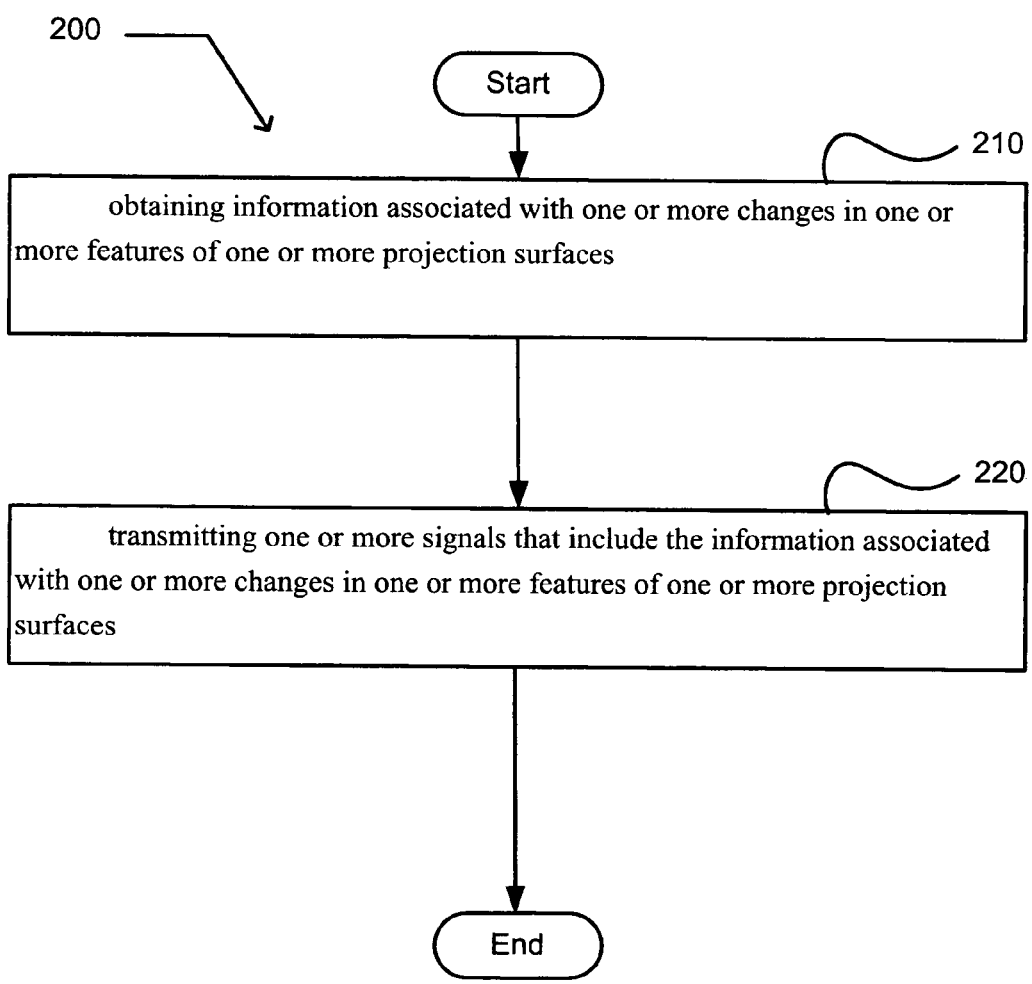
FIG. 2 illustrates an operational flow 200 representing example operations related to obtaining information associated with one or more changes in one or more features of one or more projection surfaces and transmitting one or more signals that include the information associated with one or more changes in one or more features of one or more projection surfaces.

In FIG. 2 and in following figures that include various examples of operations used during performance of the method, discussion and explanation may be provided with respect to any one or combination of the above-described examples of FIG. 1, and/or with respect to other examples and contexts. However, it should be understood that the operations may be executed in a number of other environments and contexts, and/or modified versions of FIG. 1. Also, although the various operations are presented in the sequence(s) illustrated, it should be understood that the various operations may be performed in other orders than those which are illustrated, or may be performed concurrently.

After a start operation, the operational flow 200 includes an obtaining operation 210 involving obtaining information associated with one or more changes in one or more features of one or more projection surfaces. In some embodiments, one or more sensor units 200 may obtain information associated with one or more changes in one or more features of one or more projection surfaces 500. In some embodiments, one or more sensor units 200 may obtain information associated with one or more changes in one or more features of one or more projection surfaces 500 directly. For example, in some embodiments, one or more sensor units 200 may obtain information from one or more sensors 260. In some embodiments, one or more sensor units 200 may obtain information associated with one or more changes in one or more features of one or more projection surfaces 500 indirectly. For example, in some embodiments, one or more sensor units 200 may receive one or more signals 400 that are transmitted by one or more projection surfaces 500 that include information associated with one or more changes in one or more features of the one or more projection surfaces 500. One or more sensor units 200 may obtain numerous types of information associated with one or more changes in one or more features of one or more projection surfaces 500. In some embodiments, one or more sensor units 200 may obtain information associated with one or more changes in position associated with one or more projection surfaces 500. In some embodiments, one or more sensor units 200 may obtain information associated with one or more changes in conformation associated with one or more projection surfaces 500. In some embodiments, one or more sensor units 200 may obtain information associated with one or more changes in position and conformation associated with one or more projection surfaces 500. In some embodiments, one or more sensor units 200 may obtain information associated with one or more changes in one or more fiducials associated with one or more projection surfaces 500. In some embodiments, one or more sensor units 200 may obtain information associated with one or more changes in one or more marks associated with one or more projection surfaces 500.

After a start operation, the operational flow 200 includes a transmitting operation 220 involving transmitting one or more signals that include the information associated with one or more changes in one or more features of one or more projection surfaces. In some embodiments, one or more sensor units 200 may transmit one or more signals 400 that include the information associated with one or more changes in one or more features of one or more projection surfaces 500. In some embodiments, one or more sensor units 200 may transmit one or more signals 400 that include the information associated with one or more changes in one or more positions of one or more projection surfaces 500. In some embodiments, one or more sensor units 200 may transmit one or more signals 400 that include the information associated with one or more changes in one or more conformations of one or more projection surfaces 500. In some embodiments, one or more sensor units 200 may transmit one or more signals 400 that include the information associated with one or more changes in one or more positions and one or more conformations of one or more projection surfaces 500. In some embodiments, one or more sensor units 200 may transmit one or more signals 400 that include the information associated with adjusting projection output in response to one or more changes in one or more features of one or more projection surfaces 500. For example, in some embodiments, one or more sensor units 200 may transmit one or more signals 400 that include the information associated with adjusting the intensity of light that is projected onto one or more projection surfaces 500 in response to one or more changes in one or more features of the one or more projection surfaces 500. In some embodiments, one or more sensor units 200 may transmit one or more signals 400 that include the information associated with adjusting the wavelengths of light that are projected onto one or more projection surfaces 500 in response to one or more changes in one or more features of the one or more projection surfaces 500. In some embodiments, one or more sensor units 200 may transmit one or more signals 400 that include the information associated with projecting content onto two or more separate projection surfaces 500 in response to one or more changes in one or more features of at least one of the two or more projection surfaces 500.

Figure 3:
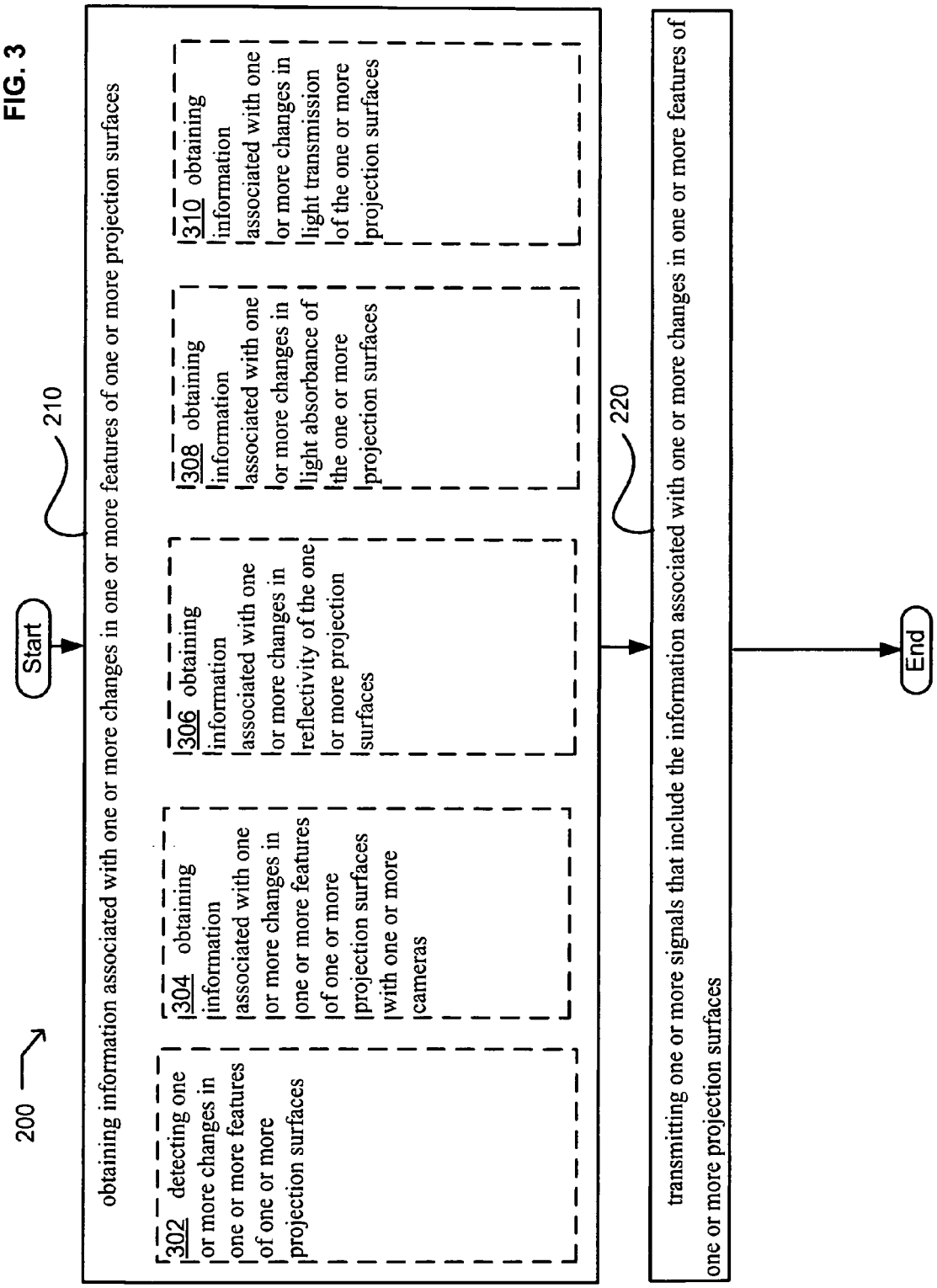
FIG. 3 illustrates alternate embodiments of the example operational flow of FIG. 2.

FIG. 3 illustrates alternative embodiments of the example operational flow 200 of FIG. 2. FIG. 3 illustrates example embodiments where the obtaining operation 210 may include at least one additional operation. Additional operations may include an operation 302, operation 304, operation 306, operation 308, and/or operation 310.

At operation 302, the obtaining operation 210 may include detecting one or more changes in one or more features of one or more projection surfaces. In some embodiments, one or more sensor units 200 may detect one or more changes in one or more features of one or more projection surfaces 500. In some embodiments, one or more sensor units 200 may be operably associated with one or more sensors 260 that detect one or more changes in one or more features of one or more projection surfaces 500. Numerous types of sensors 260 may be used to detect one or more changes in one or more features of one or more projection surfaces 500. For example, in some embodiments, one or more light sensors 268 may be configured to detect light intensity associated with one or more projection surfaces 500. In some embodiments, one or more light sensors 268 may be configured to detect reflectivity associated with one or more projection surfaces 500. In some embodiments, one or more light sensors 268 may be configured to detect light absorbance associated with one or more projection surfaces 500. In some embodiments, one or more light sensors 268 may be configured to detect light transmission associated with one or more projection surfaces 500. In some embodiments, one or more motion sensors 261 may be configured to detect motion associated with one or more projection surfaces 500. For example, in some embodiments, one or more motion sensors 261 may detect movement of one or more projection surfaces 500 from one area to another. In some embodiments, one or more motion sensors 261 may detect movement of one or more projection surfaces 500 to determine changes in conformation of the one or more projection surfaces 500. In some embodiments, one or more cameras 276 may be configured to detect one or more changes in one or more features of one or more projection surfaces 500. For example, in some embodiments, one or more cameras 276 may be configured to detect the position of one or more fiducials associated with one or more projection surfaces 500. Accordingly, in some embodiments, one or more cameras 276 may be configured to detect one or more changes in position of one or more projection surfaces 500 through determining one or more changes in the position of one or more fiducials associated with the one or more projection surfaces 500. In some embodiments, one or more cameras 276 may be configured to detect one or more changes in conformation of one or more projection surfaces 500 through determining one or more changes in the position of one or more fiducials associated with the one or more projection surfaces 500. In some embodiments, one or more cameras 276 may be configured to detect one or more changes in position of one or more projection surfaces 500 through determining one or more changes in the position of one or more calibration images associated with the one or more projection surfaces 500. In some embodiments, one or more cameras 276 may be configured to detect one or more changes in conformation of one or more projection surfaces 500 through determining one or more changes in the position of one or more calibration images associated with the one or more projection surfaces 500. In some embodiments, one or more calibration images may be associated with one or more projection surfaces 500. For example, in some embodiments, one or more calibration images may be stamped onto one or more projection surfaces 500. In some embodiments, one or more calibration images may be printed onto one or more projection surfaces 500. In some embodiments, one or more calibration images may be projected onto one or more projection surfaces 500. Accordingly, sensors 260 may be configured in numerous ways to facilitate detection of one or more changes in one or more features of one or more projection surfaces 500.

At operation 304, the obtaining operation 210 may include obtaining information associated with one or more changes in one or more features of one or more projection surfaces with one or more cameras. In some embodiments, one or more sensor units 200 may obtain information associated with one or more changes in one or more features of one or more projection surfaces 500 with one or more cameras 276. In some embodiments, one or more sensor units 200 may be configured to obtain information associated with one or more changes in one or more features of one or more projection surfaces 500 with one or more cameras 276. In some embodiments, one or more cameras 276 may be configured to detect one or more changes in one or more features of one or more projection surfaces 500. For example, in some embodiments, one or more cameras 276 may be configured to detect the position of one or more fiducials associated with one or more projection surfaces 500. Accordingly, in some embodiments, one or more cameras 276 may be configured to detect one or more changes in position of one or more projection surfaces 500 through determining one or more changes in the position of one or more fiducials associated with the one or more projection surfaces 500. In some embodiments, one or more cameras 276 may be configured to detect one or more changes in conformation of one or more projection surfaces 500 through determining one or more changes in the position of one or more fiducials associated with the one or more projection surfaces 500. In some embodiments, one or more cameras 276 may be configured to detect one or more changes in position of one or more projection surfaces 500 through determining one or more changes in the position of one or more calibration images associated with the one or more projection surfaces 500. In some embodiments, one or more cameras 276 may be configured to detect one or more changes in conformation of one or more projection surfaces 500 through determining one or more changes in the position of one or more calibration images associated with the one or more projection surfaces 500. In some embodiments, one or more calibration images may be associated with one or more projection surfaces 500. For example, in some embodiments, one or more calibration images may be stamped onto one or more projection surfaces 500. In some embodiments, one or more calibration images may be printed onto one or more projection surfaces 500. In some embodiments, one or more calibration images may be projected onto one or more projection surfaces 500. In some embodiments, one or more cameras 276 may be configured to facilitate projection onto irregular surfaces (e.g., U.S. Pat. No. 6,811,264).

At operation 306, the obtaining operation 210 may include obtaining information associated with one or more changes in reflectivity of the one or more projection surfaces. In some embodiments, one or more sensor units 200 may obtain information associated with one or more changes in reflectivity of the one or more projection surfaces 500. In some embodiments, one or more sensor units 200 may be configured to obtain information associated with one or more changes in reflectivity of the one or more projection surfaces 500. For example, in some embodiments, one or more sensor units 200 may be configured to obtain information from one or more light sensors 268 that are configured to detect changes in the reflectivity of one or more projection surfaces 500. In some embodiments, such changes in reflectivity may be correlated to one or more changes in conformation associated with one or more projection surfaces 500. In some embodiments, such changes in reflectivity may be correlated to one or more changes in position associated with one or more projection surfaces 500. In some embodiments, one or more sensor units 200 may be configured to calibrate the reflectivity of one or more projection surfaces 500 at a starting position so that changes in reflectivity may be correlated with changes in position of the one or more projection surfaces 500. In some embodiments, one or more sensor units 200 may be configured to calibrate the reflectivity of one or more projection surfaces 500 at a starting conformation so that changes in reflectivity may be correlated with changes in conformation associated with the one or more projection surfaces 500. In some embodiments, the reflectivity of one or more calibration images that are associated with one or more projection surfaces 500 may be detected. Accordingly, in some embodiments, changes in the reflectivity of one or more calibration images may be correlated with changes in position of the one or more projection surfaces 500. In some embodiments, changes in the reflectivity of one or more calibration images may be correlated with changes in conformation associated with the one or more projection surfaces 500. In some embodiments, the reflectivity of one or more fiducials that are associated with one or more projection surfaces 500 may be detected. Accordingly, in some embodiments, changes in the reflectivity of one or more fiducials may be correlated with changes in position of the one or more projection surfaces 500. In some embodiments, changes in the reflectivity of one or more fiducials may be correlated with changes in conformation associated with the one or more projection surfaces 500. For example, in some embodiments, the location of one or more projection surfaces 500 may remain substantially constant but the conformation of the one or more projection surfaces 500 may change.

At operation 308, the obtaining operation 210 may include obtaining information associated with one or more changes in light absorbance of the one or more projection surfaces. In some embodiments, one or more sensor units 200 may obtain information associated with one or more changes in light absorbance of the one or more projection surfaces 500. In some embodiments, one or more sensor units 200 may be configured to obtain information associated with one or more changes in light absorbance of one or more projection surfaces 500. In some embodiments, one or more sensor units 200 may be configured to obtain information from one or more sensors 260 that are configured to detect changes in the light absorbance of one or more projection surfaces 500. For example, in some embodiments, one or more projection surfaces 500 may exhibit changes in polarization upon undergoing changes in conformation. Accordingly, in some embodiments, one or more changes in light absorbance may be detected that indicate one or more changes in conformation of one or more projection surfaces 500. In some embodiments, one or more cameras 276 may be configured to detect one or more alterations in the light absorbance associated with one or more projection surfaces 500. In some embodiments, one or more light sensors 268 may be configured to detect one or more alterations in the light absorbance associated with one or more projection surfaces 500. In some embodiments, one or more projection surfaces 500 may include one or more materials that undergo one or more changes in light absorbance upon being illuminated. Accordingly, in some embodiments, one or more projection surfaces 500 may be illuminated with one or more calibration images that alter the absorbance of one or more portions of the projection surface 500 that are illuminated with the one or more calibration images. Accordingly, in some embodiments, changes in the absorbance pattern that occurs during a change in conformation of the projection surface 500 may be detected to indicate one or more changes in conformation of the projection surface 500. For example, in some embodiments, fluorescent materials may be used to coat a projection surface 500 such that different areas of the projection surface 500 are coated with different fluorescent materials. Accordingly, if the projection surface 500 undergoes a change in conformation, the light that is absorbed by the projection surface 500 will change.

At operation 310, the obtaining operation 210 may include obtaining information associated with one or more changes in light transmission of the one or more projection surfaces. In some embodiments, one or more sensor units 200 may obtain information associated with one or more changes in light transmission of the one or more projection surfaces 500. In some embodiments, one or more sensor units 200 may be configured to obtain information associated with one or more changes in light transmission of the one or more projection surfaces 500. In some embodiments, one or more sensor units 200 may be configured to obtain information from one or more sensors 260 that are configured to detect changes in the light transmission of one or more projection surfaces 500. For example, in some embodiments, one or more projection surfaces 500 may exhibit changes in polarization upon undergoing changes in conformation. Accordingly, in some embodiments, one or more changes in light transmission may be detected that indicate one or more changes in conformation of one or more projection surfaces 500. In some embodiments, one or more cameras 276 may be configured to detect one or more alterations in the light transmission associated with one or more projection surfaces 500. In some embodiments, one or more light sensors 268 may be configured to detect one or more alterations in the light transmission associated with one or more projection surfaces 500. In some embodiments, one or more projection surfaces 500 may include one or more materials that undergo one or more changes in light transmission upon being illuminated. Accordingly, in some embodiments, one or more projection surfaces 500 may be illuminated with one or more calibration images that alter the transmission of one or more portions of the projection surface 500 that are illuminated with the one or more calibration images. Accordingly, in some embodiments, changes in the transmission pattern that occur during a change in conformation of the projection surface 500 may be detected to indicate one or more changes in conformation of the projection surface 500. For example, in some embodiments, fluorescent materials may be used to coat a projection surface 500 such that different areas of the projection surface 500 are coated with different fluorescent materials. Accordingly, if the projection surface 500 undergoes a change in conformation, the light that is transmitted by the projection surface 500 will change. In some embodiments, changes in light transmission may include changes in light emission. For example, in some embodiments, phosphorescent materials may be used to coat a projection surface 500 such that different areas of the projection surface 500 are coated with different phosphorescent materials. Accordingly, if the projection surface 500 undergoes a change in conformation, the light that is emitted by the projection surface 500 will change.

Figure 4:
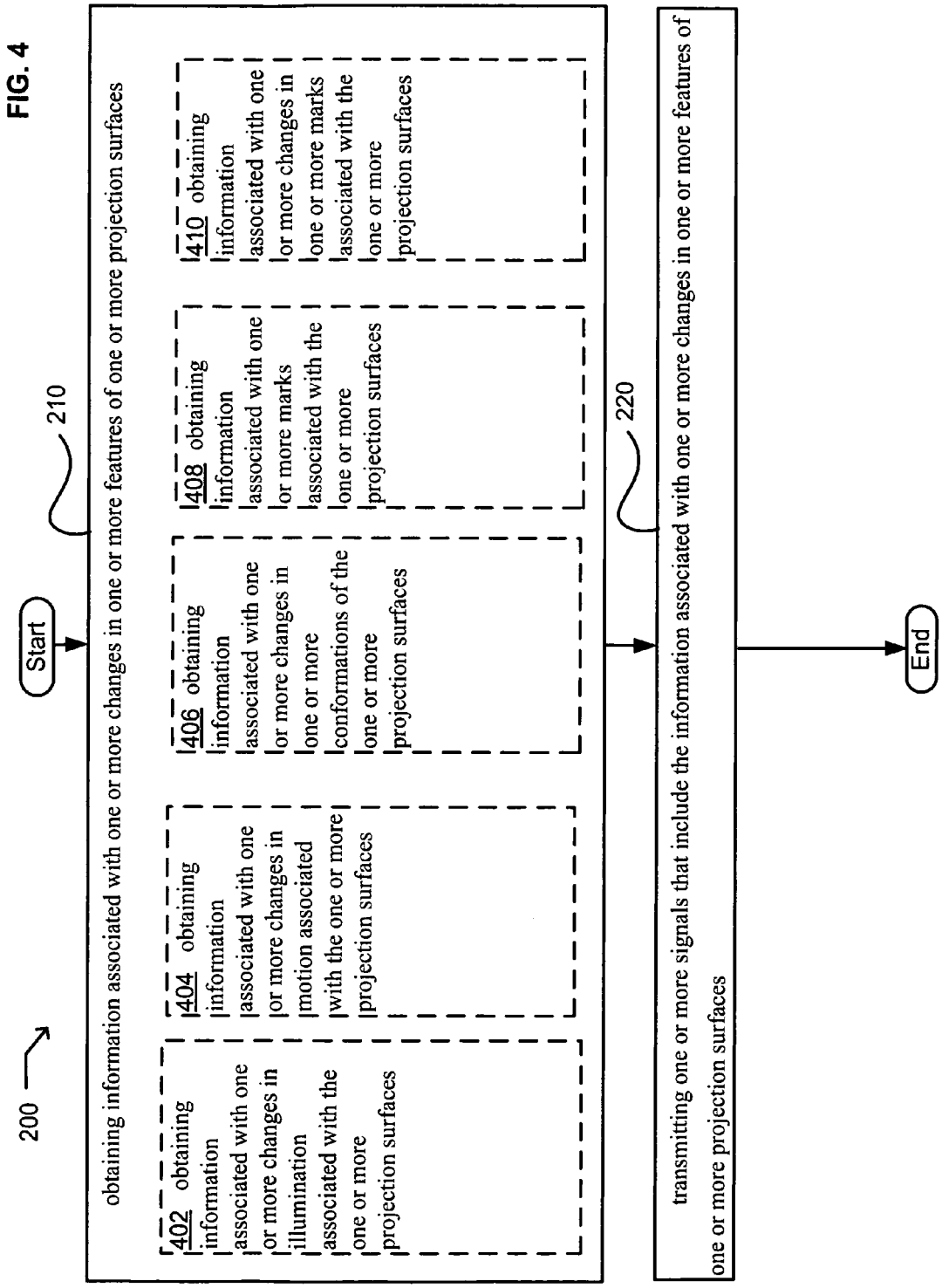
FIG. 4 illustrates alternate embodiments of the example operational flow of FIG. 2.

FIG. 4 illustrates alternative embodiments of the example operational flow 200 of FIG. 2. FIG. 4 illustrates example embodiments where the obtaining operation 210 may include at least one additional operation. Additional operations may include an operation 402, operation 404, operation 406, operation 408, and/or operation 410.

At operation 402, the obtaining operation 210 may include obtaining information associated with one or more changes in illumination associated with the one or more projection surfaces. In some embodiments, one or more sensor units 200 may obtain information associated with one or more changes in illumination associated with the one or more projection surfaces 500. In some embodiments, one or more sensor units 200 may be configured to obtain information from one or more sensors 260 that are configured to detect changes in illumination associated with the one or more projection surfaces 500. For example, in some embodiments, one or more light sensors 268 may be configured to detect light that is reflected off one or more projection surfaces 500 to determine if the projection surface 500 has undergone a change in position from an area having a certain flux of light to a second area having a different flux of light.

At operation 404, the obtaining operation 210 may include obtaining information associated with one or more changes in motion associated with the one or more projection surfaces. In some embodiments, one or more sensor units 200 may obtain information associated with one or more changes in motion associated with the one or more projection surfaces 500. In some embodiments, one or more sensor units 200 may be configured to obtain information from one or more sensors 260 that are configured to detect changes in motion associated with the one or more projection surfaces 500. In some embodiments, one or more motion sensors 261 may be configured to detect changes in motion associated with one or more projection surfaces 500. In some embodiments, one or more sensors 260 may be configured to detect changes in motion associated with one or more fiducials associated with one or more projection surfaces 500. In some embodiments, one or more sensors 260 may be configured to detect changes in motion associated with one or more calibration images associated with one or more projection surfaces 500. In some embodiments, one or more sensors 260 may be configured to detect motion of one or more objects associated with one or more projection surfaces 500. Examples of such objects include, but are not limited to, pencils, pens, styluses, fingers, and the like (e.g., U.S. Pat. Nos. 6,266,048; 6,614,422; 6,710,770; 6,750,849; 6,798,401; 7,016,711; 7,071,924; 7,151,530; 7,290,885; 7,173,605; 7,242,388; 7,248,151; 7,305,368).

At operation 406, the obtaining operation 210 may include obtaining information associated with one or more changes in one or more conformations of the one or more projection surfaces. In some embodiments, one or more sensor units 200 may obtain information associated with one or more changes in one or more conformations of the one or more projection surfaces 500. In some embodiments, one or more sensor units 200 may be configured to obtain information from one or more sensors 260 that are configured to detect changes in conformation associated with the one or more projection surfaces 500. In some embodiments, one or more sensors 260 may be configured to detect one or more changes in the position of one or more fiducials associated with one or more projection surfaces 500. Accordingly, in some embodiments, one or more changes in position of the one or more fiducials associated with one or more projection surfaces 500 may be used to determine one or more changes in the conformation of the one or more projection surfaces 500. In some embodiments, one or more sensors 260 may be configured to detect one or more changes in the position of one or more calibration images associated with one or more projection surfaces 500. Accordingly, in some embodiments, one or more changes in position of the one or more calibration images associated with one or more projection surfaces 500 may be used to determine one or more changes in the conformation of the one or more projection surfaces 500.

At operation 408, the obtaining operation 210 may include obtaining information associated with one or more marks associated with the one or more projection surfaces. In some embodiments, one or more sensor units 200 may obtain information associated with one or more marks associated with the one or more projection surfaces 500. In some embodiments, one or more sensor units 200 may be configured to obtain information from one or more sensors 260 that are configured to detect one or more marks associated with one or more projection surfaces 500. In some embodiments, one or more sensors 260 may be configured to detect one or more marks that are fluorescent. In some embodiments, one or more sensors 260 may be configured to detect one or more marks that are phosphorescent. In some embodiments, one or more sensors 260 may be configured to detect one or more marks that are magnetic. In some embodiments, one or more sensors 260 may be configured to detect writing on a projection surface 500 (e.g., U.S. Pat. No. 7,355,583). For example, in some embodiments, one or more sensors 260 may be configured to detect ink (e.g., fluorescent ink, magnetic ink, phosphorescent ink, etc.). In some embodiments, one or more sensor units 200 may receive one or more signals 400 from one or more projection surfaces 500 that are configured to detect one or more marks on the projection surface 500 and transmit one or more signals 400 that include information associated with detection of the one or more marks.

At operation 410, the obtaining operation 210 may include obtaining information associated with one or more changes in one or more marks associated with the one or more projection surfaces. In some embodiments, one or more sensor units 200 may obtain information associated with one or more changes in one or more marks associated with the one or more projection surfaces 500. In some embodiments, one or more sensor units 200 may be configured to obtain information from one or more sensors 260 that are configured to detect one or more changes in one or more marks associated with one or more projection surfaces 500. In some embodiments, one or more sensors 260 may determine one or more changes in one or more marks through comparing a first set of marks to a second set of marks and then determining differences that occur between the first and second set of marks. In some embodiments, one or more sensors 260 may be configured to detect one or more marks that are fluorescent. In some embodiments, one or more sensors 260 may be configured to detect one or more marks that are phosphorescent. In some embodiments, one or more sensors 260 may be configured to detect one or more marks that are magnetic. In some embodiments, one or more sensors 260 may be configured to detect changes in writing that occur on a projection surface 500

(e.g., U.S. Pat. No. 7,355,583). For example, in some embodiments, one or more detectors may be configured to detect ink (e.g., fluorescent ink, magnetic ink, phosphorescent ink, etc.). In some embodiments, one or more sensor units 200 may receive one or more signals 400 from one or more projection surfaces 500 that are configured to detect one or more changes in one or more marks on the projection surface 500 and transmit one or more signals 400 that include information associated with detection of the one or more changes in the one or more marks.

Figure 5:
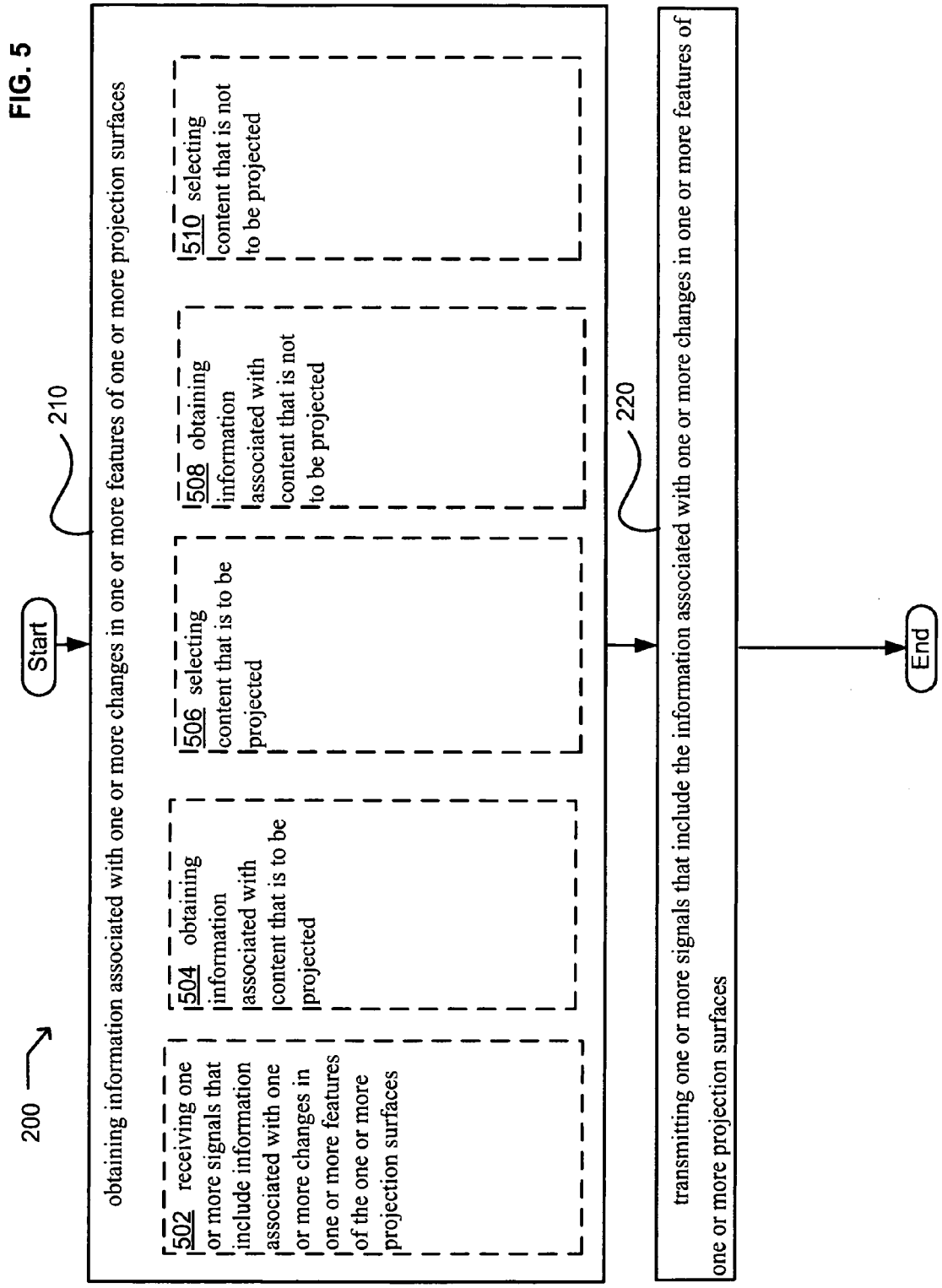
FIG. 5 illustrates alternate embodiments of the example operational flow of FIG. 2.

FIG. 5 illustrates alternative embodiments of the example operational flow 200 of FIG. 2. FIG. 5 illustrates example embodiments where the obtaining operation 210 may include at least one additional operation. Additional operations may include an operation 502, operation 504, operation 506, operation 508, and/or operation 510.

At operation 502, the obtaining operation 210 may include receiving one or more signals that include the information associated with one or more changes in one or more features of one or more projection surfaces. In some embodiments, one or more sensor units 200 may receive one or more signals 400 that include the information associated with one or more changes in one or more features of one or more projection surfaces 500. For example, in some embodiments, one or more sensor units 200 may receive one or more signals 400 that were transmitted by one or more surface transmitters 504 that are associated with one or more projection surfaces 500. In some embodiments, the one or more signals 400 may include information associated with one or more changes in one or more features of the one or more projection surfaces 500. In some embodiments, such information may be obtained by one or more surface sensors 502 that are integrated into one or more projection surfaces 500. For example, in some embodiments, one or more pressure surface sensors 502 may be integrated into one or more projection surfaces 500 and configured to detect the motion of one or more objects (e.g., pens, pencils, styluses, fingers, etc.) relative to the one or more projection surfaces 500. In some embodiments, one or more magnetic surface sensors 502 may be integrated into one or more projection surfaces 500 and configured to detect the motion of one or more objects relative to the one or more projection surfaces 500. In some embodiments, one or more magnetic surface sensors 502 may be integrated into one or more projection surfaces 500 and configured to detect magnetic material that is applied to the one or more projection surfaces 500 (e.g., ink applied by a pen, material applied by a pencil, etc.). Accordingly, numerous types of surface sensors 502 may be associated with a projection surface 500.

In some embodiments, one or more sensor units 200 may act as a relay between one or more surface sensors 502 and one or more projector units 700. For example, in some embodiments, one or more sensor units 200 may receive one or more signals 400 from one or more surface sensors 502 that are associated with one or more projection surfaces 500. The one or more sensor units 200 may than transmit one or more signals 400 that are received by one or more projector units 700. Accordingly, in some embodiments, one sensor unit 200 may receive signals 400 from numerous projection surfaces 500 and transmit signals 400 to numerous projector units 700. A sensor unit 200 may receive signals 400 that include numerous types of information associated with one or more changes in one or more features of one or more projection surfaces 500. In some embodiments, one or more sensor units 200 may receive one or more signals 400 that include information associated with one or more changes in the position of one or more projection surfaces 500. In some embodiments, one or more sensor units 200 may receive one or more signals 400 that include information associated with one or more changes in the conformation of one or more projection surfaces 500. In some embodiments, one or more sensor units 200 may receive one or more signals 400 that include information associated with one or more changes in the position and conformation of one or more projection surfaces 500.

At operation 504, the obtaining operation 210 may include obtaining information associated with content that is to be projected. In some embodiments, one or more sensor units 200 may obtain information associated with content that is to be projected. For example, in some embodiments, one or more sensor units 200 may access sensor memory 228 to obtain content that is to be projected. In some embodiments, one or more sensor units 200 may receive one or more signals 400 that include information associated with content that is to be projected.

At operation 506, the obtaining operation 210 may include selecting content that is to be projected. In some embodiments, one or more sensor units 200 may select content that is to be projected. For example, in some embodiments, one or more sensor units 200 may be configured to select content that is to be projected from sensor memory 228. In some embodiments, one or more sensor units 200 may be configured to select content that is to be projected in response to user input. In some embodiments, one or more sensor units 200 may be configured to select content that is to be projected in response to one or more sensors 260. In some embodiments, one or more sensor units 200 may select content that is to be projected in response to one or more sensors 260 that detect one or more persons. For example, in some embodiments, one or more sensor units 200 may select content that is suitable for children if a child is detected. In some embodiments, one or more sensor units 200 may receive one or more signals 400 that include information associated with content that is to be selected for projection.

At operation 508, the obtaining operation 210 may include obtaining information associated with content that is not to be projected. In some embodiments, one or more sensor units 200 may obtain information associated with content that is not to be projected. For example, in some embodiments, one or more sensor units 200 may access sensor memory 228 to obtain information associated with content that is not to be projected. In some embodiments, one or more sensor units 200 may receive one or more signals 400 that include information associated with content that is not to be projected.

At operation 510, the obtaining operation 210 may include selecting content that is not to be projected. In some embodiments, one or more sensor units 200 may select content that is not to be projected. For example, in some embodiments, one or more sensor units 200 may be configured to access sensor memory 228 to select content that is not to be projected. In some embodiments, one or more sensor units 200 may be configured to select content that is not to be projected in response to user input. In some embodiments, one or more sensor units 200 may be configured to select content that is not to be projected in response to one or more sensors 260. In some embodiments, one or more sensor units 200 may select content that is not to be projected in response to one or more sensors 260 that detect one or more persons. For example, in some embodiments, one or more sensor units 200 may select content that is not suitable for children if a child is detected. In some embodiments, one or more sensor units 200 may receive one or more signals 400 that include information associated with content that is not to be selected for projection.

Figure 6:
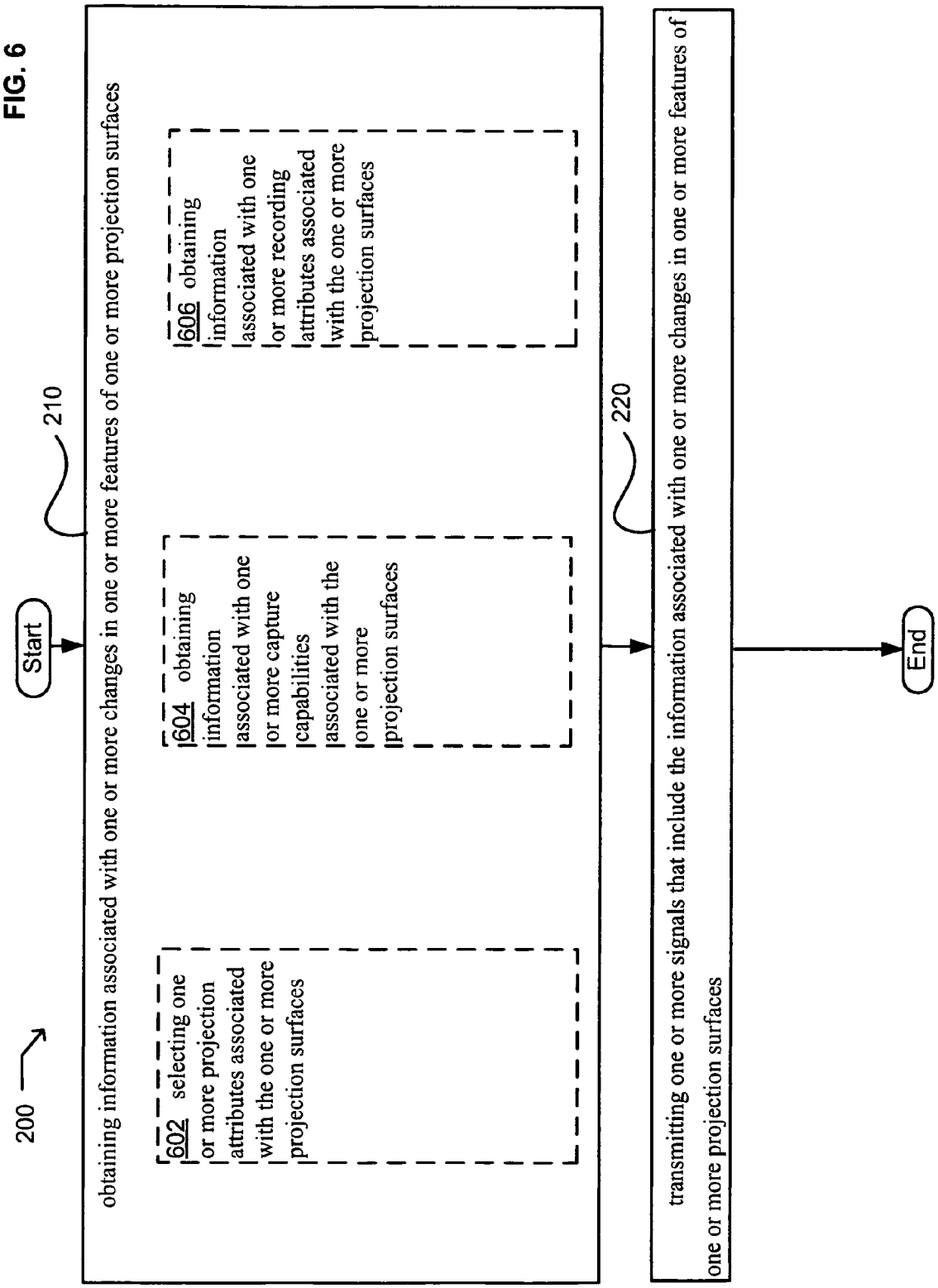
FIG. 6 illustrates alternate embodiments of the example operational flow of FIG. 2.

FIG. 6 illustrates alternative embodiments of the example operational flow 200 of FIG. 2. FIG. 6 illustrates example embodiments where the obtaining operation 210 may include at least one additional operation. Additional operations may include an operation 602, operation 604, and/or operation 606.

At operation 602, the obtaining operation 210 may include selecting one or more projection attributes associated with the one or more projection surfaces. In some embodiments, one or more sensor units 200 may select one or more projection attributes associated with one or more projection surfaces 500. In some embodiments, one or more sensor units 200 may be configured to access sensor memory 228 to determine one or more projection attributes associated with one or more projection surfaces 500. In some embodiments, one or more sensor units 200 may be operably associated with one or more sensors 260 that are configured to determine one or more projection attributes associated with one or more projection surfaces 500. In some embodiments, one or more sensor units 200 may be configured to receive one or more signals 400 that include information associated with one or more projection attributes associated with one or more projection surfaces 500. Examples of such projection attributes associated with one or more projection surfaces 500 include, but are not limited to, reflectivity, light absorbance, light reflection, light transmission, light emission, ability to record projected content, ability to transmit information associated with projected content, and the like. Accordingly, in some embodiments, one or more sensor units 200 may transmit one or more signals 400 that include one or more instructions for one or more projector units 700 to project in response to one or more attributes associated with one or more projection surfaces 500. For example, in some embodiments, one or more sensor units 200 may instruct one or more projector units 700 to project content that is to be printed if a projection surface 500 is able to facilitate printing of content that is projected onto the projection surface 500. In some embodiments, one or more sensor units 200 may instruct one or more projector units 700 not to project content that is confidential if a projection surface 500 is able to facilitate printing of content that is projected onto the projection surface 500. In some embodiments, one or more sensor units 200 may instruct one or more projector units 700 to project one or more wavelengths of light in response to one or more attributes associated with a projection surface 500. For example, in some embodiments, a projection surface 500 may be made of material that transmits one or more wavelengths of light preferentially over other wavelengths of light. Accordingly, in some embodiments, a sensor unit 200 may instruct one or more projector units 700 to project the one or more wavelengths of light that are preferentially transmitted by a projection surface 500. Accordingly, in some embodiments, one or more sensor units 200 may control one or more projector units 700 in accordance with projection attributes associated with one or more projection surfaces 500.

At operation 604, the obtaining operation 210 may include obtaining information associated with one or more capture capabilities associated with the one or more projection surfaces. In some embodiments, one or more sensor units 200 may obtain information associated with one or more capture capabilities associated with one or more projection surfaces 500. In some embodiments, one or more sensor units 200 may be configured to access sensor memory 228 to determine one or more capture capabilities associated with one or more projection surfaces 500. In some embodiments, one or more sensor units 200 may be operably associated with one or more sensors 260 that are configured to determine one or more capture capabilities associated with one or more projection surfaces 500. In some embodiments, one or more sensor units 200 may be configured to receive one or more signals 400 that include information associated with one or more capture capabilities associated with one or more projection surfaces 500. Examples of capture capabilities include, but are not limited to, printing of projected content, transmission of one or more signals 400 that include information associated with projected content, and the like. In some embodiments, one or more sensor units 200 may transmit one or more signals 400 that include instructions for controlling one or more projector units 700 in response to one or more capture capabilities associated with one or more projection surfaces 500. For example, in some embodiments, a sensor unit 200 may instruct one or more projector units 700 to project content that is to be printed onto one or more projection surfaces 500 that are capable of facilitating printing of the projected content. In some embodiments, a sensor unit 200 may instruct one or more projector units 700 not to project content that is confidential onto one or more projection surfaces 500 that are capable of facilitating printing of the projected content.

At operation 606, the obtaining operation 210 may include obtaining information associated with one or more recording attributes associated with the one or more projection surfaces. In some embodiments, one or more sensor units 200 may obtain information associated with one or more recording attributes associated with one or more projection surfaces 500. In some embodiments, one or more sensor units 200 may be configured to access sensor memory 228 to determine one or more recording attributes associated with one or more projection surfaces 500. In some embodiments, one or more sensor units 200 may be operably associated with one or more sensors 260 that are configured to determine one or more recording attributes associated with one or more projection surfaces 500. In some embodiments, one or more sensor units 200 may be configured to receive one or more signals 400 that include information associated with one or more recording attributes associated with one or more projection surfaces 500. Examples of recording attributes include, but are not limited to, permanent recordation of projected content, storage of projected content into memory, and the like. In some embodiments, one or more sensor units 200 may transmit one or more signals 400 that include one or more instructions for controlling one or more projector units 700 in response to one or more recording attributes associated with one or more projection surfaces 500. For example, in some embodiments, a sensor unit 200 may instruct one or more projector units 700 to project content that is to be saved into memory onto one or more projection surfaces 500 that are capable of recording projected content into memory. In some embodiments, a sensor unit 200 may instruct one or more projector units 700 not to project content that is confidential onto one or more projection surfaces 500 that are capable of saving the projected content into memory.

Figure 7:
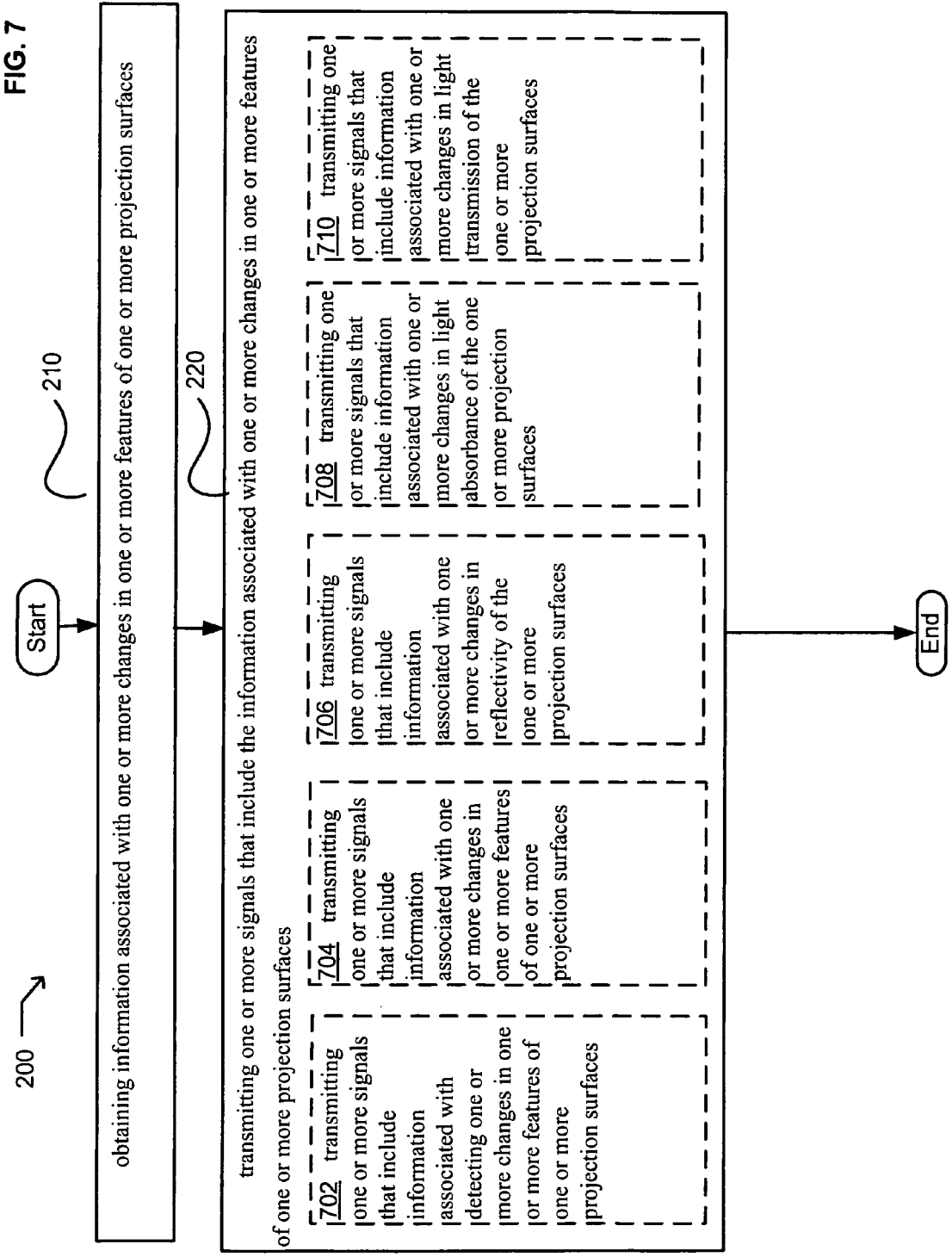
FIG. 7 illustrates alternate embodiments of the example operational flow of FIG. 2.

FIG. 7 illustrates alternative embodiments of the example operational flow 200 of FIG. 2. FIG. 7 illustrates example embodiments where the transmitting operation 220 may include at least one additional operation. Additional operations may include an operation 702, operation 704, operation 706, operation 708, and/or operation 710.

At operation 702, the transmitting operation 220 may include transmitting one or more signals that include information associated with detecting one or more changes in one or more features of one or more projection surfaces. In some embodiments, one or more sensor transmitters 251 may transmit one or more signals 400 that include information associated with detecting one or more changes in one or more features of one or more projection surfaces 500. In some embodiments, one or more sensor transmitters 251 may transmit one or more signals 400 that include information associated with detecting one or more changes in one or more features of one or more projection surfaces 500 with one or more sensors 260. Signals 400 may include information that is obtained through use of numerous types of sensors 260. For example, in some embodiments, one or more signals 400 may include information that is obtained through use of one or more light sensors 268 that are configured to detect light intensity associated with one or more projection surfaces 500. In some embodiments, one or more signals 400 may include information that is obtained through use of one or more light sensors 268 that are configured to detect reflectivity associated with one or more projection surfaces 500. In some embodiments, one or more signals 400 may include information that is obtained through use of one or more light sensors 268 that are configured to detect light absorbance associated with one or more projection surfaces 500. In some embodiments, one or more signals 400 may include information that is obtained through use of one or more light sensors 268 that are configured to detect light transmission associated with one or more projection surfaces 500. In some embodiments, one or more signals 400 may include information that is obtained through use of one or more motion sensors 261 that are configured to detect motion associated with one or more projection surfaces 500. For example, in some embodiments, one or more motion sensors 261 may detect movement of one or more projection surfaces 500 from one area to another. In some embodiments, one or more motion sensors 261 may detect movement of one or more projection surfaces 500 to determine changes in conformation of the one or more projection surfaces 500. In some embodiments, one or more signals 400 may include information that is obtained through use of one or more cameras 276 may be configured to detect one or more changes in one or more features of one or more projection surfaces 500. For example, in some embodiments, one or more cameras 276 may be configured to detect the position of one or more fiducials associated with one or more projection surfaces 500. Accordingly, in some embodiments, one or more cameras 276 may be configured to detect one or more changes in position of one or more projection surfaces 500 through determining one or more changes in the position of one or more fiducials associated with the one or more projection surfaces 500. In some embodiments, one or more cameras 276 may be configured to detect one or more changes in conformation of one or more projection surfaces 500 through determining one or more changes in the position of one or more fiducials associated with the one or more projection surfaces 500. In some embodiments, one or more cameras 276 may be configured to detect one or more changes in position of one or more projection surfaces 500 through determining one or more changes in the position of one or more calibration images associated with the one or more projection surfaces 500. In some embodiments, one or more cameras 276 may be configured to detect one or more changes in conformation of one or more projection surfaces 500 through determining one or more changes in the position of one or more calibration images associated with the one or more projection surfaces 500. Accordingly, one or more signals 400 may include information that is obtained through use of sensors 260 that are configured in numerous ways to facilitate detection of one or more changes in one or more features of one or more projection surfaces 500.

At operation 704, the transmitting operation 220 may include transmitting one or more signals that include information associated with one or more changes in one or more features of one or more projection surfaces. In some embodiments, one or more sensor transmitters 251 may transmit one or more signals 400 that include information associated with one or more changes in one or more features of one or more projection surfaces 500. In some embodiments, one or more sensor transmitters 251 may transmit one or more signals 400 that include information associated with detecting one or more changes in one or more features of one or more projection surfaces 500 with one or more cameras 276. In some embodiments, one or more cameras 276 may be configured to detect one or more changes in one or more features of one or more projection surfaces 500. For example, in some embodiments, one or more cameras 276 may be configured to detect the position of one or more fiducials associated with one or more projection surfaces 500. Accordingly, in some embodiments, one or more cameras 276 may be configured to detect one or more changes in position of one or more projection surfaces 500 through determining one or more changes in the position of one or more fiducials associated with the one or more projection surfaces 500. In some embodiments, one or more cameras 276 may be configured to detect one or more changes in conformation of one or more projection surfaces 500 through determining one or more changes in the position of one or more fiducials associated with the one or more projection surfaces 500. In some embodiments, one or more cameras 276 may be configured to detect one or more changes in position of one or more projection surfaces 500 through determining one or more changes in the position of one or more calibration images associated with the one or more projection surfaces 500. In some embodiments, one or more cameras 276 may be configured to detect one or more changes in conformation of one or more projection surfaces 500 through determining one or more changes in the position of one or more calibration images associated with the one or more projection surfaces 500.

At operation 706, the transmitting operation 220 may include transmitting one or more signals that include information associated with one or more changes in reflectivity of the one or more projection surfaces. In some embodiments, one or more sensor transmitters 251 may transmit one or more signals 400 that include information associated with one or more changes in reflectivity of the one or more projection surfaces 500. In some embodiments, one or more sensor transmitters 251 may transmit one or more signals 400 that include information associated with detecting one or more changes in one or more features of one or more projection surfaces 500. In some embodiments, one or more sensor transmitters 251 may transmit one or more signals 400 that include information associated with correlating one or more changes in the reflectivity of one or more projection surfaces 500 with one or more changes in the conformation associated with the one or more projection surfaces 500. In some embodiments, such changes in reflectivity may be correlated to one or more changes in position associated with one or more projection surfaces 500.

At operation 708, the transmitting operation 220 may include transmitting one or more signals that include information associated with one or more changes in light absorbance of the one or more projection surfaces. In some embodiments, one or more sensor transmitters 251 may transmit one or more signals 400 that include information associated with one or more changes in light absorbance of the one or more projection surfaces 500. In some embodiments, one or more sensor transmitters 251 may transmit one or more signals 400 that include information associated with detecting one or more changes in the light absorbance of one or more projection surfaces 500. For example, in some embodiments, one or more sensor transmitters 251 may transmit one or more signals 400 that include information associated with changes in polarization associated with one or more projection surfaces 500 that undergo one or more changes in conformation. In some embodiments, one or more sensor transmitters 251 may transmit one or more signals 400 that include information associated with one or more changes in light absorbance that indicate one or more changes in conformation of one or more projection surfaces 500. For example, in some embodiments, one or more sensor transmitters 251 may transmit one or more signals 400 that include information associated with detection of one or more alterations in the light absorbance associated with one or more projection surfaces 500. In some embodiments, one or more sensor transmitters 251 may transmit one or more signals 400 that include information associated with one or more changes in one or more absorbance patterns that occur during one or more changes in the conformation of a projection surface 500.

At operation 710, the transmitting operation 220 may include transmitting one or more signals that include information associated with one or more changes in light transmission of the one or more projection surfaces. In some embodiments, one or more sensor transmitters 251 may transmit one or more signals 400 that include information associated with one or more changes in light transmission of the one or more projection surfaces 500. In some embodiments, one or more sensor transmitters 251 may transmit one or more signals 400 that include information associated with detection of one or more changes in light transmission of the one or more projection surfaces 500. For example, in some embodiments, one or more projection surfaces 500 may exhibit changes in polarization upon undergoing changes in conformation. Accordingly, in some embodiments, one or more changes in light transmission may be detected that indicate one or more changes in conformation of one or more projection surfaces 500. In some embodiments, one or more sensor transmitters 251 may transmit one or more signals 400 that include information associated with detection of one or more changes in light transmission with one or more cameras 276. In some embodiments, one or more sensor transmitters 251 may transmit one or more signals 400 that include information associated with detection of one or more changes in light transmission with one or more light sensors 268. In some embodiments, one or more sensor transmitters 251 may transmit one or more signals 400 that include information associated with detection of one or more changes in light transmission that indicate one or more changes in conformation of one or more projection surfaces 500.

Figure 8:
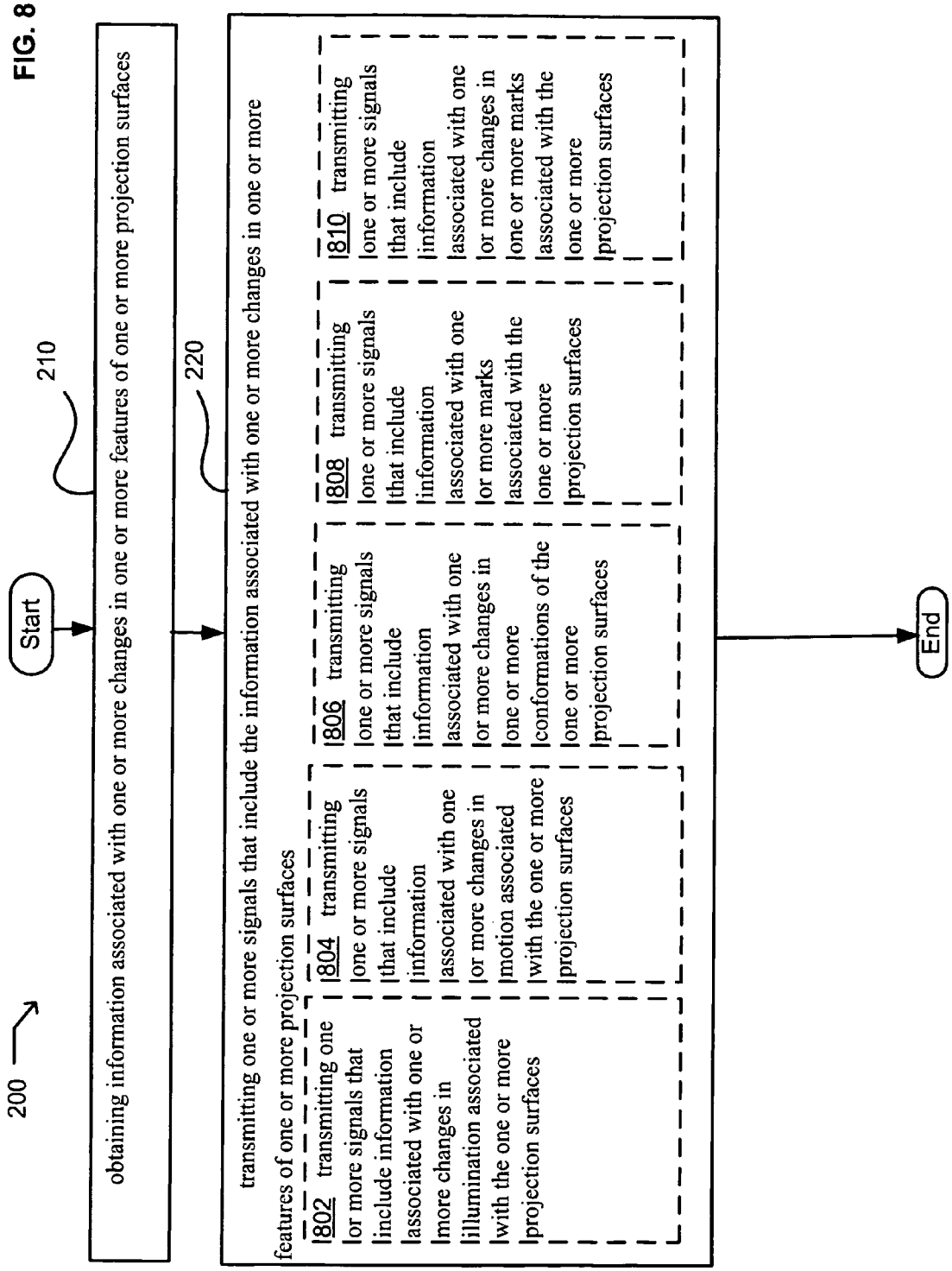
FIG. 8 illustrates alternate embodiments of the example operational flow of FIG. 2.

FIG. 8 illustrates alternative embodiments of the example operational flow 200 of FIG. 2. FIG. 8 illustrates example embodiments where the transmitting operation 220 may include at least one additional operation. Additional operations may include an operation 802, operation 804, operation 806, operation 808, and/or operation 810.

At operation 802, the transmitting operation 220 may include transmitting one or more signals that include information associated with one or more changes in illumination associated with the one or more projection surfaces. In some embodiments, one or more sensor transmitters 251 may transmit one or more signals 400 that include information associated with one or more changes in illumination associated with the one or more projection surfaces 500. In some embodiments, one or more sensor transmitters 251 may transmit one or more signals 400 that include information associated with detection of one or more changes in the illumination associated with one or more projection surfaces 500. For example, in some embodiments, sensor transmitters 251 may transmit one or more signals 400 that include information associated with light that is reflected off one or more projection surfaces 500 to determine if the projection surface 500 has undergone a change in position from an area having a certain flux of light to a second area having a different flux of light.

At operation 804, the transmitting operation 220 may include transmitting one or more signals that include information associated with one or more changes in motion associated with the one or more projection surfaces. In some embodiments, one or more sensor transmitters 251 may transmit one or more signals 400 that include information associated with one or more changes in motion associated with the one or more projection surfaces 500. In some embodiments, one or more sensor transmitters 251 may transmit one or more signals 400 that include information associated with detection of one or more changes in motion associated with the one or more projection surfaces 500. In some embodiments, one or more sensor transmitters 251 may transmit one or more signals 400 that include information associated with detecting changes in motion associated with one or more fiducials associated with one or more projection surfaces 500. In some embodiments, one or more sensor transmitters 251 may transmit one or more signals 400 that include information associated with detecting changes in motion associated with one or more calibration images associated with one or more projection surfaces 500. In some embodiments, one or more sensor transmitters 251 may transmit one or more signals 400 that include information associated with detecting changes in motion of one or more objects associated with one or more projection surfaces 500. Examples of such objects include, but are not limited to, pencils, pens, styluses, fingers, and the like (e.g., U.S. Pat. Nos. 6,266,048; 6,614,422; 6,710,770; 6,750,849; 6,798,401; 7,016,711; 7,071,924; 7,151,530; 7,290,885; 7,173,605; 7,242,388; 7,248,151; 7,305,368).

At operation 806, the transmitting operation 220 may include transmitting one or more signals that include information associated with one or more changes in one or more conformations of the one or more projection surfaces. In some embodiments, one or more sensor transmitters 251 may transmit one or more signals 400 that include information associated with one or more changes in one or more conformations of the one or more projection surfaces 500. In some embodiments, one or more sensor transmitters 251 may transmit one or more signals 400 that include information associated with detection of one or more changes in conformation associated with one or more projection surfaces 500. In some embodiments, one or more sensor transmitters 251 may transmit one or more signals 400 that include information associated with detection of one or more changes in the position of one or more fiducials that are associated with one or more projection surfaces 500. In some embodiments, one or more sensor transmitters 251 may transmit one or more signals 400 that include information associated with detection of one or more changes in the position of one or more calibration images associated with one or more projection surfaces 500.

At operation 808, the transmitting operation 220 may include transmitting one or more signals that include information associated with one or more marks associated with the one or more projection surfaces. In some embodiments, one or more sensor transmitters 251 may transmit one or more signals 400 that include information associated with one or more marks associated with the one or more projection surfaces 500. In some embodiments, one or more sensor transmitters 251 may transmit one or more signals 400 that include information associated with detection of one or more marks associated with one or more projection surfaces 500. In some embodiments, one or more sensor transmitters 251 may transmit one or more signals 400 that include information associated with detection of one or more marks that are fluorescent.

In some embodiments, one or more sensor transmitters 251 may transmit one or more signals 400 that include information associated with detection of one or more marks that are phosphorescent. In some embodiments, one or more sensor transmitters 251 may transmit one or more signals 400 that include information associated with detection of one or more marks that are magnetic. In some embodiments, one or more sensor transmitters 251 may transmit one or more signals 400 that include information associated with detection of writing on a projection surface 500 (e.g., U.S. Pat. No. 7,355,583).

At operation 810, the transmitting operation 220 may include transmitting one or more signals that include information associated with one or more changes in one or more marks associated with the one or more projection surfaces. In some embodiments, one or more sensor transmitters 251 may transmit one or more signals 400 that include information associated with one or more changes in one or more marks associated with the one or more projection surfaces 500. In some embodiments, one or more sensor transmitters 251 may transmit one or more signals 400 that include information associated with detection of one or more changes in one or more marks associated with one or more projection surfaces 500. In some embodiments, one or more sensor transmitters 251 may transmit one or more signals 400 that include information associated with determining one or more changes in one or more marks through comparing a first set of marks to a second set of marks and then determining differences that occur between the first and second set of marks. In some embodiments, one or more sensor transmitters 251 may transmit one or more signals 400 that include information associated with detection of one or more marks that are fluorescent. In some embodiments, one or more sensor transmitters 251 may transmit one or more signals 400 that include information associated with detection of one or more marks that are phosphorescent. In some embodiments, one or more sensor transmitters 251 may transmit one or more signals 400 that include information associated with detection of one or more marks that are magnetic. In some embodiments, one or more sensor transmitters 251 may transmit one or more signals 400 that include information associated with detection of writing that occurs on a projection surface 500 (e.g., U.S. Pat. No. 7,355,583).

Figure 9:
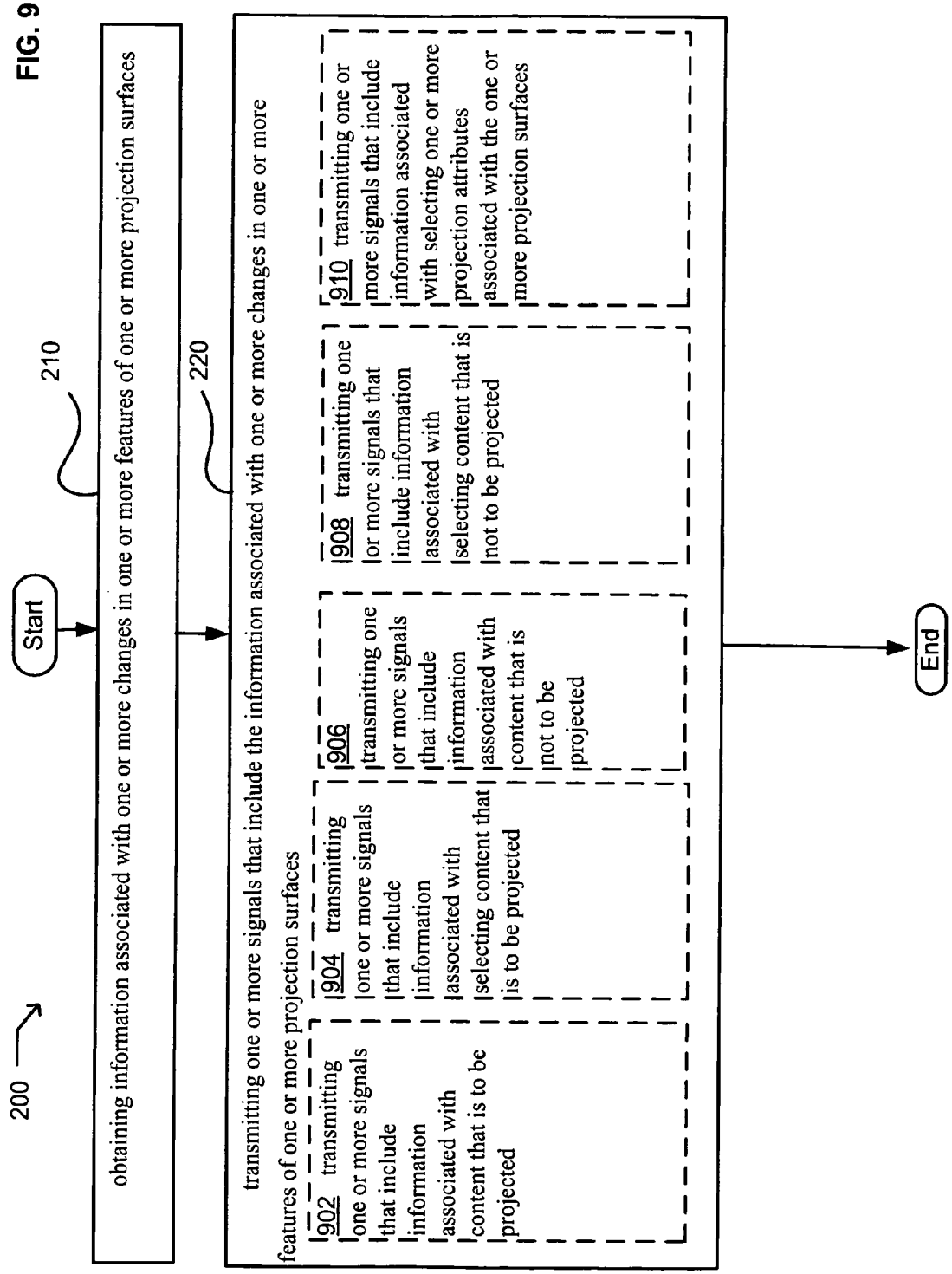
FIG. 9 illustrates alternate embodiments of the example operational flow of FIG. 2.

FIG. 9 illustrates alternative embodiments of the example operational flow 200 of FIG. 2. FIG. 9 illustrates example embodiments where the transmitting operation 220 may include at least one additional operation. Additional operations may include an operation 902, operation 904, operation 906, operation 908, and/or operation 910.

At operation 902, the transmitting operation 220 may include transmitting one or more signals that include information associated with content that is to be projected. In some embodiments, one or more sensor transmitters 251 may transmit one or more signals 400 that include information associated with content that is to be projected. For example, in some embodiments, one or more sensor transmitters 251 may transmit one or more signals 400 that include information associated with accessing sensor memory 228 to obtain content that is to be projected.

At operation 904, the transmitting operation 220 may include transmitting one or more signals that include information associated with selecting content that is to be projected. In some embodiments, one or more sensor transmitters 251 may transmit one or more signals 400 that include information associated with content that is to be projected. In some embodiments, one or more sensor transmitters 251 may transmit one or more signals 400 that include information associated with selecting content that is to be projected from sensor memory 228. In some embodiments, one or more sensor transmitters 251 may transmit one or more signals 400 that include information associated with selecting content that is to be projected in response to user input. In some embodiments, one or more sensor transmitters 251 may transmit one or more signals 400 that include information associated with selecting content that is to be projected in response to one or more sensors 260. In some embodiments, one or more sensor transmitters 251 may transmit one or more signals 400 that include information associated with selecting content that is to be projected in response to one or more sensors 260 that detect one or more persons.

At operation 906, the transmitting operation 220 may include transmitting one or more signals that include information associated with content that is not to be projected. In some embodiments, one or more sensor transmitters 251 may transmit one or more signals 400 that include information associated with content that is not to be projected. In some embodiments, one or more sensor transmitters 251 may transmit one or more signals 400 that include information associated with accessing sensor memory 228 to obtain information associated with content that is not to be projected.

At operation 908, the transmitting operation 220 may include transmitting one or more signals that include information associated with selecting content that is not to be projected. In some embodiments, one or more sensor transmitters 251 may transmit one or more signals 400 that include information associated with selecting content that is not to be projected. In some embodiments, one or more sensor transmitters 251 may transmit one or more signals 400 that include information associated with accessing sensor memory 228 to select content that is not to be projected. In some embodiments, one or more sensor transmitters 251 may transmit one or more signals 400 that include information associated with selecting content that is not to be projected in response to user input. In some embodiments, one or more sensor transmitters 251 may transmit one or more signals 400 that include information associated with selecting content that is not to be projected in response to one or more sensors 260. In some embodiments, one or more sensor transmitters 251 may transmit one or more signals 400 that include information associated with selecting content that is not to be projected in response to one or more sensors 260 that detect one or more persons.

At operation 910, the transmitting operation 220 may include transmitting one or more signals that include information associated with selecting one or more projection attributes associated with the one or more projection surfaces. In some embodiments, one or more sensor transmitters 251 may transmit one or more signals 400 that include information associated with selecting one or more projection attributes associated with one or more projection surfaces 500. In some embodiments, one or more sensor transmitters 251 may transmit one or more signals 400 that include information associated with accessing sensor memory 228 to determine one or more projection attributes associated with one or more projection surfaces 500. In some embodiments, one or more sensor transmitters 251 may transmit one or more signals 400 that include information associated with determining one or more projection attributes associated with one or more projection surfaces 500. Examples of such projection attributes associated with one or more projection surfaces 500 include, but are not limited to, reflectivity, light absorbance, light reflection, light transmission, light emission, ability to record projected content, ability to transmit information associated with projected content, and the like. Accordingly, in some embodiments, one or more sensor transmitters 251 may transmit one or more signals 400 that include one or more instructions for one or more projectors 760 to project in response to one or more attributes associated with one or more projection surfaces 500. In some embodiments, one or more sensor transmitters 251 may transmit one or more signals 400 that include one or more instructions for one or more projectors 760 to project content that is to be printed if a projection surface 500 is able to facilitate printing of content that is projected onto the projection surface 500. In some embodiments, one or more sensor transmitters 251 may transmit one or more signals 400 that include one or more instructions for one or more projectors 760 to not project content that is confidential if a projection surface 500 is able to facilitate printing of content that is projected onto the projection surface 500. In some embodiments, one or more sensor transmitters 251 may transmit one or more signals 400 that include one or more instructions for one or more projectors 760 to project one or more wavelengths of light in response to one or more attributes associated with a projection surface 500. For example, in some embodiments, a projection surface 500 may be made of material that transmits one or more wavelengths of light preferentially over other wavelengths of light. Accordingly, in some embodiments, one or more sensor transmitters 251 may transmit one or more signals 400 that include one or more instructions for one or more projectors 760 to project one or more wavelengths of light that are preferentially transmitted by a projection surface 500.

Figure 10:
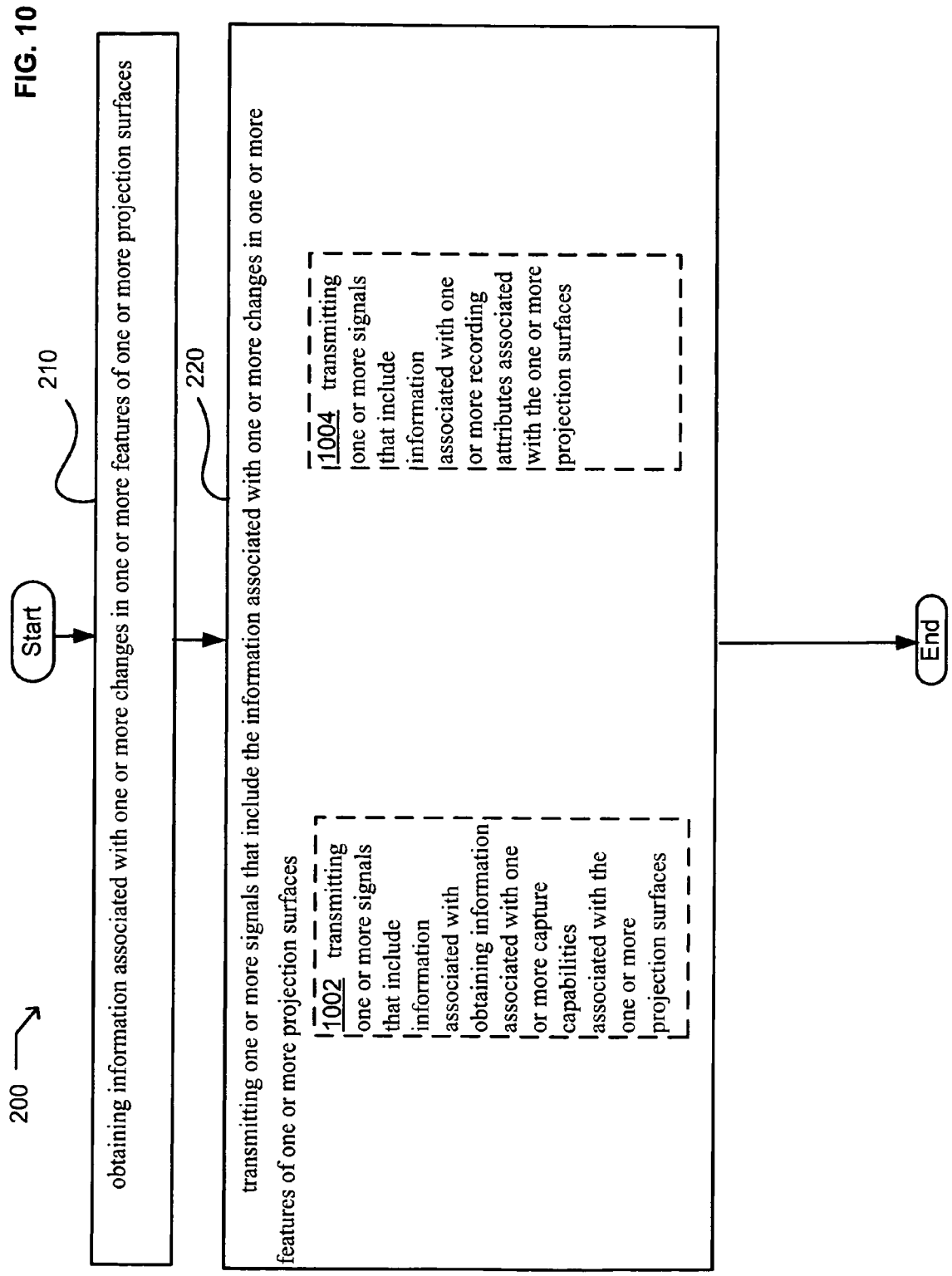
FIG. 10 illustrates alternate embodiments of the example operational flow of FIG. 2.

FIG. 10 illustrates alternative embodiments of the example operational flow 200 of FIG. 2. FIG. 10 illustrates example embodiments where the transmitting operation 220 may include at least one additional operation. Additional operations may include an operation 1002 and/or operation 1004.

At operation 1002, the transmitting operation 220 may include transmitting one or more signals that include information associated with obtaining information associated with one or more capture capabilities associated with the one or more projection surfaces. In some embodiments, one or more sensor transmitters 251 may transmit one or more signals 400 that include information associated with obtaining information associated with one or more capture capabilities associated with one or more projection surfaces 500. In some embodiments, one or more sensor transmitters 251 may transmit one or more signals 400 that include information associated with accessing sensor memory 228 to determine one or more capture capabilities associated with one or more projection surfaces 500. In some embodiments, one or more sensor transmitters 251 may transmit one or more signals 400 that include information associated with determining one or more capture capabilities associated with one or more projection surfaces 500. Examples of capture capabilities include, but are not limited to, printing of projected content, transmission of one or more signals 400 that include information associated with projected content, and the like. In some embodiments, one or more sensor transmitters 251 may transmit one or more signals 400 that include instructions for controlling one or more projectors 760 in response to one or more capture capabilities associated with one or more projection surfaces 500. For example, in some embodiments, one or more sensor transmitters 251 may transmit one or more signals 400 that instruct one or more projectors 760 to project content that is to be printed onto one or more projection surfaces 500 that are capable of facilitating printing of the projected content. In some embodiments, one or more sensor transmitters 251 may transmit one or more signals 400 that instruct one or more projectors 760 not to project content that is confidential onto one or more projection surfaces 500 that are capable of facilitating printing of the projected content.

At operation 1004, the transmitting operation 220 may include transmitting one or more signals that include information associated with one or more recording attributes associated with the one or more projection surfaces. In some embodiments, one or more sensor transmitters 251 may transmit one or more signals 400 that include information associated with one or more recording attributes associated with one or more projection surfaces 500. In some embodiments, one or more sensor transmitters 251 may transmit one or more signals 400 that include information associated with accessing sensor memory 228 to determine one or more recording attributes associated with one or more projection surfaces 500. In some embodiments, one or more sensor transmitters 251 may transmit one or more signals 400 that include information associated with determining one or more recording attributes associated with one or more projection surfaces 500. Examples of recording attributes include, but are not limited to, permanent recordation of projected content, storage of projected content into memory, and the like. In some embodiments, one or more sensor transmitters 251 may transmit one or more signals 400 that include one or more instructions for controlling one or more projectors 760 in response to one or more recording attributes associated with one or more projection surfaces 500. For example, in some embodiments, one or more sensor transmitters 251 may transmit one or more signals 400 that instruct one or more projectors 760 to project content that is to be saved into memory onto one or more projection surfaces 500 that are capable of recording projected content into memory. In some embodiments, one or more sensor transmitters 251 may transmit one or more signals 400 that instruct one or more projector units 700 not to project content that is confidential onto one or more projection surfaces 500 that are capable of saving the projected content into memory.

Figure 11:
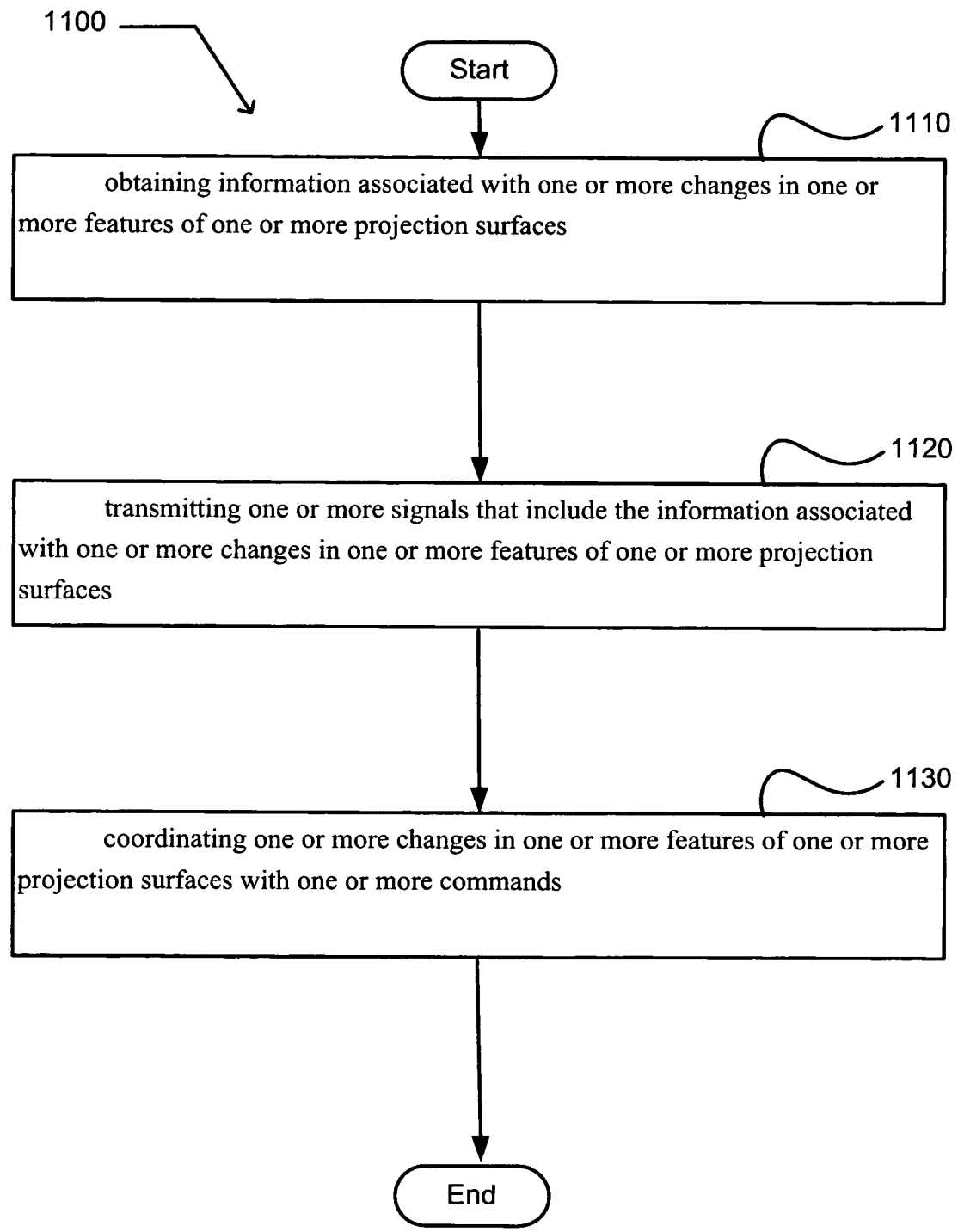
FIG. 11 illustrates an operational flow 1100 representing example operations related to obtaining information associated with one or more changes in one or more features of one or more projection surfaces, transmitting one or more signals that include the information associated with one or more changes in one or more features of one or more projection surfaces, and coordinating one or more changes in one or more features of one or more projection surfaces with one or more commands.

In FIG. 11 and in following figures that include various examples of operations used during performance of the method, discussion and explanation may be provided with respect to any one or combination of the above-described examples of FIG. 1, and/or with respect to other examples and contexts. In some embodiments, modules 210 and 220 of FIG. 2 may correspond to modules 1110 and 1120 of FIG. 11. However, it should be understood that the operations may be executed in a number of other environments and contexts, and/or modified versions of FIG. 1. Also, although the various operations are presented in the sequence(s) illustrated, it should be understood that the various operations may be performed in other orders than those which are illustrated, or may be performed concurrently.

After a start operation, the operational flow 1100 includes an obtaining operation 1110 involving obtaining information associated with one or more changes in one or more features of one or more projection surfaces. In some embodiments, one or more sensor units 200 may obtain information associated with one or more changes in one or more features of one or more projection surfaces 500. In some embodiments, one or more sensor units 200 may obtain information associated with one or more changes in one or more features of one or more projection surfaces 500 directly. For example, in some embodiments, one or more sensor units 200 may obtain information from one or more sensors 260. In some embodiments, one or more sensor units 200 may obtain information associated with one or more changes in one or more features of one or more projection surfaces 500 indirectly. For example, in some embodiments, one or more sensor units 200 may receive one or more signals 400 that are transmitted by one or more projection surfaces 500 that include information associated with one or more changes in one or more features of the one or more projection surfaces 500. One or more sensor units 200 may obtain numerous types of information associated with one or more changes in one or more features of one or more projection surfaces 500. In some embodiments, one or more sensor units 200 may obtain information associated with one or more changes in position associated with one or more projection surfaces 500. In some embodiments, one or more sensor units 200 may obtain information associated with one or more changes in conformation associated with one or more projection surfaces 500. In some embodiments, one or more sensor units 200 may obtain information associated with one or more changes in position and conformation associated with one or more projection surfaces 500. In some embodiments, one or more sensor units 200 may obtain information associated with one or more changes in one or more fiducials associated with one or more projection surfaces 500. In some embodiments, one or more sensor units 200 may obtain information associated with one or more changes in one or more marks associated with one or more projection surfaces 500.

After a start operation, the operational flow 1100 includes a transmitting operation 1120 involving transmitting one or more signals that include the information associated with one or more changes in one or more features of one or more projection surfaces. In some embodiments, one or more sensor units 200 may transmit one or more signals 400 that include the information associated with one or more changes in one or more features of one or more projection surfaces 500. In some embodiments, one or more sensor units 200 may transmit one or more signals 400 that include the information associated with one or more changes in one or more positions of one or more projection surfaces 500. In some embodiments, one or more sensor units 200 may transmit one or more signals 400 that include the information associated with one or more changes in one or more conformations of one or more projection surfaces 500. In some embodiments, one or more sensor units 200 may transmit one or more signals 400 that include the information associated with one or more changes in one or more positions and one or more conformations of one or more projection surfaces 500. In some embodiments, one or more sensor units 200 may transmit one or more signals 400 that include the information associated with adjusting projection output in response to one or more changes in one or more features of one or more projection surfaces 500. For example, in some embodiments, one or more sensor units 200 may transmit one or more signals 400 that include the information associated with adjusting the intensity of light that is projected onto one or more projection surfaces 500 in response to one or more changes in one or more features of the one or more projection surfaces 500. In some embodiments, one or more sensor units 200 may transmit one or more signals 400 that include the information associated with adjusting the wavelengths of light that are projected onto one or more projection surfaces 500 in response to one or more changes in one or more features of the one or more projection surfaces 500. In some embodiments, one or more sensor units 200 may transmit one or more signals 400 that include the information associated with projecting content onto two or more separate projection surfaces 500 in response to one or more changes in one or more features of at least one of the two or more projection surfaces 500.

After a start operation, the operational flow 1100 includes a coordinating operation 1130 involving coordinating one or more changes in one or more features of one or more projection surfaces with one or more commands. In some embodiments, one or more sensor units 200 may facilitate coordinating one or more changes in one or more features of one or more projection surfaces 500 with one or more commands. In some embodiments, one or more sensor processors 222 may facilitate coordination of one or more features of one or more projection surfaces 500 with one or more commands. Numerous features of one or more projection surfaces 500 may be coordinated with one or more commands. Examples of such features include, but are not limited to, reflectivity, light absorbance, light transmission, illumination, motion, conformation, marks, changes in one or more marks, projection attributes, capture capabilities, recording attributes, and the like. Examples of commands include, but are not limited to, commands to: increase light output from one or more projectors 760, decrease light output from one or more projectors 760, select one or more wavelengths of light for projection, select one or more wavelengths of light that are not to be projected, direct projection outputs, project in response to changes in conformation, project in response to motion, project in response to one or more marks associated with one or more projection surfaces 500, project in response to one or more changes in one or more marks associated with one or more projection surfaces 500, select content for projection, select content that is not to be projected, project in response to one or more attributes associated with one or more projection surfaces 500, project in response to one or more capabilities associated with one or more projection surfaces 500, save content into memory, and the like. In some embodiments, one or more sensor units 200 may access memory. For example, in some embodiments, one or more sensor units 200 may access one or more lookup tables that include correlations of one or more changes in one or more features of one or more projection surfaces 500 with one or more commands. In some embodiments, one or more sensor units 200 may access one or more algorithms may be used to correlate one or more changes in one or more features of one or more projection surfaces 500 with one or more commands.

Figure 12:
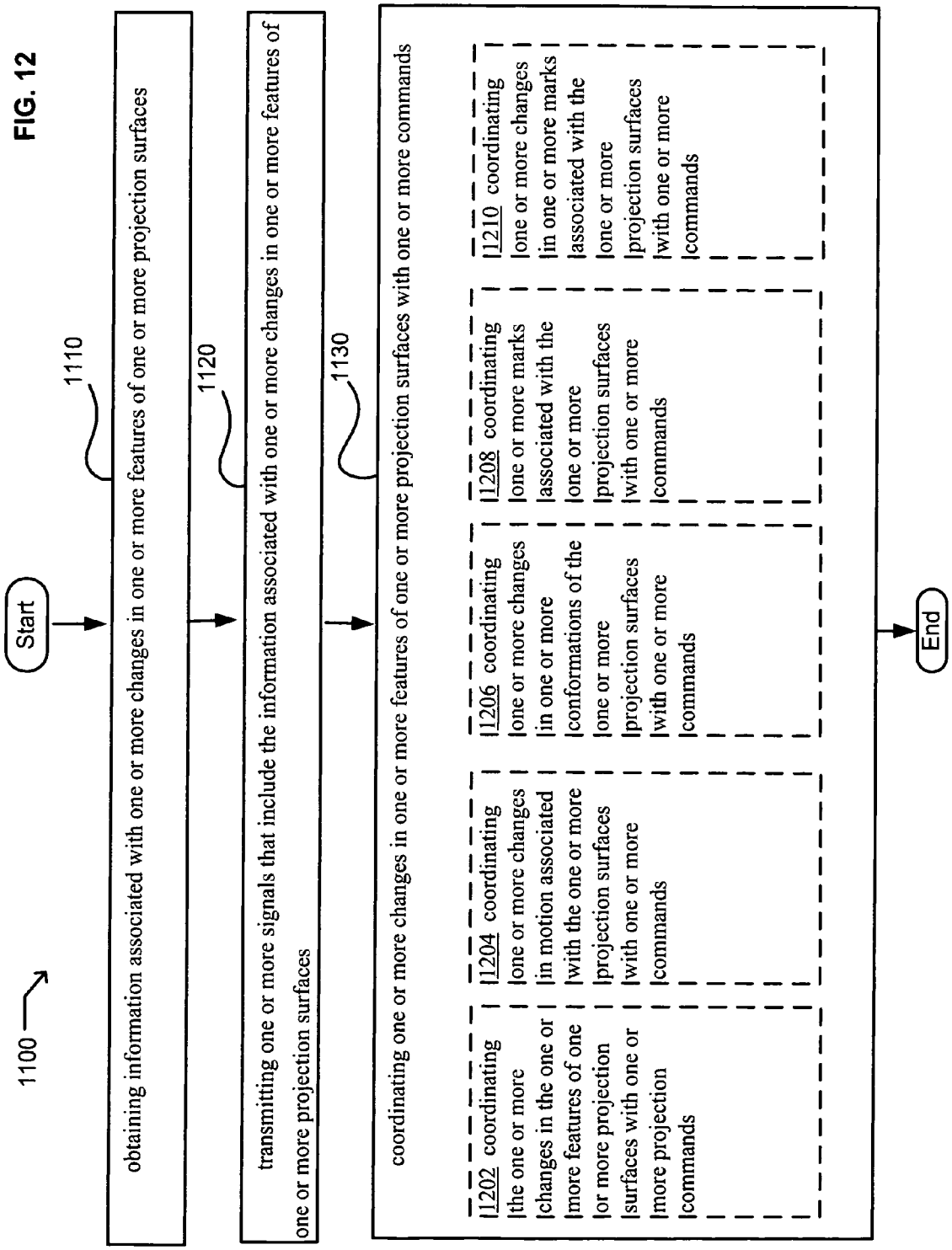
FIG. 12 illustrates alternate embodiments of the example operational flow of FIG. 11.

FIG. 12 illustrates alternative embodiments of the example operational flow 1100 of FIG. 11. FIG. 12 illustrates example embodiments where the coordinating operation 1130 may include at least one additional operation. Additional operations may include an operation 1202, operation 1204, operation 1206, operation 1208, and/or operation 1210.

At operation 1202, the coordinating operation 1130 may include coordinating the one or more changes in the one or more features of one or more projection surfaces with one or more projection commands. In some embodiments, one or more sensor units 200 may facilitate coordinating the one or more changes in the one or more features of one or more projection surfaces 500 with one or more projection commands. For example, in some embodiments, one or more sensor units 200 may facilitate coordinating one or more changes in light transmission by one or more projection surfaces 500 with one or more projection commands to increase or decrease the intensity of light projected by one or more projectors 760 onto the one or more projection surfaces 500. In some embodiments, one or more sensor units 200 may facilitate coordinating one or more changes in the light absorbance of one or more projection surfaces 500 with one or more projection commands to alter the intensity of one or more wavelengths of light projected by one or more projectors 760 onto the one or more projection surfaces 500. For example, in some embodiments, one or more projection surfaces 500 may undergo one or more changes that alter the absorbance of one or more wavelengths of light by the one or more projection surfaces 500. Accordingly, in some embodiments, one or more sensor units 200 may alter the intensity of one or more wavelengths of light that are projected onto the one or more projection surfaces 500 in response to the altered absorbance of the one or more projection surfaces 500.

At operation 1204, the coordinating operation 1130 may include coordinating one or more changes in motion associated with the one or more projection surfaces with one or more commands. In some embodiments, one or more sensor units 200 may facilitate coordinating one or more changes in motion associated with the one or more projection surfaces 500 with one or more commands. In some embodiments, one or more sensor units 200 may facilitate coordinating one or more changes in the motion of one or more projection surfaces 500 with one or more commands to select content for projection. In some embodiments, one or more sensor units 200 may facilitate coordinating one or more changes in the motion of one or more projection surfaces 500 with one or more commands to select content and project the content. In some embodiments, one or more sensor units 200 may facilitate coordinating one or more changes in the motion of one or more projection surfaces 500 with one or more commands to select content that is not to be projected. In some embodiments, one or more sensor units 200 may facilitate coordinating one or more changes in the motion of one or more projection surfaces 500 with one or more commands to project content onto one or more projection surfaces 500 that are capable of recording the content. Accordingly, one or more changes in the motion of one or more projection surfaces 500 may be coordinated with numerous commands.

At operation 1206, the coordinating operation 1130 may include coordinating one or more changes in one or more conformations of the one or more projection surfaces with one or more commands. In some embodiments, one or more sensor units 200 may facilitate coordinating one or more changes in one or more conformations of the one or more projection surfaces 500 with one or more commands. In some embodiments, one or more sensor units 200 may facilitate coordinating one or more changes in the conformation of one or more projection surfaces 500 with one or more commands to select content for projection. In some embodiments, one or more sensor units 200 may facilitate coordinating one or more changes in the conformation of one or more projection surfaces 500 with one or more commands to select content and project the content. In some embodiments, one or more sensor units 200 may facilitate coordinating one or more changes in the conformation of one or more projection surfaces 500 with one or more commands to select content that is not to be projected. In some embodiments, one or more sensor units 200 may facilitate coordinating one or more changes in the conformation of one or more projection surfaces 500 with one or more commands to project content onto one or more projection surfaces 500 that are capable of recording the content. Accordingly, one or more changes in the conformation of one or more projection surfaces 500 may be coordinated with numerous commands.

At operation 1208, the coordinating operation 1130 may include coordinating one or more marks associated with the one or more projection surfaces with one or more commands. In some embodiments, one or more sensor units 200 may facilitate coordinating one or more marks associated with the one or more projection surfaces 500 with one or more commands. In some embodiments, one or more sensor units 200 may facilitate coordinating one or more marks associated with the one or more projection surfaces 500 with one or more commands to select content for projection. In some embodiments, one or more sensor units 200 may facilitate coordinating one or more marks associated with the one or more projection surfaces 500 with one or more commands to select content that is not to be projected. For example, in some embodiments, one or more sensor units 200 may facilitate coordinating one or more marks associated with confidential information with one or more commands to project confidential information associated with the one or more marks. In some embodiments, one or more projector control unit 740 may facilitate coordinating of one or more user 600 created marks placed onto one or more projection surfaces 500 with one or more commands. For example, in some embodiments, one or more users 600 may create one or more marks on a projection surface 500 with one or more pens that may be correlated with one or more commands to select content from memory and project the selected content. In some embodiments, one or more users 600 may configure one or more sensor units 200 to recognize one or more user 600 created marks and facilitate coordinating one or more user 600 created marks with one or more commands.

At operation 1210, the coordinating operation 1130 may include coordinating one or more changes in one or more marks associated with the one or more projection surfaces with one or more commands. In some embodiments, one or more sensor units 200 may facilitate coordinating one or more changes in one or more marks associated with the one or more projection surfaces 500 with one or more commands. In some embodiments, one or more sensor units 200 may facilitate coordinating one or more changes in one or more marks associated with the one or more projection surfaces 500 with one or more commands to select content for projection. In some embodiments, one or more sensor units 200 may facilitate coordinating one or more changes in one or more marks associated with the one or more projection surfaces 500 with one or more commands to select content that is not to be projected. For example, in some embodiments, one or more sensor units 200 may facilitate coordinating elimination (e.g., erasure) of one or more marks with one or more commands.

Figure 13:
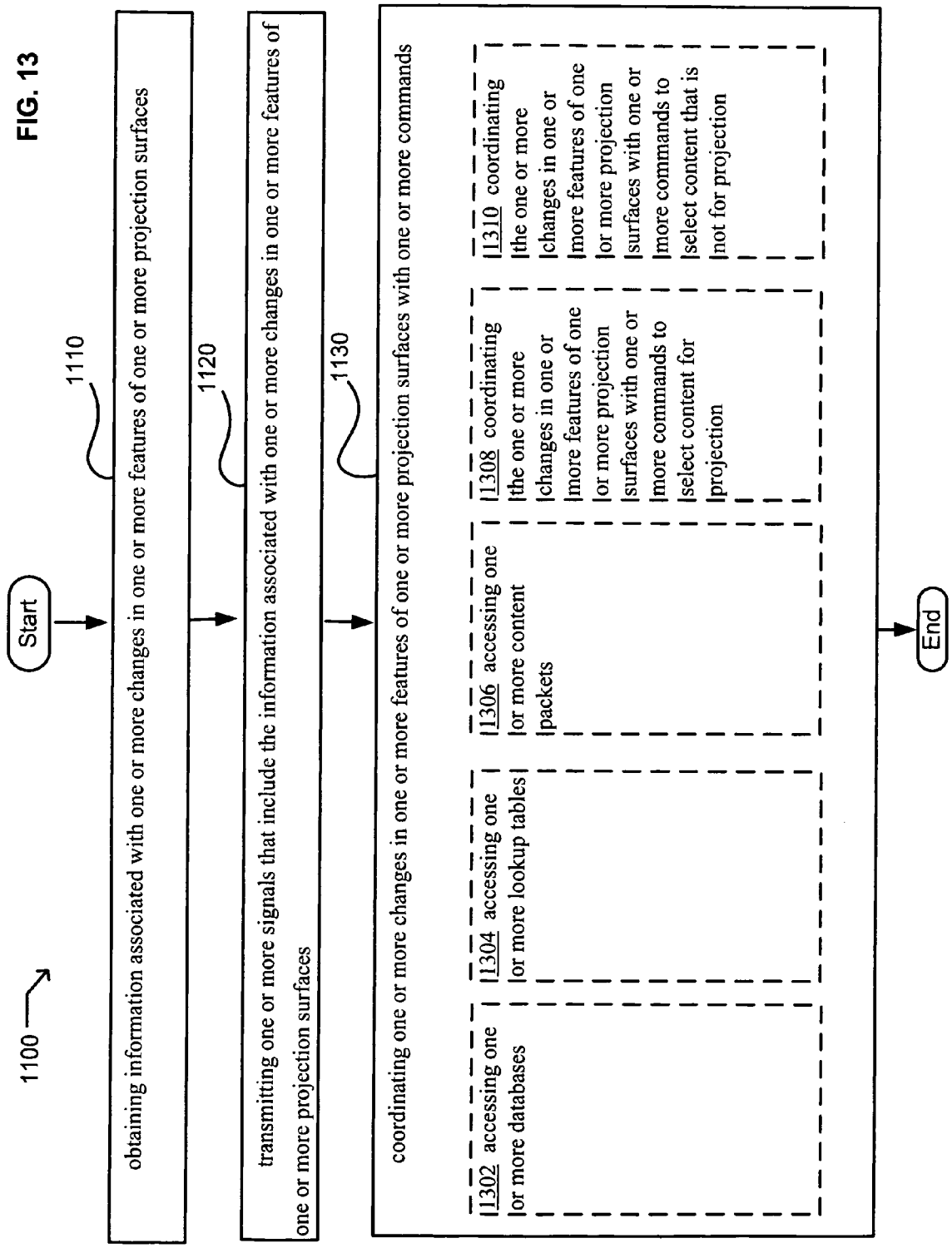
FIG. 13 illustrates alternate embodiments of the example operational flow of FIG. 11.

FIG. 13 illustrates alternative embodiments of the example operational flow 1100 of FIG. 11. FIG. 13 illustrates example embodiments where the coordinating operation 1130 may include at least one additional operation. Additional operations may include an operation 1302, operation 1304, operation 1306, operation 1308, and/or operation 1310.

At operation 1302, the coordinating operation 1130 may include accessing one or more databases. In some embodiments, one or more sensor units 200 may facilitate accessing one or more databases. In some embodiments, one or more sensor units 200 may facilitate coordinating one or more changes in one or more features of one or more projection surfaces 500 with one or more commands to access one or more databases. For example, in some embodiments, one or more sensor units 200 may facilitate accessing one or more databases that include confidential material in response to one or more marks associated with confidential information being placed onto one or more projection surfaces 500. In some embodiments, one or more sensor units 200 may facilitate accessing one or more databases in response to one or more changes in the conformation of one or more projection surfaces 500. For example, in some embodiments, folding a projection surface 500 in half may be coordinated with accessing one or more databases while folding the projection surfaces 500 into quarters may be coordinated with accessing one or more different databases. Accordingly, in some embodiments, one or more sensor units 200 may facilitate accessing one or more databases in response to one or more specified changes in the conformation of a projection surface 500.

At operation 1304, the coordinating operation 1130 may include accessing one or more lookup tables. In some embodiments, one or more sensor units 200 may facilitate accessing one or more lookup tables. In some embodiments, one or more sensor units 200 may facilitate coordinating one or more changes in one or more features of one or more projection surfaces 500 with one or more commands to access one or more lookup tables. In some embodiments, one or more sensor units 200 may facilitate coordinating one or more changes in one or more features of one or more projection surfaces 500 with one or more commands to access one or more lookup tables that include information for coordinating the one or more changes in conformation with one or more commands. For example, in some embodiments, one or more lookup tables may include information for coordinating one or more specified changes in conformation of one or more projection surfaces 500 with one or more commands to select content for projection. In some embodiments, one or more lookup tables may include information for coordinating one or more specified changes in conformation of one or more projection surfaces 500 with one or more commands to select content that is not for projection. In some embodiments, one or more sensor units 200 may facilitate accessing one or more lookup tables in response to one or more changes in the conformation of one or more projection surfaces 500. For example, in some embodiments, folding a projection surface 500 in half may be coordinated with accessing one or more lookup tables while folding the projection surface 500 into quarters may be coordinated with accessing one or more different lookup tables. Accordingly, in some embodiments, one or more sensor units 200 may facilitate accessing one or more lookup tables in response to one or more specified changes in the conformation of a projection surface 500. In some embodiments, one or more sensor units 200 may facilitate accessing one or more lookup tables in response to one or more changes in the position of one or more projection surfaces 500. For example, in some embodiments, moving a projection surface 500 from one position to another may be coordinated with accessing one or more lookup tables. Accordingly, in some embodiments, one or more sensor units 200 may facilitate accessing one or more lookup tables in response to one or more specified changes in the position of a projection surface 500. In some embodiments, one or more sensor units 200 may facilitate accessing one or more lookup tables in response to one or more motions associated with one or more projection surfaces 500. For example, in some embodiments, rotating a projection surface 500 may be coordinated with accessing one or more lookup tables. Accordingly, in some embodiments, one or more sensor units 200 may facilitate accessing one or more lookup tables in response to one or more specified motions associated with a projection surface 500.

At operation 1306, the coordinating operation 1130 may include accessing one or more content packets. In some embodiments, one or more sensor units 200 may facilitate accessing one or more content packets 402. In some embodiments, one or more sensor units 200 may facilitate coordinating one or more changes in one or more features of one or more projection surfaces 500 with one or more commands to access one or more content packets 402. In some embodiments, one or more sensor units 200 may facilitate coordinating one or more changes in one or more features of one or more projection surfaces 500 with one or more commands to access one or more content packets 402 that include specified information. For example, in some embodiments, one or more lookup tables may include information for coordinating one or more specified changes in conformation of one or more projection surfaces 500 with one or more commands to access one or more content packets 402 that include specified information. Accordingly, in some embodiments, one or more specified changes in conformation may be coordinated with specified information. In some embodiments, one or more lookup tables may include information for coordinating one or more specified changes in conformation of one or more projection surfaces 500 with one or more commands to access one or more specified content packets 402. Accordingly, in some embodiments, one or more specified changes in conformation may be coordinated with one or more specified content packets 402.

At operation 1308, the coordinating operation 1130 may include coordinating the one or more changes in one or more features of one or more projection surfaces with one or more commands to select content for projection. In some embodiments, one or more sensor units 200 may facilitate coordinating the one or more changes in one or more features of one or more projection surfaces 500 with one or more commands to select content for projection. In some embodiments, one or more sensor units 200 may facilitate coordinating one or more changes in one or more conformations of one or more projection surfaces 500 with one or more commands to select content for projection. For example, in some embodiments, folding a projection surface 500 in half along the length of the projection surface 500 may be coordinated with one or more commands to select confidential information for projection. In some embodiments, folding a projection surface 500 in half along the width of the projection surface 500 may be coordinated with one or more commands to select nonconfidential information for projection. In some embodiments, a user 600 may specify one or more changes in conformation that may be coordinated with one or more commands to select content for projection. For example, a user 600 may specify that folding a projection surface 500 in a diagonal manner is to be coordinated with one or more commands to select confidential information for projection. In some embodiments, one or more sensor units 200 may facilitate coordinating one or more changes in one or more positions of one or more projection surfaces 500 with one or more commands to select content for projection. For example, in some embodiments, rotating a projection surface 500 may be coordinated with one or more commands to select content for projection. Accordingly, in some embodiments, numerous changes in the conformation of a projection surface 500 may be coordinated with one or more commands to select content for projection.

At operation 1310, the coordinating operation 1130 may include coordinating the one or more changes in one or more features of one or more projection surfaces with one or more commands to select content that is not for projection. In some embodiments, one or more sensor units 200 may facilitate coordinating the one or more changes in one or more features of one or more projection surfaces 500 with one or more commands to select content that is not for projection. In some embodiments, one or more sensor units 200 may facilitate coordinating one or more changes in one or more conformations of one or more projection surfaces 500 with one or more commands to select content that is not for projection. For example, in some embodiments, folding a projection surface 500 in half along the length of the projection surface 500 may be coordinated with one or more commands to select confidential information that is not for projection. In some embodiments, a user 600 may specify one or more changes in conformation that may be coordinated with one or more commands to select content that is not for projection. For example, a user 600 may specify that folding a projection surface 500 in a diagonal manner is to be coordinated with one or more commands to select confidential information that is not for projection. Accordingly, in some embodiments, numerous changes in the conformation of a projection surface 500 may be coordinated with one or more commands to select content that is not for projection. In some embodiments, one or more sensor units 200 may facilitate coordinating one or more changes in one or more positions of one or more projection surfaces 500 with one or more commands to select content that is not for projection. For example, in some embodiments, rotating a projection surface 500 may be coordinated with one or more commands to select content that is not for projection.

Figure 14:
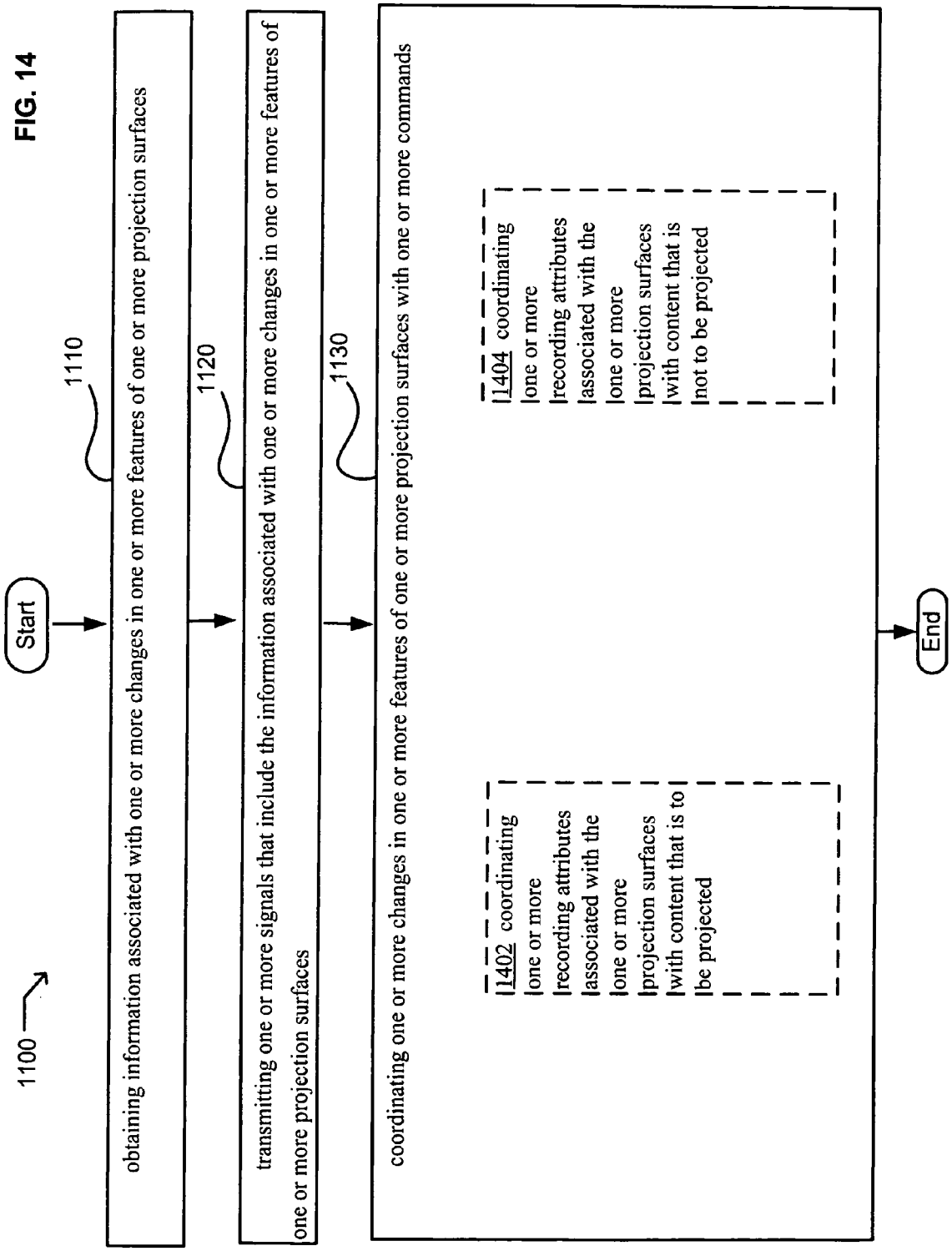
FIG. 14 illustrates alternate embodiments of the example operational flow of FIG. 11.

FIG. 14 illustrates alternative embodiments of the example operational flow 1100 of FIG. 11. FIG. 14 illustrates example embodiments where the coordinating operation 1130 may include at least one additional operation. Additional operations may include an operation 1402, and/or operation 1404.

At operation 1402, the coordinating operation 1130 may include coordinating one or more recording attributes associated with the one or more projection surfaces with content that is to be projected. In some embodiments, one or more sensor units 200 may facilitate coordinating one or more recording attributes associated with one or more projection surfaces 500 with content that is to be projected. In some embodiments, one or more sensor units 200 may facilitate coordinating one or more recording attributes associated with one or more projection surfaces 500 with content that is to be recorded into memory. For example, in some embodiments, the ability of one or more projection surfaces 500 to facilitate saving content that is projected onto the projection surface 500 into memory may be coordinated with content that is to be projected on the projection surface 500 and saved into memory. In some embodiments, one or more sensor units 200 may facilitate coordinating one or more recording attributes associated with one or more projection surfaces 500 with content that is to be printed. For example, in some embodiments, the ability of one or more projection surfaces 500 to facilitate printing of content that is projected onto the projection surface 500 may be coordinated with content that is to be projected onto the projection surface 500 and printed.

At operation 1404, the coordinating operation 1130 may include coordinating one or more recording attributes associated with the one or more projection surfaces with content that is not to be projected. In some embodiments, one or more sensor units 200 may facilitate coordinating one or more recording attributes associated with one or more projection surfaces 500 with content that is not to be projected. In some embodiments, one or more sensor units 200 may facilitate coordinating one or more recording attributes associated with one or more projection surfaces 500 with content that is not to be recorded into memory. For example, in some embodiments, the ability of one or more projection surfaces 500 to facilitate saving content that is projected onto the projection surface 500 into memory may be coordinated with content that is not to be projected onto the projection surface 500. In some embodiments, one or more sensor units 200 may facilitate coordinating one or more recording attributes associated with one or more projection surfaces 500 with content that is not to be printed. For example, in some embodiments, the ability of one or more projection surfaces 500 to facilitate printing of content that is projected onto the projection surface 500 may be coordinated with content that is to be projected onto the projection surface 500.

Figure 15:
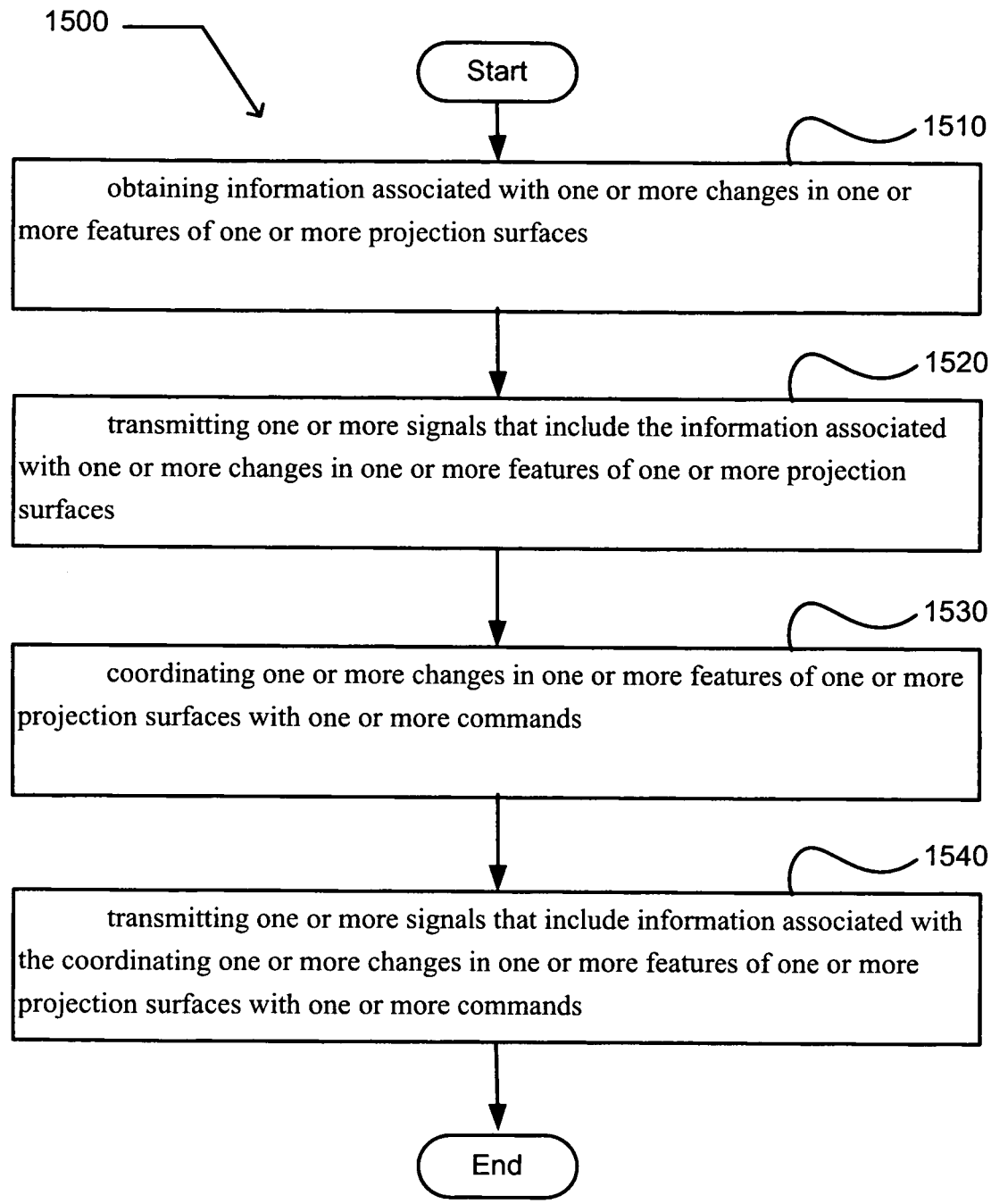
FIG. 15 illustrates an operational flow 1500 representing example operations related to obtaining information associated with one or more changes in one or more features of one or more projection surfaces, transmitting one or more signals that include the information associated with one or more changes in one or more features of one or more projection surfaces, coordinating one or more changes in one or more features of one or more projection surfaces with one or more commands, and transmitting one or more signals that include information associated with the coordinating one or more changes in one or more features of one or more projection surfaces with one or more commands.

In FIG. 15 and in following figures that include various examples of operations used during performance of the method, discussion and explanation may be provided with respect to any one or combination of the above-described examples of FIG. 1, and/or with respect to other examples and contexts. In some embodiments, modules 1110, 1120 and 1130 of FIG. 11 may correspond to modules 1510, 1520 and 1530 of FIG. 15. However, it should be understood that the operations may be executed in a number of other environments and contexts, and/or modified versions of FIG. 1. Also, although the various operations are presented in the sequence(s) illustrated, it should be understood that the various operations may be performed in other orders than those which are illustrated, or may be performed concurrently.

After a start operation, the operational flow 1500 includes an obtaining operation 1510 involving obtaining information associated with one or more changes in one or more features of one or more projection surfaces. In some embodiments, one or more sensor units 200 may obtain information associated with one or more changes in one or more features of one or more projection surfaces 500. In some embodiments, one or more sensor units 200 may obtain information associated with one or more changes in one or more features of one or more projection surfaces 500 directly. For example, in some embodiments, one or more sensor units 200 may obtain information from one or more sensors 260. In some embodiments, one or more sensor units 200 may obtain information associated with one or more changes in one or more features of one or more projection surfaces 500 indirectly. For example, in some embodiments, one or more sensor units 200 may receive one or more signals 400 that are transmitted by one or more projection surfaces 500 that include information associated with one or more changes in one or more features of the one or more projection surfaces 500. One or more sensor units 200 may obtain numerous types of information associated with one or more changes in one or more features of one or more projection surfaces 500. In some embodiments, one or more sensor units 200 may obtain information associated with one or more changes in position associated with one or more projection surfaces 500. In some embodiments, one or more sensor units 200 may obtain information associated with one or more changes in conformation associated with one or more projection surfaces 500. In some embodiments, one or more sensor units 200 may obtain information associated with one or more changes in position and conformation associated with one or more projection surfaces 500. In some embodiments, one or more sensor units 200 may obtain information associated with one or more changes in one or more fiducials associated with one or more projection surfaces 500. In some embodiments, one or more sensor units 200 may obtain information associated with one or more changes in one or more marks associated with one or more projection surfaces 500.

After a start operation, the operational flow 1500 includes a transmitting operation 1520 involving transmitting one or more signals that include the information associated with one or more changes in one or more features of one or more projection surfaces. In some embodiments, one or more sensor units 200 may transmit one or more signals 400 that include the information associated with one or more changes in one or more features of one or more projection surfaces 500. In some embodiments, one or more sensor units 200 may transmit one or more signals 400 that include the information associated with one or more changes in one or more positions of one or more projection surfaces 500. In some embodiments, one or more sensor units 200 may transmit one or more signals 400 that include the information associated with one or more changes in one or more conformations of one or more projection surfaces 500. In some embodiments, one or more sensor units 200 may transmit one or more signals 400 that include the information associated with one or more changes in one or more positions and one or more conformations of one or more projection surfaces 500. In some embodiments, one or more sensor units 200 may transmit one or more signals 400 that include the information associated with adjusting projection output in response to one or more changes in one or more features of one or more projection surfaces 500. For example, in some embodiments, one or more sensor units 200 may transmit one or more signals 400 that include the information associated with adjusting the intensity of light that is projected onto one or more projection surfaces 500 in response to one or more changes in one or more features of the one or more projection surfaces 500. In some embodiments, one or more sensor units 200 may transmit one or more signals 400 that include the information associated with adjusting the wavelengths of light that are projected onto one or more projection surfaces 500 in response to one or more changes in one or more features of the one or more projection surfaces 500. In some embodiments, one or more sensor units 200 may transmit one or more signals 400 that include the information associated with projecting content onto two or more separate projection surfaces 500 in response to one or more changes in one or more features of at least one of the two or more projection surfaces 500.

After a start operation, the operational flow 1500 includes a coordinating operation 1530 involving coordinating one or more changes in one or more features of one or more projection surfaces with one or more commands. In some embodiments, one or more sensor units 200 may facilitate coordinating one or more changes in one or more features of one or more projection surfaces 500 with one or more commands. In some embodiments, one or more sensor processors 222 may facilitate coordination of one or more features of one or more projection surfaces 500 with one or more commands. Numerous features of one or more projection surfaces 500 may be coordinated with one or more commands. Examples of such features include, but are not limited to, reflectivity, light absorbance, light transmission, illumination, motion, conformation, marks, changes in one or more marks, projection attributes, capture capabilities, recording attributes, and the like. Examples of commands include, but are not limited to, commands to: increase light output from one or more projectors 760, decrease light output from one or more projectors 760, select one or more wavelengths of light for projection, select one or more wavelengths of light that are not to be projected, direct projection outputs, project in response to changes in conformation, project in response to motion, project in response to one or more marks associated with one or more projection surfaces 500, project in response to one or more changes in one or more marks associated with one or more projection surfaces 500, select content for projection, select content that is not to be projected, project in response to one or more attributes associated with one or more projection surfaces 500, project in response to one or more capabilities associated with one or more projection surfaces 500, save content into memory, and the like. In some embodiments, one or more sensor units 200 may access memory. For example, in some embodiments, one or more sensor units 200 may access one or more lookup tables that include correlations of one or more changes in one or more features of one or more projection surfaces 500 with one or more commands. In some embodiments, one or more sensor units 200 may access one or more algorithms that may be used to correlate one or more changes in one or more features of one or more projection surfaces 500 with one or more commands.

After a start operation, the operational flow 1500 includes a transmitting operation 1540 involving transmitting one or more signals that include information associated with the coordinating one or more changes in one or more features of one or more projection surfaces with one or more commands. In some embodiments, one or more sensor transmitters 251 may transmit one or more signals 400 that include information associated with the coordinating one or more changes in one or more features of one or more projection surfaces 500 with one or more commands. In some embodiments, one or more sensor transmitters 251 may transmit one or more signals 400 that include information associated with the coordinating one or more changes in the position of one or more projection surfaces 500 with one or more commands. In some embodiments, one or more sensor transmitters 251 may transmit one or more signals 400 that include information associated with the coordinating one or more changes in the conformation of one or more projection surfaces 500 with one or more commands. In some embodiments, one or more sensor transmitters 251 may transmit one or more signals 400 that include information associated with the coordinating one or more changes in the position and the conformation of one or more projection surfaces 500 with one or more commands.

Figure 16:
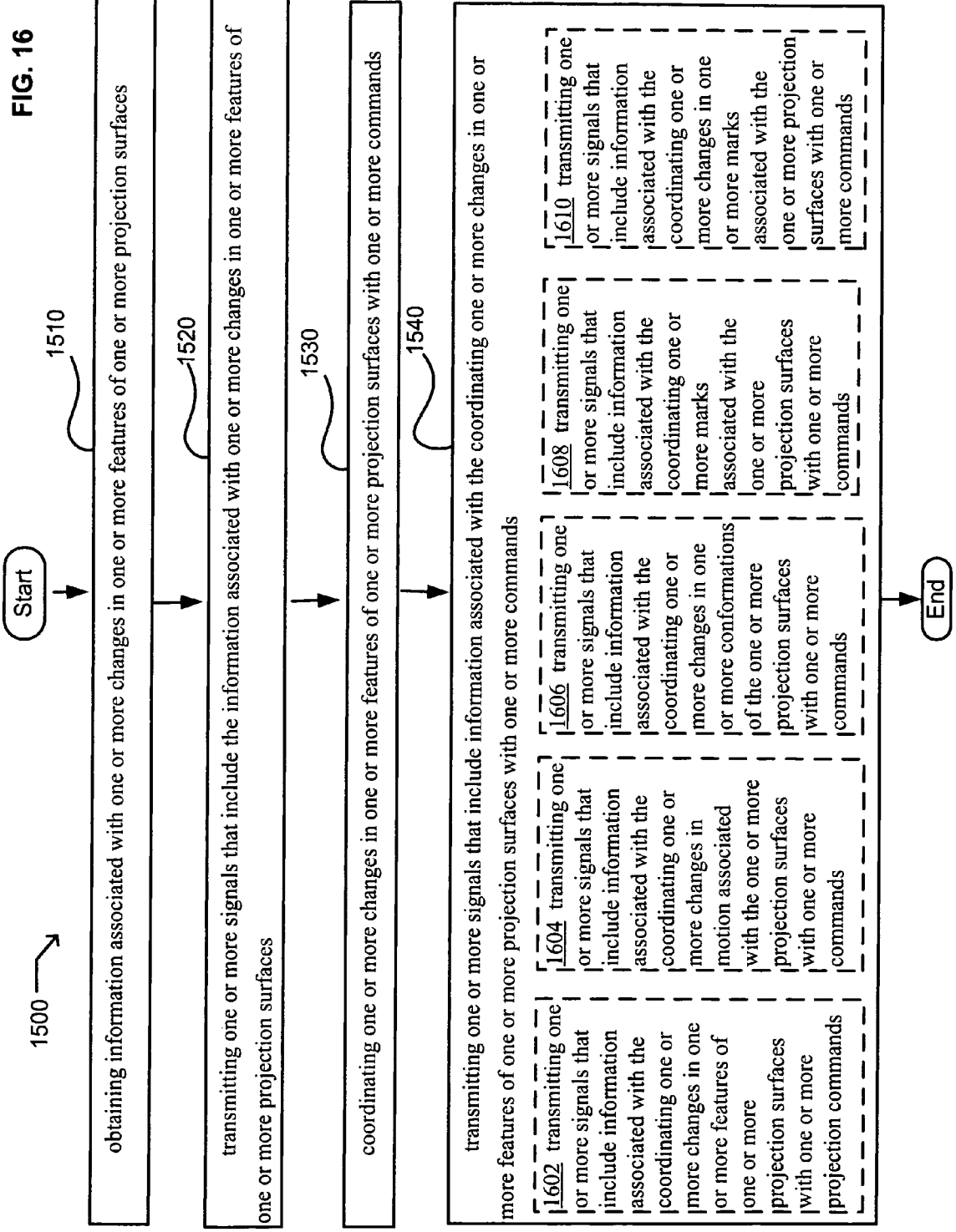
FIG. 16 illustrates alternate embodiments of the example operational flow of FIG. 15.

FIG. 16 illustrates alternative embodiments of the example operational flow 1500 of FIG. 15. FIG. 16 illustrates example embodiments where the transmitting operation 1540 may include at least one additional operation. Additional operations may include an operation 1602, operation 1604, operation 1606, operation 1608, and/or operation 1610.

At operation 1602, the transmitting operation 1540 may include transmitting one or more signals that include information associated with the coordinating one or more changes in one or more features of one or more projection surfaces with one or more projection commands. In some embodiments, one or more sensor transmitters 251 may transmit one or more signals 400 that include information associated with the coordinating one or more changes in one or more features of one or more projection surfaces with one or more projection commands. For example, in some embodiments, one or more sensor transmitters 251 may transmit one or more signals 400 that include information associated with coordinating one or more changes in light transmission by one or more projection surfaces 500 with one or more projection commands to increase or decrease the intensity of light projected by one or more projectors 760 onto the one or more projection surfaces 500. In some embodiments, one or more sensor transmitters 251 may transmit one or more signals 400 that include information associated with coordinating one or more changes in the light absorbance of one or more projection surfaces 500 with one or more projection commands to alter the intensity of one or more wavelengths of light projected by one or more projectors 760 onto the one or more projection surfaces 500.

At operation 1604, the transmitting operation 1540 may include transmitting one or more signals that include information associated with the coordinating one or more changes in motion associated with the one or more projection surfaces with one or more commands. In some embodiments, one or more sensor transmitters 251 may transmit one or more signals 400 that include information associated with the coordinating one or more changes in motion associated with the one or more projection surfaces 500 with one or more commands. In some embodiments, one or more sensor transmitters 251 may transmit one or more signals 400 that include information associated with coordinating one or more changes in motion associated with the one or more projection surfaces 500 with one or more commands. In some embodiments, one or more sensor transmitters 251 may transmit one or more signals 400 that include information associated with coordinating one or more changes in the motion of one or more projection surfaces 500 with one or more commands to select content for projection. In some embodiments, one or more sensor transmitters 251 may transmit one or more signals 400 that include information associated with coordinating one or more changes in the motion of one or more projection surfaces 500 with one or more commands to select content and project the content. In some embodiments, one or more sensor transmitters 251 may transmit one or more signals 400 that include information associated with coordinating one or more changes in the motion of one or more projection surfaces 500 with one or more commands to select content that is not to be projected. In some embodiments, one or more sensor transmitters 251 may transmit one or more signals 400 that include information associated with coordinating one or more changes in the motion of one or more projection surfaces 500 with one or more commands to project content onto one or more projection surfaces 500 that are capable of recording the content.

At operation 1606, the transmitting operation 1540 may include transmitting one or more signals that include information associated with the coordinating one or more changes in one or more conformations of the one or more projection surfaces with one or more commands. In some embodiments, one or more sensor transmitters 251 may transmit one or more signals 400 that include information associated with the coordinating one or more changes in one or more conformations of the one or more projection surfaces 500 with one or more commands. In some embodiments, one or more sensor transmitters 251 may transmit one or more signals 400 that include information associated with coordinating one or more changes in the conformation of one or more projection surfaces 500 with one or more commands to select content for projection. In some embodiments, one or more sensor transmitters 251 may transmit one or more signals 400 that include information associated with coordinating one or more changes in the conformation of one or more projection surfaces 500 with one or more commands to select content and project the content. In some embodiments, one or more sensor transmitters 251 may transmit one or more signals 400 that include information associated with coordinating one or more changes in the conformation of one or more projection surfaces 500 with one or more commands to select content that is not to be projected. In some embodiments, one or more sensor transmitters 251 may transmit one or more signals 400 that include information associated with coordinating one or more changes in the conformation of one or more projection surfaces 500 with one or more commands to project content onto one or more projection surfaces 500 that are capable of recording the content.

At operation 1608, the transmitting operation 1540 may include transmitting one or more signals that include information associated with the coordinating one or more marks associated with the one or more projection surfaces with one or more commands. In some embodiments, one or more sensor transmitters 251 may transmit one or more signals 400 that include information associated with the coordinating one or more marks associated with the one or more projection surfaces 500 with one or more commands. In some embodiments, one or more sensor transmitters 251 may transmit one or more signals 400 that include information associated with coordinating one or more marks associated with the one or more projection surfaces 500 with one or more commands. In some embodiments, one or more sensor transmitters 251 may transmit one or more signals 400 that include information associated with coordinating one or more marks associated with the one or more projection surfaces 500 with one or more commands to select content for projection. In some embodiments, one or more sensor transmitters 251 may transmit one or more signals 400 that include information associated with coordinating one or more marks associated with the one or more projection surfaces 500 with one or more commands to select content that is not to be projected. For example, in some embodiments, one or more sensor transmitters 251 may transmit one or more signals 400 that include information associated with coordinating one or more marks associated with confidential information with one or more commands to project the confidential information associated with the one or more marks. In some embodiments, one or more sensor transmitters 251 may transmit one or more signals 400 that include information associated with coordinating one or more user 600 created marks placed onto one or more projection surfaces 500 with one or more commands.

At operation 1610, the transmitting operation 1540 may include transmitting one or more signals that include information associated with the coordinating one or more changes in one or more marks associated with the one or more projection surfaces with one or more commands. In some embodiments, one or more sensor transmitters 251 may transmit one or more signals 400 that include information associated with the coordinating one or more changes in one or more marks associated with the one or more projection surfaces with one or more commands. In some embodiments, one or more sensor transmitters 251 may transmit one or more signals 400 that include information associated with coordinating one or more changes in one or more marks associated with the one or more projection surfaces 500 with one or more commands. In some embodiments, one or more sensor transmitters 251 may transmit one or more signals 400 that include information associated with coordinating one or more changes in one or more marks associated with the one or more projection surfaces 500 with one or more commands to select content for projection. In some embodiments, one or more sensor transmitters 251 may transmit one or more signals 400 that include information associated with coordinating one or more changes in one or more marks associated with the one or more projection surfaces 500 with one or more commands to select content that is not to be projected. For example, in some embodiments, one or more sensor transmitters 251 may transmit one or more signals 400 that include information associated with coordinating elimination (e.g., erasure) of one or more marks with one or more commands.

Figure 17:
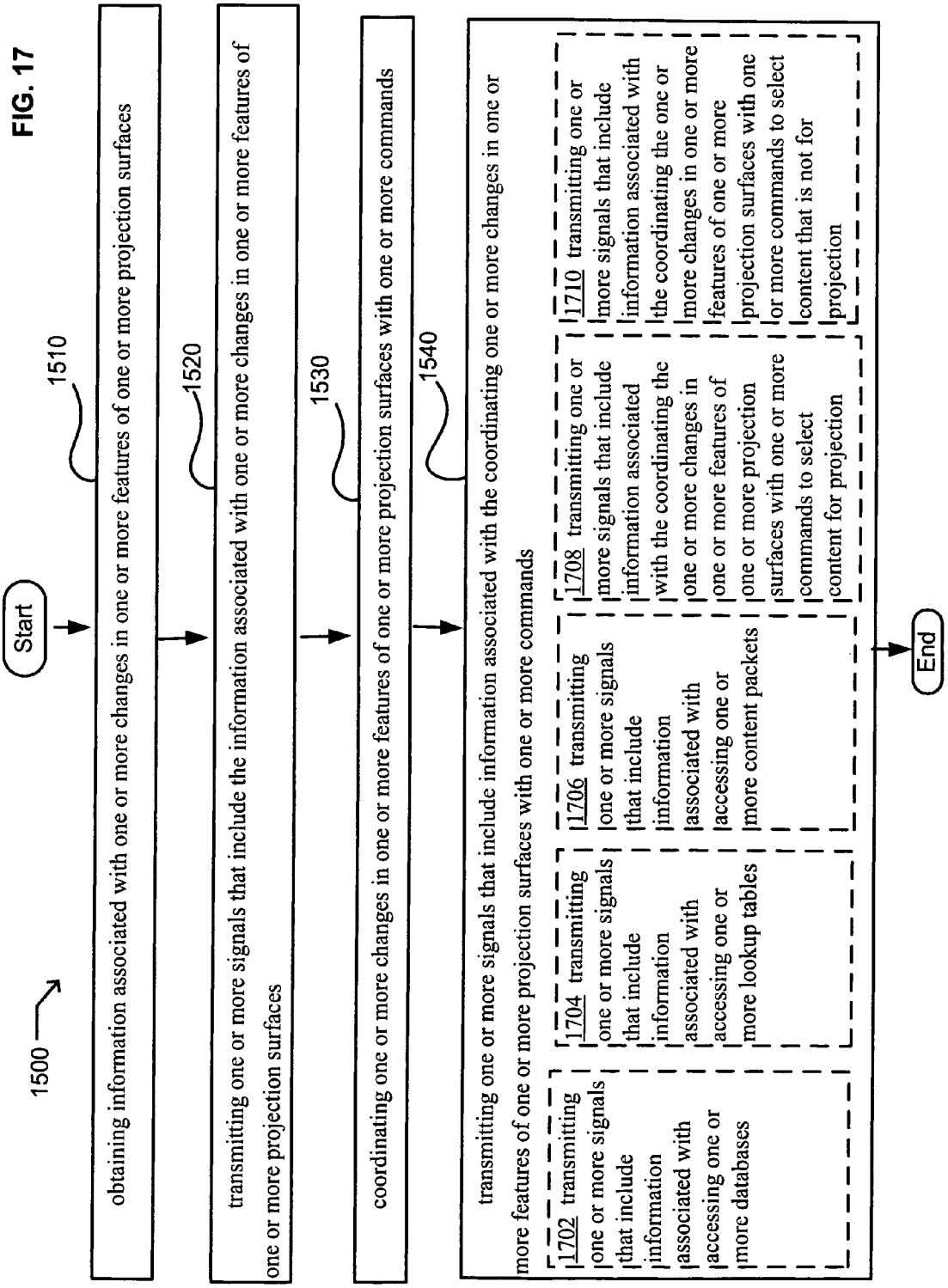
FIG. 17 illustrates alternate embodiments of the example operational flow of FIG. 15.

FIG. 17 illustrates alternative embodiments of the example operational flow 1500 of FIG. 15. FIG. 17 illustrates example embodiments where the transmitting operation 1540 may include at least one additional operation. Additional operations may include an operation 1702, operation 1704, operation 1706, operation 1708, and/or operation 1710.

At operation 1702, the transmitting operation 1540 may include transmitting one or more signals that include information associated with accessing one or more databases. In some embodiments, one or more sensor transmitters 251 may transmit one or more signals 400 that include information associated with accessing one or more databases. In some embodiments, one or more sensor transmitters 251 may transmit one or more signals 400 that include information associated with accessing one or more databases that include confidential material in response to one or more marks associated with confidential information being placed onto one or more projection surfaces 500. In some embodiments, one or more sensor transmitters 251 may transmit one or more signals 400 that include information associated with accessing one or more databases in response to one or more changes in the conformation of one or more projection surfaces 500. In some embodiments, one or more sensor transmitters 251 may transmit one or more signals 400 that include information associated with accessing one or more databases in response to one or more specified changes in the conformation of a projection surface 500.

At operation 1704, the transmitting operation 1540 may include transmitting one or more signals that include information associated with accessing one or more lookup tables. In some embodiments, one or more sensor transmitters 251 may transmit one or more signals 400 that include information associated with the accessing one or more lookup tables. In some embodiments, one or more sensor transmitters 251 may transmit one or more signals 400 that include information associated with coordinating one or more changes in one or more features of one or more projection surfaces 500 with one or more commands to access one or more lookup tables. In some embodiments, one or more sensor transmitters 251 may transmit one or more signals 400 that include information associated with coordinating one or more specified changes in conformation of one or more projection surfaces 500 with one or more commands to select content for projection. In some embodiments, one or more sensor transmitters 251 may transmit one or more signals 400 that include information associated with accessing one or more lookup tables in response to one or more changes in the conformation of one or more projection surfaces 500. In some embodiments, one or more sensor transmitters 251 may transmit one or more signals 400 that include information associated with accessing one or more lookup tables in response to one or more changes in the position of one or more projection surfaces 500. In some embodiments, one or more sensor transmitters 251 may transmit one or more signals 400 that include information associated with accessing one or more lookup tables in response to one or more motions associated with one or more projection surfaces 500.

At operation 1706, the transmitting operation 1540 may include transmitting one or more signals that include information associated with accessing one or more content packets. In some embodiments, one or more sensor transmitters 251 may transmit one or more signals 400 that include information associated with the accessing one or more content packets 402. In some embodiments, one or more sensor transmitters 251 may transmit one or more signals 400 that include information associated with coordinating one or more changes in one or more features of one or more projection surfaces 500 with one or more commands to access one or more content packets 402. In some embodiments, one or more sensor transmitters 251 may transmit one or more signals 400 that include information associated with coordinating one or more changes in one or more features of one or more projection surfaces 500 with one or more commands to access one or more content packets that include specified information. In some embodiments, one or more sensor transmitters 251 may transmit one or more signals 400 that include information associated with coordinating one or more specified changes in conformation with specified information. In some embodiments, one or more sensor transmitters 251 may transmit one or more signals 400 that include information associated with coordinating one or more specified changes in conformation of one or more projection surfaces 500 with one or more commands to access one or more specified content packets 402.

At operation 1708, the transmitting operation 1540 may include transmitting one or more signals that include information associated with the coordinating the one or more changes in one or more features of one or more projection surfaces with one or more commands to select content for projection. In some embodiments, one or more sensor transmitters 251 may transmit one or more signals 400 that include information associated with the coordinating the one or more changes in one or more features of one or more projection surfaces 500 with one or more commands to select content for projection. In some embodiments, one or more sensor transmitters 251 may transmit one or more signals 400 that include information associated with coordinating one or more changes in one or more features of one or more projection surfaces 500 with one or more commands to select content for projection. In some embodiments, one or more sensor transmitters 251 may transmit one or more signals 400 that include information associated with coordinating one or more changes in one or more conformations of one or more projection surfaces 500 with one or more commands to select content for projection. In some embodiments, one or more sensor transmitters 251 may transmit one or more signals 400 that include information associated with coordinating one or more changes in one or more positions of one or more projection surfaces 500 with one or more commands to select content for projection.

At operation 1710, the transmitting operation 1540 may include transmitting one or more signals that include information associated with the coordinating the one or more changes in one or more features of one or more projection surfaces with one or more commands to select content that is not for projection. In some embodiments, one or more sensor transmitters 251 may transmit one or more signals 400 that include information associated with the coordinating the one or more changes in one or more features of one or more projection surfaces 500 with one or more commands to select content that is not for projection. In some embodiments, one or more sensor transmitters 251 may transmit one or more signals 400 that include information associated with coordinating one or more changes in one or more features of one or more projection surfaces 500 with one or more commands to select content that is not for projection. In some embodiments, one or more sensor transmitters 251 may transmit one or more signals 400 that include information associated with coordinating one or more changes in one or more conformations of one or more projection surfaces 500 with one or more commands to select content that is not for projection. In some embodiments, one or more sensor transmitters 251 may transmit one or more signals 400 that include information associated with coordinating one or more changes in one or more positions of one or more projection surfaces 500 with one or more commands to select content that is not for projection.

Figure 18:
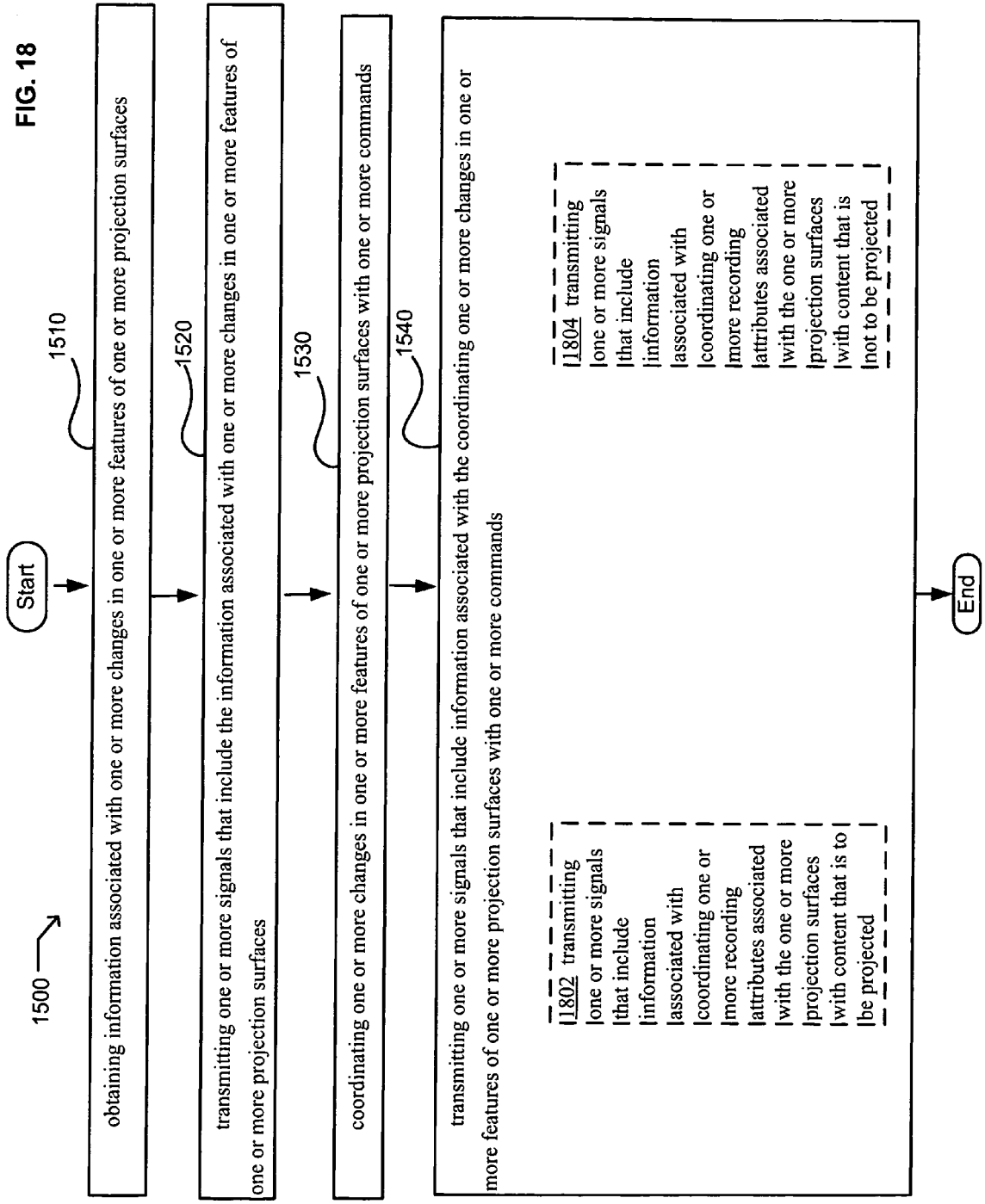
FIG. 18 illustrates alternate embodiments of the example operational flow of FIG. 15.

FIG. 18 illustrates alternative embodiments of the example operational flow 1500 of FIG. 15. FIG. 18 illustrates example embodiments where the transmitting operation 1540 may include at least one additional operation. Additional operations may include an operation 1802 and/or operation 1804.

At operation 1802, the transmitting operation 1540 may include transmitting one or more signals that include information associated with coordinating one or more recording attributes associated with the one or more projection surfaces with content that is to be projected. In some embodiments, one or more sensor transmitters 251 may transmit one or more signals 400 that include information associated with coordinating one or more recording attributes associated with the one or more projection surfaces with content that is to be projected. In some embodiments, one or more sensor transmitters 251 may transmit one or more signals 400 that include information associated with coordinating one or more recording attributes associated with one or more projection surfaces 500 with content that is to be projected. In some embodiments, one or more sensor transmitters 251 may transmit one or more signals 400 that include information associated with coordinating one or more recording attributes associated with one or more projection surfaces 500 with content that is to be recorded into memory. In some embodiments, one or more sensor transmitters 251 may transmit one or more signals 400 that include information associated with coordinating one or more recording attributes associated with one or more projection surfaces 500 with content that is to be printed.

At operation 1804, the transmitting operation 1540 may include transmitting one or more signals that include information associated with coordinating one or more recording attributes associated with the one or more projection surfaces with content that is not to be projected. In some embodiments, one or more sensor transmitters 251 may transmit one or more signals 400 that include information associated with coordinating one or more recording attributes associated with the one or more projection surfaces with content that is not to be projected. In some embodiments, one or more sensor transmitters 251 may transmit one or more signals 400 that include information associated with coordinating one or more recording attributes associated with one or more projection surfaces 500 with content that is not to be projected. In some embodiments, one or more sensor transmitters 251 may transmit one or more signals 400 that include information associated with coordinating one or more recording attributes associated with one or more projection surfaces 500 with content that is not to be recorded into memory. In some embodiments, one or more sensor transmitters 251 may transmit one or more signals 400 that include information associated with coordinating one or more recording attributes associated with one or more projection surfaces 500 with content that is not to be printed.

Figure 19:
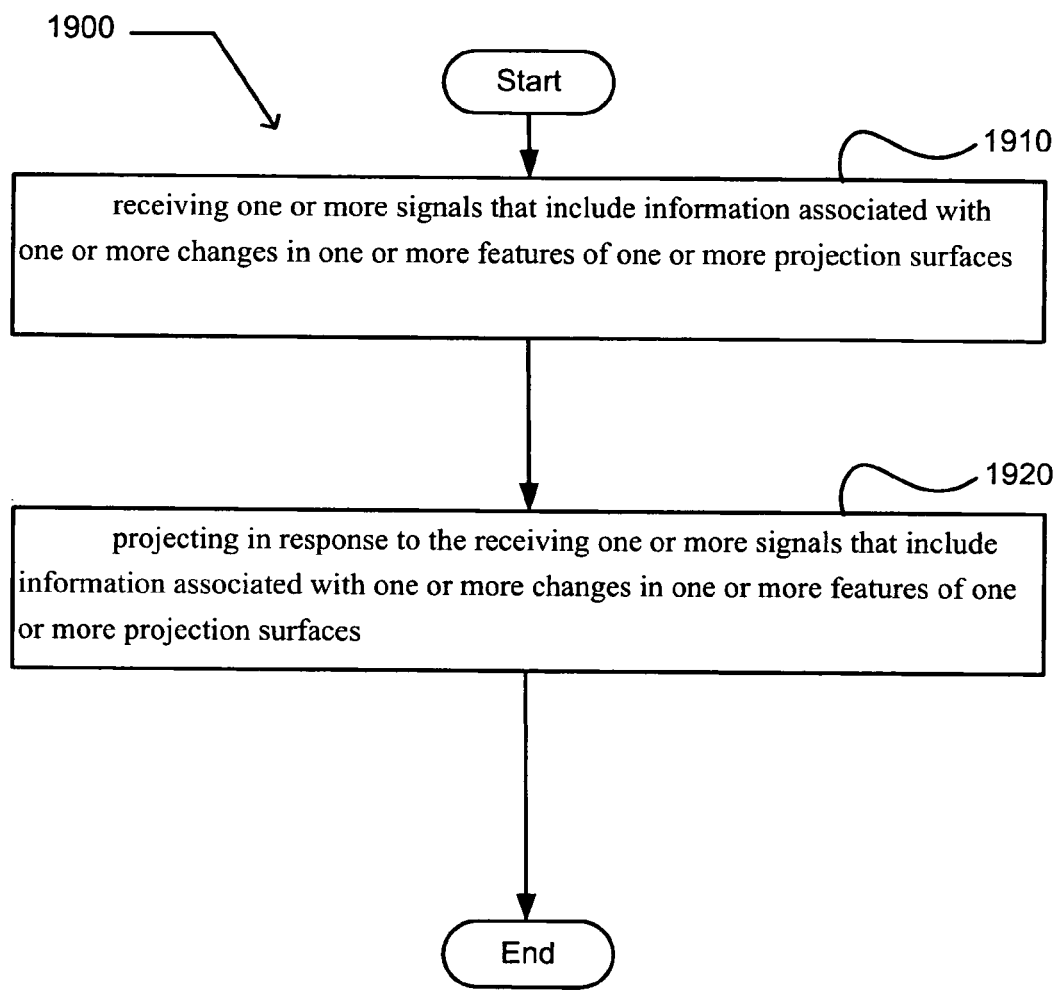
FIG. 19 illustrates an operational flow 1900 representing example operations related to receiving one or more signals that include information associated with one or more changes in one or more features of one or more projection surfaces and projecting in response to the receiving one or more signals that include information associated with one or more changes in one or more features of one or more projection surfaces.

In FIG. 19 and in following figures that include various examples of operations used during performance of the method, discussion and explanation may be provided with respect to any one or combination of the above-described examples of FIG. 1, and/or with respect to other examples and contexts. However, it should be understood that the operations may be executed in a number of other environments and contexts, and/or modified versions of FIG. 1. Also, although the various operations are presented in the sequence(s) illustrated, it should be understood that the various operations may be performed in other orders than those which are illustrated, or may be performed concurrently.

After a start operation, the operational flow 1900 includes a receiving operation 1910 involving receiving one or more signals that include information associated with one or more changes in one or more features of one or more projection surfaces. In some embodiments, one or more projector units 700 may facilitate reception of one or more signals that include information associated with one or more changes in one or more features of one or more projection surfaces 500. In some embodiments, one or more projector receivers 792 may receive one or more signals 400 that include information associated with one or more changes in one or more features of one or more projection surfaces 500. In some embodiments, one or more projector receivers 792 may receive one or more signals 400 that include information associated with one or more changes in one or more conformations of one or more projection surfaces 500. In some embodiments, one or more projector receivers 792 may receive one or more signals 400 that include information associated with one or more changes in one or more positions of one or more projection surfaces 500. In some embodiments, one or more projector receivers 792 may receive one or more signals 400 that include information associated with one or more changes in one or more conformations and one or more positions of one or more projection surfaces 500.

After a start operation, the operational flow 1900 includes a projecting operation 1920 involving projecting in response to the receiving one or more signals that include information associated with one or more changes in one or more features of one or more projection surfaces. In some embodiments, one or more projector units 700 may facilitate projection in response to receiving one or more signals 400 that include information associated with one or more changes in one or more features of one or more projection surfaces 500. In some embodiments, one or more projectors 760 may project in response to receiving one or more signals 400 that include information associated with one or more changes in one or more features of one or more projection surfaces 500. In some embodiments, one or more projectors 760 may project in response to receiving one or more signals 400 that include information associated with one or more changes in one or more conformations of one or more projection surfaces 500. In some embodiments, one or more projectors 760 may project in response to receiving one or more signals 400 that include information associated with one or more changes in one or more positions of one or more projection surfaces 500. In some embodiments, one or more projectors 760 may project in response to receiving one or more signals 400 that include information associated with one or more changes in one or more conformations and one or more positions of one or more projection surfaces 500.

Figure 20:
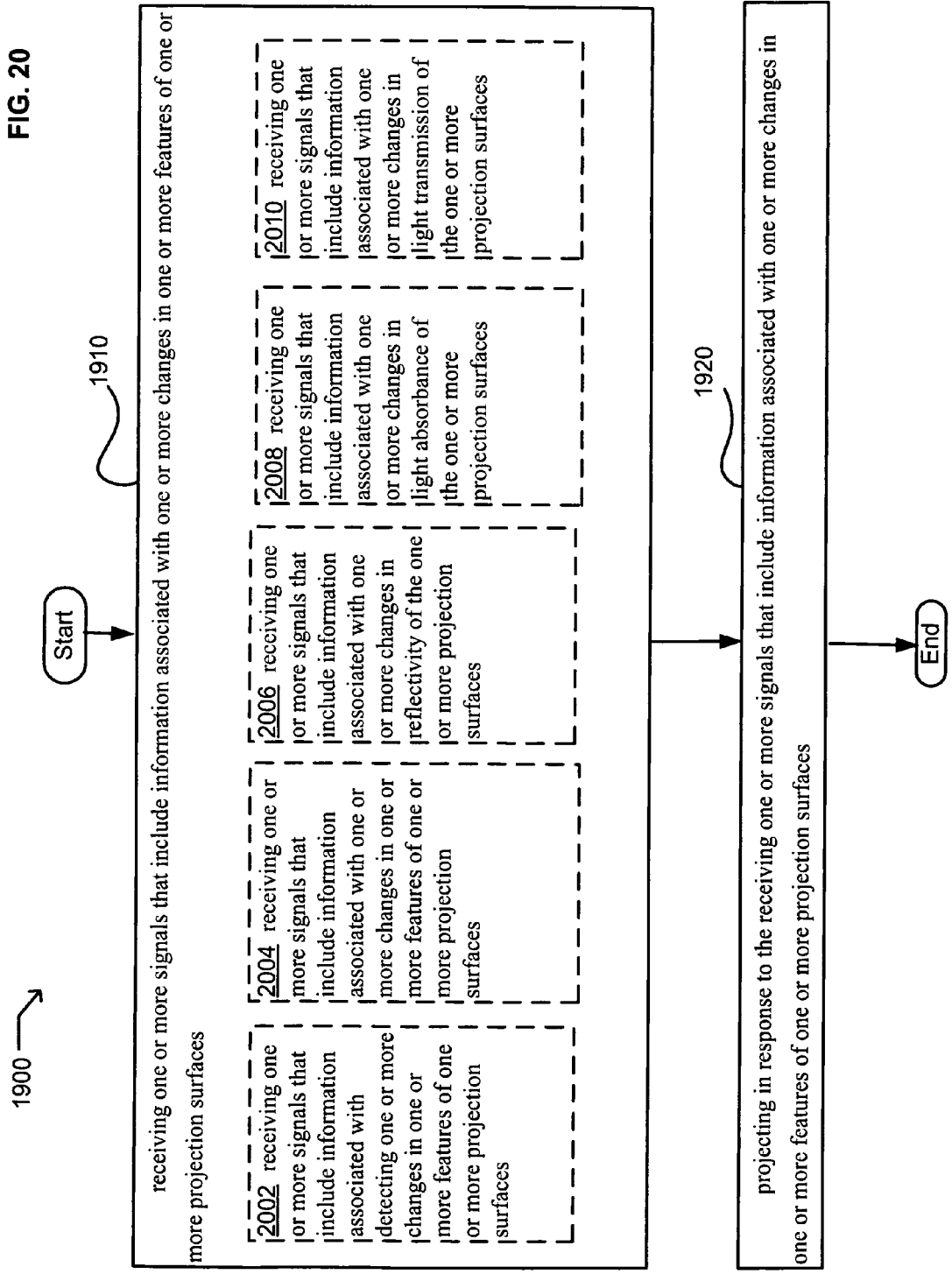
FIG. 20 illustrates alternate embodiments of the example operational flow of FIG. 19.

FIG. 20 illustrates alternative embodiments of the example operational flow 1900 of FIG. 19. FIG. 20 illustrates example embodiments where the receiving operation 1910 may include at least one additional operation. Additional operations may include an operation 2002, operation 2004, operation 2006, operation 2008, and/or operation 2010.

At operation 2002, the receiving operation 1910 may include receiving one or more signals that include information associated with detecting one or more changes in one or more features of one or more projection surfaces. In some embodiments, one or more projector receivers 792 may receive one or more signals 400 that include information associated with detecting one or more changes in one or more features of one or more projection surfaces 500. In some embodiments, one or more projector receivers 792 may receive one or more signals 400 that include information associated with detecting one or more changes in one or more features of one or more projection surfaces 500 with one or more sensors 260. Signals 400 may include information that is obtained through use of numerous types of sensors 260. For example, in some embodiments, one or more signals 400 may include information that is obtained through use of one or more light sensors 268 that are configured to detect light intensity associated with one or more projection surfaces 500. In some embodiments, one or more signals 400 may include information that is obtained through use of one or more light sensors 268 that are configured to detect reflectivity associated with one or more projection surfaces 500. In some embodiments, one or more signals 400 may include information that is obtained through use of one or more light sensors 268 that are configured to detect light absorbance associated with one or more projection surfaces 500. In some embodiments, one or more signals 400 may include information that is obtained through use of one or more light sensors 268 that are configured to detect light transmission associated with one or more projection surfaces 500. In some embodiments, one or more signals 400 may include information that is obtained through use of one or more motion sensors 261 that are configured to detect motion associated with one or more projection surfaces 500. For example, in some embodiments, one or more motion sensors 261 may detect movement of one or more projection surfaces 500 from one area to another. In some embodiments, one or more motion sensors 261 may detect movement of one or more projection surfaces 500 to determine changes in conformation of the one or more projection surfaces 500. In some embodiments, one or more signals 400 may include information that is obtained through use of one or more cameras 276 may be configured to detect one or more changes in one or more features of one or more projection surfaces 500. For example, in some embodiments, one or more cameras 276 may be configured to detect the position of one or more fiducials associated with one or more projection surfaces 500. Accordingly, in some embodiments, one or more cameras 276 may be configured to detect one or more changes in position of one or more projection surfaces 500 through determining one or more changes in the position of one or more fiducials associated with the one or more projection surfaces 500. In some embodiments, one or more cameras 276 may be configured to detect one or more changes in conformation of one or more projection surfaces 500 through determining one or more changes in the position of one or more fiducials associated with the one or more projection surfaces 500. In some embodiments, one or more cameras 276 may be configured to detect one or more changes in position of one or more projection surfaces 500 through determining one or more changes in the position of one or more calibration images associated with the one or more projection surfaces 500. In some embodiments, one or more cameras 276 may be configured to detect one or more changes in conformation of one or more projection surfaces 500 through determining one or more changes in the position of one or more calibration images associated with the one or more projection surfaces 500. Accordingly, one or more signals 400 may include information that is obtained through use of sensors 260 that are configured in numerous ways to facilitate detection of one or more changes in one or more features of one or more projection surfaces 500.

At operation 2004, the receiving operation 1910 may include receiving one or more signals that include information associated with one or more changes in one or more features of one or more projection surfaces. In some embodiments, one or more projector receivers 792 may receive one or more signals 400 that include information associated with one or more changes in one or more features of one or more projection surfaces 500. In some embodiments, one or more projector receivers 792 may receive one or more signals 400 that include information associated with detecting one or more changes in one or more features of one or more projection surfaces 500 with one or more cameras 276. In some embodiments, one or more cameras 276 may be configured to detect one or more changes in one or more features of one or more projection surfaces 500. For example, in some embodiments, one or more cameras 276 may be configured to detect the position of one or more fiducials associated with one or more projection surfaces 500. Accordingly, in some embodiments, one or more cameras 276 may be configured to detect one or more changes in position of one or more projection surfaces 500 through determining one or more changes in the position of one or more fiducials associated with the one or more projection surfaces 500. In some embodiments, one or more cameras 276 may be configured to detect one or more changes in conformation of one or more projection surfaces 500 through determining one or more changes in the position of one or more fiducials associated with the one or more projection surfaces 500. In some embodiments, one or more cameras 276 may be configured to detect one or more changes in position of one or more projection surfaces 500 through determining one or more changes in the position of one or more calibration images associated with the one or more projection surfaces 500. In some embodiments, one or more cameras 276 may be configured to detect one or more changes in conformation of one or more projection surfaces 500 through determining one or more changes in the position of one or more calibration images associated with the one or more projection surfaces 500.

At operation 2006, the receiving operation 1910 may include receiving one or more signals that include information associated with one or more changes in reflectivity of the one or more projection surfaces. In some embodiments, one or more projector receivers 792 may receive one or more signals 400 that include information associated with one or more changes in reflectivity of the one or more projection surfaces 500. In some embodiments, one or more projector receivers 792 may receive one or more signals 400 that include information associated with detecting one or more changes in reflectivity of one or more projection surfaces 500. In some embodiments, one or more projector receivers 792 may receive one or more signals 400 that include information associated with correlating one or more changes in the reflectivity of one or more projection surfaces 500 with one or more changes in the conformation associated with the one or more projection surfaces 500. In some embodiments, such changes in reflectivity may be correlated to one or more changes in position associated with one or more projection surfaces 500.

At operation 2008, the receiving operation 1910 may include receiving one or more signals that include information associated with one or more changes in light absorbance of the one or more projection surfaces. In some embodiments, one or more projector receivers 792 may receive one or more signals 400 that include information associated with one or more changes in light absorbance of the one or more projection surfaces 500. In some embodiments, one or more projector receivers 792 may receive one or more signals 400 that include information associated with detecting one or more changes in the light absorbance of one or more projection surfaces 500. For example, in some embodiments, one or more projector receivers 792 may receive one or more signals 400 that include information associated with changes in polarization associated with one or more projection surfaces 500 that undergo one or more changes in conformation. In some embodiments, one or more projector receivers 792 may receive one or more signals 400 that include information associated with one or more changes in light absorbance that indicate one or more changes in conformation of one or more projection surfaces 500. For example, in some embodiments, one or more projector receivers 792 may receive one or more signals 400 that include information associated with detection of one or more alterations in the light absorbance associated with one or more projection surfaces 500. In some embodiments, one or more projector receivers 792 may receive one or more signals 400 that include information associated with one or more changes in one or more absorbance patterns that occur during one or more changes in the conformation of a projection surface 500.

At operation 2010, the receiving operation 1910 may include receiving one or more signals that include information associated with one or more changes in light transmission of the one or more projection surfaces. In some embodiments, one or more projector receivers 792 may receive one or more signals 400 that include information associated with one or more changes in light transmission of the one or more projection surfaces 500. In some embodiments, one or more projector receivers 792 may receive one or more signals 400 that include information associated with detection of one or more changes in light transmission of the one or more projection surfaces 500. For example, in some embodiments, one or more projection surfaces 500 may exhibit changes in polarization upon undergoing changes in conformation. Accordingly, in some embodiments, one or more changes in light transmission may be detected that indicate one or more changes in conformation of one or more projection surfaces 500. In some embodiments, one or more projector receivers 792 may receive one or more signals 400 that include information associated with detection of one or more changes in light transmission with one or more cameras 276. In some embodiments, one or more projector receivers 792 may receive one or more signals 400 that include information associated with detection of one or more changes in light transmission with one or more light sensors 268. In some embodiments, one or more projector receivers 792 may receive one or more signals 400 that include information associated with detection of one or more changes in light transmission that indicate one or more changes in conformation of one or more projection surfaces 500.

Figure 21:
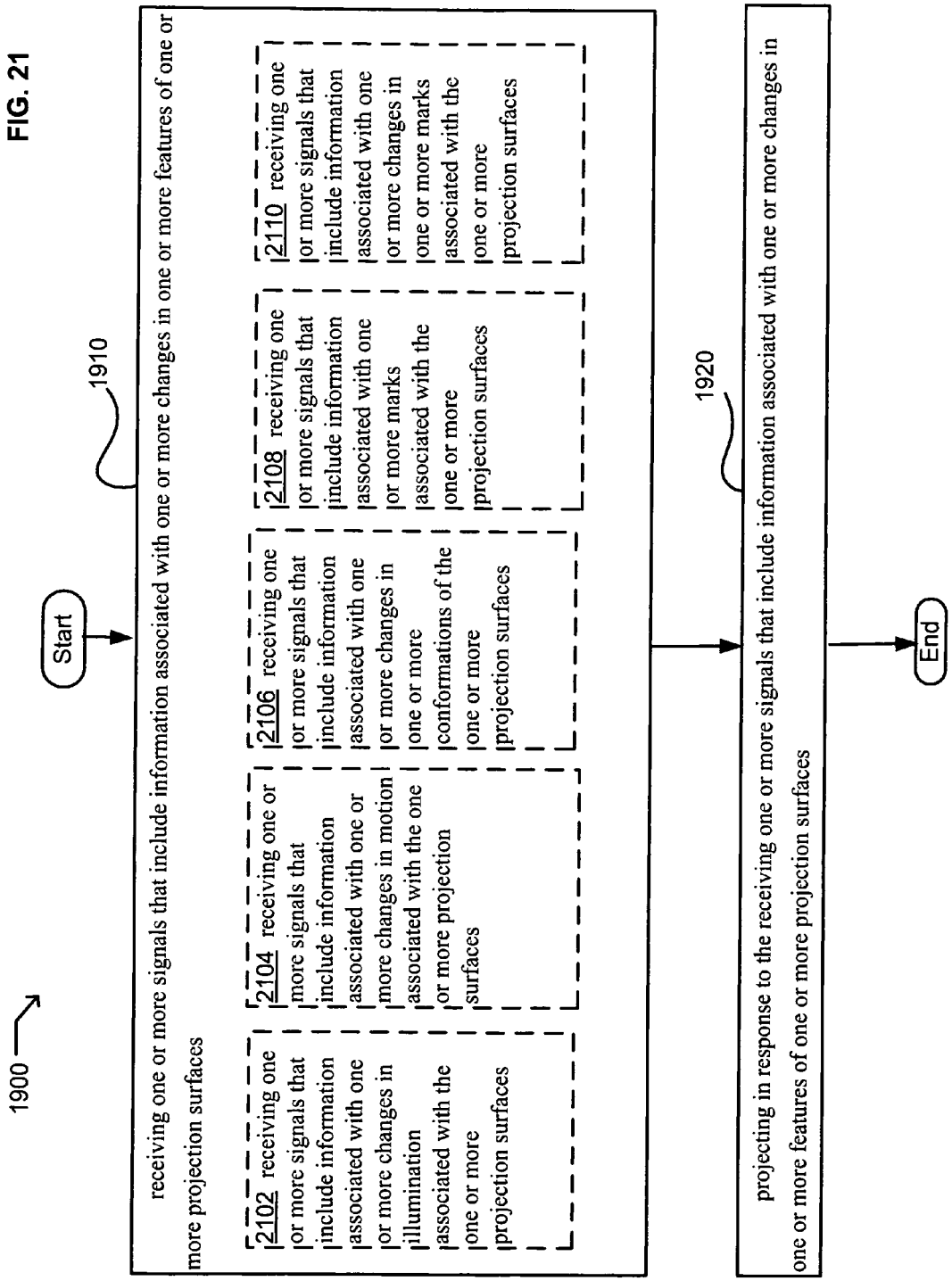
FIG. 21 illustrates alternate embodiments of the example operational flow of FIG. 19.

FIG. 21 illustrates alternative embodiments of the example operational flow 1900 of FIG. 19. FIG. 21 illustrates example embodiments where the receiving operation 1910 may include at least one additional operation. Additional operations may include an operation 2102, operation 2104, operation 2106, operation 2108, and/or operation 2110.

At operation 2102, the receiving operation 1910 may include receiving one or more signals that include information associated with one or more changes in illumination associated with the one or more projection surfaces. In some embodiments, one or more projector receivers 792 may receive one or more signals 400 that include information associated with one or more changes in illumination associated with the one or more projection surfaces 500. In some embodiments, one or more projector receivers 792 may receive one or more signals 400 that include information associated with detection of one or more changes in the illumination associated with one or more projection surfaces 500. For example, in some embodiments, projector receivers 792 may receive one or more signals 400 that include information associated with light that is reflected off one or more projection surfaces 500 to determine if the projection surface 500 has undergone a change in position from an area having a certain flux of light to a second area having a different flux of light.

At operation 2104, the receiving operation 1910 may include receiving one or more signals that include information associated with one or more changes in motion associated with the one or more projection surfaces. In some embodiments, one or more projector receivers 792 may receive one or more signals 400 that include information associated with one or more changes in motion associated with the one or more projection surfaces 500. In some embodiments, one or more projector receivers 792 may receive one or more signals 400 that include information associated with detection of one or more changes in motion associated with the one or more projection surfaces 500. In some embodiments, one or more projector receivers 792 may receive one or more signals 400 that include information associated with detecting changes in motion associated with one or more fiducials associated with one or more projection surfaces 500. In some embodiments, one or more projector receivers 792 may receive one or more signals 400 that include information associated with detecting changes in motion associated with one or more calibration images associated with one or more projection surfaces 500. In some embodiments, one or more projector receivers 792 may receive one or more signals 400 that include information associated with detecting changes in motion of one or more objects associated with one or more projection surfaces 500. Examples of such objects include, but are not limited to, pencils, pens, styluses, fingers, and the like (e.g., U.S. Pat. Nos. 6,266,048; 6,614,422; 6,710,770; 6,750,849; 6,798,401; 7,016,711; 7,071,924; 7,151,530; 7,290,885; 7,173,605; 7,242,388; 7,248,151; 7,305,368).

At operation 2106, the receiving operation 1910 may include receiving one or more signals that include information associated with one or more changes in one or more conformations of the one or more projection surfaces. In some embodiments, one or more projector receivers 792 may receive one or more signals 400 that include information associated with one or more changes in one or more conformations of the one or more projection surfaces 500. In some embodiments, one or more projector receivers 792 may receive one or more signals 400 that include information associated with detection of one or more changes in one or more conformations associated with one or more projection surfaces 500. In some embodiments, one or more projector receivers 792 may receive one or more signals 400 that include information associated with detection of one or more changes in the position of one or more fiducials that are associated with one or more projection surfaces 500. In some embodiments, one or more projector receivers 792 may receive one or more signals 400 that include information associated with detection of one or more changes in the position of one or more calibration images associated with one or more projection surfaces 500.

At operation 2108, the receiving operation 1910 may include receiving one or more signals that include information associated with one or more marks associated with the one or more projection surfaces. In some embodiments, one or more projector receivers 792 may receive one or more signals 400 that include information associated with one or more marks associated with the one or more projection surfaces 500. In some embodiments, one or more projector receivers 792 may receive one or more signals 400 that include information associated with detection of one or more marks associated with one or more projection surfaces 500. In some embodiments, one or more projector receivers 792 may receive one or more signals 400 that include information associated with detection of one or more marks that are fluorescent. In some embodiments, one or more projector receivers 792 may receive one or more signals 400 that include information associated with detection of one or more marks that are phosphorescent. In some embodiments, one or more projector receivers 792 may receive one or more signals 400 that include information associated with detection of one or more marks that are magnetic. In some embodiments, one or more projector receivers 792 may receive one or more signals 400 that include information associated with detection of writing on a projection surface 500 (e.g., U.S. Pat. No. 7,355, 583).

At operation 2110, the receiving operation 1910 may include receiving one or more signals that include information associated with one or more changes in one or more marks associated with the one or more projection surfaces. In some embodiments, one or more projector receivers 792 may receive one or more signals 400 that include information associated with one or more changes in one or more marks associated with the one or more projection surfaces 500. In some embodiments, one or more projector receivers 792 may receive one or more signals 400 that include information associated with detecting one or more changes in one or more marks associated with one or more projection surfaces 500. In some embodiments, one or more projector receivers 792 may receive one or more signals 400 that include information associated with determining one or more changes in one or more marks through comparing a first set of marks to a second set of marks and then determining differences that occur between the first and second set of marks. In some embodiments, one or more projector receivers 792 may receive one or more signals 400 that include information associated with detection of one or more marks that are fluorescent. In some embodiments, one or more projector receivers 792 may receive one or more signals 400 that include information associated with detection of one or more marks that are phosphorescent. In some embodiments, one or more projector receivers 792 may receive one or more signals 400 that include information associated with detection of one or more marks that are magnetic. In some embodiments, one or more projector receivers 792 may receive one or more signals 400 that include information associated with detection of writing that occurs on a projection surface 500 (e.g., U.S. Pat. No. 7,355,583).

Figure 22:
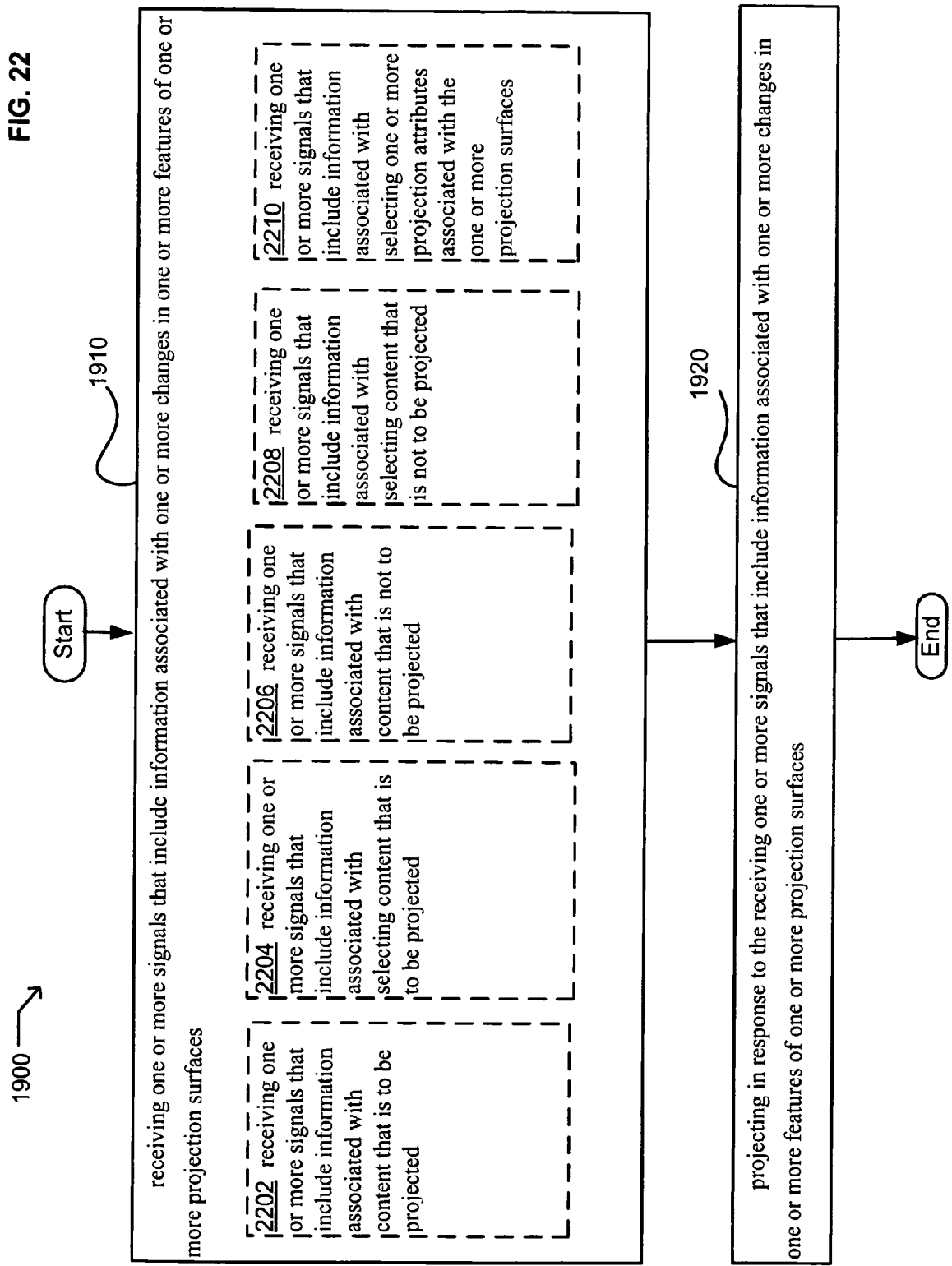
FIG. 22 illustrates alternate embodiments of the example operational flow of FIG. 19.

FIG. 22 illustrates alternative embodiments of the example operational flow 1900 of FIG. 19. FIG. 22 illustrates example embodiments where the receiving operation 1910 may include at least one additional operation. Additional operations may include an operation 2202, operation 2204, operation 2206, operation 2208, and/or operation 2210.

At operation 2202, the receiving operation 1910 may include receiving one or more signals that include information associated with content that is to be projected. In some embodiments, one or more projector receivers 792 may receive one or more signals 400 that include information associated with content that is to be projected. For example, in some embodiments, one or more projector receivers 792 may receive one or more signals 400 that include information associated with accessing sensor memory 228 to obtain content that is to be projected. In some embodiments, one or more projector receivers 792 may receive one or more signals 400 that include information associated with accessing projector memory 764 to obtain content that is to be projected.

At operation 2204, the receiving operation 1910 may include receiving one or more signals that include information associated with selecting content that is to be projected. In some embodiments, one or more projector receivers 792 may receive one or more signals 400 that include information associated with selecting content that is to be projected. In some embodiments, one or more projector receivers 792 may receive one or more signals 400 that include information associated with selecting content that is to be projected from sensor memory 228. In some embodiments, one or more projector receivers 792 may receive one or more signals 400 that include information associated with selecting content that is to be projected in response to user input. In some embodiments, one or more projector receivers 792 may receive one or more signals 400 that include information associated with selecting content that is to be projected in response to one or more sensors 260. In some embodiments, one or more projector receivers 792 may receive one or more signals 400 that include information associated with selecting content that is to be projected in response to one or more sensors 260 that detect one or more persons.

At operation 2206, the receiving operation 1910 may include receiving one or more signals that include information associated with content that is not to be projected. In some embodiments, one or more projector receivers 792 may receive one or more signals 400 that include information associated with content that is not to be projected. In some embodiments, one or more projector receivers 792 may receive one or more signals 400 that include information associated with accessing sensor memory 228 to obtain information associated with content that is not to be projected. In some embodiments, one or more projector receivers 792 may receive one or more signals 400 that include information associated with accessing projector memory 764 to obtain information associated with content that is not to be projected.

At operation 2208, the receiving operation 1910 may include receiving one or more signals that include information associated with selecting content that is not to be projected. In some embodiments, one or more projector receivers 792 may receive one or more signals 400 that include information associated with selecting content that is not to be projected. In some embodiments, one or more projector receivers 792 may receive one or more signals 400 that include information associated with accessing sensor memory 228 to select content that is not to be projected. In some embodiments, one or more projector receivers 792 may receive one or more signals 400 that include information associated with accessing projector memory 764 to select content that is not to be projected. In some embodiments, one or more projector receivers 792 may receive one or more signals 400 that include information associated with selecting content that is not to be projected in response to user input. In some embodiments, one or more projector receivers 792 may receive one or more signals 400 that include information associated with selecting content that is not to be projected in response to one or more sensors 260. In some embodiments, one or more projector receivers 792 may receive one or more signals 400 that include information associated with selecting content that is not to be projected in response to one or more sensors 260 that detect one or more persons.

At operation 2210, the receiving operation 1910 may include receiving one or more signals that include information associated with selecting one or more projection attributes associated with the one or more projection surfaces. In some embodiments, one or more projector receivers 792 may receive one or more signals 400 that include information associated with selecting one or more projection attributes associated with one or more projection surfaces 500. In some embodiments, one or more projector receivers 792 may receive one or more signals 400 that include information associated with accessing sensor memory 228 to determine one or more projection attributes associated with one or more projection surfaces 500. In some embodiments, one or more projector receivers 792 may receive one or more signals 400 that include information associated with accessing projector memory 764 to determine one or more projection attributes associated with one or more projection surfaces 500. In some embodiments, one or more projector receivers 792 may receive one or more signals 400 that include information associated with determining one or more projection attributes associated with one or more projection surfaces 500. Examples of such projection attributes associated with one or more projection surfaces 500 include, but are not limited to, reflectivity, light absorbance, light reflection, light transmission, light emission, ability to record projected content, ability to transmit information associated with projected content, and the like. Accordingly, in some embodiments, one or more projector receivers 792 may receive one or more signals 400 that include one or more instructions for one or more projectors 760 to project in response to one or more attributes associated with one or more projection surfaces 500. In some embodiments, one or more projector receivers 792 may receive one or more signals 400 that include one or more instructions for one or more projectors 760 to project content that is to be printed if a projection surface 500 is able to facilitate printing of content that is projected onto the projection surface 500. In some embodiments, one or more projector receivers 792 may receive one or more signals 400 that include one or more instructions for one or more projectors 760 to not project content that is confidential if a projection surface 500 is able to facilitate printing of content that is projected onto the projection surface 500. In some embodiments, one or more projector receivers 792 may receive one or more signals 400 that include one or more instructions for one or more projectors 760 to project one or more wavelengths of light in response to one or more attributes associated with a projection surface 500. For example, in some embodiments, a projection surface 500 may be made of material that transmits one or more wavelengths of light preferentially over other wavelengths of light. Accordingly, in some embodiments, one or more projector receivers 792 may receive one or more signals 400 that include one or more instructions for one or more projectors 760 to project one or more wavelengths of light that are preferentially transmitted by a projection surface 500.

Figure 23:
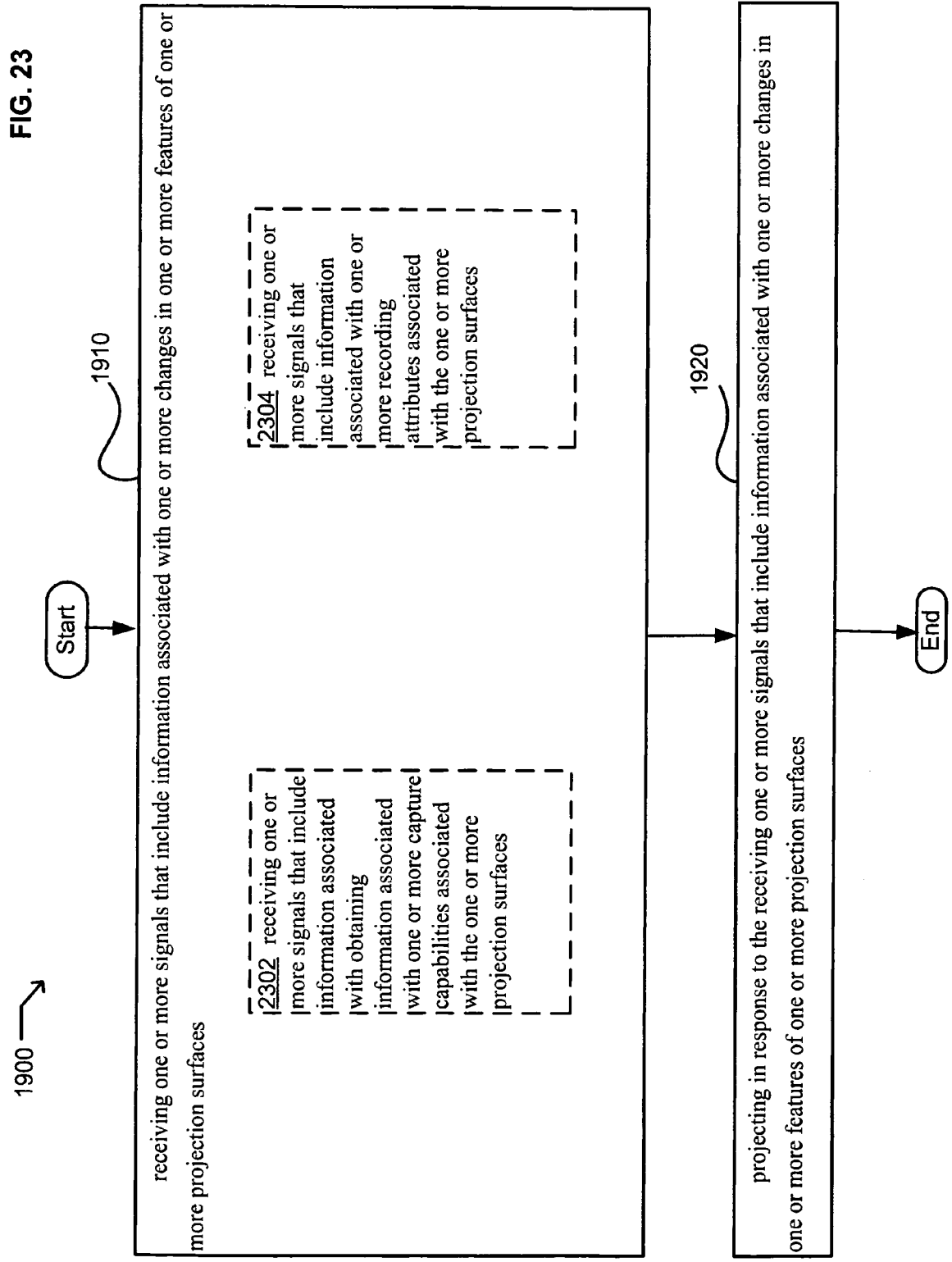
FIG. 23 illustrates alternate embodiments of the example operational flow of FIG. 19.

FIG. 23 illustrates alternative embodiments of the example operational flow 1900 of FIG. 19. FIG. 23 illustrates example embodiments where the receiving operation 1910 may include at least one additional operation. Additional operations may include an operation 2302, and/or operation 2304.

At operation 2302, the receiving operation 1910 may include receiving one or more signals that include information associated with obtaining information associated with one or more capture capabilities associated with the one or more projection surfaces. In some embodiments, one or more projector receivers 792 may receive one or more signals 400 that include information associated with obtaining information associated with one or more capture capabilities associated with the one or more projection surfaces 500. In some embodiments, one or more projector receivers 792 may receive one or more signals 400 that include information associated with accessing sensor memory 228 to determine one or more capture capabilities associated with one or more projection surfaces 500. In some embodiments, one or more projector receivers 792 may receive one or more signals 400 that include information associated with accessing projector memory 764 to determine one or more capture capabilities associated with one or more projection surfaces 500. In some embodiments, one or more projector receivers 792 may receive one or more signals 400 that include information associated with determining one or more capture capabilities associated with one or more projection surfaces 500. Examples of capture capabilities include, but are not limited to, printing of projected content, transmission of one or more signals 400 that include information associated with projected content, and the like. In some embodiments, one or more projector receivers 792 may receive one or more signals 400 that include instructions for controlling one or more projectors 760 in response to one or more capture capabilities associated with one or more projection surfaces 500. For example, in some embodiments, one or more projector receivers 792 may receive one or more signals 400 that instruct one or more projectors 760 to project content that is to be printed onto one or more projection surfaces 500 that are capable of facilitating printing of the projected content. In some embodiments, one or more projector receivers 792 may receive one or more signals 400 that instruct one or more projectors 760 not to project content that is confidential onto one or more projection surfaces 500 that are capable of facilitating printing of the projected content.

At operation 2304, the receiving operation 1910 may include receiving one or more signals that include information associated with one or more recording attributes associated with the one or more projection surfaces. In some embodiments, one or more projector receivers 792 may receive one or more signals 400 that include information associated with one or more recording attributes associated with one or more projection surfaces 500. In some embodiments, one or more projector receivers 792 may receive one or more signals 400 that include information associated with accessing sensor memory 228 to determine one or more recording attributes associated with one or more projection surfaces 500. In some embodiments, one or more projector receivers 792 may receive one or more signals 400 that include information associated with accessing projector memory 764 to determine one or more recording attributes associated with one or more projection surfaces 500. In some embodiments, one or more projector receivers 792 may receive one or more signals 400 that include information associated with determining one or more recording attributes associated with one or more projection surfaces 500. Examples of recording attributes include, but are not limited to, permanent recordation of projected content, storage of projected content into memory, and the like. In some embodiments, one or more projector receivers 792 may receive one or more signals 400 that include one or more instructions for controlling one or more projectors 760 in response to one or more recording attributes associated with one or more projection surfaces 500. For example, in some embodiments, one or more projector receivers 792 may receive one or more signals 400 that instruct one or more projectors 760 to project content that is to be saved into memory onto one or more projection surfaces 500 that are capable of recording projected content into memory. In some embodiments, one or more projector receivers 792 may receive one or more signals 400 that instruct one or more projector units 700 not to project content that is confidential onto one or more projection surfaces 500 that are capable of saving the projected content into memory.

Figure 24:
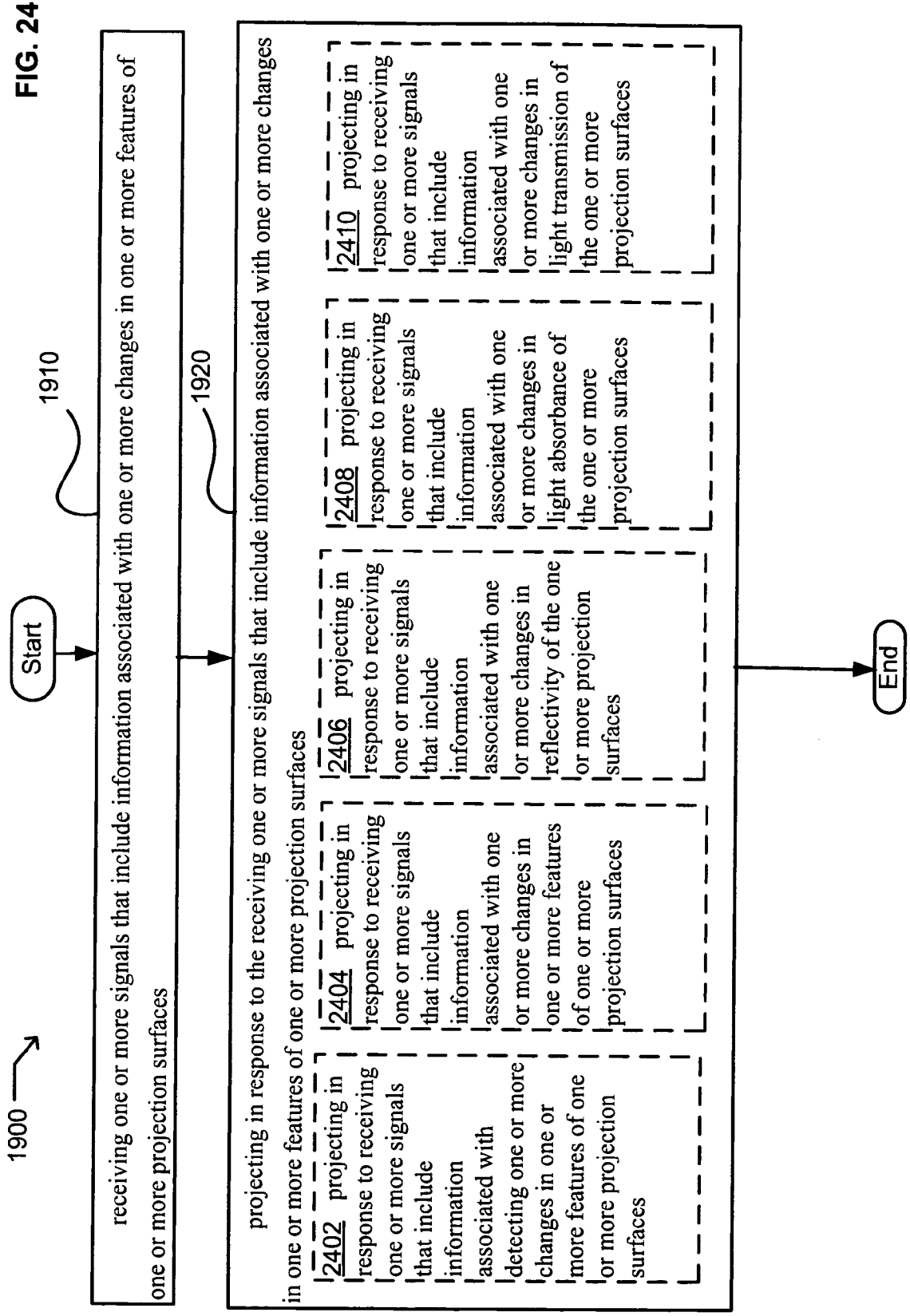
FIG. 24 illustrates alternate embodiments of the example operational flow of FIG. 19.

FIG. 24 illustrates alternative embodiments of the example operational flow 1900 of FIG. 19. FIG. 24 illustrates example embodiments where the projecting operation 1920 may include at least one additional operation. Additional operations may include an operation 2402, operation 2404, operation 2406, operation 2408, and/or operation 2410.

At operation 2402, the projecting operation 1920 may include projecting in response to receiving one or more signals that include information associated with detecting one or more changes in one or more features of one or more projection surfaces. In some embodiments, one or more projector control units 740 may instruct one or more projectors 760 to project in response to receiving one or more signals 400 that include information associated with detecting one or more changes in one or more features of one or more projection surfaces 500. In some embodiments, one or more projector control units 740 may instruct one or more projectors 760 to project in response to receiving one or more signals 400 that include information associated with detecting light intensity associated with one or more projection surfaces 500. In some embodiments, one or more projector control units 740 may instruct one or more projectors 760 to project in response to receiving one or more signals 400 that include information associated with detecting reflectivity associated with one or more projection surfaces 500. In some embodiments, one or more projector control units 740 may instruct one or more projectors 760 to project in response to receiving one or more signals 400 that include information associated with detecting light absorbance associated with one or more projection surfaces 500. In some embodiments, one or more projector control units 740 may instruct one or more projectors 760 to project in response to receiving one or more signals 400 that include information associated with detecting light transmission associated with one or more projection surfaces 500. In some embodiments, one or more projector control units 740 may instruct one or more projectors 760 to project in response to receiving one or more signals 400 that include information associated with detecting motion associated with one or more projection surfaces 500. For example, in some embodiments, one or more projector control units 740 may instruct one or more projectors 760 to project in response to receiving one or more signals 400 that include information associated with detecting movement of one or more projection surfaces 500 from one area to another. In some embodiments, one or more projector control units 740 may instruct one or more projectors 760 to project in response to receiving one or more signals 400 that include information associated with detecting changes in conformation of the one or more projection surfaces 500. In some embodiments, one or more projector control units 740 may instruct one or more projectors 760 to project in response to receiving one or more signals 400 that include information associated with detecting the position of one or more fiducials associated with one or more projection surfaces 500. In some embodiments, one or more projector control units 740 may instruct one or more projectors 760 to project in response to receiving one or more signals 400 that include information associated with detecting one or more changes in position of one or more fiducials associated with the one or more projection surfaces 500. In some embodiments, one or more projector control units 740 may instruct one or more projectors 760 to project in response to receiving one or more signals 400 that include information associated with detecting one or more changes in the position of one or more calibration images associated with the one or more projection surfaces 500.

At operation 2404, the projecting operation 1920 may include projecting in response to receiving one or more signals that include information associated with one or more changes in one or more features of one or more projection surfaces. In some embodiments, one or more projector control units 740 may instruct one or more projectors 760 to project in response to receiving one or more signals 400 that include information associated with one or more changes in one or more features of one or more projection surfaces 500. In some embodiments, one or more projector control units 740 may instruct one or more projectors 760 to project in response to receiving one or more signals 400 that include information associated with one or more sensors that detect one or more changes in one or more features of one or more projection surfaces 500. For example, in some embodiments, one or more projector control units 740 may instruct one or more projectors 760 to project in response to receiving one or more signals 400 that indicate that a projection surface 500 has been folded in half. In some embodiments, one or more projector control units 740 may instruct one or more projectors 760 to project in response to receiving one or more signals 400 that indicate that a projection surface 500 has been moved.

At operation 2406, the projecting operation 1920 may include projecting in response to receiving one or more signals that include information associated with one or more changes in reflectivity of the one or more projection surfaces. In some embodiments, one or more projector control units 740 may instruct one or more projectors 760 to project in response to receiving one or more signals 400 that include information associated with one or more changes in reflectivity of the one or more projection surfaces 500. In some embodiments, one or more projector control units 740 may instruct one or more projectors 760 to project in response to receiving one or more signals 400 from one or more light sensors 268 that are configured to detect changes in the reflectivity of one or more projection surfaces 500. In some embodiments, one or more projector control units 740 may instruct one or more projectors 760 to project in response to receiving one or more signals 400 that include information associated with correlating changes in reflectivity with one or more changes in the conformation associated with one or more projection surfaces 500. In some embodiments, one or more projector control units 740 may instruct one or more projectors 760 to project in response to receiving one or more signals 400 that include information associated with correlating changes in reflectivity with one or more changes in the position of one or more projection surfaces 500. In some embodiments, one or more projector control units 740 may instruct one or more projectors 760 to project in response to receiving one or more signals 400 that include information associated with correlating changes in reflectivity of one or more calibration images with one or more changes in the conformation of one or more projection surfaces 500. In some embodiments, one or more projector control units 740 may instruct one or more projectors 760 to project in response to receiving one or more signals 400 that include information associated with correlating changes in reflectivity of one or more fiducials with one or more changes in the conformation of one or more projection surfaces 500.

In some embodiments, one or more projector control units 740 may instruct one or more projectors 760 to project in response to receiving one or more signals 400 that include information associated with correlating changes in reflectivity of one or more calibration images with one or more changes in the conformation of one or more projection surfaces 500.

At operation 2408, the projecting operation 1920 may include projecting in response to receiving one or more signals that include information associated with one or more changes in light absorbance of the one or more projection surfaces. In some embodiments, one or more projector control units 740 may instruct one or more projectors 760 to project in response to receiving one or more signals 400 that include information associated with one or more changes in light absorbance of the one or more projection surfaces 500. In some embodiments, one or more projector control units 740 may instruct one or more projectors 760 to project in response to receiving one or more signals 400 that include information associated with changes in the polarization of light that are facilitated by one or more projection surfaces 500 undergoing one or more changes in conformation. In some embodiments, one or more projector control units 740 may instruct one or more projectors 760 to project in response to receiving one or more signals 400 that include information associated with one or more changes in light absorbance that occur upon one or more projection surfaces being illuminated. In some embodiments, one or more projector control units 740 may instruct one or more projectors 760 to project in response to receiving one or more signals 400 that include information associated with changes in an absorbance pattern that occurs during a change in conformation of a projection surface 500.

At operation 2410, the projecting operation 1920 may include projecting in response to receiving one or more signals that include information associated with one or more changes in light transmission of the one or more projection surfaces. In some embodiments, one or more projector control units 740 may instruct one or more projectors 760 to project in response to receiving one or more signals 400 that include information associated with one or more changes in light transmission of the one or more projection surfaces 500. In some embodiments, one or more projector control units 740 may instruct one or more projectors 760 to project in response to receiving one or more signals 400 that include information associated with one or more changes in polarization that occur when one or more projection surfaces undergo one or more changes in conformation. In some embodiments, one or more projector control units 740 may instruct one or more projectors 760 to project in response to receiving one or more signals 400 that include information associated with one or more changes in light transmission that indicate one or more changes in the conformation of one or more projection surfaces 500. In some embodiments, one or more projector control units 740 may instruct one or more projectors 760 to project in response to receiving one or more signals 400 that include information associated with one or more alterations in the light transmission associated with one or more projection surfaces 500. In some embodiments, one or more projector control units 740 may instruct one or more projectors 760 to project in response to receiving one or more signals 400 that include information associated with one or more changes in light transmission by one or more projection surfaces upon being illuminated.

Figure 25:
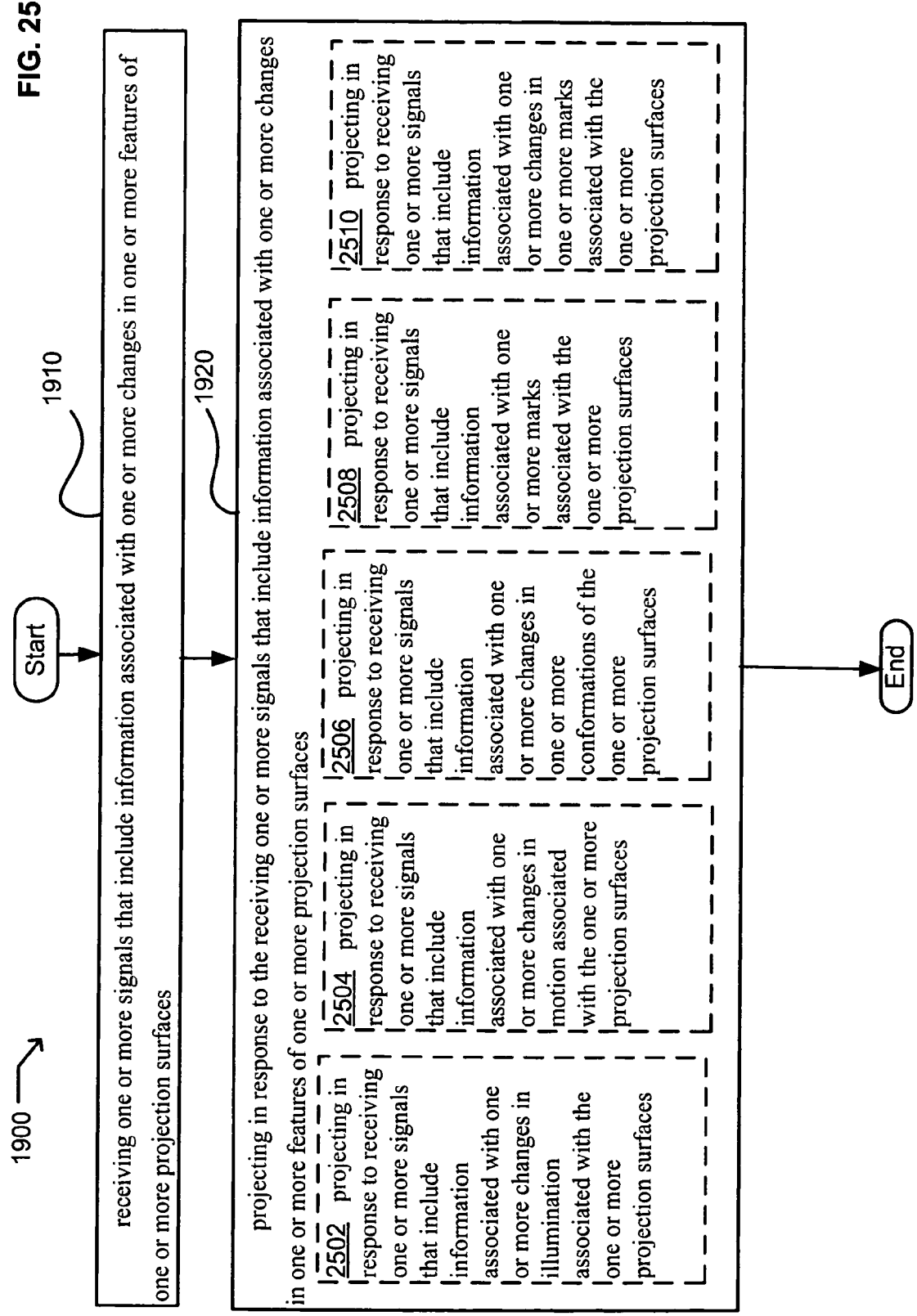
FIG. 25 illustrates alternate embodiments of the example operational flow of FIG. 19.

FIG. 25 illustrates alternative embodiments of the example operational flow 1900 of FIG. 19. FIG. 25 illustrates example embodiments where the projecting operation 1920 may include at least one additional operation. Additional operations may include an operation 2502, operation 2504, operation 2506, operation 2508, and/or operation 2510.

At operation 2502, the projecting operation 1920 may include projecting in response to receiving one or more signals that include information associated with one or more changes in illumination associated with the one or more projection surfaces. In some embodiments, one or more projector control units 740 may instruct one or more projectors 760 to project in response to receiving one or more signals 400 that include information associated with one or more changes in illumination associated with the one or more projection surfaces 500. In some embodiments, one or more projector control units 740 may instruct one or more projectors 760 to project in response to receiving one or more signals 400 that include information associated with light that is reflected from one or more projection surfaces 500 to determine if the projection surface 500 has undergone a change in position from an area having a certain flux of light to a second area having a different flux of light.

At operation 2504, the projecting operation 1920 may include projecting in response to receiving one or more signals that include information associated with one or more changes in motion associated with the one or more projection surfaces. In some embodiments, one or more projector control units 740 may instruct one or more projectors 760 to project in response to receiving one or more signals 400 that include information associated with one or more changes in motion associated with the one or more projection surfaces 500. In some embodiments, one or more projector control units 740 may instruct one or more projectors 760 to project in response to receiving one or more signals 400 that include information associated with one or more fiducials associated with one or more projection surfaces 500. In some embodiments, one or more projector control units 740 may instruct one or more projectors 760 to project in response to receiving one or more signals 400 that include information associated with changes in motion associated with one or more calibration images that are associated with one or more projection surfaces 500. In some embodiments, one or more projector control units 740 may instruct one or more projectors 760 to project in response to receiving one or more signals 400 that include information associated with the motion of one or more objects associated with one or more projection surfaces 500. Examples of such objects include, but are not limited to, pencils, pens, styluses, fingers, and the like (e.g., U.S. Pat. Nos. 6,266,048; 6,614,422; 6,710,770; 6,750,849; 6,798,401; 7,016,711; 7,071,924; 7,151,530; 7,290,885; 7,173,605; 7,242,388; 7,248,151; 7,305,368).

At operation 2506, the projecting operation 1920 may include projecting in response to receiving one or more signals that include information associated with one or more changes in one or more conformations of the one or more projection surfaces. In some embodiments, one or more projector control units 740 may instruct one or more projectors 760 to project in response to receiving one or more signals 400 that include information associated with one or more changes in one or more conformations of the one or more projection surfaces 500. In some embodiments, one or more projector control units 740 may instruct one or more projectors 760 to project in response to receiving one or more signals 400 that include information associated with one or more changes in the position of one or more fiducials associated with one or more projection surfaces 500. In some embodiments, one or more projector control units 740 may instruct one or more projectors 760 to project in response to receiving one or more signals 400 that include information associated with one or more changes in the position of one or more fiducials associated with one or more projection surfaces 500 that may be used to determine one or more changes in the conformation of the one or more projection surfaces 500. In some embodiments, one or more projector control units 740 may instruct one or more projectors 760 to project in response to receiving one or more signals 400 that include information associated with one or more changes in the position of one or more calibration images associated with one or more projection surfaces 500. In some embodiments, one or more projector control units 740 may instruct one or more projectors 760 to project in response to receiving one or more signals 400 that include information associated with one or more changes in the position of one or more calibration images associated with one or more projection surfaces 500 that may be used to determine one or more changes in the conformation of the one or more projection surfaces 500.

At operation 2508, the projecting operation 1920 may include projecting in response to receiving one or more signals that include information associated with one or more marks associated with the one or more projection surfaces. In some embodiments, one or more projector control units 740 may instruct one or more projectors 760 to project in response to receiving one or more signals 400 that include information associated with one or more marks associated with the one or more projection surfaces 500. In some embodiments, one or more projector control units 740 may instruct one or more projectors 760 to project in response to receiving one or more signals 400 that include information associated with one or more marks that are fluorescent. In some embodiments, one or more projector control units 740 may instruct one or more projectors 760 to project in response to receiving one or more signals 400 that include information associated with marks that are phosphorescent. In some embodiments, one or more projector control units 740 may instruct one or more projectors 760 to project in response to receiving one or more signals 400 that include information associated with one or more marks that are magnetic. In some embodiments, one or more projector control units 740 may instruct one or more projectors 760 to project in response to receiving one or more signals 400 that include information associated with writing on a projection surface 500 (e.g., U.S. Pat. No. 7,355,583). In some embodiments, one or more projector control units 740 may instruct one or more projectors 760 to project in response to receiving one or more signals 400 that include information associated with ink (e.g., fluorescent ink, magnetic ink, phosphorescent ink, etc.).

At operation 2510, the projecting operation 1920 may include projecting in response to receiving one or more signals that include information associated with one or more changes in one or more marks associated with the one or more projection surfaces. In some embodiments, one or more projector control units 740 may instruct one or more projectors 760 to project in response to receiving one or more signals 400 that include information associated with one or more changes in one or more marks associated with the one or more projection surfaces 500. In some embodiments, one or more projector control units 740 may instruct one or more projectors 760 to project in response to receiving one or more signals 400 that include information associated with comparing a first set of marks to a second set of marks and then determining differences that occur between the first and second set of marks. In some embodiments, one or more projector control units 740 may instruct one or more projectors 760 to project in response to receiving one or more signals 400 that include information associated with one or more marks that are fluorescent. In some embodiments, one or more projector control units 740 may instruct one or more projectors 760 to project in response to receiving one or more signals 400 that include information associated with one or more marks that are phosphorescent. In some embodiments, one or more projector control units 740 may instruct one or more projectors 760 to project in response to receiving one or more signals 400 that include information associated with one or more marks that are magnetic. In some embodiments, one or more projector control units 740 may instruct one or more projectors 760 to project in response to receiving one or more signals 400 that include information associated with writing that occurs on a projection surface 500 (e.g., U.S. Pat. No. 7,355,583). In some embodiments, one or more projector control units 740 may instruct one or more projectors 760 to project in response to receiving one or more signals 400 that include information associated with ink (e.g., fluorescent ink, magnetic ink, phosphorescent ink, etc.).

Figure 26:
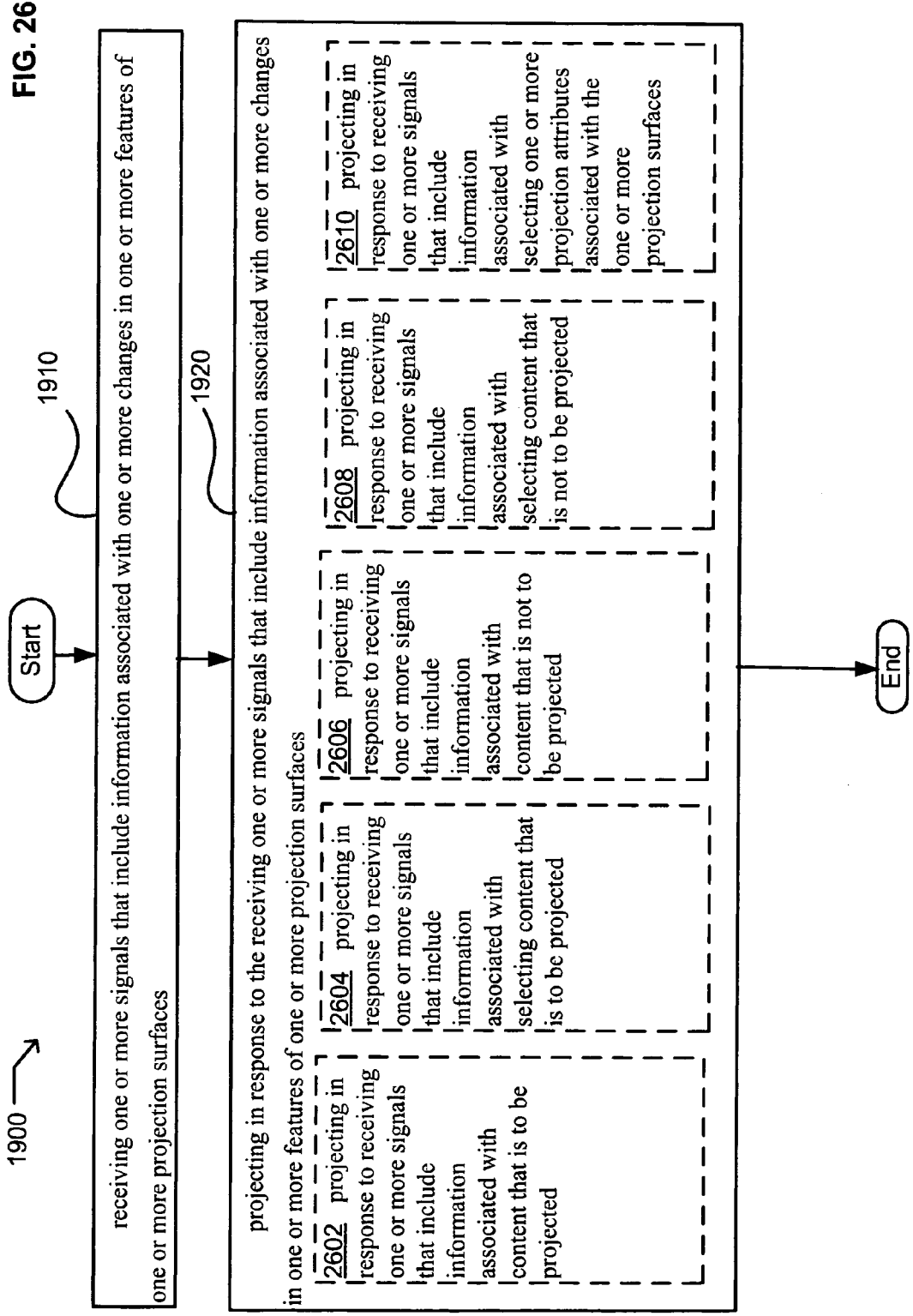
FIG. 26 illustrates alternate embodiments of the example operational flow of FIG. 19.

FIG. 26 illustrates alternative embodiments of the example operational flow 1900 of FIG. 19. FIG. 26 illustrates example embodiments where the projecting operation 1920 may include at least one additional operation. Additional operations may include an operation 2602, operation 2604, operation 2606, operation 2608, and/or operation 2610.

At operation 2602, the projecting operation 1920 may include projecting in response to receiving one or more signals that include information associated with content that is to be projected. In some embodiments, one or more projector control units 740 may instruct one or more projectors 760 to project in response to receiving one or more signals 400 that include information associated with content that is to be projected. In some embodiments, one or more projector control units 740 may instruct one or more projectors 760 to project in response to receiving one or more signals 400 that include information associated with accessing sensor memory 228 to obtain content that is to be projected. In some embodiments, one or more projector control units 740 may instruct one or more projectors 760 to project in response to receiving one or more signals 400 that include information associated with accessing projector memory 764 to obtain content that is to be projected.

At operation 2604, the projecting operation 1920 may include projecting in response to receiving one or more signals that include information associated with selecting content that is to be projected. In some embodiments, one or more projector control units 740 may instruct one or more projectors 760 to project in response to receiving one or more signals 400 that include information associated with selecting content that is to be projected. In some embodiments, one or more projector control units 740 may instruct one or more projectors 760 to project in response to receiving one or more signals 400 that include information associated with selecting content that is to be projected from sensor memory 228. In some embodiments, one or more projector control units 740 may instruct one or more projectors 760 to project in response to receiving one or more signals 400 that include information associated with selecting content that is to be projected from projector memory 764. In some embodiments, one or more projector control units 740 may instruct one or more projectors 760 to project in response to receiving one or more signals 400 that include information associated with selecting content that is to be projected in response to user input. In some embodiments, one or more projector control units 740 may instruct one or more projectors 760 to project in response to receiving one or more signals 400 that include information associated with selecting content that is to be projected in response to one or more sensors 260. In some embodiments, one or more projector control units 740 may instruct one or more projectors 760 to project in response to receiving one or more signals 400 that include information associated with selecting content that is to be projected in response to one or more sensors 260 that detect one or more persons. In some embodiments, one or more projector control units 740 may instruct one or more projectors 760 to project in response to receiving one or more signals 400 that include information associated with selecting content that is suitable for children if a child is detected.

At operation 2606, the projecting operation 1920 may include projecting in response to receiving one or more signals that include information associated with content that is not to be projected. In some embodiments, one or more projector control units 740 may instruct one or more projectors 760 to project in response to receiving one or more signals 400 that include information associated with content that is not to be projected. In some embodiments, one or more projector control units 740 may instruct one or more projectors 760 to project in response to receiving one or more signals 400 that include information associated with accessing sensor memory 228 to obtain information associated with content that is not to be projected. In some embodiments, one or more projector control units 740 may instruct one or more projectors 760 to project in response to receiving one or more signals 400 that include information associated with accessing projector memory 764 to obtain information associated with content that is not to be projected.

At operation 2608, the projecting operation 1920 may include projecting in response to receiving one or more signals that include information associated with selecting content that is not to be projected. In some embodiments, one or more projector control units 740 may instruct one or more projectors 760 to project in response to receiving one or more signals 400 that include information associated with selecting content that is not to be projected. In some embodiments, one or more projector control units 740 may instruct one or more projectors 760 to project in response to receiving one or more signals 400 that include information associated with accessing sensor memory 228 to select content that is not to be projected. In some embodiments, one or more projector control units 740 may instruct one or more projectors 760 to project in response to receiving one or more signals 400 that include information associated with accessing projector memory 764 to select content that is not to be projected. In some embodiments, one or more projector control units 740 may instruct one or more projectors 760 to project in response to receiving one or more signals 400 that include information associated with selecting content that is not to be projected in response to user input. In some embodiments, one or more projector control units 740 may instruct one or more projectors 760 to project in response to receiving one or more signals 400 that include information associated with selecting content that is not to be projected in response to one or more sensors 260. In some embodiments, one or more projector control units 740 may instruct one or more projectors 760 to project in response to receiving one or more signals 400 that include information associated with selecting content that is not to be projected in response to one or more sensors 260 that detect one or more persons. In some embodiments, one or more projector control units 740 may instruct one or more projectors 760 to project in response to receiving one or more signals 400 that include information associated with selecting content that is not suitable for children if a child is detected.

At operation 2610, the projecting operation 1920 may include projecting in response to receiving one or more signals that include information associated with selecting one or more projection attributes associated with the one or more projection surfaces. In some embodiments, one or more projector control units 740 may instruct one or more projectors 760 to project in response to receiving one or more signals 400 that include information associated with selecting one or more projection attributes associated with one or more projection surfaces 500. In some embodiments, one or more projector control units 740 may instruct one or more projectors 760 to project in response to receiving one or more signals 400 that include information associated with selecting one or more projection attributes associated with one or more projection surfaces 500. In some embodiments, one or more projector control units 740 may instruct one or more projectors 760 to project in response to receiving one or more signals 400 that include information associated with accessing sensor memory 228 to determine one or more projection attributes associated with one or more projection surfaces 500. In some embodiments, one or more projector control units 740 may instruct one or more projectors 760 to project in response to receiving one or more signals 400 that include information associated with accessing projector memory 764 to determine one or more projection attributes associated with one or more projection surfaces 500. In some embodiments, one or more projector control units 740 may instruct one or more projectors 760 to project in response to receiving one or more signals 400 that include information associated with one or more sensors 260 that are configured to determine one or more projection attributes associated with one or more projection surfaces 500. Numerous types of projection attributes may be associated with one or more projection surfaces 500. Such projection attributes may include, but are not limited to, reflectivity, light absorbance, light reflection, light transmission, light emission, ability to record projected content, ability to transmit information associated with projected content, and the like. In some embodiments, one or more projector control units 740 may instruct one or more projectors 760 to project in response to receiving one or more signals 400 that include information associated with content that is to be printed. In some embodiments, one or more projector control units 740 may instruct one or more projectors 760 not to project in response to receiving one or more signals 400 that include information associated with content that is confidential. In some embodiments, one or more projector control units 740 may instruct one or more projectors 760 to project one or more wavelengths of light in response to receiving one or more signals 400 associated with one or more attributes associated with a projection surface 500. In some embodiments, one or more projector control units 740 may instruct one or more projectors 760 to project one or more wavelengths of light in response to receiving one or more signals 400 associated with one or more wavelengths of light that are preferentially transmitted by a projection surface 500. Accordingly, in some embodiments, one or more projector control units 740 may instruct one or more projectors 760 to project in response to receiving one or more signals 400 that are associated with one or more projection attributes associated with one or more projection surfaces 500.

Figure 27:
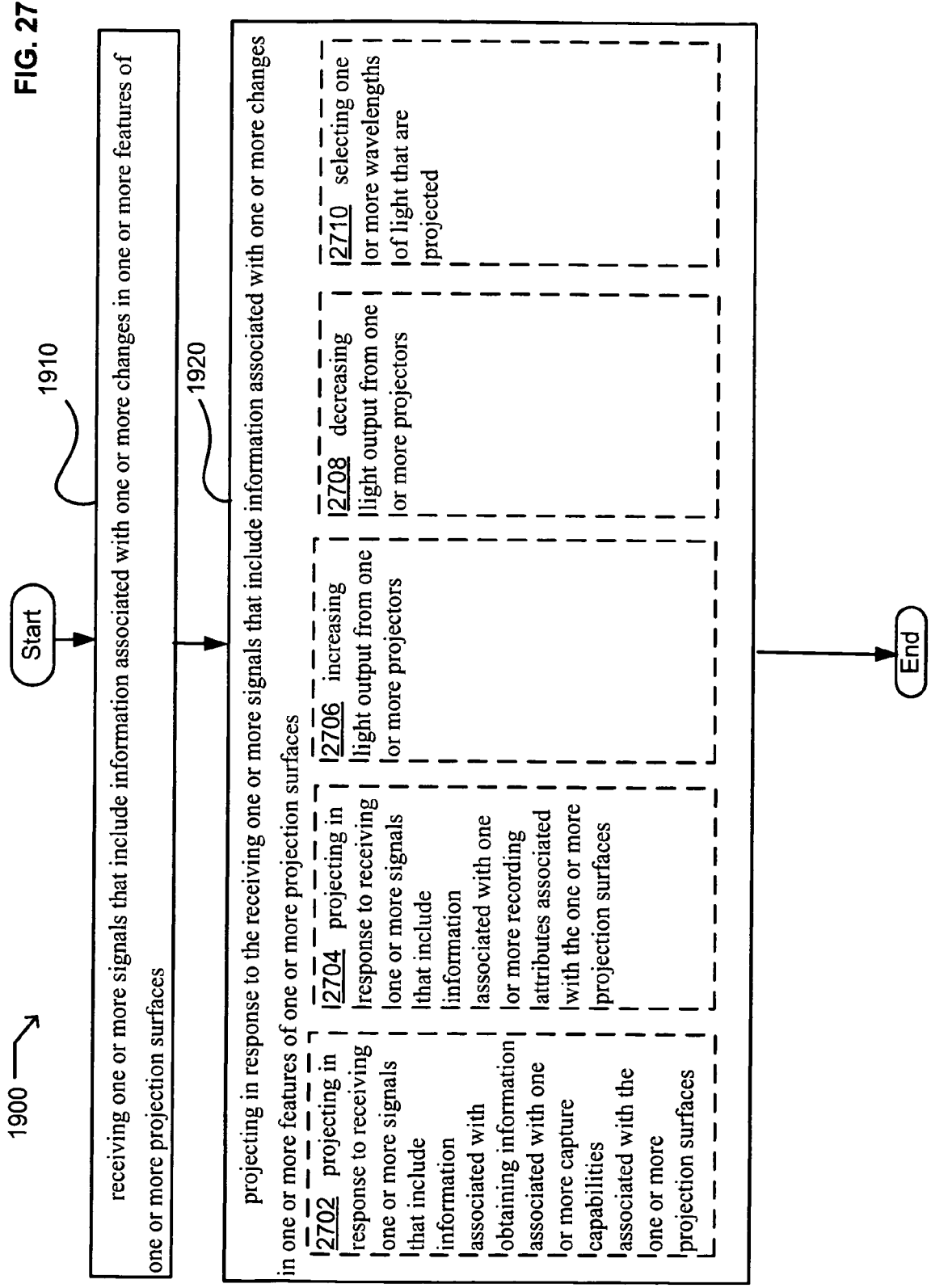
FIG. 27 illustrates alternate embodiments of the example operational flow of FIG. 19.

FIG. 27 illustrates alternative embodiments of the example operational flow 1900 of FIG. 19. FIG. 27 illustrates example embodiments where the projecting operation 1920 may include at least one additional operation. Additional operations may include an operation 2702, operation 2704, operation 2706, operation 2708, and/or operation 2710.

At operation 2702, the projecting operation 1920 may include projecting in response to receiving one or more signals that include information associated with obtaining information associated with one or more capture capabilities associated with the one or more projection surfaces. In some embodiments, one or more projector control units 740 may instruct one or more projectors 760 to project in response to receiving one or more signals 400 that include information associated with obtaining information associated with one or more capture capabilities associated with one or more projection surfaces 500. In some embodiments, one or more projector control units 740 may instruct one or more projectors 760 to project in response to receiving one or more signals 400 that include information associated with accessing sensor memory 228 to determine one or more capture capabilities associated with one or more projection surfaces 500. In some embodiments, one or more projector control units 740 may instruct one or more projectors 760 to project in response to receiving one or more signals 400 that include information associated with accessing projector memory 764 to determine one or more capture capabilities associated with one or more projection surfaces 500. In some embodiments, one or more projector control units 740 may instruct one or more projectors 760 to project in response to receiving one or more signals 400 that include information associated with one or more capture capabilities associated with one or more projection surfaces 500. Examples of capture capabilities include, but are not limited to, printing of projected content, transmission of one or more signals 400 that include information associated with projected content, and the like. In some embodiments, one or more projector control units 740 may instruct one or more projectors 760 to project in response to receiving one or more signals 400 that include information associated with controlling one or more projector units 700 in response to one or more capture capabilities associated with one or more projection surfaces 500. In some embodiments, one or more projector control units 740 may instruct one or more projectors 760 to project in response to receiving one or more signals 400 that include information associated with content that is to be projected onto one or more projection surfaces 500 that are capable of facilitating printing of the projected content. In some embodiments, one or more projector control units 740 may instruct one or more projectors 760 to project in response to receiving one or more signals 400 that include instructions not to project content that is confidential onto one or more projection surfaces 500 that are capable of facilitating printing of the projected content.

At operation 2704, the projecting operation 1920 may include projecting in response to receiving one or more signals that include information associated with one or more recording attributes associated with the one or more projection surfaces. In some embodiments, one or more projector control units 740 may instruct one or more projectors 760 to project in response to receiving one or more signals 400 that include information associated with one or more recording attributes associated with one or more projection surfaces 500. In some embodiments, one or more projector control units 740 may instruct one or more projectors 760 to project in response to receiving one or more signals 400 that include information associated with accessing sensor memory 228 to determine one or more recording attributes associated with one or more projection surfaces 500. In some embodiments, one or more projector control units 740 may instruct one or more projectors 760 to project in response to receiving one or more signals 400 that include information associated with accessing projector memory 764 to determine one or more recording attributes associated with one or more projection surfaces 500. In some embodiments, one or more projector control units 740 may instruct one or more projectors 760 to project in response to receiving one or more signals 400 that include information associated with one or more recording attributes associated with one or more projection surfaces 500. Examples of recording attributes include, but are not limited to, permanent recordation of projected content, storage of projected content into memory, and the like. In some embodiments, one or more projector control units 740 may instruct one or more projectors 760 to project content in response to receiving one or more signals 400 that include information associated with saving the content that is projected onto one or more projection surfaces 500 into memory. In some embodiments, one or more projector control units 740 may instruct one or more projectors 760 to project content in response to receiving one or more signals 400 that include information associated with not projecting content that is confidential onto one or more projection surfaces 500 that are capable of saving the projected content into memory.

At operation 2706, the projecting operation 1920 may include increasing light output from one or more projectors. In some embodiments, one or more projector control units 740 may instruct one or more projectors 760 to project in response to receiving one or more signals 400 that include information associated with increasing light output from one or more projectors. For example, in some embodiments, one or more projector control units 740 may instruct one or more projectors 760 to project in response to receiving one or more signals 400 that include information associated with light flux on one or more projection surfaces 500.

At operation 2708, the projecting operation 1920 may include decreasing light output from one or more projectors. In some embodiments, one or more projector control units 740 may instruct one or more projectors 760 to project in response to receiving one or more signals 400 that include information associated with decreasing light output from one or more projectors. For example, in some embodiments, one or more projector control units 740 may instruct one or more projectors 760 to project in response to receiving one or more signals 400 that include information associated with light flux on one or more projection surfaces 500. In some embodiments, light output from one or more projectors 760 may be reduced to reduce projector power consumption.

At operation 2710, the projecting operation 1920 may include selecting one or more wavelengths of light that are projected. In some embodiments, one or more projector control units 740 may instruct one or more projectors 760 to project in response to receiving one or more signals 400 that include information associated with selecting one or more wavelengths of light that are projected. For example, in some embodiments, one or more projector control units 740 may instruct one or more projectors 760 to project in response to receiving one or more signals 400 that include information associated with selecting one or more wavelengths of ultraviolet light that will be projected by one or more projectors 760. In some embodiments, one or more projector control units 740 may instruct one or more projectors 760 to project in response to receiving one or more signals 400 that include information associated with selecting one or more wavelengths of visible light that will be projected by one or more projectors 760. In some embodiments, one or more projector control units 740 may instruct one or more projectors 760 to project in response to receiving one or more signals 400 that include information associated with selecting one or more wavelengths of infrared light that will be projected by one or more projectors 760. In some embodiments, one or more projector control units 740 may instruct one or more projectors 760 to project in response to receiving one or more signals 400 that include information associated with selecting one or more wavelengths of light for projection by one or more projectors 760 in response to one or more attributes associated with one or more projection surfaces 500.

Figure 28:
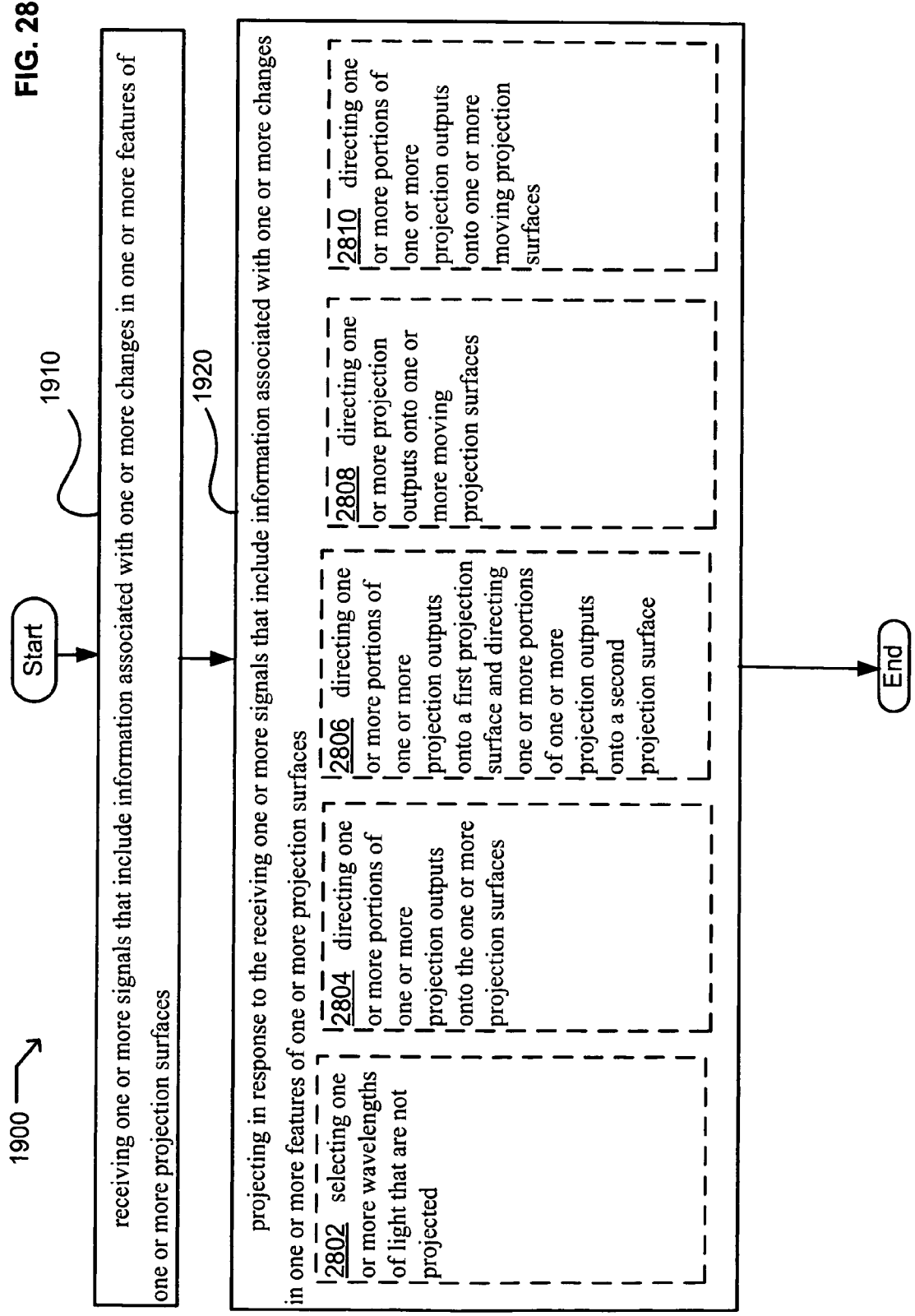
FIG. 28 illustrates alternate embodiments of the example operational flow of FIG. 19.

FIG. 28 illustrates alternative embodiments of the example operational flow 1900 of FIG. 19. FIG. 28 illustrates example embodiments where the projecting operation 1920 may include at least one additional operation. Additional operations may include an operation 2802, operation 2804, operation 2806, operation 2808, and/or operation 2810.

At operation 2802, the projecting operation 1920 may include selecting one or more wavelengths of light that are not projected. In some embodiments, one or more projector control units 740 may instruct one or more projectors 760 to project in response to receiving one or more signals 400 that include information associated with selecting one or more wavelengths of light that are not projected. For example, in some embodiments, one or more projector control units 740 may be instructed to adjust the quality of one or more projected images by selecting one or more wavelengths of light that will not be projected.

At operation 2804, the projecting operation 1920 may include directing one or more portions of one or more projection outputs onto the one or more projection surfaces. In some embodiments, one or more projector control units 740 may instruct one or more projectors 760 to project in response to receiving one or more signals 400 that include information associated with directing one or more portions of one or more projection outputs onto one or more projection surfaces 500. For example, in some embodiments, one or more projector control units 740 may instruct one or more projectors 760 to project in response to receiving one or more signals 400 that include information associated with directing projection output onto a first projection surface 500 that adjoins a first person and directing projection output onto a second projection surface 500 that adjoins a second person. Accordingly, in some embodiments, a projector 760 may be instructed to project content to a projection surface 500 in a manner that is specific to an individual person. In some embodiments, one or more projector control units 740 may instruct one or more projectors 760 to direct one or more portions of a projection output onto two or more projection surfaces 500. For example, in some embodiments, one or more projector control units 740 may instruct one or more projectors 760 to project content onto two or more projection surfaces 500 that are positioned in different areas of a room.

At operation 2806, the projecting operation 1920 may include directing one or more portions of one or more projection outputs onto a first projection surface and directing one or more portions of one or more projection outputs onto a second projection surface. In some embodiments, one or more projector control units 740 may instruct one or more projectors 760 to project in response to receiving one or more signals 400 that include information associated with directing one or more portions of one or more projection outputs onto a first projection surface and directing one or more portions of one or more projection outputs onto a second projection surface 500. For example, in some embodiments, one or more projector control units 740 may instruct one or more projectors 760 to direct projection output onto a first projection surface 500 that adjoins a first person and direct projection output onto a second projection surface 500 that adjoins a second person. Accordingly, in some embodiments, a projector 760 may be instructed to project content to a projection surface 500 in a manner that is specific to an individual person.

At operation 2808, the projecting operation 1920 may include directing one or more projection outputs onto one or more moving projection surfaces. In some embodiments, one or more projector control units 740 may instruct one or more projectors 760 to project in response to receiving one or more signals 400 that include information associated with directing one or more projection outputs onto one or more moving projection surfaces 500. In some embodiments, one or more projector control units 740 may instruct one or more projectors 760 to direct one or more projection outputs onto one or more moving projection surfaces 500. In some embodiments, one or more projector control units 740 may instruct one or more projectors 760 to project in response to receiving one or more signals 400 that include information associated with movement of one or more projection surfaces 500. For example, in some embodiments, a tablet that is a projection surface 500 may be slid across a table and one or more projectors 760 may be instructed to project output onto the tablet as it moves. In some embodiments, one or more projector control units 740 may instruct one or more projectors 760 to project output in a manner that is dependent upon the position of one or more projection surfaces 500. For example, in some embodiments, one or more projectors 760 may be instructed to project a first set of output when a projection surface 500 is in a first position and be instructed to project a second set of output when a projection surface 500 is in a second position.

At operation 2810, the projecting operation 1920 may include directing one or more portions of one or more projection outputs onto one or more moving projection surfaces. In some embodiments, one or more projector control units 740 may instruct one or more projectors 760 to project in response to receiving one or more signals 400 that include information associated with directing one or more portions of one or more projection outputs onto one or more moving projection surfaces 500. In some embodiments, one or more projector control units 740 may receive information associated with movement of one or more projection surfaces 500 and instruct one or more projectors 760 in response to the information. For example, in some embodiments, a tablet that is a projection surface 500 may be slid across a table and one or more projectors 760 may be directed to project a portion of output onto the tablet as it moves. In some embodiments, one or more projector control units 740 may project portions of output in a manner that is dependent upon the position of one or more projection surfaces 500. For example, in some embodiments, one or more projectors 760 may be directed to project a first portion of output when a projection surface 500 is in a first position and be directed to project a second portion of output when a projection surface 500 is in a second position.

Figure 29:
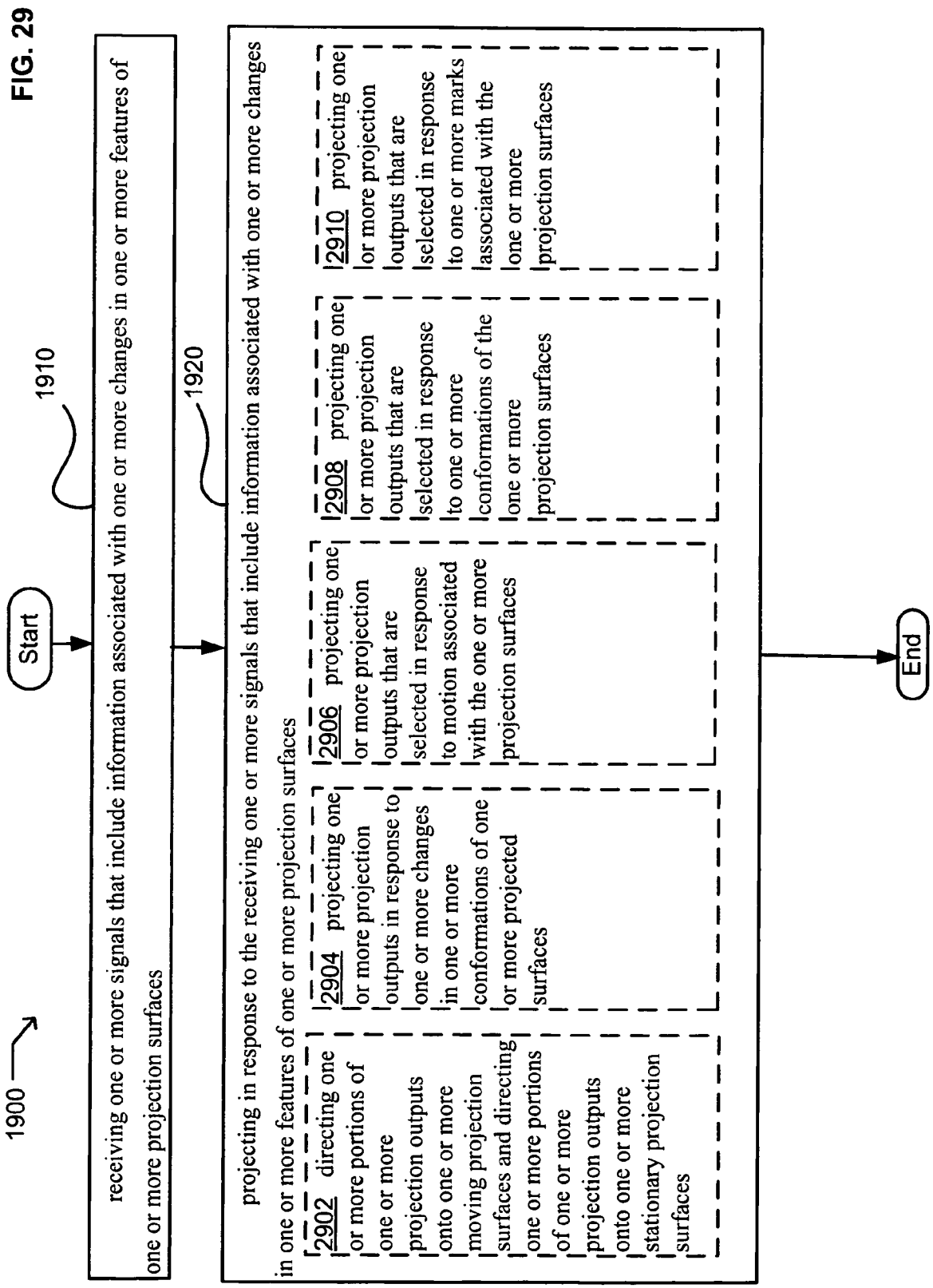
FIG. 29 illustrates alternate embodiments of the example operational flow of FIG. 19.

FIG. 29 illustrates alternative embodiments of the example operational flow 1900 of FIG. 19. FIG. 29 illustrates example embodiments where the projecting operation 1920 may include at least one additional operation. Additional operations may include an operation 2902, operation 2904, operation 2906, operation 2908, and/or operation 2910.

At operation 2902, the projecting operation 1920 may include directing one or more portions of one or more projection outputs onto one or more moving projection surfaces and directing one or more portions of one or more projection outputs onto one or more stationary projection surfaces. In some embodiments, one or more projector control units 740 may instruct one or more projectors 760 to project in response to receiving one or more signals 400 that include information associated with directing one or more portions of one or more projection outputs onto one or more moving projection surfaces 500 and directing one or more portions of one or more projection outputs onto one or more stationary projection surfaces 500. In some embodiments, one or more projector control units 740 may instruct one or more projectors 760 to direct one or more portions of one or more projection outputs onto one or more moving projection surfaces 500 and directing one or more portions of one or more projection outputs onto one or more stationary projection surfaces 500. For example, in some embodiments, one or more projector control units 740 may instruct one or more projectors 760 to direct one or more portions of one or more projection outputs onto a projection surface 500 associated with a first person and direct one or more portions of one or more projection outputs onto a second projection surface 500 that is being slid toward a second person.

At operation 2904, the projecting operation 1920 may include projecting one or more projection outputs in response to one or more changes in one or more conformations of one or more projected surfaces. In some embodiments, one or more projector control units 740 may instruct one or more projectors 760 to project in response to receiving one or more signals 400 that include information associated with projecting one or more projection outputs in response to one or more changes in one or more conformations of one or more projected surfaces. In some embodiments, one or more projector control units 740 may instruct one or more projectors 760 to project in response to one or more changes in one or more conformations of one or more projected surfaces. For example, in some embodiments, one or more projector control units 740 may project one set of content onto a tablet that is a projection surface 500 when it is in a horizontal position and project a different set of content onto the tablet when it is placed into a vertical position. In some embodiments, one or more projector control units 740 may project one set of content onto a tablet that is a projection surface 500 when it is unfolded and a separate set of content when the tablet is folded in half.

At operation 2906, the projecting operation 1920 may include projecting one or more projection outputs that are selected in response to motion associated with the one or more projection surfaces. In some embodiments, one or more projector control units 740 may instruct one or more projectors 760 to project in response to receiving one or more signals 400 that include information associated with projecting one or more projection outputs that are selected in response to motion associated with one or more projection surfaces 500. In some embodiments, one or more projector control units 740 may instruct one or more projectors 760 to project one or more projection outputs that are selected in response to motion associated with one or more projection surfaces 500. For example, in some embodiments, one or more projector control units 740 may instruct one or more projectors 760 to project one or more wavelengths of light in response to motion associated with one or more projection surfaces 500. In some embodiments, one or more projector control units 740 may instruct one or more projectors 760 to adjust the intensity of output in response to motion associated with one or more projection surfaces 500. In some embodiments, one or more projector control units 740 may instruct one or more projectors 760 to adjust the content that is output in response to motion associated with one or more projection surfaces 500.

At operation 2908, the projecting operation 1920 may include projecting one or more projection outputs that are selected in response to one or more conformations of the one or more projection surfaces. In some embodiments, one or more projector control units 740 may instruct one or more projectors 760 to project in response to receiving one or more signals 400 that include information associated with projecting one or more projection outputs that are selected in response to one or more conformations of one or more projection surfaces 500. In some embodiments, one or more projector control units 740 may instruct one or more projectors 760 to project one or more projection outputs that are selected in response to one or more conformations of one or more projection surfaces 500. In some embodiments, one or more projector control units 740 may instruct one or more projectors 760 to project content in response to one or more conformations of one or more projection surfaces 500. For example, in some embodiments, one or more projector control units 740 may instruct one or more projectors 760 to project confidential information when a projection surface 500 is in a first conformation and not to project the confidential information when the projection surface 500 is in a second conformation.

At operation 2910, the projecting operation 1920 may include projecting one or more projection outputs that are selected in response to one or more marks associated with the one or more projection surfaces. In some embodiments, one or more projector control units 740 may instruct one or more projectors 760 to project in response to receiving one or more signals 400 that include information associated with projecting one or more projection outputs that are selected in response to one or more marks associated with the one or more projection surfaces 500. In some embodiments, one or more projector control units 740 may instruct one or more projectors 760 to project one or more projection outputs that are selected in response to one or more marks associated with the one or more projection surfaces 500. In some embodiments, one or more projector control units 740 may instruct one or more projectors 760 to project content in a manner that depends upon the presence of one or more marks on a projection surface 500. For example, in some embodiments, one or more projector control units 740 may instruct one or more projectors 760 to project confidential information if one or more marks indicating confidential information are present on one or more projection surfaces 500. In some embodiments, one or more projector control units 740 may instruct one or more projectors 760 not to project confidential information if one or more marks indicating confidential information are absent from one or more projection surfaces 500.

Figure 30:
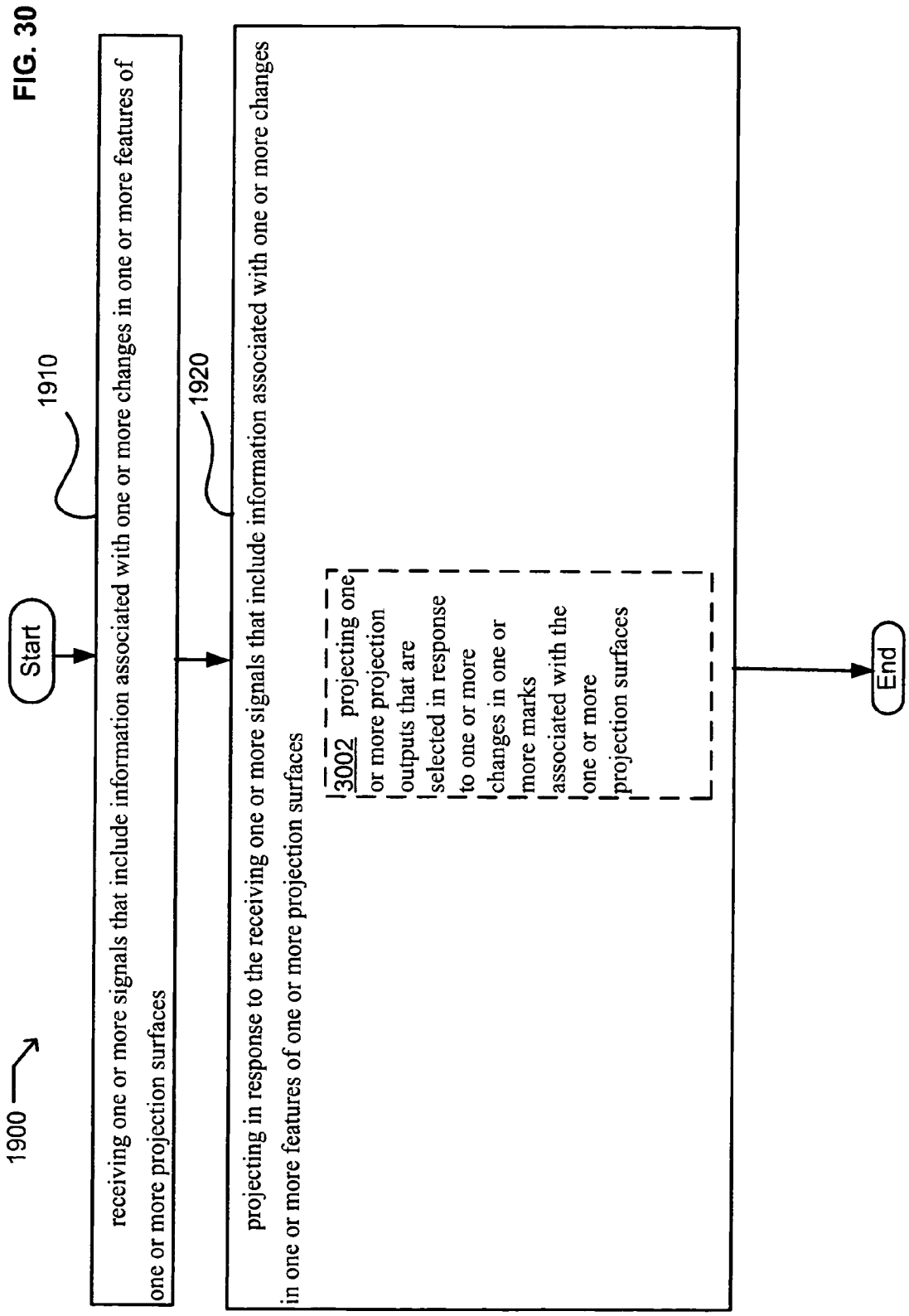
FIG. 30 illustrates alternate embodiments of the example operational flow of FIG. 19.

FIG. 30 illustrates alternative embodiments of the example operational flow 1900 of FIG. 19. FIG. 30 illustrates example embodiments where the projecting operation 1920 may include at least one additional operation. Additional operations may include an operation 3002.

At operation 3002, the projecting operation 1920 may include projecting one or more projection outputs that are selected in response to one or more changes in one or more marks associated with the one or more projection surfaces. In some embodiments, one or more projector control units 740 may instruct one or more projectors 760 to project in response to receiving one or more signals 400 that include information associated with projecting one or more projection outputs that are selected in response to one or more changes in one or more marks associated with the one or more projection surfaces 500. In some embodiments, one or more projector control units 740 may instruct one or more projectors 760 to project one or more projection outputs that are selected in response to one or more changes in one or more marks associated with the one or more projection surfaces 500. In some embodiments, one or more projector control units 740 may instruct one or more projectors 760 to project content in a manner that depends upon one or more changes in one or more marks on a projection surface 500. For example, in some embodiments, one or more projector control units 740 may instruct one or more projectors 760 not to project confidential information if one or more marks indicating confidential information are absent from one or more projection surfaces 500 but project the confidential information in response to placement of one or more marks indicating confidential material onto the one or more projection surfaces 500.

Figure 31:
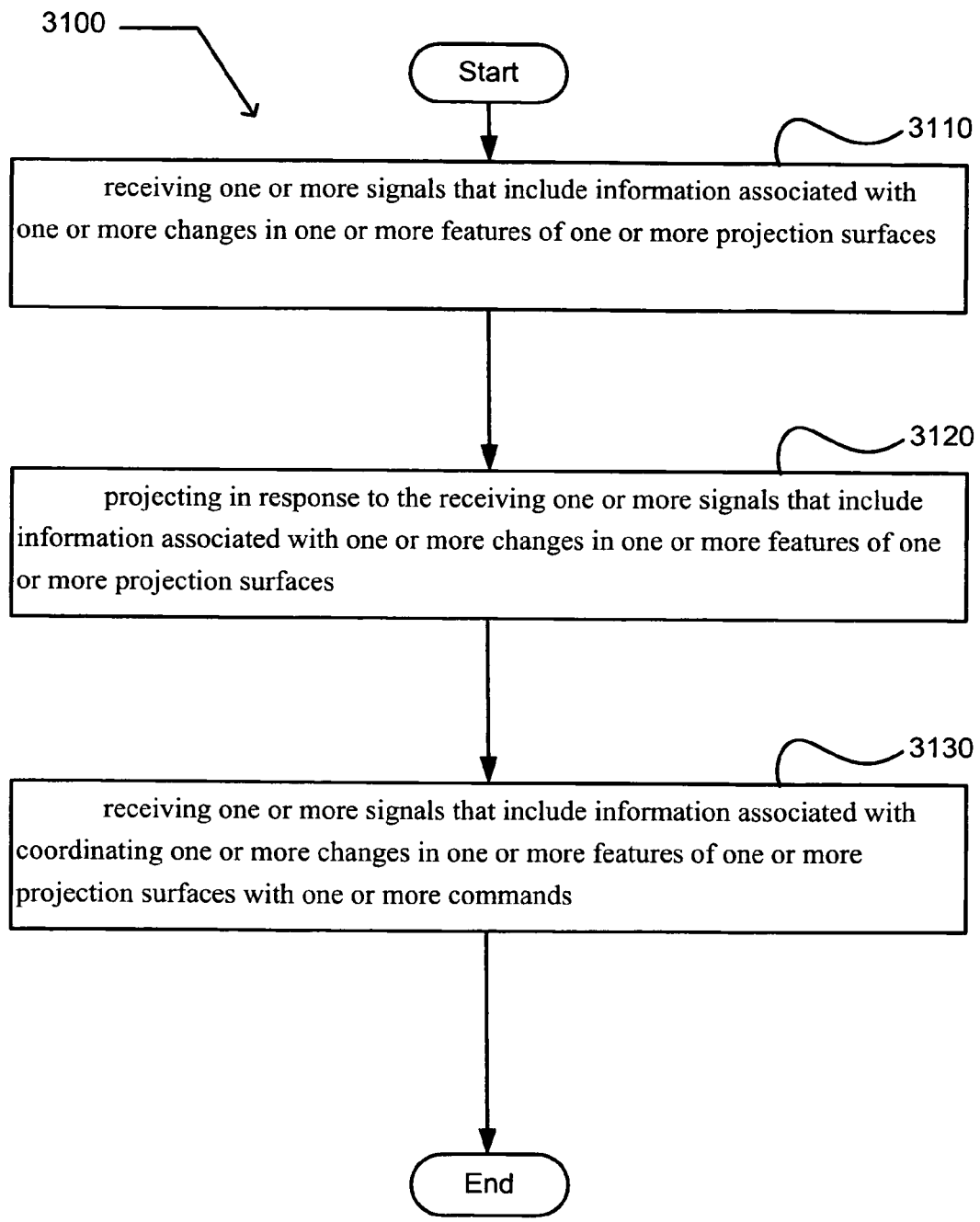
FIG. 31 illustrates an operational flow 3100 representing example operations related to receiving one or more signals that include information associated with one or more changes in one or more features of one or more projection surfaces, projecting in response to the receiving one or more signals that include information associated with one or more changes in one or more features of one or more projection surfaces, and receiving one or more signals that include information associated with coordinating one or more changes in one or more features of one or more projection surfaces with one or more commands.

In FIG. 31 and in following figures that include various examples of operations used during performance of the method, discussion and explanation may be provided with respect to any one or combination of the above-described examples of FIG. 1, and/or with respect to other examples and contexts. In some embodiments, modules 1910 and 1920 of FIG. 19 may correspond to modules 3110 and 3120 of FIG. 31. However, it should be understood that the operations may be executed in a number of other environments and contexts, and/or modified versions of FIG. 1. Also, although the various operations are presented in the sequence(s) illustrated, it should be understood that the various operations may be performed in other orders than those which are illustrated, or may be performed concurrently.

After a start operation, the operational flow 3100 includes a receiving operation 3110 involving receiving one or more signals that include information associated with one or more changes in one or more features of one or more projection surfaces. In some embodiments, one or more projector units 700 may facilitate reception of one or more signals 400 that include information associated with one or more changes in one or more features of one or more projection surfaces 500. In some embodiments, one or more projector receivers 792 may receive one or more signals 400 that include information associated with one or more changes in one or more features of one or more projection surfaces 500. In some embodiments, one or more projector receivers 792 may receive one or more signals 400 that include information associated with one or more changes in one or more conformations of one or more projection surfaces 500. In some embodiments, one or more projector receivers 792 may receive one or more signals 400 that include information associated with one or more changes in one or more positions of one or more projection surfaces 500. In some embodiments, one or more projector receivers 792 may receive one or more signals 400 that include information associated with one or more changes in one or more conformations and one or more positions of one or more projection surfaces 500.

After a start operation, the operational flow 3100 includes a projecting operation 3120 involving projecting in response to the receiving one or more signals that include information associated with one or more changes in one or more features of one or more projection surfaces. In some embodiments, one or more projector units 700 may facilitate projection in response to receiving one or more signals 400 that include information associated with one or more changes in one or more features of one or more projection surfaces 500. In some embodiments, one or more projectors 760 may project in response to receiving one or more signals 400 that include information associated with one or more changes in one or more features of one or more projection surfaces 500. In some embodiments, one or more projectors 760 may project in response to receiving one or more signals 400 that include information associated with one or more changes in one or more conformations of one or more projection surfaces 500. In some embodiments, one or more projectors 760 may project in response to receiving one or more signals 400 that include information associated with one or more changes in one or more positions of one or more projection surfaces 500. In some embodiments, one or more projectors 760 may project in response to receiving one or more signals 400 that include information associated with one or more changes in one or more conformations and one or more positions of one or more projection surfaces 500.

After a start operation, the operational flow 3100 includes a receiving operation 3130 involving receiving one or more signals that include information associated with coordinating one or more changes in one or more features of one or more projection surfaces with one or more commands. In some embodiments, one or more projector units 700 may facilitate reception of one or more signals 400 that include information associated with coordinating one or more changes in one or more features of one or more projection surfaces 500 with one or more commands. In some embodiments, one or more projector receivers 792 may receive one or more signals 400 that include information associated with coordinating one or more changes in one or more features of one or more projection surfaces 500 with one or more commands. In some embodiments, one or more projector receivers 792 may receive one or more signals 400 that include information associated with coordinating one or more changes in conformation of one or more projection surfaces 500 with one or more commands. In some embodiments, one or more projector receivers 792 may receive one or more signals 400 that include information associated with coordinating one or more changes in position of one or more projection surfaces 500 with one or more commands. In some embodiments, one or more projector receivers 792 may receive one or more signals 400 that include information associated with coordinating one or more marks associated with one or more projection surfaces 500 with one or more commands. In some embodiments, one or more projector receivers 792 may receive one or more signals 400 that include information associated with coordinating one or more changes in one or more marks associated with one or more projection surfaces 500 with one or more commands.

Figure 32:
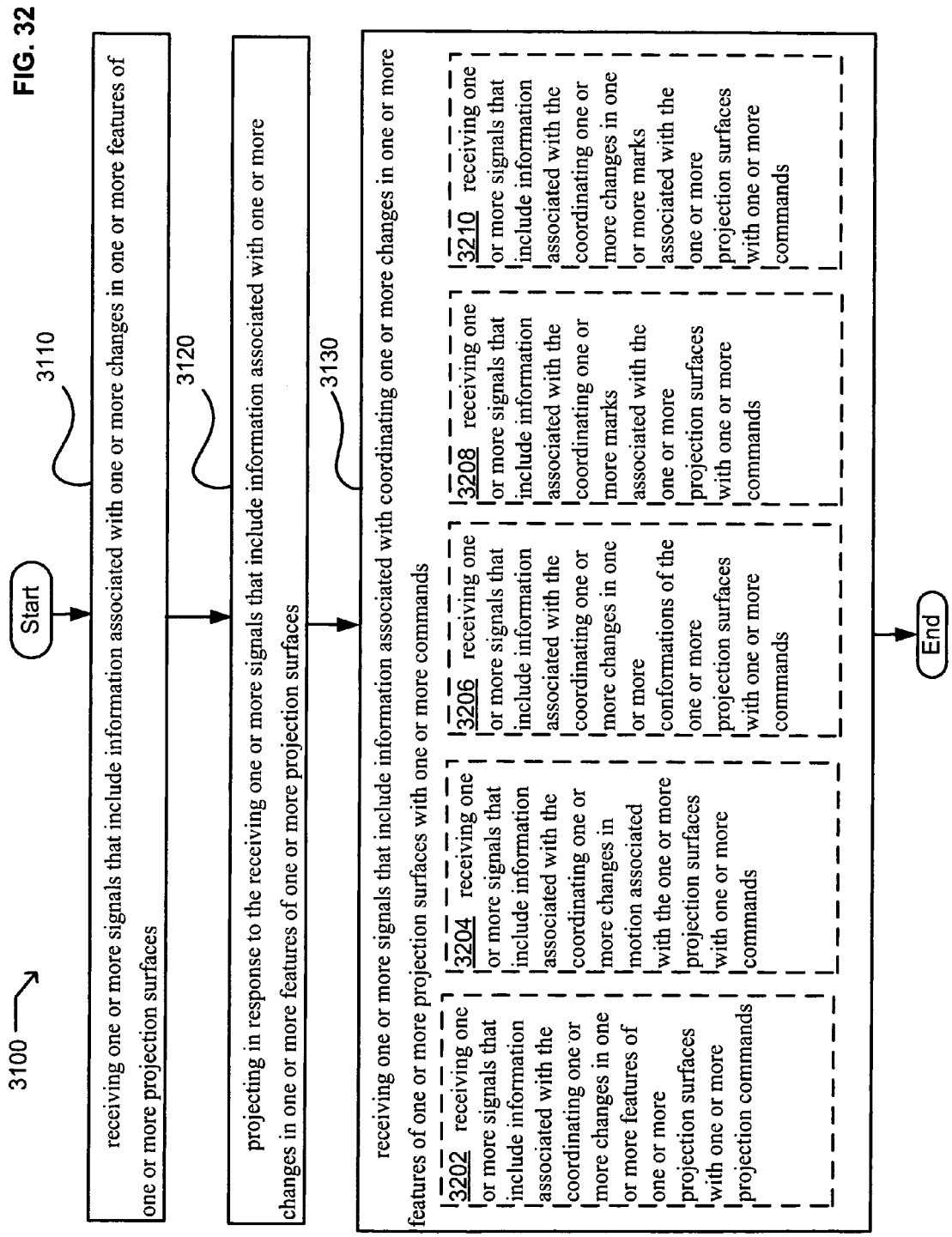
FIG. 32 illustrates alternate embodiments of the example operational flow of FIG. 31.

FIG. 32 illustrates alternative embodiments of the example operational flow 3100 of FIG. 31. FIG. 32 illustrates example embodiments where the receiving operation 3130 may include at least one additional operation. Additional operations may include an operation 3202, operation 3204, operation 3206, operation 3208, and/or operation 3210.

At operation 3202, the receiving operation 3130 may include receiving one or more signals that include information associated with the coordinating one or more changes in one or more features of one or more projection surfaces with one or more projection commands. In some embodiments, one or more projector receivers 792 may receive one or more signals 400 that include information associated with the coordinating one or more changes in one or more features of one or more projection surfaces 500 with one or more projection commands. For example, in some embodiments, one or more projector receivers 792 may receive one or more signals 400 that include information associated with coordinating one or more changes in light transmission by one or more projection surfaces 500 with one or more projection commands to increase or decrease the intensity of light projected by one or more projectors 760 onto the one or more projection surfaces 500. In some embodiments, one or more projector receivers 792 may receive one or more signals 400 that include information associated with coordinating one or more changes in the light absorbance of one or more projection surfaces 500 with one or more projection commands to alter the intensity of one or more wavelengths of light projected by one or more projectors 760 onto the one or more projection surfaces 500.

At operation 3204, the receiving operation 3130 may include receiving one or more signals that include information associated with the coordinating one or more changes in motion associated with the one or more projection surfaces with one or more commands. In some embodiments, one or more projector receivers 792 may receive one or more signals 400 that include information associated with coordinating one or more changes in motion associated with the one or more projection surfaces 500 with one or more commands. In some embodiments, one or more projector receivers 792 may receive one or more signals 400 that include information associated with coordinating one or more changes in the motion of one or more projection surfaces 500 with one or more commands to select content for projection. In some embodiments, one or more projector receivers 792 may receive one or more signals 400 that include information associated with coordinating one or more changes in the motion of one or more projection surfaces 500 with one or more commands to select content and project the content. In some embodiments, one or more projector receivers 792 may receive one or more signals 400 that include information associated with coordinating one or more changes in the motion of one or more projection surfaces 500 with one or more commands to select content that is not to be projected. In some embodiments, one or more projector receivers 792 may receive one or more signals 400 that include information associated with coordinating one or more changes in the motion of one or more projection surfaces 500 with one or more commands to project content onto one or more projection surfaces 500 that are capable of recording the content.

At operation 3206, the receiving operation 3130 may include receiving one or more signals that include information associated with the coordinating one or more changes in one or more conformations of the one or more projection surfaces with one or more commands. In some embodiments, one or more projector receivers 792 may receive one or more signals 400 that include information associated with coordinating one or more changes in one or more conformations of one or more projection surfaces 500 with one or more commands. In some embodiments, one or more projector receivers 792 may receive one or more signals 400 that include information associated with coordinating one or more changes in the conformation of one or more projection surfaces 500 with one or more commands to select content for projection. In some embodiments, one or more projector receivers 792 may receive one or more signals 400 that include information associated with coordinating one or more changes in the conformation of one or more projection surfaces 500 with one or more commands to select content and project the content. In some embodiments, one or more projector receivers 792 may receive one or more signals 400 that include information associated with coordinating one or more changes in the conformation of one or more projection surfaces 500 with one or more commands to select content that is not to be projected. In some embodiments, one or more projector receivers 792 may receive one or more signals 400 that include information associated with coordinating one or more changes in the conformation of one or more projection surfaces 500 with one or more commands to project content onto one or more projection surfaces 500 that are capable of recording the content.

At operation 3208, the receiving operation 3130 may include receiving one or more signals that include information associated with the coordinating one or more marks associated with the one or more projection surfaces with one or more commands. In some embodiments, one or more projector receivers 792 may receive one or more signals 400 that include information associated with coordinating one or more marks associated with the one or more projection surfaces 500 with one or more commands. In some embodiments, one or more projector receivers 792 may receive one or more signals 400 that include information associated with coordinating one or more marks associated with the one or more projection surfaces 500 with one or more commands to select content for projection. In some embodiments, one or more projector receivers 792 may receive one or more signals 400 that include information associated with coordinating one or more marks associated with the one or more projection surfaces 500 with one or more commands to select content that is not to be projected. For example, in some embodiments, one or more projector receivers 792 may receive one or more signals 400 that include information associated with coordinating one or more marks associated with confidential information with one or more commands to project the confidential information associated with the one or more marks. In some embodiments, one or more projector receivers 792 may receive one or more signals 400 that include information associated with coordinating one or more user 600 created marks placed onto one or more projection surfaces 500 with one or more commands.

At operation 3210, the receiving operation 3130 may include receiving one or more signals that include information associated with the coordinating one or more changes in one or more marks associated with the one or more projection surfaces with one or more commands. In some embodiments, one or more projector receivers 792 may receive one or more signals 400 that include information associated with coordinating one or more changes in one or more marks associated with the one or more projection surfaces 500 with one or more commands. In some embodiments, one or more projector receivers 792 may receive one or more signals 400 that include information associated with coordinating one or more changes in one or more marks associated with the one or more projection surfaces 500 with one or more commands to select content for projection. In some embodiments, one or more projector receivers 792 may receive one or more signals 400 that include information associated with coordinating one or more changes in one or more marks associated with the one or more projection surfaces 500 with one or more commands to select content that is not to be projected. For example, in some embodiments, one or more projector receivers 792 may receive one or more signals 400 that include information associated with coordinating elimination (e.g., erasure) of one or more marks with one or more commands.

Figure 33:
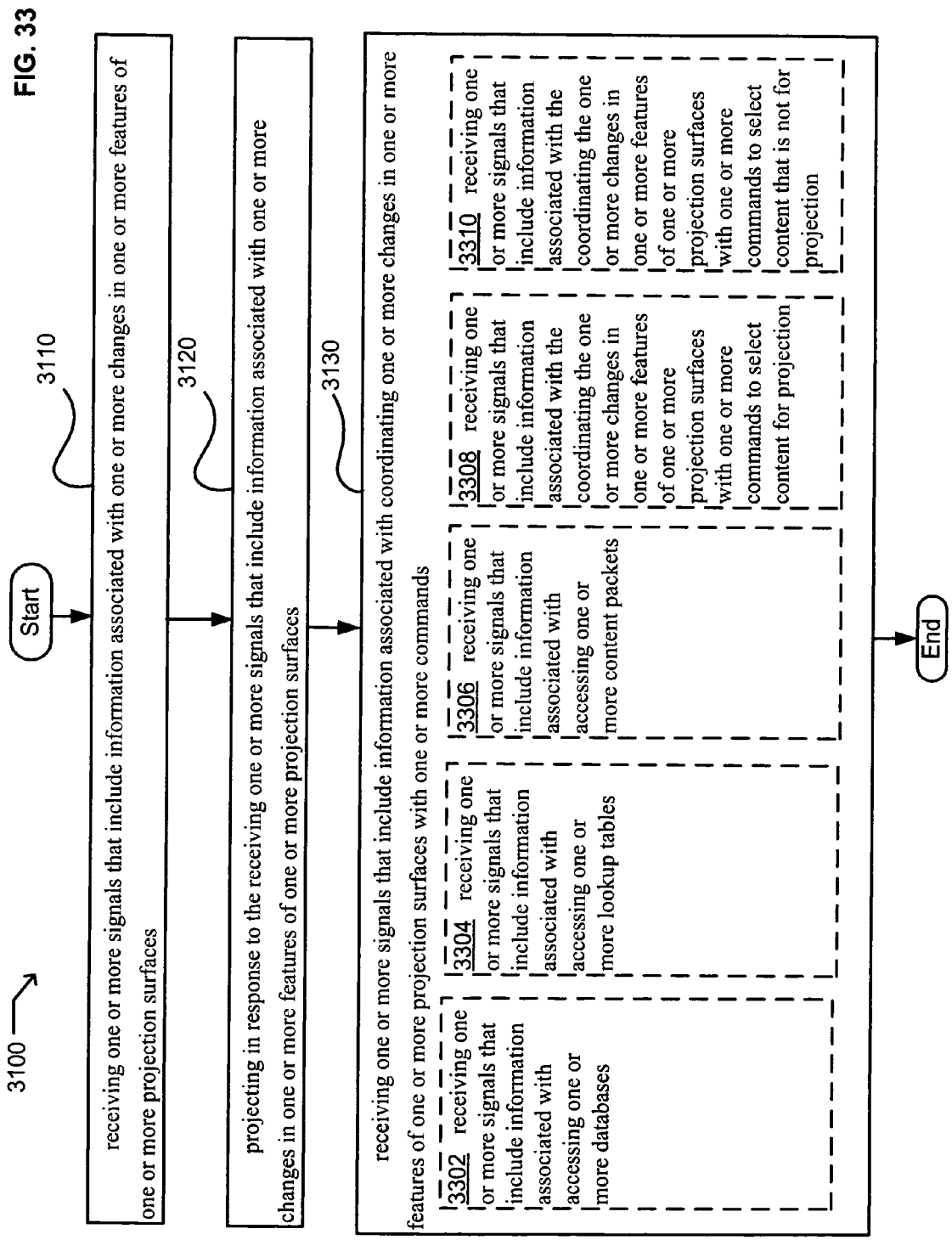
FIG. 33 illustrates alternate embodiments of the example operational flow of FIG. 31.

FIG. 33 illustrates alternative embodiments of the example operational flow 3100 of FIG. 31. FIG. 33 illustrates example embodiments where the receiving operation 3130 may include at least one additional operation. Additional operations may include an operation 3302, operation 3304, operation 3306, operation 3308, and/or operation 3310.

At operation 3302, the receiving operation 3130 may include receiving one or more signals that include information associated with accessing one or more databases. In some embodiments, one or more projector receivers 792 may receive one or more signals 400 that include information associated with the accessing one or more databases. In some embodiments, one or more projector receivers 792 may receive one or more signals 400 that include information associated with accessing one or more databases that include confidential material in response to one or more marks associated with confidential information being placed onto one or more projection surfaces 500. In some embodiments, one or more projector receivers 792 may receive one or more signals 400 that include information associated with accessing one or more databases in response to one or more changes in the conformation of one or more projection surfaces 500. In some embodiments, one or more projector receivers 792 may receive one or more signals 400 that include information associated with accessing one or more databases in response to one or more specified changes in the conformation of a projection surface 500.

At operation 3304, the receiving operation 3130 may include receiving one or more signals that include information associated with accessing one or more lookup tables. In some embodiments, one or more projector receivers 792 may receive one or more signals 400 that include information associated with the accessing one or more lookup tables. In some embodiments, one or more projector receivers 792 may receive one or more signals 400 that include information associated with coordinating one or more changes in one or more features of one or more projection surfaces 500 with one or more commands to access one or more lookup tables. In some embodiments, one or more projector receivers 792 may receive one or more signals 400 that include information associated with coordinating one or more specified changes in conformation of one or more projection surfaces 500 with one or more commands to select content for projection. In some embodiments, one or more projector receivers 792 may receive one or more signals 400 that include information associated with accessing one or more lookup tables in response to one or more changes in the conformation of one or more projection surfaces 500. In some embodiments, one or more projector receivers 792 may receive one or more signals 400 that include information associated with accessing one or more lookup tables in response to one or more changes in the position of one or more projection surfaces 500. In some embodiments, one or more projector receivers 792 may receive one or more signals 400 that include information associated with accessing one or more lookup tables in response to one or more motions associated with one or more projection surfaces 500.

At operation 3306, the receiving operation 3130 may include receiving one or more signals that include information associated with accessing one or more content packets. In some embodiments, one or more projector receivers 792 may receive one or more signals 400 that include information associated with the accessing one or more content packets 402. In some embodiments, one or more projector receivers 792 may receive one or more signals 400 that include information associated with coordinating one or more changes in one or more features of one or more projection surfaces 500 with one or more commands to access one or more content packets 402. In some embodiments, one or more projector receivers 792 may receive one or more signals 400 that include information associated with coordinating one or more changes in one or more features of one or more projection surfaces 500 with one or more commands to access one or more content packets that include specified information. In some embodiments, one or more projector receivers 792 may receive one or more signals 400 that include information associated with coordinating one or more specified changes in conformation with specified information. In some embodiments, one or more projector receivers 792 may receive one or more signals 400 that include information associated with coordinating one or more specified changes in conformation of one or more projection surfaces 500 with one or more commands to access one or more specified content packets 402.

At operation 3308, the receiving operation 3130 may include receiving one or more signals that include information associated with the coordinating the one or more changes in one or more features of one or more projection surfaces with one or more commands to select content for projection. In some embodiments, one or more projector receivers 792 may receive one or more signals 400 that include information associated with coordinating one or more changes in one or more features of one or more projection surfaces 500 with one or more commands to select content for projection. In some embodiments, one or more projector receivers 792 may receive one or more signals 400 that include information associated with coordinating one or more changes in one or more conformations of one or more projection surfaces 500 with one or more commands to select content for projection. In some embodiments, one or more projector receivers 792 may receive one or more signals 400 that include information associated with coordinating one or more changes in one or more positions of one or more projection surfaces 500 with one or more commands to select content for projection.

At operation 3310, the receiving operation 3130 may include receiving one or more signals that include information associated with the coordinating the one or more changes in one or more features of one or more projection surfaces with one or more commands to select content that is not for projection. In some embodiments, one or more projector receivers 792 may receive one or more signals 400 that include information associated with coordinating one or more changes in one or more features of one or more projection surfaces 500 with one or more commands to select content that is not for projection. In some embodiments, one or more projector receivers 792 may receive one or more signals 400 that include information associated with coordinating one or more changes in one or more conformations of one or more projection surfaces 500 with one or more commands to select content that is not for projection. In some embodiments, one or more projector receivers 792 may receive one or more signals 400 that include information associated with coordinating one or more changes in one or more positions of one or more projection surfaces 500 with one or more commands to select content that is not for projection.

Figure 34:
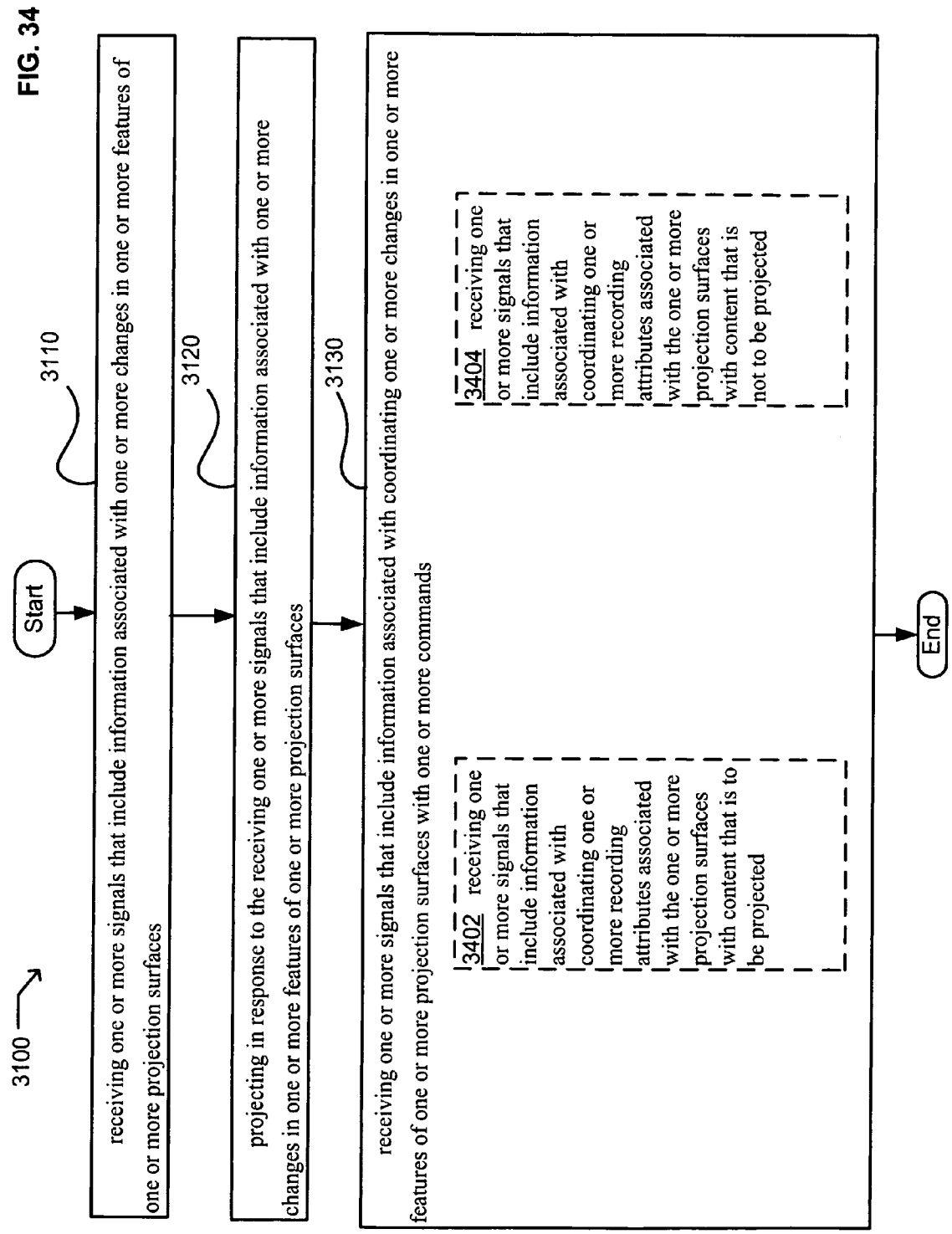
FIG. 34 illustrates alternate embodiments of the example operational flow of FIG. 31.

FIG. 34 illustrates alternative embodiments of the example operational flow 3100 of FIG. 31. FIG. 34 illustrates example embodiments where the receiving operation 3130 may include at least one additional operation. Additional operations may include an operation 3402 and/or operation 3404.

At operation 3402, the receiving operation 3130 may include receiving one or more signals that include information associated with the coordinating one or more recording attributes associated with one or more projection surfaces with content that is to be projected. In some embodiments, one or more projector receivers 792 may receive one or more signals 400 that include information associated with coordinating one or more recording attributes associated with one or more projection surfaces 500 with content that is to be projected. In some embodiments, one or more projector receivers 792 may receive one or more signals 400 that include information associated with coordinating one or more recording attributes associated with one or more projection surfaces 500 with content that is to be recorded into memory. In some embodiments, one or more projector receivers 792 may receive one or more signals 400 that include information associated with coordinating one or more recording attributes associated with one or more projection surfaces 500 with content that is to be printed.

At operation 3404, the receiving operation 3130 may include receiving one or more signals that include information associated with coordinating one or more recording attributes associated with the one or more projection surfaces with content that is not to be projected. In some embodiments, one or more projector receivers 792 may receive one or more signals 400 that include information associated with coordinating one or more recording attributes associated with one or more projection surfaces 500 with content that is not to be projected. In some embodiments, one or more projector receivers 792 may receive one or more signals 400 that include information associated with coordinating one or more recording attributes associated with one or more projection surfaces 500 with content that is not to be recorded into memory. In some embodiments, one or more projector receivers 792 may receive one or more signals 400 that include information associated with coordinating one or more recording attributes associated with one or more projection surfaces 500 with content that is not to be printed.

Figure 35:
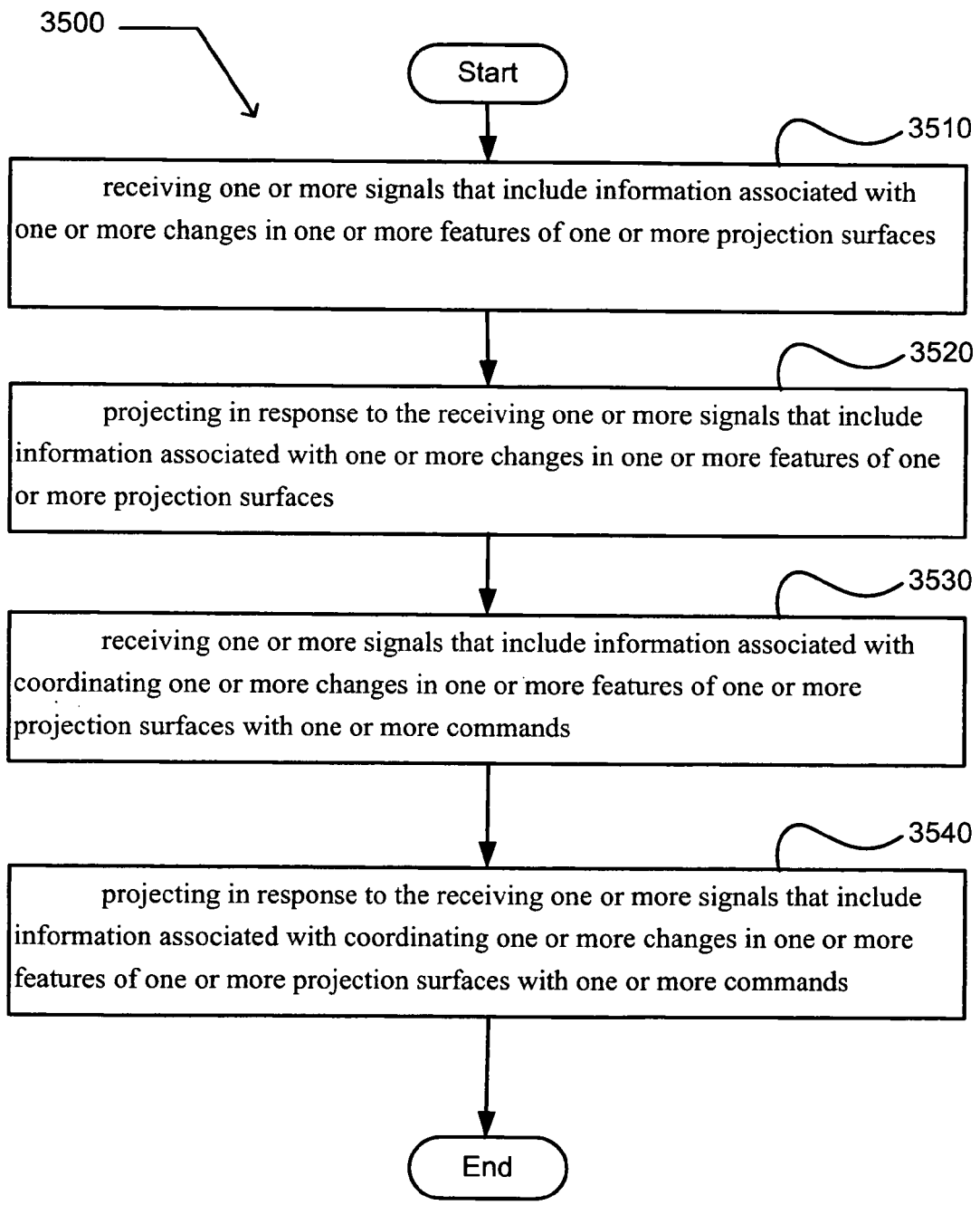
FIG. 35 illustrates an operational flow 3500 representing example operations related to receiving one or more signals that include information associated with one or more changes in one or more features of one or more projection surfaces, projecting in response to the receiving one or more signals that include information associated with one or more changes in one or more features of one or more projection surfaces, receiving one or more signals that include information associated with coordinating one or more changes in one or more features of one or more projection surfaces with one or more commands, and projecting in response to the receiving one or more signals that include information associated with coordinating one or more changes in one or more features of one or more projection surfaces with one or more commands.

In FIG. 35 and in following figures that include various examples of operations used during performance of the method, discussion and explanation may be provided with respect to any one or combination of the above-described examples of FIG. 1, and/or with respect to other examples and contexts. In some embodiments, modules 3110, 3120, and 3130 of FIG. 31 may correspond to modules 3510, 3520 and 3530 of FIG. 35. However, it should be understood that the operations may be executed in a number of other environments and contexts, and/or modified versions of FIG. 1. Also, although the various operations are presented in the sequence(s) illustrated, it should be understood that the various operations may be performed in other orders than those which are illustrated, or may be performed concurrently.

After a start operation, the operational flow 3500 includes a receiving operation 3510 involving receiving one or more signals that include information associated with one or more changes in one or more features of one or more projection surfaces. In some embodiments, one or more projector units 700 may facilitate reception of one or more signals 400 that include information associated with one or more changes in one or more features of one or more projection surfaces 500. In some embodiments, one or more projector receivers 792 may receive one or more signals 400 that include information associated with one or more changes in one or more features of one or more projection surfaces 500. In some embodiments, one or more projector receivers 792 may receive one or more signals 400 that include information associated with one or more changes in one or more conformations of one or more projection surfaces 500. In some embodiments, one or more projector receivers 792 may receive one or more signals 400 that include information associated with one or more changes in one or more positions of one or more projection surfaces 500. In some embodiments, one or more projector receivers 792 may receive one or more signals 400 that include information associated with one or more changes in one or more conformations and one or more positions of one or more projection surfaces 500.

After a start operation, the operational flow 3500 includes a projecting operation 3520 involving projecting in response to the receiving one or more signals that include information associated with one or more changes in one or more features of one or more projection surfaces. In some embodiments, one or more projector units 700 may facilitate projection in response to receiving one or more signals 400 that include information associated with one or more changes in one or more features of one or more projection surfaces 500. In some embodiments, one or more projectors 760 may project in response to receiving one or more signals 400 that include information associated with one or more changes in one or more features of one or more projection surfaces 500. In some embodiments, one or more projectors 760 may project in response to receiving one or more signals 400 that include information associated with one or more changes in one or more conformations of one or more projection surfaces 500. In some embodiments, one or more projectors 760 may project in response to receiving one or more signals 400 that include information associated with one or more changes in one or more positions of one or more projection surfaces 500. In some embodiments, one or more projectors 760 may project in response to receiving one or more signals 400 that include information associated with one or more changes in one or more conformations and one or more positions of one or more projection surfaces 500.

After a start operation, the operational flow 3500 includes a receiving operation 3530 involving receiving one or more signals that include information associated with coordinating one or more changes in one or more features of one or more projection surfaces with one or more commands. In some embodiments, one or more projector units 700 may facilitate reception of one or more signals 400 that include information associated with coordinating one or more changes in one or more features of one or more projection surfaces 500 with one or more commands. In some embodiments, one or more projector receivers 792 may receive one or more signals 400 that include information associated with coordinating one or more changes in one or more features of one or more projection surfaces 500 with one or more commands. In some embodiments, one or more projector receivers 792 may receive one or more signals 400 that include information associated with coordinating one or more changes in conformation of one or more projection surfaces 500 with one or more commands. In some embodiments, one or more projector receivers 792 may receive one or more signals 400 that include information associated with coordinating one or more changes in position of one or more projection surfaces 500 with one or more commands. In some embodiments, one or more projector receivers 792 may receive one or more signals 400 that include information associated with coordinating one or more marks associated with one or more projection surfaces 500 with one or more commands. In some embodiments, one or more projector receivers 792 may receive one or more signals 400 that include information associated with coordinating one or more changes in one or more marks associated with one or more projection surfaces 500 with one or more commands.

After a start operation, the operational flow 3500 includes a projecting operation 3540 involving projecting in response to the receiving one or more signals that include information associated with coordinating one or more changes in one or more features of one or more projection surfaces with one or more commands. In some embodiments, one or more projector control units 740 may instruct one or more projectors 760 to project in response to receiving one or more signals 400 that include information associated with coordinating one or more changes in one or more features of one or more projection surfaces 500 with one or more commands. In some embodiments, one or more projector control units 740 may instruct one or more projectors 760 to project in response to receiving one or more signals 400 that include information associated with coordinating one or more changes in conformation of one or more projection surfaces 500 with one or more commands. In some embodiments, one or more projector control units 740 may instruct one or more projectors 760 to project in response to receiving one or more signals 400 that include information associated with coordinating one or more changes in position of one or more projection surfaces 500 with one or more commands. In some embodiments, one or more projector control units 740 may instruct one or more projectors 760 to project in response to receiving one or more signals 400 that include information associated with coordinating one or more marks associated with one or more projection surfaces 500 with one or more commands. In some embodiments, one or more projector control units 740 may instruct one or more projectors 760 to project in response to receiving one or more signals 400 that include information associated with coordinating one or more changes in one or more marks associated with one or more projection surfaces 500 with one or more commands.

Figure 36:
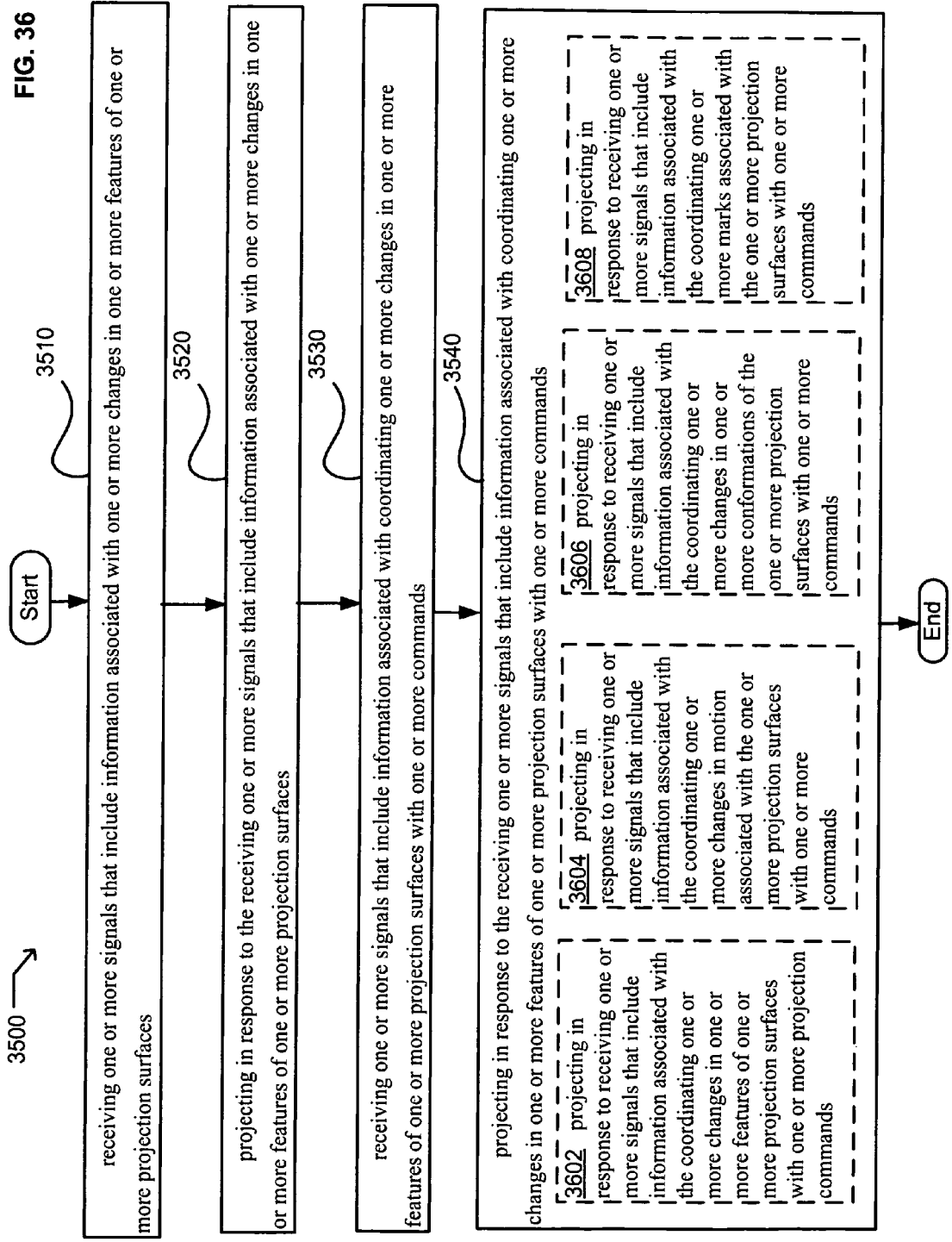
FIG. 36 illustrates alternate embodiments of the example operational flow of FIG. 35.

FIG. 36 illustrates alternative embodiments of the example operational flow 3500 of FIG. 35. FIG. 36 illustrates example embodiments where the projecting operation 3540 may include at least one additional operation. Additional operations may include an operation 3602, operation 3604, operation 3606, and/or operation 3608.

At operation 3602, the projecting operation 3540 may include projecting in response to receiving one or more signals that include information associated with the coordinating one or more changes in one or more features of one or more projection surfaces with one or more projection commands. In some embodiments, one or more projector control units 740 may instruct one or more projectors 760 to project in response to receiving one or more signals 400 that include information associated with coordinating one or more changes in one or more features of one or more projection surfaces 500 with one or more projection commands. In some embodiments, one or more projector control units 740 may instruct one or more projectors 760 to project in response to receiving one or more signals 400 that include information associated with coordinating one or more changes in light transmission by one or more projection surfaces 500 with one or more projection commands to increase or decrease the intensity of light projected by one or more projectors 760 onto the one or more projection surfaces 500. In some embodiments, one or more projector control units 740 may instruct one or more projectors 760 to project in response to receiving one or more signals 400 that include information associated with coordinating one or more changes in the light absorbance of one or more projection surfaces 500 with one or more projection commands to alter the intensity of one or more wavelengths of light projected by one or more projectors 760 onto the one or more projection surfaces 500.

At operation 3604, the projecting operation 3540 may include projecting in response to receiving one or more signals that include information associated with the coordinating one or more changes in motion associated with the one or more projection surfaces with one or more commands. In some embodiments, one or more projector control units 740 may instruct one or more projectors 760 to project in response to receiving one or more signals 400 that include information associated with coordinating one or more changes in motion associated with the one or more projection surfaces 500 with one or more commands. In some embodiments, one or more projector control units 740 may instruct one or more projectors 760 to project in response to receiving one or more signals 400 that include information associated with coordinating one or more changes in the motion of one or more projection surfaces 500 with one or more commands to select content for projection. In some embodiments, one or more projector control units 740 may instruct one or more projectors 760 to project in response to receiving one or more signals 400 that include information associated with coordinating one or more changes in the motion of one or more projection surfaces 500 with one or more commands to select content and project the content. In some embodiments, one or more projector control units 740 may instruct one or more projectors 760 to project in response to receiving one or more signals 400 that include information associated with coordinating one or more changes in the motion of one or more projection surfaces 500 with one or more commands to select content that is not to be projected. In some embodiments, one or more projector control units 740 may instruct one or more projectors 760 to project in response to receiving one or more signals 400 that include information associated with coordinating one or more changes in the motion of one or more projection surfaces 500 with one or more commands to project content onto one or more projection surfaces 500 that are capable of recording the content.

At operation 3606, the projecting operation 3540 may include projecting in response to receiving one or more signals that include information associated with the coordinating one or more changes in one or more conformations of the one or more projection surfaces with one or more commands. In some embodiments, one or more projector control units 740 may instruct one or more projectors 760 to project in response to receiving one or more signals 400 that include information associated with coordinating one or more changes in one or more conformations of the one or more projection surfaces with one or more commands. In some embodiments, one or more projector control units 740 may instruct one or more projectors 760 to project in response to receiving one or more signals 400 that include information associated with coordinating one or more changes in the conformation of one or more projection surfaces 500 with one or more commands to select content for projection. In some embodiments, one or more projector control units 740 may instruct one or more projectors 760 to project in response to receiving one or more signals 400 that include information associated with coordinating one or more changes in the conformation of one or more projection surfaces 500 with one or more commands to select content and project the content. In some embodiments, one or more projector control units 740 may instruct one or more projectors 760 to project in response to receiving one or more signals 400 that include information associated with coordinating one or more changes in the conformation of one or more projection surfaces 500 with one or more commands to select content that is not to be projected. In some embodiments, one or more projector control units 740 may instruct one or more projectors 760 to project in response to receiving one or more signals 400 that include information associated with coordinating one or more changes in the conformation of one or more projection surfaces 500 with one or more commands to project content onto one or more projection surfaces 500 that are capable of recording the content.

At operation 3608, the projecting operation 3540 may include projecting in response to receiving one or more signals that include information associated with the coordinating one or more marks associated with the one or more projection surfaces with one or more commands. In some embodiments, one or more projector control units 740 may instruct one or more projectors 760 to project in response to receiving one or more signals 400 that include information associated with coordinating one or more marks associated with the one or more projection surfaces 500 with one or more commands. In some embodiments, one or more projector control units 740 may instruct one or more projectors 760 to project in response to receiving one or more signals 400 that include information associated with coordinating one or more marks associated with the one or more projection surfaces 500 with one or more commands to select content for projection. In some embodiments, one or more projector control units 740 may instruct one or more projectors 760 to project in response to receiving one or more signals 400 that include information associated with coordinating one or more marks associated with the one or more projection surfaces 500 with one or more commands to select content that is not to be projected. In some embodiments, one or more projector control units 740 may instruct one or more projectors 760 to project in response to receiving one or more signals 400 that include information associated with coordinating one or more marks associated with confidential information with one or more commands to project the confidential information associated with the one or more marks. In some embodiments, one or more projector control units 740 may instruct one or more projectors 760 to project in response to receiving one or more signals 400 that include information associated with coordinating one or more user 600 created marks placed onto one or more projection surfaces 500 with one or more commands.

Figure 37:
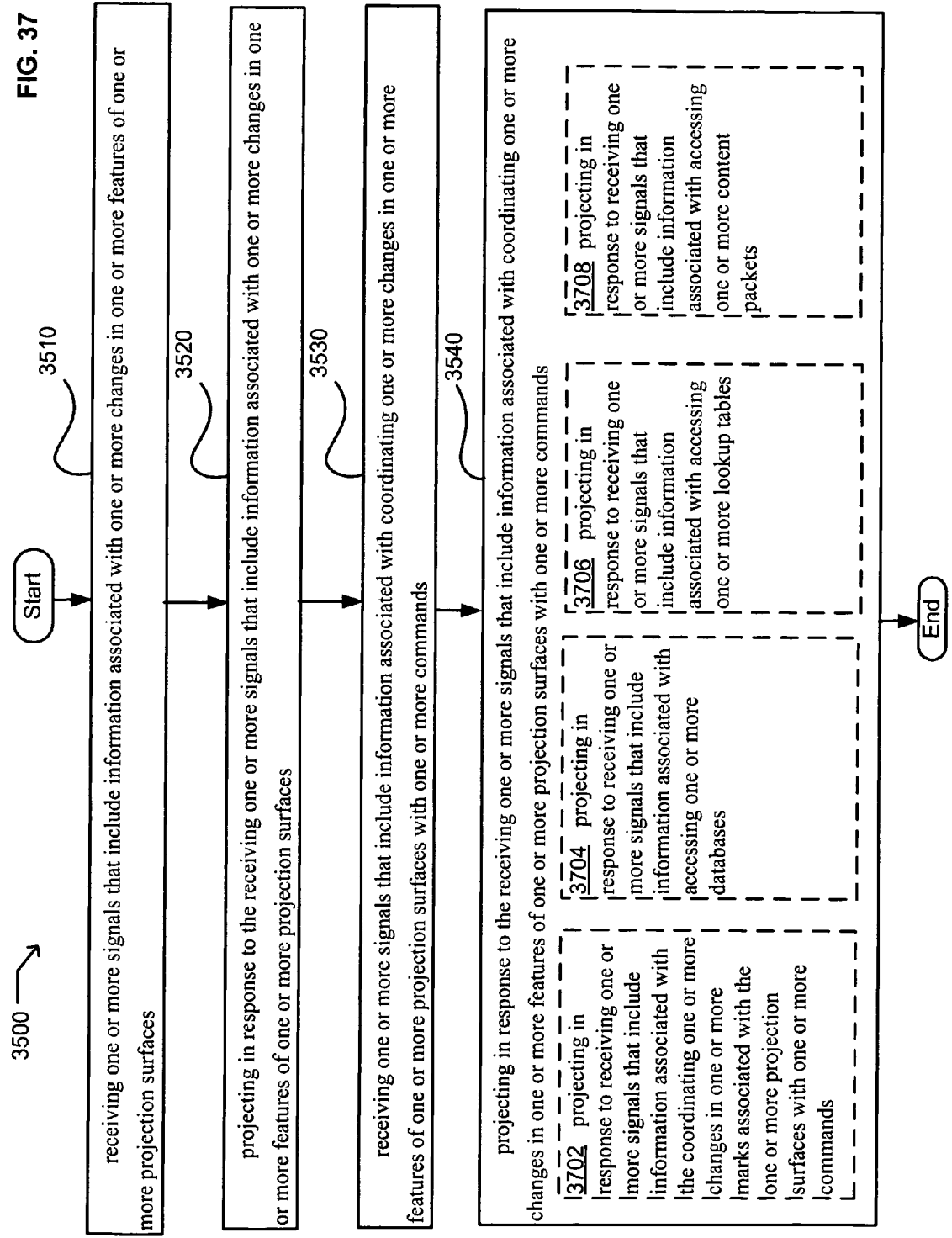
FIG. 37 illustrates alternate embodiments of the example operational flow of FIG. 35.

FIG. 37 illustrates alternative embodiments of the example operational flow 3500 of FIG. 35. FIG. 37 illustrates example embodiments where the projecting operation 3540 may include at least one additional operation. Additional operations may include an operation 3702, operation 3704, operation 3706, and/or operation 3708.

At operation 3702, the projecting operation 3540 may include projecting in response to receiving one or more signals that include information associated with the coordinating one or more changes in one or more marks associated with the one or more projection surfaces with one or more commands. In some embodiments, one or more projector control units 740 may instruct one or more projectors 760 to project in response to receiving one or more signals 400 that include information associated with coordinating one or more changes in one or more marks associated with the one or more projection surfaces 500 with one or more commands. In some embodiments, one or more projector control units 740 may instruct one or more projectors 760 to project in response to receiving one or more signals 400 that include information associated with coordinating one or more changes in one or more marks associated with the one or more projection surfaces 500 with one or more commands to select content for projection. In some embodiments, one or more projector control units 740 may instruct one or more projectors 760 to project in response to receiving one or more signals 400 that include information associated with coordinating one or more changes in one or more marks associated with the one or more projection surfaces 500 with one or more commands to select content that is not to be projected. In some embodiments, one or more projector control units 740 may instruct one or more projectors 760 to project in response to receiving one or more signals 400 that include information associated with coordinating the elimination (e.g., erasure) of one or more marks with one or more commands.

At operation 3704, the projecting operation 3540 may include projecting in response to receiving one or more signals that include information associated with accessing one or more databases. In some embodiments, one or more projector control units 740 may instruct one or more projectors 760 to project in response to receiving one or more signals 400 that include information associated with accessing one or more databases. In some embodiments, one or more projector control units 740 may instruct one or more projectors 760 to project in response to receiving one or more signals 400 that include information associated with accessing one or more databases that include confidential material. In some embodiments, one or more projector control units 740 may instruct one or more projectors 760 to project in response to receiving one or more signals 400 that include information associated with accessing one or more databases that include confidential material in response to one or more marks associated with confidential information being placed onto one or more projection surfaces 500. In some embodiments, one or more projector control units 740 may instruct one or more projectors 760 to project in response to receiving one or more signals 400 that include information associated with accessing one or more databases in response to one or more changes in the conformation of one or more projection surfaces 500. In some embodiments, one or more projector control units 740 may instruct one or more projectors 760 to project in response to receiving one or more signals 400 that include information associated with one or more databases in response to one or more specified changes in the conformation of a projection surface 500.

At operation 3706, the projecting operation 3540 may include projecting in response to receiving one or more signals that include information associated with accessing one or more lookup tables. In some embodiments, one or more projector control units 740 may instruct one or more projectors 760 to project in response to receiving one or more signals 400 that include information associated with accessing one or more lookup tables. In some embodiments, one or more projector control units 740 may instruct one or more projectors 760 to project in response to receiving one or more signals 400 that include information associated with coordinating one or more changes in one or more features of one or more projection surfaces 500 with one or more commands to access one or more lookup tables. In some embodiments, one or more projector control units 740 may instruct one or more projectors 760 to project in response to receiving one or more signals 400 that include information associated with coordinating one or more specified changes in conformation of one or more projection surfaces 500 with one or more commands to select content for projection. In some embodiments, one or more projector control units 740 may instruct one or more projectors 760 to project in response to receiving one or more signals 400 that include information associated with accessing one or more lookup tables in response to one or more changes in the conformation of one or more projection surfaces 500. In some embodiments, one or more projector control units 740 may instruct one or more projectors 760 to project in response to receiving one or more signals 400 that include information associated with accessing one or more lookup tables in response to one or more changes in the position of one or more projection surfaces 500. In some embodiments, one or more projector control units 740 may instruct one or more projectors 760 to project in response to receiving one or more signals 400 that include information associated with accessing one or more lookup tables in response to one or more motions associated with one or more projection surfaces 500.

At operation 3708, the projecting operation 3540 may include projecting in response to receiving one or more signals that include information associated with accessing one or more content packets. In some embodiments, one or more projector control units 740 may instruct one or more projectors 760 to project in response to receiving one or more signals 400 that include information associated with accessing one or more content packets 402. In some embodiments, one or more projector control units 740 may instruct one or more projectors 760 to project in response to receiving one or more signals 400 that include information associated with coordinating one or more changes in one or more features of one or more projection surfaces 500 with one or more commands to access one or more content packets 402. In some embodiments, one or more projector control units 740 may instruct one or more projectors 760 to project in response to receiving one or more signals 400 that include information associated with coordinating one or more changes in one or more features of one or more projection surfaces 500 with one or more commands to access one or more content packets that include specified information. In some embodiments, one or more projector control units 740 may instruct one or more projectors 760 to project in response to receiving one or more signals 400 that include information associated with coordinating one or more specified changes in conformation with specified information. In some embodiments, one or more projector control units 740 may instruct one or more projectors 760 to project in response to receiving one or more signals 400 that include information associated with coordinating one or more specified changes in conformation of one or more projection surfaces 500 with one or more commands to access one or more specified content packets 402.

Figure 38:
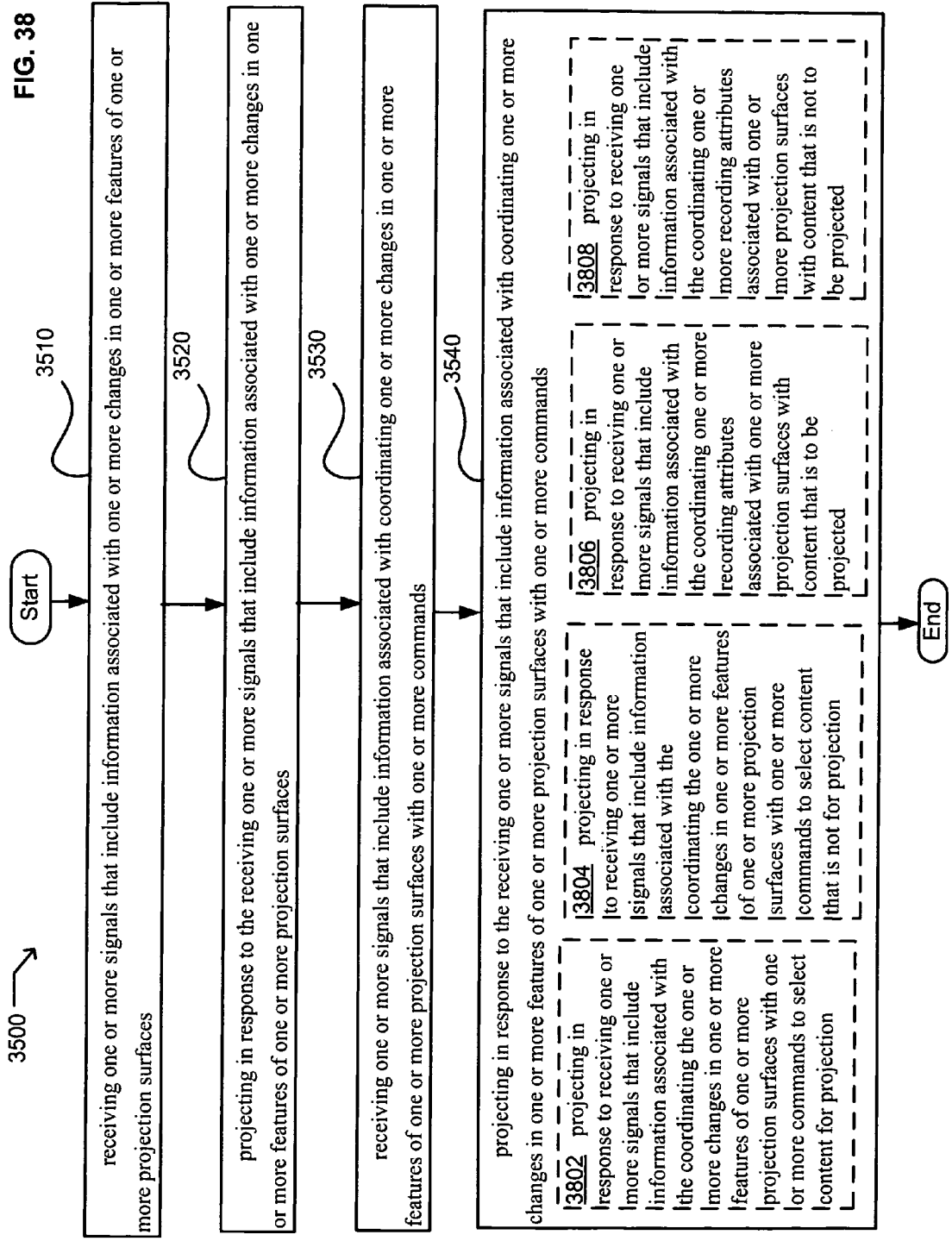
FIG. 38 illustrates alternate embodiments of the example operational flow of FIG. 35.

FIG. 38 illustrates alternative embodiments of the example operational flow 3500 of FIG. 35. FIG. 38 illustrates example embodiments where the projecting operation 3540 may include at least one additional operation. Additional operations may include an operation 3802, operation 3804, operation 3806, and/or operation 3808.

At operation 3802, the projecting operation 3540 may include projecting in response to receiving one or more signals that include information associated with the coordinating the one or more changes in one or more features of one or more projection surfaces with one or more commands to select content for projection. In some embodiments, one or more projector control units 740 may instruct one or more projectors 760 to project in response to receiving one or more signals 400 that include information associated with coordinating the one or more changes in one or more features of one or more projection surfaces 500 with one or more commands to select content for projection. In some embodiments, one or more projector control units 740 may instruct one or more projectors 760 to project in response to receiving one or more signals 400 that include information associated with coordinating one or more changes in one or more features of one or more projection surfaces 500 with one or more commands to select content for projection. In some embodiments, one or more projector control units 740 may instruct one or more projectors 760 to project in response to receiving one or more signals 400 that include information associated with coordinating one or more changes in one or more conformations of one or more projection surfaces 500 with one or more commands to select content for projection. In some embodiments, one or more projector control units 740 may instruct one or more projectors 760 to project in response to receiving one or more signals 400 that include information associated with coordinating one or more changes in one or more positions of one or more projection surfaces 500 with one or more commands to select content for projection.

At operation 3804, the projecting operation 3540 may include projecting in response to receiving one or more signals that include information associated with the coordinating the one or more changes in one or more features of one or more projection surfaces with one or more commands to select content that is not for projection. In some embodiments, one or more projector control units 740 may instruct one or more projectors 760 to project in response to receiving one or more signals 400 that include information associated with coordinating the one or more changes in one or more features of one or more projection surfaces 500 with one or more commands to select content that is not for projection. In some embodiments, one or more projector control units 740 may instruct one or more projectors 760 to project in response to receiving one or more signals 400 that include information associated with coordinating one or more changes in one or more conformations of one or more projection surfaces 500 with one or more commands to select content that is not for projection. In some embodiments, one or more projector control units 740 may instruct one or more projectors 760 to project in response to receiving one or more signals 406 that include information associated with coordinating one or more changes in one or more positions of one or more projection surfaces 500 with one or more commands to select content that is not for projection.

At operation 3806, the projecting operation 3540 may include projecting in response to receiving one or more signals that include information associated with the coordinating one or more recording attributes associated with one or more projection surfaces with content that is to be projected. In some embodiments, one or more projector control units 740 may instruct one or more projectors 760 to project in response to receiving one or more signals 400 that include information associated with coordinating one or more recording attributes associated with one or more projection surfaces 500 with content that is to be projected. In some embodiments, one or more projector control units 740 may instruct one or more projectors 760 to project in response to receiving one or more signals 400 that include information associated with coordinating one or more recording attributes associated with one or more projection surfaces 500 with content that is to be recorded into memory. In some embodiments, one or more projector control units 740 may instruct one or more projectors 760 to project in response to receiving one or more signals 400 that include information associated with coordinating one or more recording attributes associated with one or more projection surfaces 500 with content that is to be printed.

At operation 3808, the projecting operation 3540 may include projecting in response to receiving one or more signals that include information associated with the coordinating one or more recording attributes associated with one or more projection surfaces with content that is not to be projected. In some embodiments, one or more projector control units 740 may instruct one or more projectors 760 to project in response to receiving one or more signals 400 that include information associated with coordinating one or more recording attributes associated with one or more projection surfaces 500 with content that is not to be projected. In some embodiments, one or more projector control units 740 may instruct one or more projectors 760 to project in response to receiving one or more signals 400 that include information associated with coordinating one or more recording attributes associated with one or more projection surfaces 500 with content that is not to be recorded into memory. In some embodiments, one or more projector control units 740 may instruct one or more projectors 760 to project in response to receiving one or more signals 400 that include information associated with coordinating one or more recording attributes associated with one or more projection surfaces 500 with content that is not to be printed.

Figure 39:
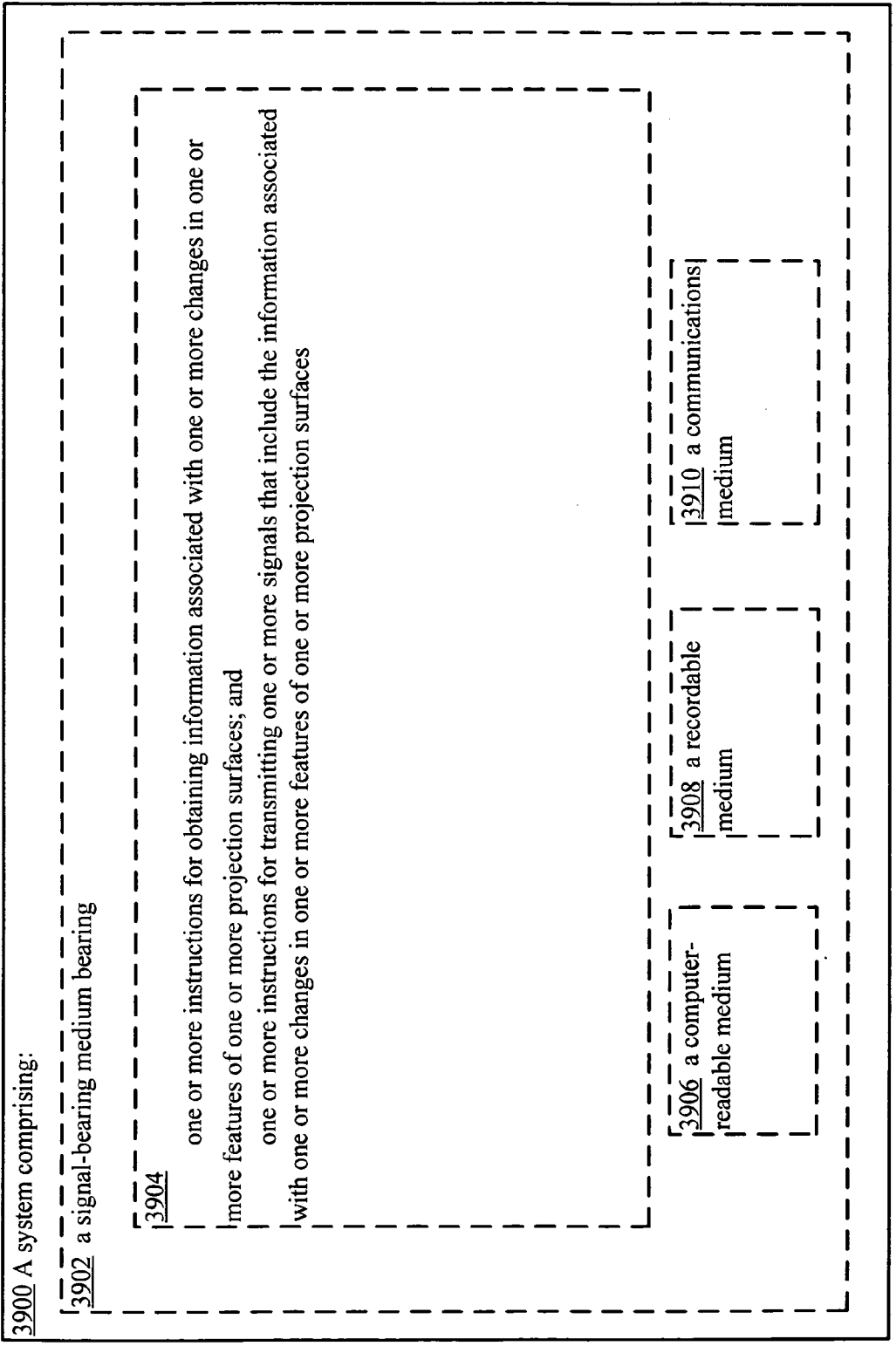
FIG. 39 illustrates a partial view of a system 3900 that includes a computer program for executing a computer process on a computing device.

FIG. 39 illustrates a partial view of a system 3900 that includes a computer program 3904 for executing a computer process on a computing device. An embodiment of system 3900 is provided using a signal-bearing medium 3902 bearing one or more instructions for obtaining information associated with one or more changes in one or more features of one or more projection surfaces 500 and one or more instructions for transmitting one or more signals 400 that include the information associated with one or more changes in one or more features of one or more projection surfaces 500. The one or more instructions may be, for example, computer executable and/or logic-implemented instructions. In some embodiments, the signal-bearing medium 3902 may include a computer-readable medium 3906. In some embodiments, the signal-bearing medium 3902 may include a recordable medium 3908. In some embodiments, the signal-bearing medium 3902 may include a communications medium 3910.

Figure 40:
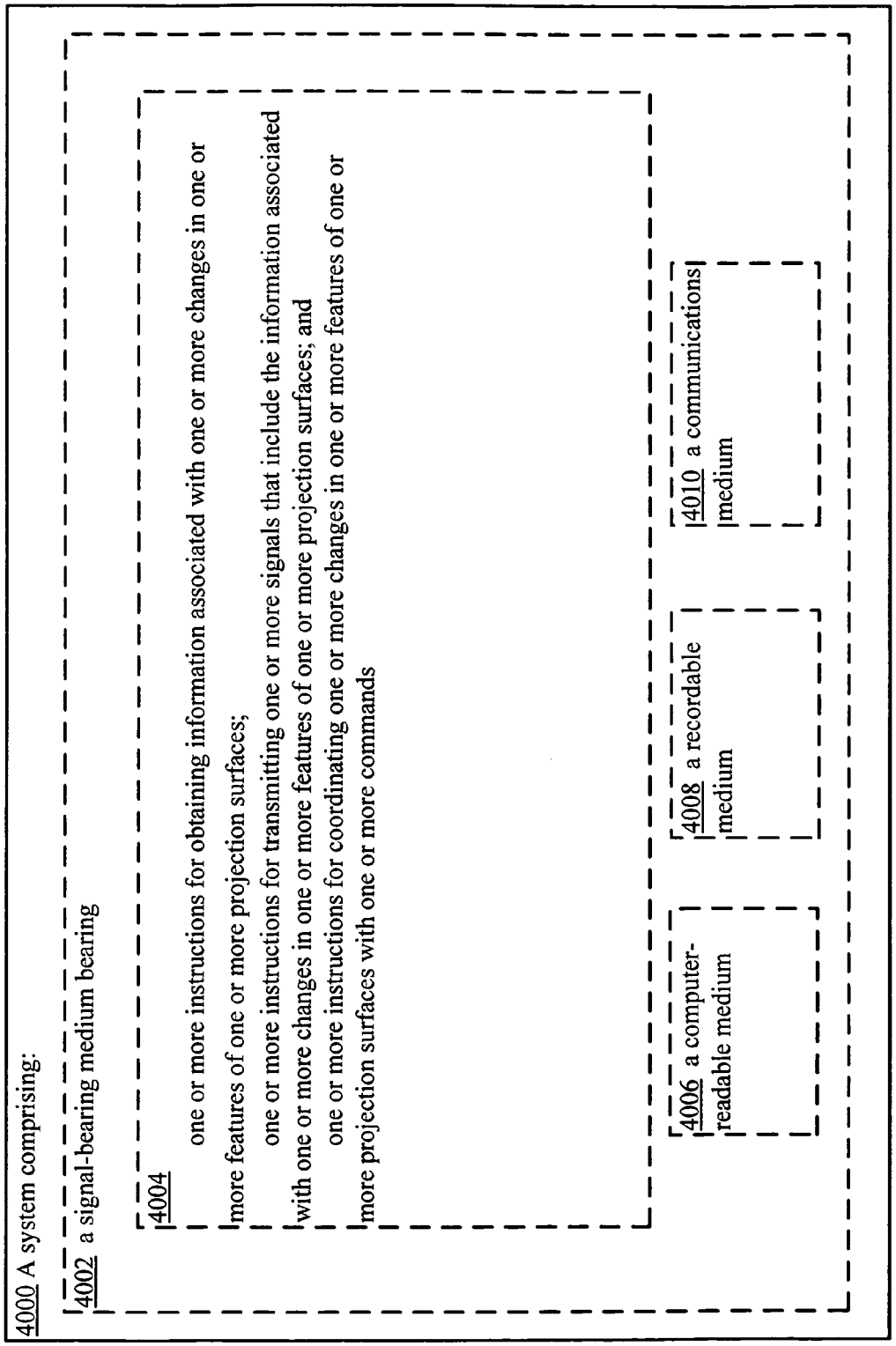
FIG. 40 illustrates a partial view of a system 4000 that includes a computer program for executing a computer process on a computing device.

FIG. 40 illustrates a partial view of a system 4000 that includes a computer program 4004 for executing a computer process on a computing device. An embodiment of system 4000 is provided using a signal-bearing medium 4002 bearing one or more instructions for obtaining information associated with one or more changes in one or more features of one or more projection surfaces 500; one or more instructions for transmitting one or more signals 400 that include the information associated with one or more changes in one or more features of one or more projection surfaces 500; and one or more instructions for coordinating one or more changes in one or more features of one or more projection surfaces 500 with one or more commands. The one or more instructions may be, for example, computer executable and/or logic-implemented instructions. In some embodiments, the signal-bearing medium 4002 may include a computer-readable medium 4006. In some embodiments, the signal-bearing medium 4002 may include a recordable medium 4008. In some embodiments, the signal-bearing medium 4002 may include a communications medium 4010.

Figure 41:
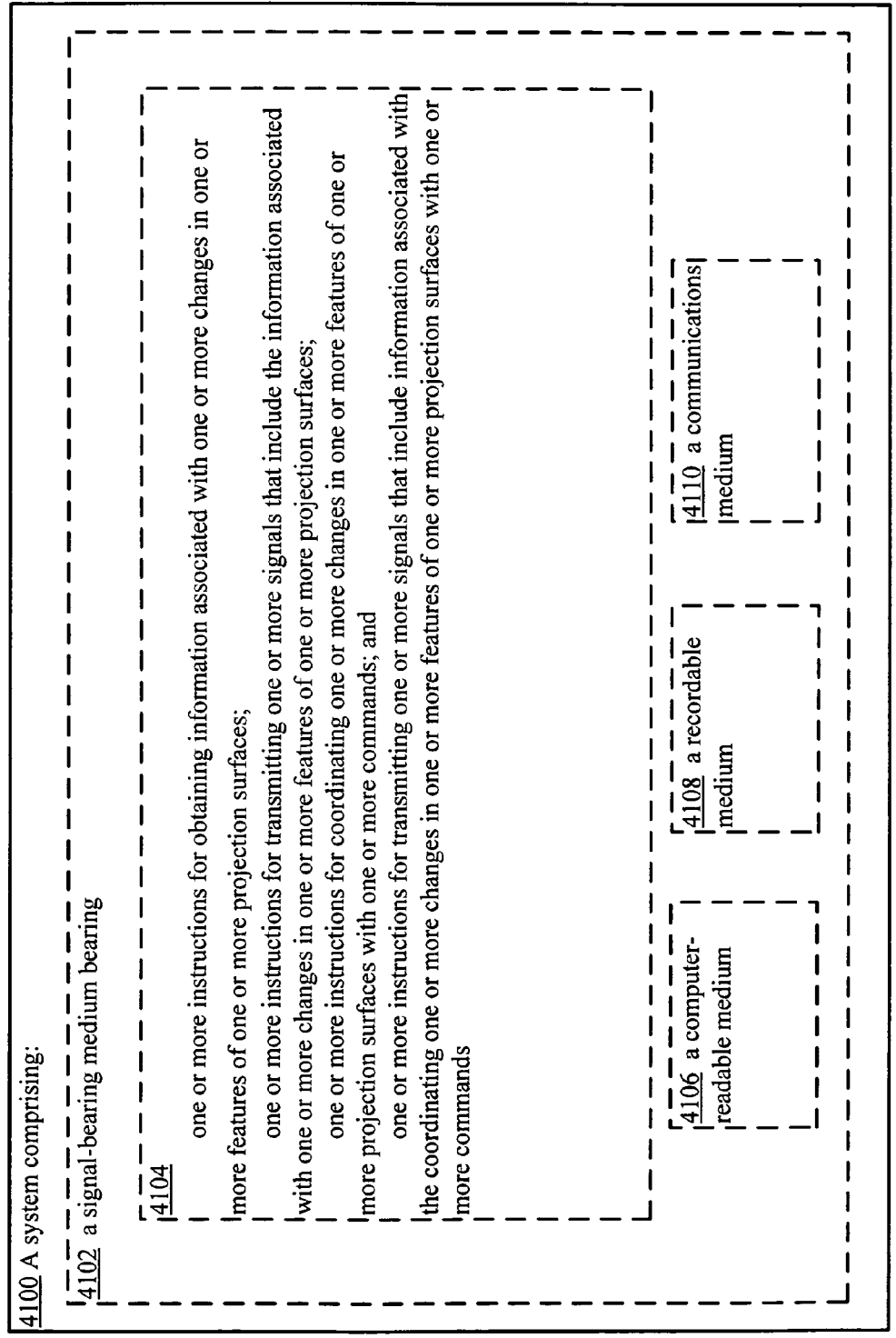
FIG. 41 illustrates a partial view of a system 4100 that includes a computer program for executing a computer process on a computing device.

FIG. 41 illustrates a partial view of a system 4100 that includes a computer program 4104 for executing a computer process on a computing device. An embodiment of system 4100 is provided using a signal-bearing medium 4102 bearing one or more instructions for obtaining information associated with one or more changes in one or more features of one or more projection surfaces 500; one or more instructions for transmitting one or more signals 400 that include the information associated with one or more changes in one or more features of one or more projection surfaces 500; one or more instructions for coordinating one or more changes in one or more features of one or more projection surfaces 500 with one or more commands; and one or more instructions for transmitting one or more signals 400 that include information associated with the coordinating one or more changes in one or more features of one or more projection surfaces 500 with one or more commands. The one or more instructions may be, for example, computer executable and/or logic-implemented instructions. In some embodiments, the signal-bearing medium 4102 may include a computer-readable medium 4106. In some embodiments, the signal-bearing medium 4102 may include a recordable medium 4108. In some embodiments, the signal-bearing medium 4102 may include a communications medium 4110.

Figure 42:
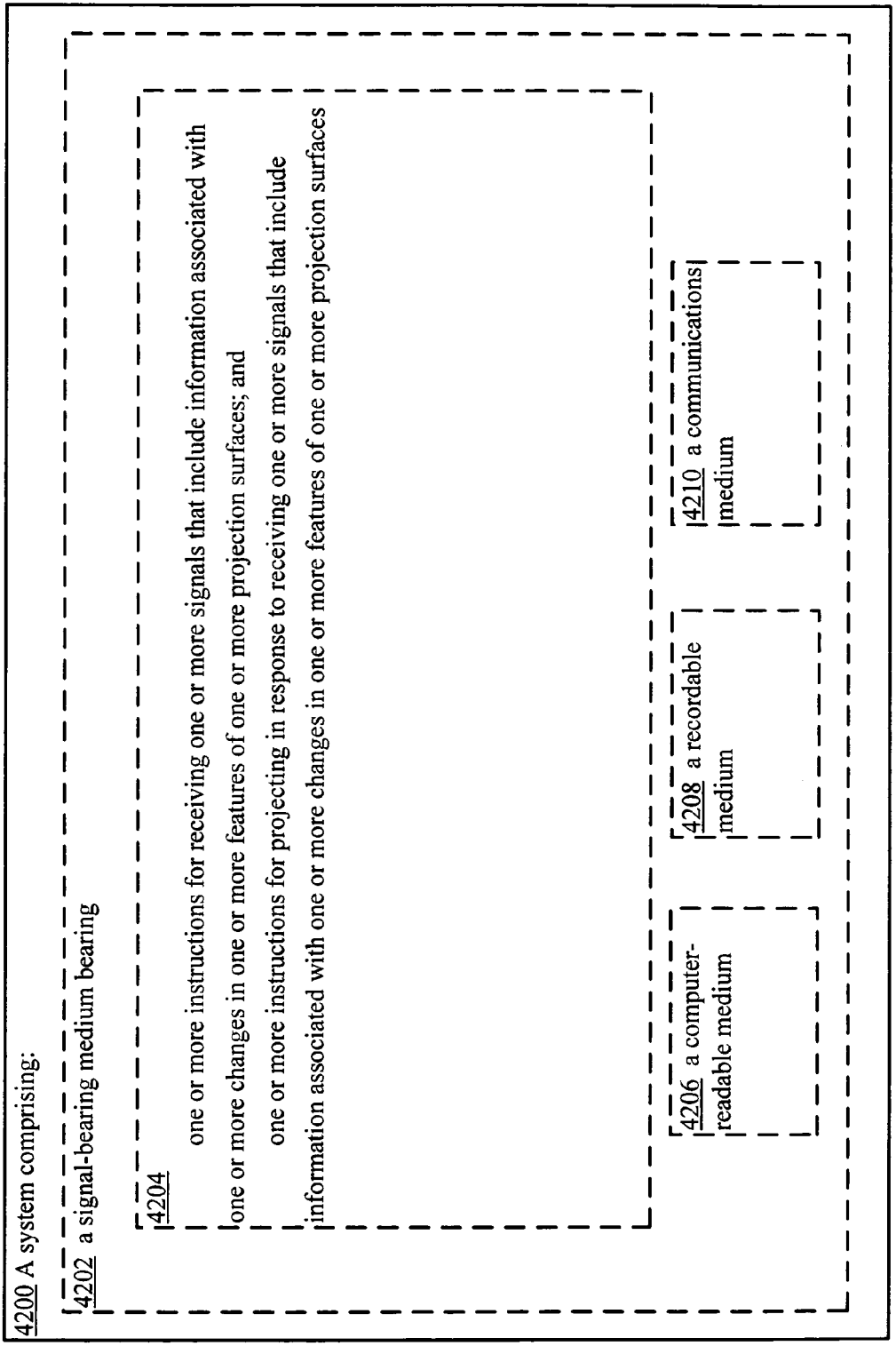
FIG. 42 illustrates a partial view of a system 4200 that includes a computer program for executing a computer process on a computing device.

FIG. 42 illustrates a partial view of a system 4200 that includes a computer program 4204 for executing a computer process on a computing device. An embodiment of system 4200 is provided using a signal-bearing medium 4202 bearing one or more instructions for receiving one or more signals 400 that include information associated with one or more changes in one or more features of one or more projection surfaces 500 and one or more instructions for projecting in response to receiving one or more signals 400 that include information associated with one or more changes in one or more features of one or more projection surfaces 500. The one or more instructions may be, for example, computer executable and/or logic-implemented instructions. In some embodiments, the signal-bearing medium 4202 may include a computer-readable medium 4206. In some embodiments, the signal-bearing medium 4202 may include a recordable medium 4208. In some embodiments, the signal-bearing medium 4202 may include a communications medium 4210.

FIG. 43 illustrates a partial view of a system 4300 that includes a computer program 4304 for executing a computer process on a computing device. An embodiment of system 4300 is provided using a signal-bearing medium 4302 bearing one or more instructions for receiving one or more signals 400 that include information associated with one or more changes in one or more features of one or more projection surfaces 500; one or more instructions for projecting in response to receiving one or more signals 400 that include information associated with one or more changes in one or more features of one or more projection surfaces 500; and one or more instructions for receiving one or more signals 400 that include information associated with coordinating one or more changes in one or more features of one or more projection surfaces 500 with one or more commands. The one or more instructions may be, for example, computer executable and/or logic-implemented instructions. In some embodiments, the signal-bearing medium 4302 may include a computer-readable medium 4306. In some embodiments, the signal-bearing medium 4302 may include a recordable medium 4308. In some embodiments, the signal-bearing medium 4302 may include a communications medium 4310.

Figure 44:
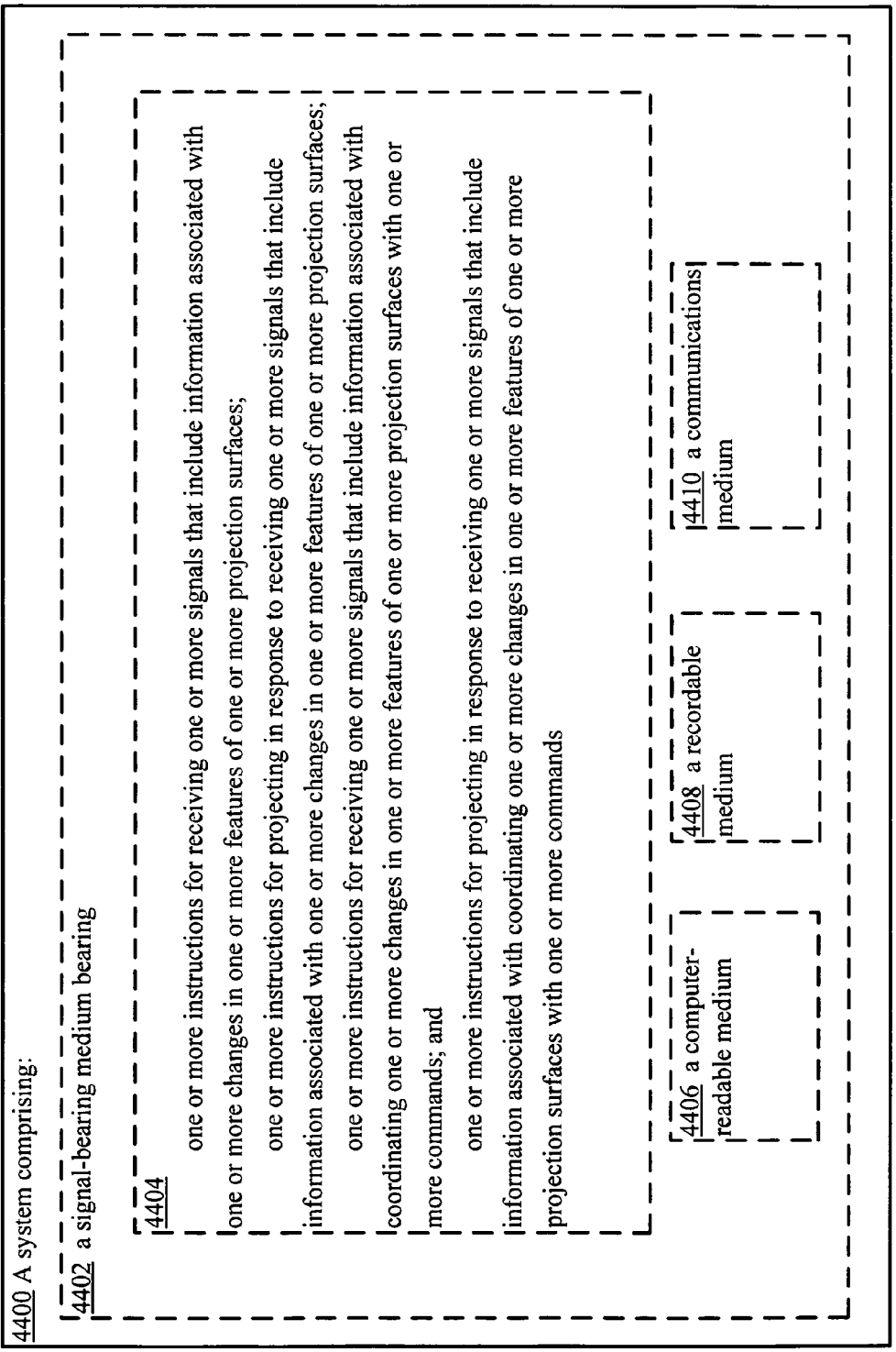
FIG. 44 illustrates a partial view of a system 4400 that includes a computer program for executing a computer process on a computing device.

FIG. 44 illustrates a partial view of a system 4400 that includes a computer program 4404 for executing a computer process on a computing device. An embodiment of system 4400 is provided using a signal-bearing medium 4402 bearing one or more instructions for receiving one or more signals 400 that include information associated with one or more changes in one or more features of one or more projection surfaces 500; one or more instructions for projecting in response to receiving one or more signals 400 that include information associated with one or more changes in one or more features of one or more projection surfaces 500; one or more instructions for receiving one or more signals 400 that include information associated with coordinating one or more changes in one or more features of one or more projection surfaces 500 with one or more commands; and one or more instructions for projecting in response to receiving one or more signals 400 that include information associated with coordinating one or more changes in one or more features of one or more projection surfaces 500 with one or more commands. The one or more instructions may be, for example, computer executable and/or logic-implemented instructions. In some embodiments, the signal-bearing medium 4402 may include a computer-readable medium 4406. In some embodiments, the signal-bearing medium 4402 may include a recordable medium 4408. In some embodiments, the signal-bearing medium 4402 may include a communications medium 4410.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described above. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces 300, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces 300, drivers, sensors 150, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory). A sale of a system or method may likewise occur in a territory even if components of the system or method are located and/or used outside the territory. Further, implementation of at least part of a system for performing a method in one territory does not preclude use of the system in another territory.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Those skilled in the art will appreciate that a user 600 may be representative of a human user 600, a robotic user 600 (e.g., computational entity), and/or substantially any combination thereof (e.g., a user may be assisted by one or more robotic agents) unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A method comprising:
   receiving, from one or more surface sensors that are disposed on or about one or more projection surfaces, one or more signals that include information associated with one or more changes in one or more physical features of at least one of the one or more projection surfaces, the one or more changes at least partially resulting from a person physically modifying the one or more physical features of at least one of the one or more projection surfaces, the information included in the received one or more signals being obtained via the one or more surface sensors;
   selecting one or more portions of content to be projected sufficient to prevent the projection of a specific type of content in response to the receiving of the one or more signals that include information associated with one or more changes in one or more physical features of the at least one or more projection surfaces; and
   projecting the selected content.

2. The method of claim 1, wherein the receiving one or more signals that include information associated with one or more changes in one or more features of at least one of the one or more projection surfaces comprises:
   receiving one or more signals that include information associated with detecting one or more changes in one or more features of one or more projection surfaces.

3. The method of claim 1, wherein the receiving one or more signals that include information associated with one or more changes in one or more features of at least one of the one or more projection surfaces comprises:
   receiving one or more signals that include information associated with one or more changes in one or more features of one or more projection surfaces.

4. The method of claim 1, wherein the receiving one or more signals that include information associated with one or more changes in one or more features of one or more projection surfaces comprises:
   receiving one or more signals that include information associated with one or more changes in motion associated with the one or more projection surfaces.

5. The method of claim 1, wherein the receiving one or more signals that include information associated with one or more changes in one or more features of one or more projection surfaces comprises:
   receiving one or more signals that include information associated with one or more changes in one or more conformations of the one or more projection surfaces.

6. The method of claim 1, wherein the receiving one or more signals that include information associated with one or more changes in one or more features of one or more projection surfaces comprises:
   receiving one or more signals that include information associated with one or more marks associated with the one or more projection surfaces.

7. The method of claim 1, wherein the receiving one or more signals that include information associated with one or more changes in one or more features of one or more projection surfaces comprises:
   receiving one or more signals that include information associated with content that is to be projected.

8. The method of claim 1, wherein the receiving one or more signals that include information associated with one or more changes in one or more features of one or more projection surfaces comprises:

receiving one or more signals that include information associated with obtaining information associated with one or more capture capabilities associated with the one or more projection surfaces.

9. The method of claim 1, wherein the receiving one or more signals that include information associated with one or more changes in one or more features of one or more projection surfaces comprises:

receiving one or more signals that include information associated with one or more recording attributes associated with the one or more projection surfaces.

10. The method of claim 1, wherein the projecting the selected content comprises:

projecting the selected content in response to receiving one or more signals that include information associated with detecting one or more changes in one or more features of one or more projection surfaces.

11. The method of claim 1, wherein the projecting the selected content comprises:

projecting the selected content in response to receiving one or more signals that include information associated with one or more changes in one or more features of one or more projection surfaces.

12. The method of claim 1, wherein the projecting in response to the receiving one or more signals that include information associated with one or more changes in one or more features of one or more projection surfaces comprises:

projecting in response to receiving one or more signals that include information associated with one or more changes in motion associated with the one or more projection surfaces.

13. The method of claim 1, wherein the projecting in response to the receiving one or more signals that include information associated with one or more changes in one or more features of one or more projection surfaces comprises:

projecting in response to receiving one or more signals that include information associated with one or more changes in one or more conformations of the one or more projection surfaces.

14. The method of claim 1, wherein the projecting in response to the receiving one or more signals that include information associated with one or more changes in one or more features of one or more projection surfaces comprises:

projecting in response to receiving one or more signals that include information associated with one or more marks associated with the one or more projection surfaces.

15. The method of claim 1, wherein the projecting in response to the receiving one or more signals that include information associated with one or more changes in one or more features of one or more projection surfaces comprises:

projecting in response to receiving one or more signals that include information associated with content that is to be projected.

16. The method of claim 1, wherein the projecting in response to the receiving one or more signals that include information associated with one or more changes in one or more features of one or more projection surfaces comprises:

projecting in response to receiving one or more signals that include information associated with obtaining information associated with one or more capture capabilities associated with the one or more projection surfaces.

17. The method of claim 1, wherein the projecting in response to the receiving one or more signals that include information associated with one or more changes in one or more features of one or more projection surfaces comprises:

projecting in response to receiving one or more signals that include information associated with one or more recording attributes associated with the one or more projection surfaces.

18. The method of claim 1, wherein the projecting content in response to receiving one or more signals that include information associated with one or more changes in one or more features of the at least one of the one or more projection surfaces comprises:

selecting one or more wavelengths of light that are projected in response to changes in light absorbency of the at least one or more projection surfaces detected by the one or more surface sensors.

19. The method of claim 1, wherein the projecting the selected content comprises:

directing one or more portions of one or more projection outputs onto two or more projection surfaces.

20. The method of claim 1, wherein the projecting in response to the receiving one or more signals that include information associated with one or more changes in one or more features of one or more projection surfaces comprises:

projecting one or more projection outputs in response to one or more changes in one or more conformations of one or more projected surfaces.

21. The method of claim 1, wherein the projecting in response to the receiving one or more signals that include information associated with one or more changes in one or more features of one or more projection surfaces comprises:

projecting one or more projection outputs that are selected in response to motion associated with the one or more projection surfaces.

22. The method of claim 1, further comprising:

receiving one or more signals that include information associated with coordinating one or more changes in one or more features of one or more projection surfaces with one or more commands.

23. The method of claim 22, wherein the receiving one or more signals that include information associated with coordinating one or more changes in one or more features of one or more projection surfaces with one or more commands comprises:

receiving one or more signals that include information associated with the coordinating one or more changes in one or more features of one or more projection surfaces with one or more projection commands.

24. The method of claim 22, wherein the receiving one or more signals that include information associated with coordinating one or more changes in one or more features of one or more projection surfaces with one or more commands comprises:

receiving one or more signals that include information associated with the coordinating one or more changes in motion associated with the one or more projection surfaces with one or more commands.

25. The method of claim 22, wherein the receiving one or more signals that include information associated with coordinating one or more changes in one or more features of one or more projection surfaces with one or more commands comprises:

receiving one or more signals that include information associated with the coordinating one or more changes in one or more conformations of the one or more projection surfaces with one or more commands.

26. The method of claim 22, wherein the receiving one or more signals that include information associated with coordinating one or more changes in one or more features of one or more projection surfaces with one or more commands comprises:
receiving one or more signals that include information associated with the coordinating one or more marks associated with the one or more projection surfaces with one or more commands.

27. The method of claim 22, wherein the receiving one or more signals that include information associated with coordinating one or more changes in one or more features of one or more projection surfaces with one or more commands comprises:
receiving one or more signals that include information associated with the coordinating the one or more changes in one or more features of one or more projection surfaces with one or more commands to select content for projection.

28. The method of claim 22, further comprising:
projecting in response to the receiving one or more signals that include information associated with coordinating one or more changes in one or more features of one or more projection surfaces with one or more commands.

29. The method of claim 28, wherein the projecting in response to the receiving one or more signals that include information associated with coordinating one or more changes in one or more features of one or more projection surfaces with one or more commands comprises:
projecting in response to receiving one or more signals that include information associated with the coordinating one or more changes in one or more features of one or more projection surfaces with one or more projection commands.

30. The method of claim 28, wherein the projecting in response to the receiving one or more signals that include information associated with coordinating one or more changes in one or more features of one or more projection surfaces with one or more commands comprises:
projecting in response to receiving one or more signals that include information associated with the coordinating one or more changes in motion associated with the one or more projection surfaces with one or more commands.

31. The method of claim 28, wherein the projecting in response to the receiving one or more signals that include information associated with coordinating one or more changes in one or more features of one or more projection surfaces with one or more commands comprises:
projecting in response to receiving one or more signals that include information associated with the coordinating one or more changes in one or more conformations of the one or more projection surfaces with one or more commands.

32. The method of claim 28, wherein the projecting in response to the receiving one or more signals that include information associated with coordinating one or more changes in one or more features of one or more projection surfaces with one or more commands comprises:
projecting in response to receiving one or more signals that include information associated with the coordinating one or more marks associated with the one or more projection surfaces with one or more commands.

33. The method of claim 28, wherein the projecting in response to the receiving one or more signals that include information associated with coordinating one or more changes in one or more features of one or more projection surfaces with one or more commands comprises:
projecting in response to receiving one or more signals that include information associated with the coordinating the one or more changes in one or more features of one or more projection surfaces with one or more commands to select content for projection.

34. The method of claim 1, wherein projecting the selected content comprises:
projecting one or more portions of the selected content sufficient to prevent the projection of a specific type of content in response to the receiving one or more signals that include information associated with one or more changes in one or more physical features of one or more projection surfaces.

35. The method of claim 34, wherein projecting one or more portions of the selected content sufficient to prevent the projection of a specific type of content in response to the receiving one or more signals that include information associated with one or more changes in one or more physical features of one or more projection surfaces, comprises:
projecting light to adjust the intensity of the light projected in response to changes in physical features of the at least one or more projection surfaces included in the received information.

36. The method of claim 1, wherein the receiving one or more signals that include information associated with one or more changes in one or more features of one or more projection surfaces, the information included in the received one or more signals being obtained via one or more sensors disposed about the one or more projection surfaces comprises:
receiving one or more signals that include information regarding a proximity of one or more persons to one or more projection surfaces, the information regarding the proximity of the one or more persons being obtained via one or more sensors disposed about the one or more projection surfaces.

37. The method of claim 1 wherein physically modifying the one or more physical features of at least one or more projection surfaces includes folding the one or more projection surfaces along a diagonal.

38. The method of claim 1 further comprising determining from the signals a class of the person.

39. The method of claim 38 wherein the class is determined based on a relative age of person.

40. The method of claim 1 wherein selecting one or more portions of content to be projected sufficient to prevent the projection of a specific type of content comprises:
selecting first portions of the content to be projected sufficient to prevent the projection of the specific type of content in response to determining the person is a member of a first class of persons, and selecting the first and a second portion of the content to be projected in response to determining the person is a member of a second class of persons.

41. The method of claim 1 wherein selecting one or more portions of content to be projected sufficient to prevent the projection of a specific type of content comprises:
selecting first portions of the content to be projected sufficient to prevent the projection of the specific type of content in response to determining the person is a member of a first class of persons, and selecting the first and a second portion of the content to be projected in response to determining the person is a member of a second class of persons.

42. A system comprising:
circuitry to receive one or more signals that include information associated with one or more changes in one or more features of one or more projection surfaces including physical attributes of the one or more projection surfaces, the information included in the received one or more signals having been obtained via one or more sensors disposed about the one or more projection surfaces; and circuitry to project light that is responsive to the circuitry to receive one or more signals that include information associated with one or more changes in one or more features of one or more projection surfaces, the circuitry to project light to adjust the intensity or wavelength of the light projected in response to the received one or more signals that include information associated with changes in the one or more features of the at least one or more projection surfaces including the physical attributes of the one or more projection surfaces.

43. The system of claim 42, further comprising:

circuitry for receiving one or more signals that include information associated with coordinating one or more changes in one or more features of one or more projection surfaces with one or more commands.

44. The system of claim 43, further comprising:

circuitry for projecting that is responsive to the circuitry for receiving one or more signals that include information associated with coordinating one or more changes in one or more features of one or more projection surfaces with one or more commands.

45. A system comprising:

means for sensing, the means for sensing to be disposed on or about one or more projection surfaces, the means for sensing to include at least one of magnetic sensing means, pressure sensing means, range sensing means, or surface strain sensing means, the means for sensing detecting changes in features of the one or more projection surfaces;

means for receiving one or more signals that include information associated with one or more changes in one or more features of at least one of the one or more projection surfaces, the information included in the received one or more signals having been obtained via the one or more sensing means, the information included in the one or more signals including detected changes in features of the one or more projection surfaces;

means for projecting content onto the at least one of the one or more projection surfaces, the means for projecting responsive to receiving one or more signals that include information associated with one or more changes in one or more features of the at least one of the one or more projection surfaces, the means for projecting including means for selecting one or more portions of content to be projected sufficient to prevent the projection of a specific type of content in response to the received changes in features of the one or more projection surfaces included in the information included in the received one or more signals.

46. The system of claim 45, further comprising:

means for receiving one or more signals that include information associated with coordinating one or more changes in one or more features of one or more projection surfaces with one or more commands.

47. The system of claim 46, further comprising:

means for projecting in response to the means for receiving one or more signals that include information associated with coordinating one or more changes in one or more features of one or more projection surfaces with one or more commands.

48. A system comprising:

a non-transitory signal-bearing medium bearing one or more executable, instructions that when executed perform a process that includes:

sensing with one or more surface sensors, the surface sensors to be disposed on or about one or more projection surfaces, the one or more surface sensors to include at least one of a magnetic sensor, a pressure sensor, a motion sensor, a range sensor, or a strain surface sensor, sensing including detecting changes in one or more features of the at least one or more projection surfaces;

receiving one or more signals that include information associated with one or more changes in one or more features of at least one of the one or more projection surfaces, the information included in the received one or more signals having been obtained via the one or more surface sensors, the information associated with one or more changes in one or more features of at least one of the one or more projection surfaces included in the one or more signals; and projecting content onto the projection surface in response to receiving one or more signals that include information associated with one or more changes in one or more features of at least one of the one or more projection surfaces, projecting content includes selecting the content in response to receiving the detected features of the one or more projection surfaces included in the information included in the one or more signals.

49. The system of claim 48, further comprising:

one or more instructions for receiving one or more signals that include information associated with coordinating one or more changes in one or more features of one or more projection surfaces with one or more commands.

50. The system of claim 49, further comprising:

one or more instructions for projecting in response to receiving one or more signals that include information associated with coordinating one or more changes in one or more features of one or more projection surfaces with one or more commands.

51. The system of claim 48, wherein sensing includes detecting changes in one or more features of the at least one or more projection surfaces by a person, wherein the instructions that when executed perform a process that includes determining from the signals a class of the person, and wherein projecting content includes selecting the content in response to receiving the detected features of the one or more projection surfaces included in the information included in the one or more signals comprises:

projecting a first content in response to determining the person is a member of a first class of persons; and projecting a second content in response to determining the person is a member of a second class of persons.

* * * * *